US007849393B1

(12) United States Patent
Hendricks et al.

(10) Patent No.: US 7,849,393 B1
(45) Date of Patent: Dec. 7, 2010

(54) ELECTRONIC BOOK CONNECTION TO WORLD WATCH LIVE

(75) Inventors: John S. Hendricks, Montgomery County, MD (US); John S. McCoskey, Douglas County, CO (US); Michael L. Asmussen, Fairfax County, VA (US)

(73) Assignee: Discovery Communications, Inc., Bethesda, MD (US)

( * ) Notice: Subject to any disclaimer, the term of this patent is extended or adjusted under 35 U.S.C. 154(b) by 0 days.

(21) Appl. No.: 09/520,344

(22) Filed: Mar. 7, 2000

Related U.S. Application Data

(63) Continuation-in-part of application No. 07/991,074, filed on Dec. 9, 1992, now abandoned, and a continuation-in-part of application No. 08/336,247, filed on Nov. 7, 1994, now Pat. No. 5,986,690, and a continuation-in-part of application No. 08/160,194, and application No. PCT/US93/11606, Dec. 2, 1993, now Pat. No. 5,990,927, and a continuation-in-part of application No. 08/906,469, filed on Aug. 5, 1997, now Pat. No. 6,408,437, and a continuation-in-part of application No. 09/191,520, filed on Nov. 13, 1998, now abandoned, and a continuation-in-part of application No. 08/923,091, filed on Sep. 4, 1997, now Pat. No. 6,675,386.

(51) Int. Cl.
*G06F 17/00* (2006.01)
(52) U.S. Cl. ...................................... 715/203
(58) Field of Classification Search .................. 725/39, 725/105, 106, 125; 715/854, 515, 501, 513, 715/514, 203, 205; 700/83; 345/173; 348/14.07; 395/157; 709/206; 705/27; *G06F 17/00*
See application file for complete search history.

(56) References Cited

U.S. PATENT DOCUMENTS 3,860,873 A    1/1975    Ringstad (Continued)

FOREIGN PATENT DOCUMENTS

CA    2044574    12/1992

(Continued)

OTHER PUBLICATIONS

Proceedings of the Symnposium on Optical Character Recognition, Washington, D.C., 1962, Edited by Fisher, George, et al., 6 pages.

(Continued)

*Primary Examiner*—Tung Vo
(74) *Attorney, Agent, or Firm*—Arent Fox, LLP

(57) ABSTRACT

An electronic book selection and delivery system distributes text to subscribers. The system includes the ability to use electronic links as well as a system for creating electronic links between specific electronic books and other electronic files. The links may be used or accessed by a menu system or by operation of a cursor and a select button. The other electronic files could be portions of a specific electronic book, such as a Table of Contents. The other electronic files could also exist external to a specific electronic book. For example, definitions provided in an electronic English-language dictionary could be linked to terms contained in an electronic book. The electronic links may be created by the book publisher or may be subscriber-defined. The links may use standard programming language such as hypertext markup language (HTML). The links may be established through use of a relational database.

23 Claims, 59 Drawing Sheets

U.S. PATENT DOCUMENTS

| | | | |
|---|---|---|---|
| 3,891,792 A | 6/1975 | Kimura |
| 3,978,470 A | 8/1976 | McGuire |
| 4,023,408 A | 5/1977 | Ryan et al. |
| 4,071,697 A | 1/1978 | Bushnell et al. |
| 4,159,417 A | 6/1979 | Rubincam |
| 4,160,242 A | 7/1979 | Fowler |
| 4,179,212 A | 12/1979 | Lahr |
| 4,197,590 A | 4/1980 | Sukonick et al. |
| 4,272,819 A | 6/1981 | Katsumata et al. |
| 4,298,793 A | 11/1981 | Melis et al. |
| 4,302,193 A | 11/1981 | Haynes |
| 4,361,848 A | 11/1982 | Poignet et al. |
| 4,381,522 A | 4/1983 | Lambert |
| 4,398,216 A | 8/1983 | Field et al. |
| 4,405,829 A | 9/1983 | Rivest et al. |
| 4,406,626 A | 9/1983 | Anderson et al. |
| 4,429,385 A | 1/1984 | Cichelli et al. |
| 4,455,570 A | 6/1984 | Saeki et al. |
| 4,484,217 A | 11/1984 | Block et al. |
| 4,488,179 A | 12/1984 | Kruger et al. |
| 4,513,390 A | 4/1985 | Walter et al. |
| 4,517,598 A | 5/1985 | Van Valkenburg et al. |
| 4,528,589 A | 7/1985 | Block et al. |
| 4,528,643 A | 7/1985 | Freeny, Jr. |
| 4,532,540 A | 7/1985 | Wine |
| 4,533,948 A | 8/1985 | McNamara et al. |
| 4,546,382 A | 10/1985 | McKenna et al. |
| 4,567,512 A | 1/1986 | Abraham |
| 4,578,531 A | 3/1986 | Everhart et al. |
| 4,579,533 A | 4/1986 | Anderson et al. |
| 4,587,520 A | 5/1986 | Astle |
| 4,602,279 A | 7/1986 | Freeman et al. |
| 4,604,710 A | 8/1986 | Amezcua et al. |
| 4,605,964 A | 8/1986 | Chard |
| 4,613,901 A | 9/1986 | Gilhousen et al. |
| 4,616,263 A | 10/1986 | Eichelberger |
| 4,621,282 A | 11/1986 | Ahern |
| 4,625,076 A | 11/1986 | Okamoto et al. |
| 4,625,235 A | 11/1986 | Watson |
| 4,633,462 A | 12/1986 | Stifle et al. |
| 4,639,225 A | 1/1987 | Washizuka |
| 4,644,470 A | 2/1987 | Feigenbaum et al. |
| 4,653,100 A | 3/1987 | Barnett et al. |
| 4,668,218 A | 5/1987 | Virtanen |
| 4,673,976 A | 6/1987 | Wreford-Howard |
| 4,688,218 A | 8/1987 | Blineau et al. |
| 4,688,246 A | 8/1987 | Eilers et al. |
| 4,694,483 A | 9/1987 | Cheung |
| 4,694,490 A | 9/1987 | Harvey et al. |
| 4,697,209 A | 9/1987 | Kiewit et al. |
| 4,706,121 A | 11/1987 | Young |
| 4,712,105 A | 12/1987 | Kohler |
| 4,712,130 A | 12/1987 | Casey |
| 4,716,543 A | 12/1987 | Ogawa et al. |
| 4,724,491 A | 2/1988 | Lambert |
| 4,731,840 A | 3/1988 | Mniszewski et al. |
| 4,739,510 A | 4/1988 | Jeffers et al. |
| 4,742,543 A | 5/1988 | Frederiksen |
| 4,751,578 A | 6/1988 | Reiter et al. |
| 4,768,087 A | 8/1988 | Taub et al. |
| 4,774,655 A | 9/1988 | Kollin et al. |
| 4,776,011 A | 10/1988 | Busby |
| 4,792,972 A | 12/1988 | Cook, Jr. |
| 4,796,220 A | 1/1989 | Wolfe |
| 4,805,014 A | 2/1989 | Sahara et al. |
| 4,816,901 A | 3/1989 | Music et al. |
| 4,816,904 A | 3/1989 | McKenna et al. |
| 4,820,167 A | 4/1989 | Nobles et al. |
| D301,037 S | 5/1989 | Matsuda |
| 4,829,372 A | 5/1989 | McCalley et al. |
| 4,829,558 A | 5/1989 | Welsh |
| 4,829,569 A | 5/1989 | Seth-Smith et al. |
| 4,835,607 A | 5/1989 | Keith |
| 4,854,878 A | 8/1989 | Malvino |
| 4,855,725 A | 8/1989 | Fernandez |
| 4,860,379 A | 8/1989 | Schoenberger et al. |
| 4,866,770 A | 9/1989 | Seth-Smith |
| 4,868,866 A | 9/1989 | Williams, Jr. |
| 4,876,736 A | 10/1989 | Kiewit |
| 4,885,803 A | 12/1989 | Hermann et al. |
| 4,890,319 A | 12/1989 | Seth-Smith |
| 4,890,321 A | 12/1989 | Seth-Smith |
| 4,891,838 A | 1/1990 | Faber |
| 4,899,292 A | 2/1990 | Montagna |
| 4,920,432 A | 4/1990 | Eggers et al. |
| 4,924,513 A | 5/1990 | Herbison et al. |
| 4,928,168 A | 5/1990 | Iwashita |
| 4,928,177 A | 5/1990 | Martinez |
| 4,930,160 A | 5/1990 | Vogel |
| 4,941,089 A | 7/1990 | Fisher |
| 4,941,125 A | 7/1990 | Boyne |
| 4,947,244 A | 8/1990 | Fenwich et al. |
| 4,947,429 A | 8/1990 | Bestler et al. |
| 4,949,187 A | 8/1990 | Cohen |
| 4,959,810 A | 9/1990 | Darbee et al. |
| 4,961,109 A | 10/1990 | Tanaka |
| 4,965,819 A * | 10/1990 | Kannes ................ 348/14.07 |
| 4,965,825 A | 10/1990 | Harvey et al. |
| 4,975,951 A | 12/1990 | Bennett |
| 4,977,455 A | 12/1990 | Young |
| 4,982,344 A * | 1/1991 | Jordan ................ 715/804 |
| 4,985,697 A | 1/1991 | Boulton |
| D314,383 S | 2/1991 | Hafner |
| 4,995,078 A | 2/1991 | Monslow et al. |
| 4,996,597 A | 2/1991 | Duffield |
| 5,001,554 A | 3/1991 | Johnson et al. |
| 5,003,384 A | 3/1991 | Durden et al. |
| 5,003,591 A | 3/1991 | Kauffman et al. |
| 5,010,499 A | 4/1991 | Yee |
| 5,014,125 A | 5/1991 | Pocock et al. |
| 5,015,829 A | 5/1991 | Eilert et al. |
| 5,020,129 A | 5/1991 | Martin et al. |
| 5,027,400 A | 6/1991 | Baji et al. |
| 5,036,394 A | 7/1991 | Morii |
| 5,036,537 A | 7/1991 | Jeffers et al. |
| 5,038,402 A | 8/1991 | Robbins |
| 5,046,093 A | 9/1991 | Wachob |
| 5,047,867 A | 9/1991 | Strubbe et al. |
| 5,049,862 A | 9/1991 | Dao |
| 5,049,990 A | 9/1991 | Kondo et al. |
| 5,054,984 A | 10/1991 | Chan et al. |
| 5,056,138 A | 10/1991 | Tyson, Sr. |
| 5,057,917 A | 10/1991 | Shalkauser et al. |
| 5,073,930 A | 12/1991 | Green et al. |
| 5,075,771 A | 12/1991 | Hashimoto |
| 5,077,607 A | 12/1991 | Johnson et al. |
| 5,078,019 A | 1/1992 | Aoki |
| 5,089,956 A | 2/1992 | MacPhail |
| 5,091,782 A | 2/1992 | Krause et al. |
| 5,093,718 A | 3/1992 | Hoarty et al. |
| 5,099,319 A | 3/1992 | Esch et al. |
| 5,099,331 A | 3/1992 | Truong |
| D325,581 S | 4/1992 | Schwartz |
| 5,103,314 A | 4/1992 | Keenan |
| 5,105,268 A | 4/1992 | Yamanouchi et al. |
| D326,446 S | 5/1992 | Wong |
| 5,115,426 A | 5/1992 | Spanke |
| 5,121,476 A | 6/1992 | Yee |
| 5,124,980 A | 6/1992 | Maki |
| 5,128,662 A | 7/1992 | Failla |
| 5,130,792 A | 7/1992 | Tindell et al. |
| 5,130,924 A | 7/1992 | Barker et al. |
| 5,132,789 A | 7/1992 | Ammon et al. |
| 5,132,992 A | 7/1992 | Yurt et al. |

| | | | | | | |
|---|---|---|---|---|---|---|
| 5,133,079 A | 7/1992 | Ballantyne et al. | | 5,319,455 A | 6/1994 | Hoarty et al. |
| 5,140,419 A | 8/1992 | Galumbeck et al. | | 5,319,542 A | 6/1994 | King et al. |
| D329,238 S | 9/1992 | Grasso et al. | | 5,319,649 A | 6/1994 | Raghavan et al. |
| 5,144,663 A | 9/1992 | Kudelski et al. | | 5,319,707 A | 6/1994 | Wasilewski et al. |
| 5,144,665 A | 9/1992 | Takaragi et al. | | 5,321,846 A | 6/1994 | Yokota et al. |
| 5,146,552 A | 9/1992 | Cassorla et al. | | 5,323,240 A | 6/1994 | Amano et al. |
| 5,146,600 A | 9/1992 | Sugiura | | 5,327,554 A | 7/1994 | Palazzi, III et al. |
| 5,150,118 A | 9/1992 | Finkle | | 5,329,590 A | 7/1994 | Pond |
| 5,151,782 A | 9/1992 | Ferraro | | D349,923 S | 8/1994 | Billings et al. |
| 5,151,789 A | 9/1992 | Young | | 5,339,091 A | 8/1994 | Yamazaki et al. |
| 5,152,011 A | 9/1992 | Schwob | | 5,339,239 A | 8/1994 | Manabe et al. |
| 5,155,590 A | 10/1992 | Beyers, II et al. | | 5,339,315 A | 8/1994 | Maeda et al. |
| 5,155,591 A | 10/1992 | Wachob | | 5,341,166 A | 8/1994 | Garr et al. |
| 5,157,783 A | 10/1992 | Anderson | | 5,341,425 A | 8/1994 | Wasilweski et al. |
| 5,159,452 A | 10/1992 | Kinoshita et al. | | 5,341,426 A | 8/1994 | Barney et al. |
| 5,159,669 A | 10/1992 | Trigg et al. | | 5,341,474 A | 8/1994 | Gelman et al. |
| 5,166,886 A | 11/1992 | Molnar et al. | | 5,343,239 A | 8/1994 | Lappington |
| D331,760 S | 12/1992 | Renk, Jr. | | 5,343,516 A | 8/1994 | Callele et al. |
| 5,172,413 A | 12/1992 | Bradley et al. | | 5,345,580 A | 9/1994 | Tamaru et al. |
| 5,173,051 A | 12/1992 | May et al. | | 5,345,594 A | 9/1994 | Tsuda |
| 5,182,639 A | 1/1993 | Jutamulia et al. | | 5,349,638 A | 9/1994 | Pitroda et al. |
| 5,185,667 A | 2/1993 | Zimmerman et al. | | 5,351,075 A | 9/1994 | Herz et al. |
| 5,195,181 A | 3/1993 | Bryant et al. | | 5,353,121 A | 10/1994 | Young et al. |
| 5,199,104 A | 3/1993 | Hirayama | | 5,355,162 A | 10/1994 | Yazolino et al. |
| 5,202,817 A | 4/1993 | Koenck et al. | | 5,357,276 A | 10/1994 | Banker et al. |
| 5,204,947 A * | 4/1993 | Bernstein et al. ............ 715/854 | | 5,365,265 A | 11/1994 | Shibata et al. |
| 5,206,722 A | 4/1993 | Kwan | | 5,365,434 A | 11/1994 | Figliuzzi |
| 5,206,929 A | 4/1993 | Langford et al. | | 5,367,330 A | 11/1994 | Haave et al. |
| 5,206,954 A | 4/1993 | Inoue et al. | | 5,367,571 A | 11/1994 | Bowen et al. |
| 5,208,665 A | 5/1993 | McCalley et al. | | 5,367,621 A | 11/1994 | Cohen et al. |
| 5,208,745 A * | 5/1993 | Quentin et al. ................ 700/83 | | 5,367,643 A | 11/1994 | Chang et al. |
| 5,210,611 A | 5/1993 | Yee et al. | | 5,371,532 A | 12/1994 | Gelman et al. |
| 5,212,553 A | 5/1993 | Maruoka | | 5,373,324 A | 12/1994 | Kuroda et al. |
| 5,216,515 A | 6/1993 | Steele et al. | | 5,375,068 A | 12/1994 | Palmer et al. |
| 5,220,438 A | 6/1993 | Yamamoto | | 5,375,160 A | 12/1994 | Guidon et al. |
| 5,220,649 A | 6/1993 | Forcier | | 5,379,057 A | 1/1995 | Clough et al. |
| 5,221,962 A | 6/1993 | Backus et al. | | 5,383,112 A | 1/1995 | Clark |
| 5,222,136 A | 6/1993 | Rasmussen et al. | | 5,384,588 A | 1/1995 | Martin et al. |
| 5,223,924 A | 6/1993 | Strubbe | | 5,388,101 A | 2/1995 | Dinkins |
| 5,231,631 A | 7/1993 | Buhrke | | 5,388,196 A | 2/1995 | Pajak et al. |
| 5,233,333 A | 8/1993 | Borsuk | | 5,390,348 A | 2/1995 | Magin et al. |
| 5,235,419 A | 8/1993 | Krause et al. | | 5,392,387 A | 2/1995 | Fitzpatrick |
| 5,235,619 A | 8/1993 | Beyers et al. | | 5,396,546 A | 3/1995 | Remillard |
| 5,235,680 A | 8/1993 | Bijnagte | | 5,400,401 A | 3/1995 | Wasilewski et al. |
| 5,237,311 A | 8/1993 | Mailey et al. | | 5,404,393 A | 4/1995 | Remillard |
| 5,237,610 A | 8/1993 | Gammie et al. | | 5,404,505 A | 4/1995 | Levison |
| 5,237,614 A | 8/1993 | Weiss | | 5,408,258 A | 4/1995 | Kolessar |
| 5,239,665 A | 8/1993 | Tsuchiya | | 5,408,465 A | 4/1995 | Guesella et al. |
| 5,241,671 A | 8/1993 | Reed et al. | | 5,410,326 A | 4/1995 | Goldstein |
| 5,247,347 A | 9/1993 | Litteral et al. | | 5,410,344 A | 4/1995 | Graves et al. |
| 5,247,575 A | 9/1993 | Sprague et al. | | 5,412,416 A | 5/1995 | Nemirofsky |
| 5,251,324 A | 10/1993 | McMullan | | 5,414,426 A | 5/1995 | O'Donnell et al. |
| 5,253,066 A | 10/1993 | Vogel | | 5,416,508 A | 5/1995 | Sakuma et al. |
| 5,253,275 A | 10/1993 | Yurt et al. | | 5,417,575 A | 5/1995 | McTaggart |
| 5,253,341 A | 10/1993 | Rozmanith et al. | | 5,418,559 A | 5/1995 | Blahut |
| 5,256,067 A | 10/1993 | Gildea | | 5,418,957 A | 5/1995 | Narayan |
| 5,257,185 A | 10/1993 | Farley et al. | | 5,420,974 A * | 5/1995 | Morris et al. ................ 715/515 |
| 5,260,778 A | 11/1993 | Kauffman et al. | | 5,424,770 A | 6/1995 | Schmelzer et al. |
| 5,260,788 A | 11/1993 | Takano et al. | | 5,425,102 A | 6/1995 | Moy |
| 5,262,875 A | 11/1993 | Mincer et al. | | 5,426,594 A | 6/1995 | Wright et al. |
| 5,282,028 A | 1/1994 | Johnson et al. | | 5,428,529 A | 6/1995 | Hartrick et al. |
| 5,283,639 A | 2/1994 | Esch et al. | | 5,432,542 A | 7/1995 | Thibadeau et al. |
| 5,285,272 A | 2/1994 | Bradley et al. | | 5,432,561 A | 7/1995 | Strubbe |
| 5,289,271 A | 2/1994 | Watson | | 5,437,552 A | 8/1995 | Baer et al. |
| 5,289,288 A | 2/1994 | Silverman et al. | | 5,438,372 A | 8/1995 | Tsumori et al. |
| 5,291,554 A | 3/1994 | Morales | | 5,440,632 A | 8/1995 | Bacon et al. |
| 5,293,540 A | 3/1994 | Trani et al. | | 5,442,390 A | 8/1995 | Hooper et al. |
| 5,293,633 A | 3/1994 | Robbins | | 5,442,626 A | 8/1995 | Wei |
| 5,301,172 A | 4/1994 | Richards et al. | | 5,444,853 A | 8/1995 | Lentz |
| D346,620 S | 5/1994 | McSorley | | 5,446,488 A | 8/1995 | Vogel |
| 5,315,711 A * | 5/1994 | Barone et al. ................ 709/208 | | 5,446,490 A | 8/1995 | Blahut et al. |
| 5,318,450 A | 6/1994 | Carver | | 5,446,919 A | 8/1995 | Wilkins |
| 5,319,454 A | 6/1994 | Schutte | | D362,429 S | 9/1995 | Lande et al. |

| | | | | | | |
|---|---|---|---|---|---|---|
| 5,453,796 A | 9/1995 | Duffield | | 5,598,279 A | 1/1997 | Ishii |
| 5,459,507 A | 10/1995 | Sakuma et al. | | 5,598,351 A | 1/1997 | Chater et al. |
| 5,461,667 A | 10/1995 | Remillard | | 5,598,523 A | 1/1997 | Fujita |
| 5,465,213 A | 11/1995 | Ross | | 5,600,368 A | 2/1997 | Matthews, III |
| 5,465,401 A | 11/1995 | Thompson | | 5,600,573 A | 2/1997 | Hendricks et al. |
| 5,466,158 A | 11/1995 | Smith, III | | 5,602,596 A | 2/1997 | Claussen et al. |
| 5,467,102 A | 11/1995 | Kuno et al. | | 5,604,824 A | 2/1997 | Chui et al. |
| 5,469,206 A | 11/1995 | Strubbe et al. | | 5,608,449 A | 3/1997 | Swafford et al. |
| 5,473,362 A | 12/1995 | Fitzgerald et al. | | 5,613,109 A | 3/1997 | Yamauchi et al. |
| 5,475,398 A | 12/1995 | Yamazaki et al. | | 5,621,456 A | 4/1997 | Florin et al. |
| 5,475,399 A | 12/1995 | Borsuk | | 5,621,658 A | 4/1997 | Jackson et al. |
| 5,475,585 A | 12/1995 | Bush | | 5,624,265 A | 4/1997 | Redford et al. |
| 5,475,682 A | 12/1995 | Choudhury | | 5,625,833 A | 4/1997 | Levine et al. |
| 5,477,262 A | 12/1995 | Banker et al. | | 5,630,103 A | 5/1997 | Smith et al. |
| 5,477,263 A | 12/1995 | O'Callaghan et al. | | 5,630,125 A | 5/1997 | Zellweger |
| 5,479,268 A | 12/1995 | Young | | 5,631,693 A | 5/1997 | Wunderlich et al. |
| 5,479,508 A | 12/1995 | Bestler et al. | | 5,631,694 A | 5/1997 | Aggarwal et al. |
| 5,479,615 A | 12/1995 | Ishii et al. | | 5,632,022 A | 5/1997 | Warren et al. |
| 5,481,294 A | 1/1996 | Thomas et al. | | 5,634,064 A | 5/1997 | Warnock et al. |
| 5,481,296 A | 1/1996 | Cragun et al. | | 5,635,918 A | 6/1997 | Tett |
| 5,481,542 A | 1/1996 | Logston | | 5,636,036 A | 6/1997 | Ashbey |
| 5,483,278 A | 1/1996 | Strubbe et al. | | 5,638,443 A | 6/1997 | Stefik |
| 5,484,292 A | 1/1996 | McTaggart | | 5,640,193 A | 6/1997 | Wellner |
| 5,485,176 A | 1/1996 | Ohara | | 5,640,196 A | 6/1997 | Behrens et al. |
| 5,485,221 A | 1/1996 | Banker et al. | | 5,644,354 A | 7/1997 | Thompson et al. |
| 5,486,686 A | 1/1996 | Zdybel, Jr. et al. | | 5,646,675 A | 7/1997 | Copriviza et al. |
| 5,495,581 A | 2/1996 | Tsai | | 5,649,230 A | 7/1997 | Lentz |
| 5,497,187 A | 3/1996 | Banker et al. | | 5,657,414 A | 8/1997 | Lett et al. |
| 5,497,459 A | 3/1996 | Tanihira et al. | | 5,661,516 A | 8/1997 | Carles |
| 5,499,330 A | 3/1996 | Lucas et al. | | 5,663,748 A | 9/1997 | Huffman |
| 5,500,794 A | 3/1996 | Fujita et al. | | 5,663,757 A | 9/1997 | Morales |
| 5,502,576 A | 3/1996 | Ramsay et al. | | 5,666,493 A | 9/1997 | Wojcik et al. |
| 5,506,902 A | 4/1996 | Kubota | | 5,682,206 A | 10/1997 | Wehmeyer et al. |
| 5,509,074 A | 4/1996 | Choudhury et al. | | 5,689,641 A | 11/1997 | Ludwig et al. |
| 5,512,934 A | 4/1996 | Kochanski | | 5,689,648 A | 11/1997 | Diaz et al. |
| 5,515,098 A | 5/1996 | Carles | | 5,689,663 A | 11/1997 | Williams |
| 5,517,254 A | 5/1996 | Monta et al. | | 5,691,777 A | 11/1997 | Kassaatly |
| 5,519,780 A | 5/1996 | Woo et al. | | 5,696,906 A | 12/1997 | Peters et al. |
| 5,521,631 A | 5/1996 | Budow et al. | | 5,696,982 A | 12/1997 | Tanigawa et al. |
| 5,524,193 A | 6/1996 | Covington et al. | | 5,697,793 A | 12/1997 | Huffman et al. |
| 5,524,201 A | 6/1996 | Shwarts et al. | | 5,708,960 A | 1/1998 | Kamisaka |
| 5,526,035 A | 6/1996 | Lappington et al. | | 5,710,887 A | 1/1998 | Chelliah et al. |
| 5,526,469 A | 6/1996 | Brindle et al. | | 5,715,314 A | 2/1998 | Payne et al. |
| 5,528,281 A | 6/1996 | Grady et al. | | 5,715,515 A | 2/1998 | Akins, III |
| 5,528,490 A | 6/1996 | Hill | | 5,721,832 A | 2/1998 | Westrope et al. |
| 5,530,235 A | 6/1996 | Stefik | | 5,721,908 A * | 2/1998 | Lagarde et al. ................ 707/10 |
| 5,531,227 A | 7/1996 | Schneider | | 5,721,956 A | 2/1998 | Martin et al. |
| 5,531,600 A | 7/1996 | Baer | | 5,722,418 A | 3/1998 | Bro |
| 5,532,920 A | 7/1996 | Hartrick et al. | | 5,724,091 A | 3/1998 | Freeman et al. |
| 5,534,888 A | 7/1996 | Lebby et al. | | 5,724,521 A | 3/1998 | Dedrick |
| 5,538,430 A | 7/1996 | Smith | | 5,726,909 A | 3/1998 | Krikorian |
| 5,544,320 A | 8/1996 | Konrad | | 5,727,065 A | 3/1998 | Dillon |
| 5,544,342 A | 8/1996 | Dean | | 5,734,719 A | 3/1998 | Tsevdos et al. |
| 5,550,863 A | 8/1996 | Yurt et al. | | 5,734,823 A | 3/1998 | Saigh et al. |
| 5,553,216 A | 9/1996 | Yoshioka et al. | | 5,734,891 A | 3/1998 | Saigh |
| 5,555,441 A | 9/1996 | Haddad | | 5,737,725 A | 4/1998 | Case |
| 5,557,722 A | 9/1996 | DeRose et al. | | 5,737,747 A | 4/1998 | Vishlitzky et al. |
| 5,557,744 A | 9/1996 | Kobayakawa et al. | | 5,739,814 A * | 4/1998 | Ohara et al. ................ 345/173 |
| 5,561,708 A | 10/1996 | Remillard | | 5,740,549 A | 4/1998 | Reily et al. |
| 5,561,803 A | 10/1996 | Kilis | | 5,742,680 A | 4/1998 | Wilson |
| 5,565,908 A | 10/1996 | Ahmad | | 5,748,441 A | 5/1998 | Loritz et al. |
| 5,565,999 A | 10/1996 | Takahashi | | 5,749,735 A | 5/1998 | Redford |
| 5,570,126 A | 10/1996 | Blahut et al. | | 5,754,172 A | 5/1998 | Kubota et al. |
| 5,572,625 A | 11/1996 | Raman et al. | | 5,758,257 A | 5/1998 | Herz et al. |
| 5,572,652 A | 11/1996 | Robusto | | 5,760,771 A * | 6/1998 | Blonder et al. ................ 715/854 |
| 5,579,055 A | 11/1996 | Hamilton et al. | | 5,761,468 A | 6/1998 | Emberson |
| 5,579,057 A | 11/1996 | Banker et al. | | 5,761,485 A | 6/1998 | Munyan |
| 5,581,560 A | 12/1996 | Shimada et al. | | 5,761,606 A | 6/1998 | Wolzien |
| 5,581,686 A | 12/1996 | Koppolu et al. | | 5,761,681 A | 6/1998 | Huffman |
| 5,585,858 A | 12/1996 | Harper et al. | | 5,764,276 A | 6/1998 | Martin et al. |
| 5,586,235 A | 12/1996 | Kauffman et al. | | 5,767,896 A | 6/1998 | Nemirofsky |
| 5,587,724 A | 12/1996 | Matsuda | | 5,768,521 A | 6/1998 | Dedrick |
| 5,598,209 A | 1/1997 | Cortjens et al. | | 5,771,354 A | 6/1998 | Crawford |

| | | |
|---|---|---|
| 5,774,170 A | 6/1998 | Hite et al. |
| 5,778,374 A | 7/1998 | Dang et al. |
| 5,784,565 A * | 7/1998 | Lewine ................... 709/229 |
| 5,786,521 A | 7/1998 | Darsow |
| 5,787,171 A | 7/1998 | Kubota et al. |
| 5,787,254 A * | 7/1998 | Maddalozzo et al. ........ 709/228 |
| 5,788,504 A | 8/1998 | Rice et al. |
| 5,790,176 A | 8/1998 | Craig |
| 5,790,935 A | 8/1998 | Payton |
| 5,793,414 A | 8/1998 | Shaffer |
| 5,796,954 A | 8/1998 | Hanif |
| 5,798,785 A | 8/1998 | Hendricks et al. |
| 5,799,071 A | 8/1998 | Azar et al. |
| 5,799,157 A | 8/1998 | Escallon |
| 5,802,465 A | 9/1998 | Hamalainen et al. |
| 5,802,526 A | 9/1998 | Fawcett et al. |
| 5,805,204 A | 9/1998 | Thompson et al. |
| 5,815,662 A | 9/1998 | Ong |
| 5,815,671 A | 9/1998 | Morrison |
| 5,819,301 A | 10/1998 | Rowe et al. |
| 5,835,732 A | 11/1998 | Kikinis et al. |
| 5,844,600 A | 12/1998 | Kerr |
| 5,844,890 A | 12/1998 | Delp et al. |
| 5,850,218 A | 12/1998 | LaJoie et al. |
| 5,850,520 A | 12/1998 | Griebenow et al. |
| 5,850,629 A | 12/1998 | Holm et al. |
| 5,859,594 A | 1/1999 | King et al. |
| 5,862,325 A | 1/1999 | Reed et al. |
| 5,862,329 A | 1/1999 | Aras et al. |
| 5,864,823 A | 1/1999 | Levitan |
| 5,870,717 A | 2/1999 | Wiecha |
| 5,870,767 A * | 2/1999 | Kraft, IV .................... 715/205 |
| 5,877,755 A | 3/1999 | Hellhake |
| 5,877,801 A | 3/1999 | Martin et al. |
| 5,881,269 A | 3/1999 | Dobbelstein |
| 5,884,288 A | 3/1999 | Chang |
| 5,890,122 A | 3/1999 | Van Kleeck et al. |
| 5,890,177 A | 3/1999 | Moody et al. |
| 5,892,900 A | 4/1999 | Ginter et al. |
| 5,892,915 A | 4/1999 | Duso et al. |
| 5,893,109 A | 4/1999 | DeRose et al. |
| 5,893,132 A | 4/1999 | Huffman et al. |
| 5,898,852 A | 4/1999 | Petolino et al. |
| 5,903,319 A | 5/1999 | Busko et al. |
| 5,903,652 A | 5/1999 | Mital |
| 5,903,901 A | 5/1999 | Kawakura et al. |
| 5,906,397 A | 5/1999 | MacWilliams |
| 5,914,706 A | 6/1999 | Kono |
| 5,917,543 A | 6/1999 | Uehara |
| 5,917,915 A | 6/1999 | Hirose |
| 5,918,213 A | 6/1999 | Bernard et al. |
| 5,923,656 A | 7/1999 | Duan |
| 5,926,624 A | 7/1999 | Katz et al. |
| 5,929,848 A | 7/1999 | Albukerk et al. |
| 5,930,768 A | 7/1999 | Hooban |
| 5,933,498 A | 8/1999 | Schneck et al. |
| 5,937,162 A | 8/1999 | Funk et al. |
| 5,940,073 A | 8/1999 | Klosterman et al. |
| 5,956,034 A | 9/1999 | Sachs et al. |
| 5,956,483 A * | 9/1999 | Grate et al. ................. 709/203 |
| 5,957,695 A | 9/1999 | Redford et al. |
| 5,957,697 A | 9/1999 | Iggulden et al. |
| 5,959,945 A | 9/1999 | Kleiman |
| 5,963,246 A | 10/1999 | Kato |
| 5,978,841 A | 11/1999 | Berger |
| 5,986,677 A | 11/1999 | Jones et al. |
| 5,986,690 A | 11/1999 | Hendricks |
| 5,990,927 A | 11/1999 | Hendricks et al. |
| 5,991,594 A | 11/1999 | Froeber |
| 5,999,214 A | 12/1999 | Inagaki |
| 6,009,401 A | 12/1999 | Horstmann |
| 6,012,890 A | 1/2000 | Celorio |
| 6,014,184 A | 1/2000 | Knee et al. |
| 6,016,484 A | 1/2000 | Williams et al. |
| 6,025,837 A | 2/2000 | Mathews, III et al. |
| 6,025,871 A | 2/2000 | Kantor et al. |
| 6,029,045 A | 2/2000 | Picco et al. |
| 6,029,141 A * | 2/2000 | Bezos et al. ................... 705/27 |
| 6,029,176 A | 2/2000 | Cannon |
| 6,034,680 A * | 3/2000 | Kessenich et al. ........... 715/733 |
| 6,044,385 A * | 3/2000 | Gross et al. ................. 715/205 |
| 6,052,717 A | 4/2000 | Reynolds et al. |
| 6,055,544 A * | 4/2000 | DeRose et al. ........... 707/104.1 |
| 6,061,504 A | 5/2000 | Tzelnic et al. |
| 6,091,823 A | 7/2000 | Hosomi et al. |
| 6,091,930 A | 7/2000 | Mortimer et al. |
| 6,101,485 A | 8/2000 | Fortenberry et al. |
| 6,112,049 A | 8/2000 | Sonnenfeld |
| 6,115,040 A | 9/2000 | Bladow et al. |
| 6,115,482 A | 9/2000 | Sears et al. |
| 6,161,093 A | 12/2000 | Watari et al. |
| 6,163,796 A | 12/2000 | Yokomizo |
| 6,167,435 A * | 12/2000 | Druckenmiller et al. .... 709/206 |
| 6,173,335 B1 | 1/2001 | Culbert |
| 6,177,936 B1 * | 1/2001 | Cragun ....................... 715/760 |
| 6,195,667 B1 | 2/2001 | Duga et al. |
| 6,204,885 B1 | 3/2001 | Kwoh |
| 6,229,694 B1 | 5/2001 | Kono |
| 6,243,071 B1 | 6/2001 | Shwarts et al. |
| 6,249,785 B1 | 6/2001 | Paepke |
| 6,252,876 B1 | 6/2001 | Brueckheimer |
| 6,252,879 B1 | 6/2001 | Zhang |
| 6,260,024 B1 | 7/2001 | Shkedy |
| 6,269,483 B1 | 7/2001 | Broussard |
| 6,279,017 B1 | 8/2001 | Walker |
| 6,281,986 B1 | 8/2001 | Form |
| 6,295,542 B1 | 9/2001 | Corbin |
| 6,298,441 B1 | 10/2001 | Handelman et al. |
| 6,301,584 B1 * | 10/2001 | Ranger ..................... 707/103 R |
| 6,313,828 B1 | 11/2001 | Chombo |
| 6,314,474 B1 | 11/2001 | Walter et al. |
| 6,320,591 B1 | 11/2001 | Griencewic |
| 6,331,865 B1 | 12/2001 | Sachs et al. |
| 6,331,867 B1 | 12/2001 | Eberhard et al. |
| 6,334,109 B1 | 12/2001 | Kanevsky et al. |
| 6,335,678 B1 | 1/2002 | Heutschi |
| 6,339,842 B1 | 1/2002 | Fernandez et al. |
| 6,344,853 B1 | 2/2002 | Knight |
| 6,351,750 B1 | 2/2002 | Duga et al. |
| 6,363,418 B1 | 3/2002 | Conboy et al. |
| 6,385,614 B1 | 5/2002 | Vellandi |
| 6,411,973 B1 | 6/2002 | Yianilos |
| 6,415,316 B1 | 7/2002 | Van Der Meer |
| 6,438,233 B1 | 8/2002 | Yoshimune et al. |
| 6,452,614 B1 | 9/2002 | King et al. |
| 6,452,933 B1 | 9/2002 | Duffield et al. |
| 6,460,036 B1 | 10/2002 | Herz |
| 6,462,729 B2 | 10/2002 | Morita |
| 6,486,895 B1 | 11/2002 | Robertson |
| 6,493,734 B1 | 12/2002 | Sachs et al. |
| 6,507,342 B1 | 1/2003 | Hirayama |
| 6,510,531 B1 | 1/2003 | Gibbons |
| 6,535,505 B1 | 3/2003 | Hwang et al. |
| 6,546,016 B1 | 4/2003 | Gerszberg et al. |
| 6,556,561 B1 | 4/2003 | Himbeault et al. |
| 6,557,173 B1 | 4/2003 | Hendricks |
| 6,585,776 B1 * | 7/2003 | Bates et al. .................. 715/206 |
| 6,597,314 B1 * | 7/2003 | Beezer et al. ............... 715/812 |
| 6,606,603 B1 | 8/2003 | Joseph |
| 6,611,531 B1 | 8/2003 | Chen et al. |
| 6,634,028 B2 | 10/2003 | Handelman |
| 6,654,754 B1 | 11/2003 | Knauft |
| 6,657,654 B2 | 12/2003 | Narayanaswami |
| 6,675,384 B1 | 1/2004 | Block et al. |
| 6,683,631 B2 | 1/2004 | Carroll |
| 6,714,238 B2 | 3/2004 | Urisaka et al. |

| | | | | | |
|---|---|---|---|---|---|
| 6,725,203 B1 | 4/2004 | Seet et al. | CA | 2361371 | 4/2009 |
| 6,813,249 B1 | 11/2004 | Lauffenburger et al. | CA | 2369779 | 4/2009 |
| 6,847,403 B1 | 1/2005 | Forsberg, Jr. et al. | CA | 2459059 | 4/2009 |
| 6,886,000 B1 | 4/2005 | Aggarwal et al. | DE | 3423846 | 1/1986 |
| 6,891,551 B2 | 5/2005 | Keely et al. | DE | 3935294 | 4/1991 |
| 6,976,028 B2 | 12/2005 | Fenton | DE | 42 12 184 | 10/1993 |
| 6,990,464 B1 | 1/2006 | Pirillo | EP | 0103438 | 3/1984 |
| 7,020,663 B2 | 3/2006 | Hay | EP | 140302 | 5/1985 |
| 7,039,643 B2 | 5/2006 | Sena et al. | EP | 0145063 | 6/1985 |
| 7,051,351 B2 | 5/2006 | Goldman et al. | EP | 0149536 | 7/1985 |
| 7,181,468 B2 | 2/2007 | Spring | EP | 0158548 | 10/1985 |
| 7,181,692 B2 | 2/2007 | Siegel | EP | 0158767 | 10/1985 |
| 7,185,274 B1 * | 2/2007 | Rubin et al. ............ 715/205 | EP | 0167237 | 1/1986 |
| 7,350,704 B2 | 4/2008 | Barsness | EP | 0187 961 | 7/1986 |
| 2002/0034296 A1 | 3/2002 | Yoshimune | EP | 0243312 | 10/1987 |
| 2002/0087555 A1 | 7/2002 | Murata | EP | 0277014 | 8/1988 |
| 2002/0120635 A1 | 8/2002 | Joao | EP | 0281293 | 9/1988 |
| 2003/0018543 A1 | 1/2003 | Alger et al. | EP | 0299830 | 1/1989 |
| 2003/0093336 A1 | 5/2003 | Ukita et al. | EP | 0314572 | 5/1989 |
| 2003/0093382 A1 | 5/2003 | Himeno et al. | EP | 0328440 | 8/1989 |
| 2003/0124502 A1 | 7/2003 | Chou | EP | 0340643 | 11/1989 |
| 2003/0198932 A1 | 10/2003 | Stuppy | EP | 0355 697 | 2/1990 |
| 2003/0200145 A1 | 10/2003 | Krassner et al. | EP | 0377334 | 7/1990 |
| 2003/0236836 A1 | 12/2003 | Borthwick | EP | 0384986 | 9/1990 |
| 2004/0039934 A1 | 2/2004 | Land et al. | EP | 0396186 | 11/1990 |
| 2004/0201609 A1 | 10/2004 | Obrador | EP | 0399200 | 11/1990 |
| 2004/0215658 A1 | 10/2004 | Carnegie et al. | EP | 0402 809 | 12/1990 |
| 2004/0219494 A1 | 11/2004 | Boon | EP | 0420 123 | 4/1991 |
| 2004/0268224 A1 | 12/2004 | Balkus et al. | EP | 0187 961 | 5/1991 |
| 2005/0144133 A1 | 6/2005 | Hoffman | EP | 0424 648 | 5/1991 |
| 2006/0204942 A1 | 9/2006 | Kimball | EP | 0425 834 | 5/1991 |
| 2006/0259239 A1 | 11/2006 | Nouri | EP | 0450841 | 10/1991 |
| 2007/0016657 A1 | 1/2007 | Ito | EP | 0472070 | 2/1992 |
| | | | EP | 0506 435 | 9/1992 |
| | FOREIGN PATENT DOCUMENTS | | EP | 0513 763 | 11/1992 |
| CA | 2257659 | 11/1993 | EP | 0516533 | 12/1992 |
| CA | 2177154 | 6/1995 | EP | 0539106 | 4/1993 |
| CA | 2458564 | 6/1995 | EP | 093/22877 | 11/1993 |
| CA | 2458346 | 5/2004 | EP | 0567800 | 11/1993 |
| CA | 2458564 | 5/2004 | EP | 0570785 | 11/1993 |
| CA | 2459528 | 10/2004 | EP | 09322877 | 11/1993 |
| CA | 2458337 | 12/2004 | EP | 0586954 | 3/1994 |
| CA | 2458564 | 12/2004 | EP | 0620689 | 10/1994 |
| CA | 2458346 | 4/2005 | EP | 0646856 | 4/1995 |
| CA | 2458355 | 11/2005 | EP | 0702461 A1 | 3/1996 |
| CA | 2458337 | 12/2005 | EP | 0702491 | 3/1996 |
| CA | 2458317 | 3/2006 | EP | 0372384 | 5/1997 |
| CA | 2459063 | 3/2006 | EP | 0810534 A | 12/1997 |
| CA | 2361371 | 7/2006 | EP | 0838798 | 4/1998 |
| CA | 2458258 | 10/2006 | EP | 95904787.9 | 5/1998 |
| CA | 2459048 | 10/2006 | EP | 0892388 | 1/1999 |
| CA | 2458317 | 11/2006 | EP | 0924629 A | 6/1999 |
| CA | 2458355 | 11/2006 | EP | 0924687 | 6/1999 |
| CA | 2459063 | 12/2006 | EP | 0701220 | 7/2001 |
| CA | 2458337 | 1/2007 | EP | 0726535 | 5/2003 |
| CA | 2459059 | 5/2007 | EP | 00968375.6 | 3/2004 |
| CA | 2458379 | 6/2007 | EP | 00909958.1 | 5/2004 |
| CA | 2459048 | 6/2007 | EP | 00974003.6 | 7/2004 |
| CA | 2459529 | 6/2007 | EP | 00974006.9 | 7/2004 |
| CA | 2361371 | 10/2007 | EP | 00923211.7 | 5/2005 |
| CA | 2458307 | 10/2007 | EP | 00923210.9 | 6/2005 |
| CA | 2458355 | 11/2007 | EP | 00909958.1 | 7/2005 |
| CA | 2459779 | 11/2007 | EP | 00968375.6 | 7/2005 |
| CA | 2459780 | 11/2007 | EP | 00909966.4 | 6/2006 |
| CA | 2459059 | 3/2008 | EP | 00974003.6 | 6/2006 |
| CA | 2458317 | 5/2008 | EP | 00909958.1 | 9/2006 |
| CA | 2459063 | 5/2008 | EP | 00909958.1 | 10/2006 |
| CA | 2359690 | 9/2008 | EP | 00943086.9 | 12/2006 |
| CA | 2459779 | 1/2009 | EP | 00925915.1 | 4/2007 |
| CA | 2459780 | 1/2009 | EP | 00960077.6 | 10/2007 |
| CA | 2385097 | 2/2009 | GB | 1204190 | 12/1967 |
| CA | 2458307 | 2/2009 | GB | 1204190 | 9/1970 |
| | | | GB | 2149544 | 6/1985 |

| | | | | | | |
|---|---|---|---|---|---|---|
| GB | 2 177 873 A | 7/1985 | | MX | 2001/010298 | 11/2006 |
| GB | 2149544 A | 12/1985 | | MX | 2002/002555 | 1/2007 |
| GB | 2168227 | 6/1986 | | MX | 2002/000197 | 2/2007 |
| GB | 2 177 873 A | 1/1987 | | MX | 2002/002984 | 3/2007 |
| GB | 2269302 A | 2/1994 | | MX | 2001/007580 | 2/2008 |
| GB | 2344009 | 5/2000 | | MX | 2001/007580 | 6/2008 |
| JP | 060-143086 | 7/1985 | | MX | 2001/010300 | 6/2008 |
| JP | 61-028150 | 2/1986 | | MX | 2001/010298 | 9/2008 |
| JP | 061060150 | 3/1986 | | MX | 2002/002555 | 9/2008 |
| JP | 061060150 | 8/1986 | | MX | 2001/010300 | 11/2008 |
| JP | 62-24777 | 2/1987 | | MX | 2001/007580 | 3/2009 |
| JP | 062-24777 | 2/1987 | | MX | 2001/007581 | 3/2009 |
| JP | 62-140134 | 6/1987 | | TW | 234223 | 11/1994 |
| JP | 062-140134 | 6/1987 | | TW | 235358 | 12/1994 |
| JP | 62-245167 | 10/1987 | | TW | 235359 | 12/1994 |
| JP | 062-245167 | 10/1987 | | TW | 236065 | 12/1994 |
| JP | 01-020454 | 1/1989 | | TW | 236744 | 12/1994 |
| JP | 64-086778 | 3/1989 | | TW | 238461 | 1/1995 |
| JP | 0186778 | 3/1989 | | TW | 234223 | 6/2005 |
| JP | 01-130683 | 5/1989 | | TW | 235358 | 7/2005 |
| JP | 01130683 | 5/1989 | | TW | 235359 | 7/2005 |
| JP | 01-142918 | 6/1989 | | TW | 236065 | 7/2005 |
| JP | 064-007786 | 11/1989 | | TW | 236744 | 7/2005 |
| JP | 64-007786 | 11/1989 | | TW | 238461 | 8/2005 |
| JP | 02-284571 | 11/1990 | | WO | WO 80/00209 | 2/1980 |
| JP | 03-114375 | 5/1991 | | WO | WO 83/03020 | 9/1983 |
| JP | 03-198119 | 8/1991 | | WO | WO 84/00237 | 1/1984 |
| JP | 03225445 | 10/1991 | | WO | WO 86/01962 | 3/1986 |
| JP | 04-170183 | 6/1992 | | WO | WO 87/01481 | 3/1987 |
| JP | 05-046045 | 2/1993 | | WO | WO 88/01463 | 2/1988 |
| JP | 05056405 | 3/1993 | | WO | WO 89/09528 | 10/1989 |
| JP | 05-046045 | 5/1993 | | WO | WO 8909528 | 10/1989 |
| JP | 05-236437 | 9/1993 | | WO | WO 89/12370 | 12/1989 |
| JP | 05233547 | 9/1993 | | WO | WO 90/10988 | 9/1990 |
| JP | 05236437 | 9/1993 | | WO | WO 9100670 | 1/1991 |
| JP | 05250106 | 9/1993 | | WO | WO 91/03112 | 3/1991 |
| JP | 05-334167 A | 12/1993 | | WO | WO 91/11769 * | 8/1991 |
| JP | 05334167 A | 12/1993 | | WO | WO 91/15841 | 10/1991 |
| JP | 0405334167 A | 12/1993 | | WO | WO 92/10040 | 6/1992 |
| JP | 06-068339 A | 3/1994 | | WO | WO 92/11713 | 7/1992 |
| JP | 06068339 A | 3/1994 | | WO | WO 92/12599 | 7/1992 |
| JP | 0406068339 A | 3/1994 | | WO | WO 92/17027 | 10/1992 |
| JP | 06134489 | 5/1994 | | WO | WO 92/21206 | 11/1992 |
| JP | 06187359 | 7/1994 | | WO | WO 93/06692 | 4/1993 |
| JP | 07-230466 A | 8/1995 | | WO | WO9307713 | 4/1993 |
| JP | 07230466 A | 8/1995 | | WO | WO 93/09490 | 5/1993 |
| JP | 07 235909 | 9/1995 | | WO | WO 93/09631 | 5/1993 |
| JP | 07-235909 | 9/1995 | | WO | WO93/15466 | 8/1993 |
| JP | 08-008850 A | 1/1996 | | WO | WO 93/22877 | 11/1993 |
| JP | 08008850 A | 1/1996 | | WO | WO 94/01964 | 1/1994 |
| JP | 08008851 | 1/1996 | | WO | WO 94/07327 | 3/1994 |
| JP | 08-051614 A | 2/1996 | | WO | WO 94/07327 A1 | 3/1994 |
| JP | 408051614 A | 2/1996 | | WO | WO 94/13107 | 6/1994 |
| JP | 08-228328 | 9/1996 | | WO | WO 94/14282 | 6/1994 |
| JP | 040 8228328 | 9/1996 | | WO | WO 94/16527 | 7/1994 |
| JP | 08314790 | 11/1996 | | WO | WO 94/23537 | 10/1994 |
| JP | 09227193 | 8/1997 | | WO | WO 95/15649 | 6/1995 |
| JP | 09-227193 | 9/1997 | | WO | WO 9515649 A | 6/1995 |
| JP | 09237096 | 9/1997 | | WO | WO 96/08109 | 3/1996 |
| JP | 09-284571 | 10/1997 | | WO | WO 96/17306 | 6/1996 |
| JP | 09 284571 | 10/1997 | | WO | WO 96/25006 | 8/1996 |
| JP | 09282218 | 10/1997 | | WO | WO 96/41473 | 12/1996 |
| JP | 10070530 | 3/1998 | | WO | WO 97/13368 | 4/1997 |
| JP | 10-285568 A | 10/1998 | | WO | WO 97/18665 | 5/1997 |
| JP | 410285568 A | 10/1998 | | WO | WO 97/12105 | 6/1997 |
| JP | 11003341 | 1/1999 | | WO | WO 97/20224 | 6/1997 |
| JP | 11-068770 | 3/1999 | | WO | WO 97/20274 | 6/1997 |
| JP | 11068770 | 3/1999 | | WO | WO 97/22049 | 6/1997 |
| JP | 515760/95 | 4/2004 | | WO | WO 97/22062 | 6/1997 |
| JP | 515760/95 | 12/2004 | | WO | WO 97/22063 | 6/1997 |
| MX | 2001/010300 | 9/2004 | | WO | WO 97/22064 | 6/1997 |
| MX | 2001/010298 | 4/2005 | | WO | WO 97/22065 | 6/1997 |
| MX | 2001/007581 | 7/2006 | | WO | WO 97/22067 | 6/1997 |

| | | |
|---|---|---|
| WO | WO 97/22079 | 6/1997 |
| WO | WO 97/22080 | 6/1997 |
| WO | WO 97/22097 | 6/1997 |
| WO | WO 97/22099 | 6/1997 |
| WO | WO 97/22100 | 6/1997 |
| WO | WO 97/22101 | 6/1997 |
| WO | WO 97/22102 | 6/1997 |
| WO | WO 97/22103 | 6/1997 |
| WO | WO 97/22104 | 6/1997 |
| WO | WO 97/22105 | 6/1997 |
| WO | WO 97/22106 | 6/1997 |
| WO | WO 97/22107 | 6/1997 |
| WO | WO 97/22108 | 6/1997 |
| WO | WO 97/22109 | 6/1997 |
| WO | WO 97/22110 | 6/1997 |
| WO | WO 97/22111 | 6/1997 |
| WO | WO 97/22112 | 6/1997 |
| WO | WO9720274 | 6/1997 |
| WO | WO 97/12819 | 7/1997 |
| WO | WO 97/23819 | 7/1997 |
| WO | WO9737344 | 10/1997 |
| WO | WO 97/41688 A1 | 11/1997 |
| WO | WO 97/45798 | 12/1997 |
| WO | WO 98/02836 | 1/1998 |
| WO | WO9808344 | 2/1998 |
| WO | WO 9808344 A | 2/1998 |
| WO | WO 9818086 | 4/1998 |
| WO | WO9827494 | 6/1998 |
| WO | WO 98/48566 | 10/1998 |
| WO | WO 98/53581 | 11/1998 |
| WO | WO 99/26415 | 11/1998 |
| WO | WO 99/12349 | 3/1999 |
| WO | WO 99/18701 A1 | 4/1999 |
| WO | WO 99/26415 | 5/1999 |
| WO | WO 99/44144 | 9/1999 |
| WO | WO 99/45491 | 9/1999 |
| WO | WO 9944144 A | 9/1999 |
| WO | WO 99/45491 | 10/1999 |
| WO | WO 99/52285 | 10/1999 |
| WO | WO 99/66719 | 12/1999 |
| WO | WO 00/62228 A3 | 10/2000 |
| WO | WO 01/18665 A1 | 3/2001 |
| WO | WO 01/22107 | 3/2001 |
| WO | WO 97/18665 | 3/2001 |
| WO | WO 2007/022107 | 2/2007 |

OTHER PUBLICATIONS

Rethinking Ink, Science News, Jun. 20, 1998, 4 pages.
Computer Organization and Design, Patterson, David, and John Hennessay, 1998, 4 pages.
"BSD Kernel Interfaces Manual-PTY(4)", Mac OS X Man Pages, original publication, Nov. 30, 1993.
Sandrick, Karen, "Internet marketing: Software for the hard sell," Health Management Technology, Oct. 1998, vol. 19, No. 11, 6 pages.
Antelman et al. "Collection Development in the Electronic Library," Proceedings of the 21rst annual ACM SIGUCCS Conference on User Services, San Diego, CA, p. 50-56, 1993.
Systems, Boyle, C. et al.; *IEEE Transactions on Professional Communication;* IEEE Inc.; New York; vol. 35, No. 2; Jun. 1, 1992, pp. 98-111.
"An Interactive Lesson in the Interactive Course Series" Waite Group Press, MacMillan Computer Publishing, 'Online! 1996, XP00082591, Retrieved from the Internet: <URL:http//www.waite.com/> retrieved in 1996.
"Electronic Dictionary Pronounces over 83,000 Words," Goorfin, L., *Speech Technology;* Man-Machine Voice Communications, U.S., Media Dimensions Inc.; New York, vol. 4, No. 4; Apr. 1, 1989, pp. 78-79.
"Enabling the book metaphor for the World-Wide-Web: disseminating on-line information as dynamic Web documents," Rauch, T. et al.; *IEEE Transactions on Professional Communications,* Jun. 1997; vol. 40, No. 2, pp. 111-128.

"Fourth generation hypermedia: some missing links for the World Wide Web," Bieber, M. et al., *International Journal of Human-Computer Studies;* U.S.; Academic Press: New York; vol. 47, No. 1; Jul. 1997; pp. 31-65.
"*A Dynamic Policy of Segment Replication for Load-Balancing in Video-On-Demand Servers,*" Dan, A. et al.; Multimedia Systems, *Jul. 1995, pp. 93-103.*
"Prototyping an Interactive Electronic Book System Using an Object-oriented Approach," Pasquier-Boltuck, J. et al.; *ECOOP;* European Conference on Object-oriented Programming; Aug. 15, 1988; pp. 177-190.
"Reading and Writing the Electronic Book," Yankelovich, N. et al., *Computer;* U.S. IEEE Computer Society, Long Beach, Calif., U.S. vol. 18, No. 10, Oct. 1, 1985, pp. 15-30.
"Subscription Teletext for Value Added Services", Dr. G.T. Sharpless, IEEE Transactions on Consumer Electronics, Aug. 1985, vol. CE-31, No. 3, pp. 283-289.
"The Internet bookstore opens for business", Medford: Jul./Aug. 1994. vol. 11, Iss. 4; p. 21 (1 page).
"Using an ER Query and Update Interface for Rapid Prototyping of Hypertext Systems," Czejdo, B.; Proceedings of the Annual Hawaii International Conference on System Sciences; Jan. 1, 1990, pp. 227-236.
"A Store-and-Forward Architecture for Video-on-Demand Service," Gelman, A.D. et al., ICC Conference, 1991, pp. 842-846.
Dinaro, M. et al., "Markets and Products Overview," Revue HF Tijdschrift, 1991, vol. 15, No. 3/4, pp. 135-148.
Alexander Gelman, et al., "An Architecture for Interactive Applications", May 1993, pp. 848-852.
Boom, H., "An Interactive Videotex System for Two-Way CATV Networks," 1986, vol. 40, No. 6, pp. 397-401.
"*Applied Cryptography Protocols, Algorithms, and Source Code in C,*" Schneier, Bruce; 1996 by John Wiley & Sons, pp. 34-44.
Azuma J., "Creating Educational Web Sites", IEE Communications Magazine, U.S. IEEE Service Center, Piscataway, N.J., vol. 37, No. 3, Mar. 1999, pp. 109-113.
Barnes, 10 Minute Guide to Windows 3.1., Alpha Books, 1992, pp. 60-64.
Basch, Reva, "Books Online: Visions, Plans, and Perspectives for Electronic Text", Online, Medford: Jul. 1991, vol. 15, Iss. 4; pp. 13-23.
Bestler, C., "Flexible Data Structure and Interface Rituals for Rapid Development of OSD Applications", NCTA Technical Papers, pp. 223-236, Jun. 1993.
Broering, N. C., "The Electronic Library and IAIMS at Georgetown University", Policy Issues in Information and Communication Techniques in Medical Applications, 1988. Symposium Record, Sep. 29-30, 1988, pp. 27-29.
Chan, L. M., "Principles, Structure and Format", Immroth's Guide to the Library of Congress Classification, 4th Edition, 1990, Chapter 2, pp. 19-51.
Consumer Digest advertisement; "Xpand Your TV's Channel Capability;" Fall/Winter 1992; p. 215.
Daniel M. Moloney, "Digital Compression in Today's Addressable Environment;" 1993 NCTA Technical Papers; Jun. 6, 1993; pp. 308-316.
DeBuse, R., "So That's a Book . . . Advancing Technology and the Library," Mar. 1988, Information Technology and Libraries, vol. 7, Issue 1, pp. 7-18.
Endo, K. et al., "Electronic Book in 3.5" Floppy Disk", Consumer Electronics, Digest of Technical Papers, IEEE 1994 International Conference on Jun. 21-23, 1994 pp. 316-317.
Fox E. A., et al., "Users, user interfaces, and objects: Envision, a Digital Library," Sep. 1993, Journal of the American Society for Information Science, vol. 44, issue 8, p. 480-491.
Schepers, C., "Für Geschlossene Benutzergruppen" Funkschau, DE, Franzis-Verlag K.G. Munchen, No. 18, Aug. 25, 1989, pp. S53-S54.
Goldberg M W et al: "World Wide Web—course tool: An environment for building WWW-based courses," Computer Networks and ISDN Systems, NL, North Holland Publishing. Amsterdam, vol. 28, No. 11, May 1, 1996.
Great Presentations advertisement; "Remote, Remote;" 1987; p. 32H.

Hartley S et al.: "Enhancing Teaching Using the Internet" SIGCSE/SIGCUE Conference on Integrating Technology into Computer Science Education, US, New York, ACM, vol. CONF. 1, Jun. 2, 1996, pp. 218-228.
Herron T L: "Teaching with the Internet" Internet and Higher Education, US, JAI Press, Stamford, CT, vol. 1, No. 3, 1998, pp. 217-222.
Hong Kong Enterprise; Advertisement, "Two Innovative New Consumer Products From SVI," Nov. 1988, p. 379.
HP-41 C Operating Manual—A Guide for the Experienced User, Hewlett Packard Co., Jun. 1980.
"Applying Interactive Voice Response Technology in Psychiatric Practice", Sorce J. F. et al., Human Factors in Telecommunications; R. V. Decker's Verlag, Heidelberg, Germany, pp. 397-407.
Indian Patent Application 762-Cal-93.
Indian Patent Application 765-Cal-93.
Intner, S. S. et al., "The Dewey Decimal Classification", Special Libraries: A Cataloging Guide, 1998, Chapter 11, pp. 211-239.
John Reimer, "Memories in My Pocket;" BYTE; Feb. 1991; pp. 251-258.
Kubota H. et al.: "Terrestrial Data Multiplex Broadcasting News Delivery System and Its Terminal", IEE Transactions on Consumer Electronics, U.S., IEE Inc., New York, vol. 43, No. 3, Aug. 1, 1997, pp. 504-509.
Lewis, B.T. et al.; "Shared books: collaborative publication management for an office information system"; ACM SIGIOS Bulletin Conference sponsored by ACM SIGOIS and IEEECS TC-OA on Office information systems, vol. 9, Issue 2-3, Apr. 1988, pp. 197-204.
Mann et al.; "A coherent distributed file cache with directory write-behind" ACM Transactions on Computer Systems (TCOS), vol. 12, Issue 2, May 1994.
Miyazawa, M. et al., "An electronic book: APT Book," Aug. 1990, Human-Computer Interaction, Interact '90, Proceedings of the IFIP TC 13 Third International Conference, Cambridge, UK, pp. 513-519.
O'Gorman, L., "Image and document processing techniques for the RightPages electronic library system", Conference B: Pattern Recognition Methodology and Systems, Proceedings, 11th IAP International Conference on Aug. 30-Sep. 3, 1992 pp. 260-263.
Olshansky R. et al., "Subscriber Distribution Networks Using Compressed Digital Video;" Journal of Lightwave Technology; Nov. 1992; vol. 10, No. 11, pp. 1760-1765.
Pobiak, B.C., "Adjustable access electronic books", Computing Applications to Assist Persons with Disabilities, 1992, Proceedings of the John Hopkins National Search for Feb. 1-5, 1992 pp. 90-94.
Raman, T.V., "Audio System for Technical Readings," May 1994, Cornell University, pp. 1-129.
Rawlins, "The New Publishing—Technology's impact on the publishing industry over the next decade", Nov. 12, 1991, pp. 1-65.
Schatz, "Building an electronic scientific community", System Sciences, 1991. Proceeding of the Twenty-Fourth Annual Hawaii International Conference on vol. iii, Jan. 8-11, 1991 pp. 739-748 vol. 3.
Simpson, Alan, Mastering WORDPERFECT® 5.1 & 5.2 for Windows, 1993, Sybex, Inc., pp. 72-73.
Soloview; "Prefetching in segmented disk cache for multi-disk systems" Proceedings of the fourth workshop on I/O in parallel and distributed systems: part of the federated computing research conference; May 1996.
Valauskas, Edward J, "Electronic books as databases", Database, Aug. 1993. vol. 16, Iss. 4; p. 84-86.
Rauch, et al.; Enabling the Book Metaphor for the World Wide Web: Disseminating on-line information as dynamic web documents; Jun. 1997; pp. 111-128.
Waite Group Press; An Interactive Lesson in the Interactive Course Series; 3 pages.
Junichi Azuma; Creating Educational Web Sites; Mar. 1999; pp. 109-113.
RE 36,207.
"A Survey and Classification of Hypertext Documentation Systems," Boyle, C. et al.; *IEEE Transactions on Professional Communication;* IEEE Inc.; New York; vol. 35, No. 2; Jun. 1, 1992.
"An Interactive Lesson in the Interactive Course Series" Waite Group Press, MacMillan Computer Publishing, 'Online! 1996, XP00082591, Retrieved from the Internet: <URL:http//www.waite.com/> retrieved on 1996!.

"An Interactive Lesson in the Interactive Course Series," Waite Group Press, Macmillian Computer Publishing, 'Online! 1996, XP000829591 Retrieved from the Internet: <URL:http://www.waite.com/> 'retrieved on 1996!
"Electronic Dictionary Pronounces over 83,000 Words," *Speech Technology;* Man-Machine Voice Communications, U.S., Media Dimensions Inc.; New York, vol. 4; No. 4; Apr. 1, 1989, pp. 78-79.
"Enabling the book metaphor for the World-Wide-Web: disseminating on-line information as dynamic Web documents," Rauch, T. et al.; *IEEE Transactions on Professional Communications,* Jun. 1997; vol. 40, No. 2, pp. 111-128.
"Fourth generation hypermedia: some missing links for the World Wide Web," *International Journal of Human-Computer Studies;* U.S.; Academic Press: New York; vol. 47, No. 1; Jul. 1997; pp. 31-65.
"Multimedia Systems," *A Dynamic Policy of Segment Replication for Load-Balancing in Video-On-Demand Servers;* Dan, et al.; Jul. 1995.
"Prototyping an Interactive Electronic Book System Using and Object-oriented Approach," Pasquier-Boltuck, J. et al.; *ECOOP*; european Conference on Object-oriented Programming; Aug. 15, 1988; pp. 177-190.
"Reading and Writing the Electronic Book," *Computer;* U.S. IEEE Computer Society, Long Beach, Calif., U.S. vol. 18, No. 10, Oct. 1, 1985.
"Subscription Teletext for Value Added Services", Dr. G.T. Sharpless, IEEE Transactions on Consumer Electronics, Aug. 1985, No. 3, p. 283.
"The Internet bookstore opens for business", Medford: Jul./Aug. 1994. vol. 11, Iss. 4; p. 21 (1 page).
"Using an ER Query and Update Interface for Rapid Prototyping of Hypertext Systems," Czejdo, B.; Proceedings of the Annual Hawaii International Conference on System Sciences; Jan. 1, 1990.
A Store-and-Forward Architecture for Video-on-Demand Service.
A Survey and Classification of Hypertext Documentation Systems, IEEE Transaction on Professional Communication.
A.D. Gelman, et al.; A Store-And-Forward Architecture for Video-On-Demand Service; ICC 91 Conf.; Jun. 23-26, 1991;pp. 842-846.
A6,034,680 Alcatel Teletra: Markets and Products Overview.
Alexander Felman, et al., "An Architecture for Interactive Applications", May 1993, pp. 848-852.
An Interactive Lesson . . . .
An Interactive lesson in the interactive course series, Aug. 1996.
An Interactive Videotex System for Two-Way CATV Networks.
*Applied Cryptography Protocols, Algorithms, and Source Code in C* (pp. 34-44); Schneier, Bruce; Pub. 199 by John Wiley & Sons.
Azuma J.: "Creating Eduational Web Sites", IEE Communications Magazine, U.S. IEEE Service Center, Piscataway, N.J., vol. 37, No. 3, Mar. 1999, pp. 109-113.
Basch, Reva, "Books Online: Visions, Plans, and Perspectives for Electronic Text", Online. Medford: Jul. 1991. vol. 15, Iss. 4; 13 (11 pages).
Bestler, "Flexible Data Structure and Interface Rituals for Rapid Development of OSD Applications", pp. 223-236, Jun. 1993.
Biber, et al.; Fourth generation hypermedia: some missing links for the World Wide Web; Jul. 1997; pp. 31-65.
Bogdan Czejdo, "Using an ER Query and Update Interface for Rapid Prototyping of Hypertext Systems", Jan. 1990; pp. 227-236.
Boltuck et al.; Prototyping an Interactive Electronic Book System Using an Object-Oriented Approach; Aug. 1988; pp. 1770190.
*Books Online* . . . ; Basch; Jul. 1991.
Boom, "An Interactive Videotext System", pp. 397-401, Nov./Dec. 1986.
Boyle C. et al.: "A Survey and Classificatoin of Hypertext Documentation Systems", IEE Transactions on Professional Communications, US, IEE Inc., New York, vol. 35, No. 2, Jun. 1, 1992, pp. 98-111.
Broering, "The Electronic Library and IAIMS at Georgetown University", Policy Issuees in Information and Communication Techniques in Medical Applications, 1988. Symposium Record Sep. 29-30, 1988 pp. 27-29.
Caejdo B.: "Using an ER Query and Update Interface for Rapid Prototyping of Hypertext Systems", Proceedings of the Annual Hawaii International Conference on System Sciences, Jan. 1, 1990, p. 231.

Caitlin Bestler, "Flexible Data Structures and Interface Rituals for Rapid Development of OSD Applications", Jun. 1993, pp. 223-236.
Chan, "Principles, Structure and Format", Immroth's Guide to the Library of Congress Classification, 4th Edition, 1990, Chapter 2, pp. 19-51.
Consumer Digest advertisement; Xpand Your TV's Channel Capability; Fall/Winter 1992; p. 215.
Craig Boyle, et al., "A Survey and Classification of Hypertext Documentation Systems", Jun. 1992, pp. 98-111.
Creating Educational Web Sites.
Czejdo B.: "Using an ER Query and Update Interface for Rapid Prototyping of Hypertext Systems" Proceedings of the Annual Hawaii International Conference on System Sciences, Jan. 1, 1990, p. 231.
Dan A. Et al.: "A Dynamic Policy of Segment Replication for Load-Balancing in Video-on-Demand Servers", Multimedia Systems, Springer Verlag, DE, vol. 3, No. 3, Jul. 1995, pp. 93-103.
Daniel M. Moloney, Digital Compression in Today's Addressable Environment; 1993 NCTA Technical Papers; Jun. 6, 1993; pp. 308-316.
DeBuse, SO That's a Book . . . Advancing Technology and the Library, Mar. 1988, Information Technology and Libraries, vol. 7, Issue 1, pp. 7-18.
Digital Compression in Today's Addressable Environment.
Dinaro et al., "Markets and Products Overview", 1991.
Dr. G. T. Sharpless, IEE Transactions on Consumer Electronics, vol. CE-31, No. 3, Aug. 1985, pp. 283-289.
*Electronic Books as* . . . ; Valauskas; Auust 1993 Electronic Dictionary Pronoucnes . . . , Speech Technology.
Enabling the Book Metaphor, IEEE Transactions on Professional Communication.
Endo et al., "Electronic Book in 3.5 Floppy Disk", Consumer Electronics, 1994. Digest of Technical Papers, IEEE 1994 International Conference on Jun. 21-23, 1994 pp. 316-317.
Enhancing Teaching *Flexibl Data Structures and Interface Rituals for Rapid Development of OSD Applications,* Caitlin Bestler, 93 NCTA Tech. Papers, pp. 223-236; Jun. 6, 1993.
Fourth Generation Hypermedia . . . , Int'l Journal of Human-Computer Sciences Studies.
Fox, et al., Users, user interfaces, and objects: Envision, a Digital Library, Sep. 1993, Journal of the American Society for Information Science, vol. 44, issue 8, p. 480.
Für Geschlossene *Fur Geschlossene*; Funkschau; Aug. 25, 1989.
Gelman, et al., "An Architecture For Interactive Applications", May 1993, pp. 848-852.
Goorfin L.: "Electronic Dictionary Pronounces over 83,000 Words" Sp[eech Technology, Man-Machine Voice Communications, U.S., Media, Dimensions, Inc. New York, vol. 4, No. 4, Apr. 1, 1989, pp. 78-79.
Great Presentations advertisement; Remote, Remote; 1987; p. 32H.
H. Van Den Boom, An Interactive Videotex System for Two-Way CATV Networks, Dec. 1986, pp. 397-401.
Henri van den Boom; An Interactive Videotex System for Two-Way CATV Network; Nov. 1986; pp. 397-401.
Hong Consumer Products From SVI; Nov. 1988; p. 379 Kong Enterprise advertisement; Two Innovative New.
Hong Kong Enterprise; Advertisement Two Innovative New Consumer Products From SVI, Nov. 1988, p. 279.
HP-41 C Operating Manual, Hewlett Packard Co., Dec. 1982.
Human Factors in Telecommunications; Sorce et al.
Inter et al., "The Dewey Decimal Classification", Special Libraries: A Cataloging Guide, 1998, Chapter 11, pp. 211-239.
*Interactive Videotex*; van den Boom, Nov.-Dec. 1986.
John Reimer: Memories in My Pocket; BYTE; Feb. 1991; pp. 251-258.
Junichi Azuma; Creating Education Web Sites; Mar. 1999; pp. 109-113.
Kubota H. et al.: "Terrestrial Data Multiplex Broadcasting News Delivery System and Its Terminal", IEE Transactions on Consumer Electronics, U.S., IEE Inc., New York, Vo.. 43, No. 3, Aug. 1, 1997, pp. 504-509.
Lewis et al.; ("Shared books: collaborative publication management for an office information system"); ACM SIGIOS Bulletin Conference sponsored by ACM SIGOIS and IEEECS TC-OA on Office information systems, vol. 9, Issue 2-3, Apr. 1988.
Mann et al.; ("A coherent distributed file cache with directory write behind") ACM Transactions on Computer Systems (TCOS), vol. 12, Issue 2, May 1994.
Marco Dinaro, Alcatel Telettra; Markets and Products Overview; Revue HF Tijdschrift 15; 1991; pp. 135-148.
Markets and Products Overview; Dinaro et al.
Medley, et al.; Enhancing teaching using the Internet; Feb. 1996: pp. 218-228.
Memories in My Pocket; Reimer; Byte, pp. 251, 252, 254, 255, 256, 258, Feb. 1991.
Michael Bieber, et al.; Fourth Generation Hypermedia: some missing links for the World Wide Web; 1997; pp. 31-65.
Miyazawa, et al., An electronic book: APT Book, Aug. 1990, Human-Computer Interaction, Interact '90, Proceedings of the IFIP TC 13 Third International Conference, Cambridge, UK, pp. 513-519.
*Multimedia Systems, A Dynaic Policy of Segment Replicatoin for Load-Balancing in Video-On-Demand Servers (see 111)*; Dan et al.; Jul. 1995.
Nicole Yankelovich, et al., "Reading and the Electronic Book", Oct. 1985, pp. 16-30.
O'Gorman, "Image and document processing techniques for the RightPages electronic library system", Conference B: Pattern Recognition Methodology and Systems, Proceedings, 11th IAP International Conference on Aug. 30-3 ept. 1992 pp. 260-263.
Olshansky & Joyce: Subscriber Distribution Networks Using Compressed Digital Video; Journal of Lightwavw Tech; Nov. 1992; pp. 1760-1765.
Pasquier-Boltuck J et al: Prototyping an Interactive Electronic Book System Using an Object-Oriented Approach; ECOOP. European Conference on Object-Oriented Programming. Aug. 15, 1998, pp. 177-190.
Pobiak, "Adjustable access electronic books", Computing Applications to Assist Persons with Disabilities, 1992, Proceedings of the John Hopkins National Search for Feb. 1-5, 1992 pp. 90-94.
Prototyping an Interactive Electronic Book System Raman, T.V., Audio System for Technical Readings, May 1994, Cornell University, pp. 1-129.
Rauch T et al: "Enabling the Book Metaphor for the World-Wide-Web: Disseminating On-Line Information as Dynamic Web Documents" IEEE Transactions on Professional Communiations. Jun. 1997. IEEE, USA, vol. 40, No. 2, pp. 111-128.
Re. 36.207 (5,185,667).
Reading and Wriring the Electronic Book, IEEE Computer Science.
Reimer; "Memories in My Pocket", Feb. 1991, pp. 251-258.
*Remote, Remote,* Great Presentations advertisement, p. 32H; Nov. 1988.
Schepers C.: "Fur Geschlossene Benutzergruppen" Funkschau, De, Franzis-Verlag K.G. Munchen, No. 18, Aug. 25, 1989, pp. S53-S54.
Sharpless, Dr. G. T., "Subscription teletext for value added services", IEEE Transactions On Consumer Electronics, vol. CE-31, No. 3, Aug. 1985.
Simpson, Alan, Mastering Wordperfect® 5.1 & 5.2 for Windows, 1993, Sybex, Inc., pp. 72-73.
Soloview; ("Prefetching in segmented disk cache for multi-disk systems") Proceedings of the fourth workshop on I/O in parallel and distributed systems: part of the federated computing research conference; May 1996.
Speech Technology, "Electronic Dictionary Pronouces Over 35,000 Words", pp. 78-79 (1989).
Stephen Hartley, et al.; Enhancing Teaching Using the Internet; Feb. 6, 1996; pp. 218-228.
Subscriber Distribution Networks Using Compressed Digital Video.
Subscription Teletex for Value Addes Services.
Teaching with the Internet.
*Technology's Impact on* . . . ; Rawlins; Nov. 21, 1991.
Telman, et al.; A Store-and-Forward Architecture for Video-on-Demand Service; 1991; pp. 842-846.
Terrestrial Data . . . .
Terri Herron; Teaching with the Internet; 1998; pp. 217-222.
*The Internet Bookstore* . . . ; Jul./Aug. 1994.

Thyra Rauch, et al., "Enabling the book metaphor for the World Wide Web: Disseminating on-line information as dynami[c] Web documents", Jun. 1997, pp. 111-128.
Two Innovatice New Consumer Products from SVI.
Using an ER Query ad Update Interface . . . , Proceedings of the Annual Hawaii.
Valauskas, Edward J, "Electronic books as databases", Database. Aug. 1993. vol. 16, Iss. 4; p. 84 (3 pages).
Van Den Boom, "An Interactive Videotex System for Two-Way CATV Networks", vol. 40, No. 6, pp. 397-401, Dec. 1986.
Waite Group Press; An Interactive Lesson in the Interactive Course Series, 1996.
*World Wide Web—Course Tool,* Goldberg, M.W., et al., May, 1996.
Xpand your TV's Channel Capability.
Yankelovich N et al: "Reading and Writing the Electronic Book" Computer, US, IEEE Computer Society. Long Beach, CA, US, vol. 18, No. 10.
Herron T.L., "Teaching with the Internet" Internet and Higher Education, US, JAI Press, Stamford, CT, vol. 1, No. 3, 1998, pp. 217-222, XP002118719, ISSN: 1096-7516.
Azuma J., "Creating Educational Web Sites", IEEE Communications Magazine, US, IEEE Service Center, Piscataway, N.J., vol. 37, No. 3, Mar. 1999, pp. 109-113, XP000823980, ISSN: 0163-6804.
Goldberg, M.W. et al., "World Wide Web-Course tool: An environment for building WWW-based courses", Computer Networks and ISDN Systems, NL, North Holland Publishing, Amsterdam, vol. 28, No. 11, May 1, 1996, pp. 1219-1231, XP004018222, ISSN: 0169-7552.
An Interactive Lesson in the Interactive Course Series, Waite Group Press, Macmillan Computer Publishing, 'Online! 1996, XP000829591, Retrieved from the Internet: URL:http://www.waite.com/> 'retrieved on 1996!.
Goorfin, L., "Electronic Dictionary Pronounces over 83,000 Words", Speech Technology, Man-Machine Voice Communications, US, Media Dimensions Inc., New York, vol. 4, No. 4, Apr. 1, 1989, pp. 78-79, XP000033505, ISSN: 0744-1355.
Hartley, S. et al., "Enhancing Teaching Using the Internet", SIGCSE/SIGCUE Conference on Integrating Technology into Computer Science Education, US, New York, ACM, vol. CONF. 1, Jun. 2, 1996, pp. 218-228, ISBN: 0-89791-844-4.
Seno, H. et al., "A Consideration of Data Transmission Method for Enhanced Teletext", NHK Science and Technical Research Laboratories, ITEJ Technical Report, vol. 16, No. 71, Oct. 1992, Japan, pp. 1-6.
Technology Update, WordPerfect Corporation Introduces WordPerfect 6.0 for DOS, http://www.nfbnet.org/files/word_processing/WP60.TXT, Mar. 24, 1993.
T.V. Raman, "An Audio View of (LA)Tex Documents," Proceedings of the 1191 Annual Meeting, pp. 1001-1008.
Microsoft Press Computer Dictionary Second Edition, Microsoft Press, 1994, p. 418.
U.S. Appl. No. 29/030,157, filed Sep. 24, 1996.
U.S. Appl. No. 12/010,045, filed Sep. 8, 2009.
U.S. Appl. No. 09/964,883, filed Sep. 4, 2009.
U.S. Appl. No. 09/964,883, filed Feb. 17, 2009.
U.S. Appl. No. 09/964,883, filed Sep. 17, 2008.
U.S. Appl. No. 09/964,883, filed Feb. 6, 2008.
U.S. Appl. No. 09/964,883, filed Jun. 22, 2007.
U.S. Appl. No. 09/964,883, filed Jan. 3, 2007.
U.S. Appl. No. 09/964,883, filed Jul. 12, 2006.
U.S. Appl. No. 09/964,883, filed Feb. 2, 2006.
U.S. Appl. No. 09/964,883, filed Jun. 15, 2005.
U.S. Appl. No. 09/964,883, filed Sep. 27, 2004.
U.S. Appl. No. 09/964,882, filed Aug. 10, 2007.
U.S. Appl. No. 09/964,882, filed May 22, 2006.
U.S. Appl. No. 09/964,882, filed Dec. 2, 2005.
U.S. Appl. No. 09/964,882, filed Mar. 22, 2005.
U.S. Appl. No. 09/964,880, filed Jul. 22, 2005.
U.S. Appl. No. 09/964,880, filed Jan. 12, 2005.
U.S. Appl. No. 09/964,857, filed May 9, 2005.
U.S. Appl. No. 09/964,857, filed Jul. 7, 2004.
U.S. Appl. No. 09/723,282, filed Feb. 8, 2006
U.S. Appl. No. 09/723,282, filed Aug. 17, 2005.
U.S. Appl. No. 09/723,282, filed Jun. 3, 2004.
U.S. Appl. No. 09/723,280, filed May 19, 2005.
U.S. Appl. No. 09/723,280, filed Jun. 7, 2004.
U.S. Appl. No. 09/722,823, filed Aug. 24, 2005.
U.S. Appl. No. 09/722,823, filed Jan. 4, 2005.
U.S. Appl. No. 09/722,744, filed Jul. 18, 2002.
U.S. Appl. No. 09/722,744, filed Jan. 16, 2002.
U.S. Appl. No. 09/722,743, filed Oct. 5, 2005.
U.S. Appl. No. 09/722,743, filed Dec. 16, 2004.
U.S. Appl. No. 09/722,742, filed Jan. 11, 2008.
U.S. Appl. No. 09/722,742, filed May 29, 2007.
U.S. Appl. No. 09/722,742, filed Oct. 2, 2006.
U.S. Appl. No. 09/722,742, filed Apr. 13, 2006.
U.S. Appl. No. 09/722,742, filed Oct. 7, 2003.
U.S. Appl. No. 09/722,741, filed Mar. 24, 2005.
U.S. Appl. No. 09/722,741, filed Jun. 28, 2004.
U.S. Appl. No. 09/722,740, filed Aug. 24, 2005.
U.S. Appl. No. 09/722,740, filed May 24, 2004.
U.S. Appl. No. 09/722,626, filed Apr. 10, 2009.
U.S. Appl. No. 09/722,626, filed Dec. 5, 2008.
U.S. Appl. No. 09/722,626, filed Jun. 9, 2008.
U.S. Appl. No. 09/722,626, filed Oct. 30, 2007.
U.S. Appl. No. 09/722,626, filed May 8, 2007.
U.S. Appl. No. 09/722,626, filed Aug. 1, 2006.
U.S. Appl. No. 09/722,626, filed Feb. 22, 2006.
U.S. Appl. No. 09/722,626, filed Jun. 20, 2005.
U.S. Appl. No. 09/722,519, filed Dec. 20, 2006.
U.S. Appl. No. 09/722,519, filed Aug. 15, 2006.
U.S. Appl. No. 09/722,519, filed Mar. 15, 2006.
U.S. Appl. No. 09/722,519, filed Nov. 22, 2005.
U.S. Appl. No. 09/722,519, filed Apr. 14, 2005.
U.S. Appl. No. 09/722,519, filed Aug. 10, 2004.
U.S. Appl. No. 09/722,463, filed Jan. 18, 2006.
U.S. Appl. No. 09/722,463, filed Jul. 27, 2005.
U.S. Appl. No. 09/722,463, filed Jan. 12, 2005.
U.S. Appl. No. 09/722,462, filed Jun. 6, 2005.
U.S. Appl. No. 09/722,462, filed Jun. 4, 2004.
U.S. Appl. No. 09/722,460, filed May 17, 2005.
U.S. Appl. No. 09/722,460, filed Jun. 18, 2004.
U.S. Appl. No. 09/722,456, filed Feb. 9, 2007.
U.S. Appl. No. 09/722,456, filed Aug. 11, 2006.
U.S. Appl. No. 09/722,456, filed Feb. 23, 2006.
U.S. Appl. No. 09/722,456, filed May 5, 2005.
U.S. Appl. No. 09/722,456, filed Jun. 16, 2004.
U.S. Appl. No. 09/539,773, filed Jul. 30, 2009.
U.S. Appl. No. 09/539,773, filed Jun. 24, 2009.
U.S. Appl. No. 09/539,773, filed Feb. 25, 2009.
U.S. Appl. No. 09/539,773, filed Aug. 25, 2008.
U.S. Appl. No. 09/539,773, filed Nov. 29, 2007.
U.S. Appl. No. 09/539,773, filed Nov. 24, 2006.
U.S. Appl. No. 09/539,773, filed Aug. 2, 2006.
U.S. Appl. No. 09/539,773, filed Apr. 4, 2006.
U.S. Appl. No. 09/539,773, filed Jun. 15, 2005.
U.S. Appl. No. 09/539,773, filed Jun. 22, 2004.
U.S. Appl. No. 09/520,344, filed Apr. 6, 2009.
U.S. Appl. No. 09/520,344, filed Oct. 23, 2008.
U.S. Appl. No. 09/520,344, filed Jun. 13, 2008.
U.S. Appl. No. 09/520,344, filed Dec. 26, 2007.
U.S. Appl. No. 09/520,344, filed Aug. 3, 2007.
U.S. Appl. No. 09/520,344, filed Jun. 23, 2005.
U.S. Appl. No. 09/441,892, filed Nov. 12, 2008.
U.S. Appl. No. 09/441,892, filed Apr. 29, 2008.
U.S. Appl. No. 09/441,892, filed Nov. 2, 2007.
U.S. Appl. No. 09/441,892, filed Jun. 18, 2007.
U.S. Appl. No. 09/441,892, filed Nov. 24, 2006.
U.S. Appl. No. 09/441,892, filed Feb. 3, 2006.
U.S. Appl. No. 09/441,892, filed May 17, 2005.
U.S. Appl. No. 09/441,892, filed Aug. 24, 2004.
U.S. Appl. No. 09/427,939, filed Jun. 19, 2009.
U.S. Appl. No. 09/427,939, filed Aug. 16, 2007.
U.S. Appl. No. 09/427,939, filed Mar. 29, 2007.
U.S. Appl. No. 09/427,939, filed Jun. 7, 2006.
U.S. Appl. No. 09/427,939, filed May 20, 2005.

U.S. Appl. No. 09/427,938, filed May 28, 2009.
U.S. Appl. No. 09/427,938, filed Dec. 3, 2008.
U.S. Appl. No. 09/427,938, filed Apr. 18, 2008.
U.S. Appl. No. 09/427,938, filed Oct. 19, 2007.
U.S. Appl. No. 09/427,938, filed Jun. 15, 2007.
U.S. Appl. No. 09/427,938, filed Jan. 31, 2007.
U.S. Appl. No. 09/427,938, filed Jun. 7, 2006.
U.S. Appl. No. 09/427,938, filed Apr. 25, 2005.
U.S. Appl. No. 09/400,296, filed Dec. 30, 2005.
U.S. Appl. No. 09/400,296, filed Apr. 8, 2005.
U.S. Appl. No. 09/391,461, filed Jun. 25, 2009.
U.S. Appl. No. 09/391,461, filed Jan. 7, 2009.
U.S. Appl. No. 09/391,461, filed Jul. 3, 2008.
U.S. Appl. No. 09/391,461, filed Dec. 13, 2007.
U.S. Appl. No. 09/391,461, filed Jun. 22, 2007.
U.S. Appl. No. 09/391,461, filed Nov. 17, 2006.
U.S. Appl. No. 09/391,461, filed Mar. 28, 2006.
U.S. Appl. No. 09/391,461, filed Jun. 15, 2005.
U.S. Appl. No. 09/391,461, filed Jun. 30, 2004.
U.S. Appl. No. 09/344,499, filed Aug. 10, 2009.
U.S. Appl. No. 09/344,499, filed Feb. 18, 2009.
U.S. Appl. No. 09/344,499, filed Feb. 8, 2008.
U.S. Appl. No. 09/344,499, filed Jun. 14, 2007.
U.S. Appl. No. 09/344,499, filed Dec. 15, 2006.
U.S. Appl. No. 09/344,499, filed Jun. 30, 2006.
U.S. Appl. No. 09/344,499, filed May 6, 2005.
U.S. Appl. No. 09/344,492, filed Jul. 13, 2009.
U.S. Appl. No. 09/344,492, filed Jan. 23, 2009.
U.S. Appl. No. 09/344,492, filed Aug. 5, 2008.
U.S. Appl. No. 09/344,492, filed Jan. 23, 2008.
U.S. Appl. No. 09/344,492, filed Jul. 11, 2007.
U.S. Appl. No. 09/344,492, filed Dec. 19, 2006.
U.S. Appl. No. 09/344,492, filed Jun. 26, 2006.
U.S. Appl. No. 09/344,492, filed Jan. 24, 2006.
U.S. Appl. No. 09/344,492, filed Jun. 6, 2005.
U.S. Appl. No. 09/335,268, filed Jan. 22, 2009.
U.S. Appl. No. 09/335,268, filed Jul. 9, 2008.
U.S. Appl. No. 09/335,268, filed Jan. 10, 2008.
U.S. Appl. No. 09/335,268, filed May 17, 2007.
U.S. Appl. No. 09/335,268, filed Oct. 2, 2006.
U.S. Appl. No. 09/335,268, filed Apr. 13, 2006.
U.S. Appl. No. 09/335,268, filed Oct. 28, 2005.
U.S. Appl. No. 09/335,268, filed Feb. 24, 2005.
U.S. Appl. No. 09/328,672, filed Feb. 19, 2009.
U.S. Appl. No. 09/328,672, filed Jun. 16, 2004.
U.S. Appl. No. 09/289,958, filed Jul. 7, 2009.
U.S. Appl. No. 09/289,958, filed Dec. 24, 2008.
U.S. Appl. No. 09/289,958, fired Jul. 29, 2008.
U.S. Appl. No. 09/289,958, filed Jan. 18, 2008.
U.S. Appl. No. 09/289,958, filed Jul. 31, 2007.
U.S. Appl. No. 09/289,958, filed Mar. 23, 2007.
U.S. Appl. No. 09/289,958, filed Jun. 6, 2006.
U.S. Appl. No. 09/289,958, filed Jan. 3, 2005.
U.S. Appl. No. 09/289,957, filed Jul. 22, 2009.
U.S. Appl. No. 09/289,957, filed Nov. 18, 2008.
U.S. Appl. No. 09/289,957, filed Mar. 25, 2008.
U.S. Appl. No. 09/289,957, filed Jul. 6, 2007.
U.S. Appl. No. 09/289,957, filed Oct. 11, 2006.
U.S. Appl. No. 09/289,957, filed Apr. 21, 2006.
U.S. Appl. No. 09/289,957, filed Nov. 3, 2005.
U.S. Appl. No. 09/289,957, filed Nov. 4, 2004.
U.S. Appl. No. 09/289,956, filed Sep. 9, 2009.
U.S. Appl. No. 09/289,956, filed Mar. 17, 2009.
U.S. Appl. No. 09/289,956, filed Nov. 13, 2008.
U.S. Appl. No. 09/289,956, filed Jun. 12, 2008.
U.S. Appl. No. 09/289,956, filed Mar. 22, 2007.
U.S. Appl. No. 09/289,956, filed Jul. 24, 2006.
U.S. Appl. No. 09/289,956, filed Jan. 30, 2006.
U.S. Appl. No. 09/289,956, filed Jun. 23, 2005.
U.S. Appl. No. 09/237,828, filed Oct. 3, 2007.
U.S. Appl. No. 09/237,828, filed Mar. 5, 2007.
U.S. Appl. No. 09/237,828, filed Sep. 8, 2006.
U.S. Appl. No. 09/237,828, filed May 12, 2005.
U.S. Appl. No. 09/237,828, filed Aug. 25, 2004.
U.S. Appl. No. 09/237,827, filed Aug. 28, 2009.
U.S. Appl. No. 09/237,827, filed Mar. 2, 2009.
U.S. Appl. No. 09/237,827, filed Aug. 18, 2008.
U.S. Appl. No. 09/237,827, filed Jan. 9, 2008.
U.S. Appl. No. 09/237,827, filed Jul. 23, 2007.
U.S. Appl. No. 09/237,827, filed May 16, 2007.
U.S. Appl. No. 09/237,827, filed Jan. 12, 2007.
U.S. Appl. No. 09/237,827, filed Aug. 2, 2006.
U.S. Appl. No. 09/237,827, filed Oct. 19, 2005.
U.S. Appl. No. 09/237,827, filed Jan. 26, 2005
U.S. Appl. No. 09/237,826, filed Aug. 3, 2009.
U.S. Appl. No. 09/237,826, filed Feb. 13, 2009.
U.S. Appl. No. 09/237,826, filed Aug. 15, 2008.
U.S. Appl. No. 09/237,826, filed Dec. 7, 2007.
U.S. Appl. No. 09/237,826, filed Jun. 27, 2007.
U.S. Appl. No. 09/237,826, filed Dec. 19, 2006.
U.S. Appl. No. 09/237,826, filed Jun. 14, 2006.
U.S. Appl. No. 09/237,826, filed Dec. 6, 2005.
U.S. Appl. No. 09/237,826, filed Jun. 6, 2005.
U.S. Appl. No. 09/237,826, filed May 25, 2004.
U.S. Appl. No. 09/237,825, filed Jun. 15, 2005.
U.S. Appl. No. 09/237,825, filed Jun. 4, 2004.
U.S. Appl. No. 08/336,247, filed May 12, 1998.
U.S. Appl. No. 08/336,247, filed Jul. 24, 1997.
U.S. Appl. No. 08/336,247, filed Apr. 29, 1997.
U.S. Appl. No. 08/336,247, filed Aug. 28, 1996.
U.S. Appl. No. 08/336,247, filed Jun. 27, 1996.
U.S. Appl. No. 08/336,247, filed Nov. 1, 1995.
IPER dated Mar. 6, 1996 for PCT/US94/13808, PCT/US94/13808, PCT.
Written Opinion dated Nov. 16, 1995 for PCT/US94/13808, PCT/US94/13808, PCT.
ISR dated Apr. 5, 1995 for PCT/US94/13808, PCT/US94/13808, PCT.
ISR dated Feb. 21, 2002 for PCT/US01/10559, PCT/US01/10559, PCT.
IPER dated Apr. 11, 2002 for PCT/US01/04946, PCT/US01/04946, PCT.
Written Opinion dated Dec. 4, 2001 for PCT/US01/04946, PCT/US01/04946, PCT.
ISR dated Oct. 16, 2001 for PCT/US01/04946, PCT/US01/04946. PCT.
Partial ISR dated Nov. 18, 2002 for PCT/US00/29813, PCT/US00/29813, PCT.
IPER dated Oct. 18, 2001 for PCT/US00/09542, PCT/US00/09542, PCT.
Written Opinion dated Jun. 19, 2001 for PCT/US00/01708, PCT/US00/01708, PCT.
ISR dated Jun. 26, 2000 for PCT/US00/01708, PCT/US00/01708, PCT.
ISR dated Feb. 4, 2003 for PCT/US00/29813, 2388649, CA.
IPER dated Jan. 25, 2002 for PCT/US00/29813, 2388649, CA.
Written Opinion dated Sep. 5, 2001 for PCT/US00/29813, 2388649, CA.
ISR dated Feb. 21, 2003 for PCT/US00/29809, 2388648, CA.
IPER dated Feb. 11, 2002 for PCT/US00/29809, 2388648, CA.
Written Opinion dated Sep. 5, 2001 for PCT/US00/29809, 2388648, CA.
IPER dated Mar. 25, 2002 for PCT/US00/25826, 2385097, CA.
Written Opinion dated Nov. 2, 2001 for PCT/US00/25826, 2385097, CA.
ISR dated Jun. 22, 2001 for PCT/US00/25826, 2385097, CA.
Written Opinion dated May 29, 2001 for PCT/US00/09542, 2371379, CA.
ISR dated Nov. 2, 2000 for PCT/US00/09542, 2371379, CA.
ISR dated Nov. 2, 2000 for PCT/US00/09541, 2369759, CA.
IPER dated Feb. 14, 2002 for PCT/US00/31740, 2001-539201, JP.
Written Opinion dated Oct. 19, 2001 for PCT/US00/31740, 2001-539201, JP.
ISR dated Sep. 18, 2001 for PCT/US00/31740, 2001-539201, JP.
IPER dated Aug. 22, 2003 for PCT/US00/17266, 2001-506518, JP.

Written Opinion dated Jan. 31, 2003 for PCT/US00/17266, 2001-506518, JP.
ISR dated Sep. 21, 2001 for PCT/US00/15810, 2001-502044, JP.
ESR dated Oct. 4, 2005, 00974003.6, EP.
IPER dated Feb. 13, 2002 for PCT/US00/24819, 00960077.6, EP.
Written Opinion dated Aug. 13, 2001 for PCT/US00/24819, 00960077.6, EP.
ISR dated Dec. 7, 2000 for PCT/US00/24819, 00960077.6, EP.
ISR dated Jan. 18, 2001 for PCT/US00/17266, 00943086.9, EP.
IPER dated Sep. 8, 2001 for PCT/US00/15810, 00941287.5, EP.
IPER dated Jan. 2, 2002 for PCT/US00/09541, 00925915.1, EP.
Written Opinion dated Aug. 13, 2001 for PCT/US00/09541, 00925915.1, EP.
IPER dated Feb. 14, 2001 for PCT/US00/09543, 00923211.7, EP.
ISR dated Oct. 24, 2000 for PCT/US00/09543, 00923211.7, EP.
IPER dated Nov. 1, 2001 for PCT/US00/01708, 00909966.4, EP.
IPER dated Feb. 2, 2001 for PCT/US00/01625, 00909958.1, EP.
ISR dated Jul. 24, 2000 for PCT/US00/01625, 00909958.1, EP.
Tan, Q. et al., "A brief overview of current TV set-top box developments", Systems, Man, and Cybernetics, 1996, IEEE International Conference on: Oct. 14-17, 1996, 2127-2132.
Perry, T.S., "Consumer electronics", Spectrum, IEEE, Jan. 1997, vol. 34, No. 1, 43-48.
The Internet Protocol Journal, Dec. 1998, vol. 3, No. 1, http://www.noc.garr.it/docum/journal/ipj_dic_98.pdf.
T.P. David, "Networking requirements and solutions for a TV WWW Browser" 1997 from http://scholar.lib.vt.edu/theses/public/etd-82497-16476/materials/etd.pdf.
Atzori, L. et al., "Multimedia information broadcasting using digital TV channels", Broadcasting, IEEE Transactions on, Dec. 1997, vol. 43, No. 4, 383-392.
Encryption. Free On-line dictionary of computing: http://foldoc.doc.ic.ac.uk/foldoc/2003-04-12.
Encode. Free On-line dictionary of computing: http://foldoc.doc.ic.ac.uk/foldoc/1999-07-06.
The project Gutenberg entitled: "The Bible: Old and New Testaments, King James Version by Anonymous", released on Aug. 1, 1989.

"'Optical Disks' May Be Books of the Future", Steven Kosek and Dennis Lynch; Chicago Tribune, Sep. 15, 1985, p. 31.
"Transmission Control Protocol; Request for Comment 793", Sep. 1981, pp. 1-85.
Cerf, V. et al., "A protocol for Packet Network Intercommunication," May 1974, IEEE Transactions on Communications Col. COM-22, No. 5, 637-647.
Holzmann, G., "Design and Validation of Computer Protocols," Nov. 1990, Prentice Hall, pp. 1-512.
Hearst, "Changing Network Society: New Technology in the Internet," (the original title: Interfaces for Searching the Web), Dec. 1998, Japan Nikkei Science, $1^{st}$ edition, 80-85.
Shunji Ichiyama, "WWW-based Digital Library System," Jul. 1996, NEC Giho (technical journal), NEC Creative, vol. 49, 33-39.
Minoru Ashizawa, "Using Digital Libraries as a Community Hall for Worldwide Information Spiral Development," May 1998, Journal of the Institute of Electronics, Information and Communication Engineers, Japan, vol. J81-D-II, No. 5, 1014-1024.
Akira Kojima, "Navigable Digital Library System Using Video-based Walk-through Technology," Mar. 1996, Technical Research Report of the Institute of Electronics, Information and Communication Engineers, Japan, vol. 95, No. 580, 31-36.
Toshiyuki Kamiya, "Development of Electronic Library Interface with 3D Walk-through and CG Librarian," Jan. 1995, Research Report of Information Processing Society of Japan, vol. 95, No. 1, 27-35.
Mamoru Sato, "Electronic Library Search using Animation," Apr. 1989, Science and Technology Information Service, Japan, National Diet Library, No. 88, 11-17.
Mamoru Sato, "SON-GO-KU: A dream of Automated Library," Mar. 1989, Joho Kanri (Journal of Information Processing and Management), the Japan Information Center of Science and Technology, vol. 31, No. 12, 1023-1034.
English language translation of citation No. 12, JP08008851.
English language translation of citation No. 13, JP09237096.
English language translation of citation No. 14, JP10070530.

* cited by examiner

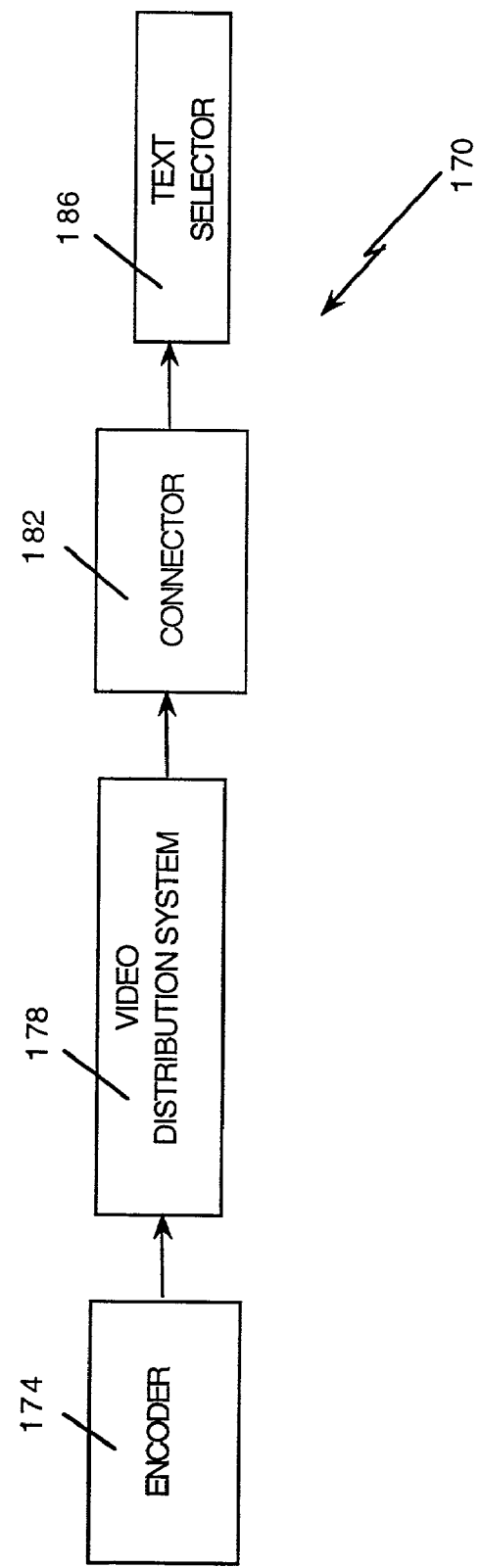

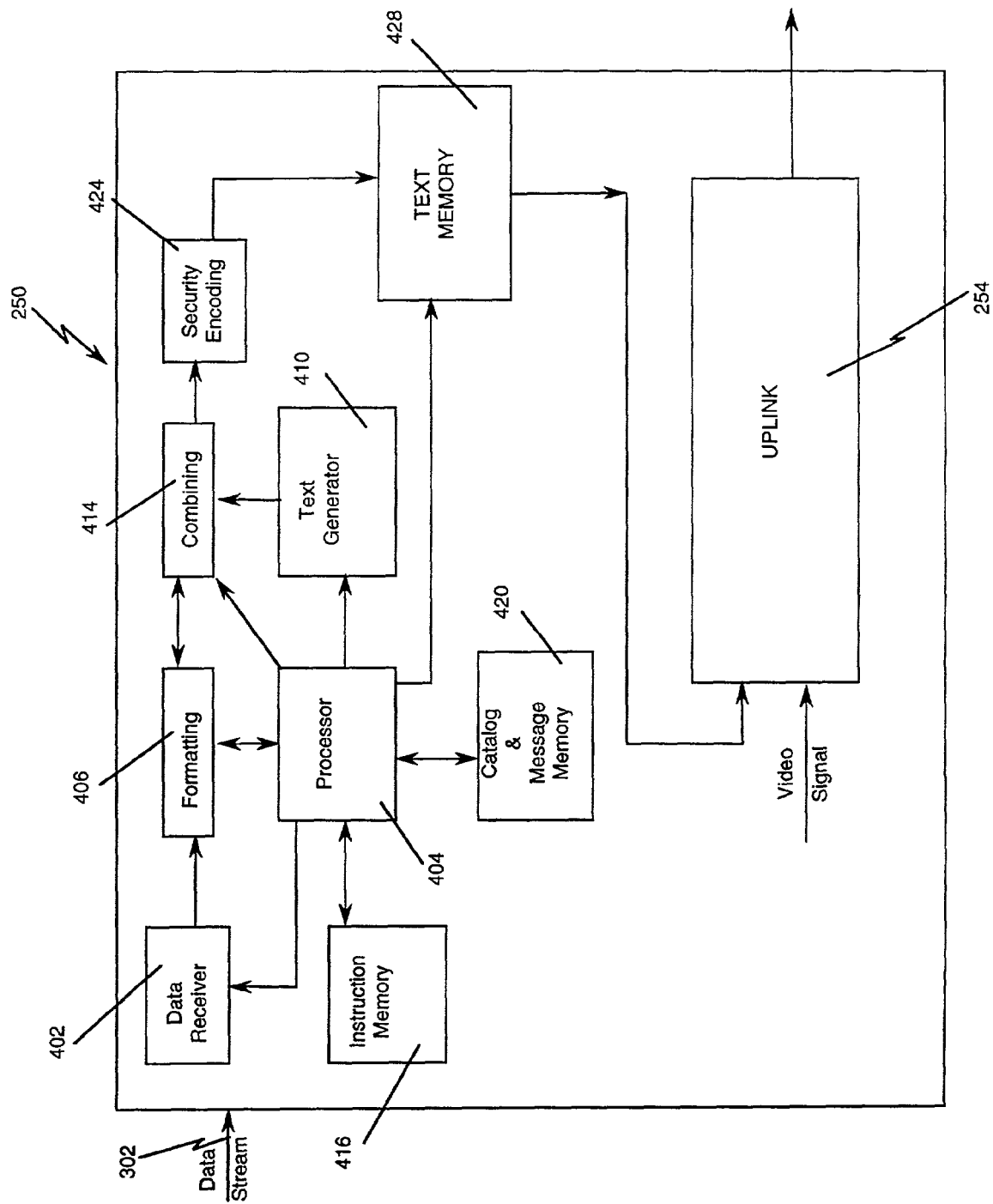

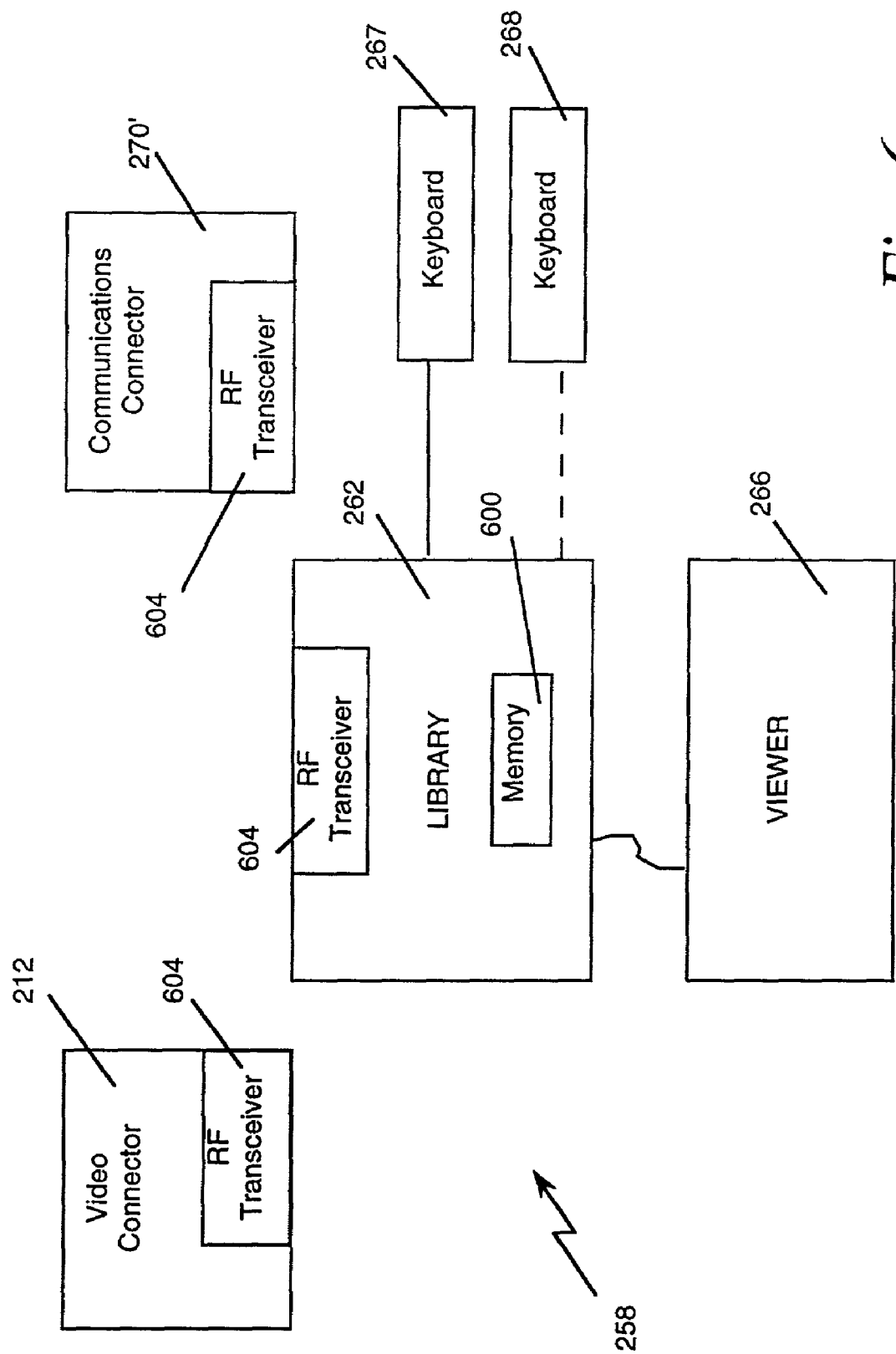

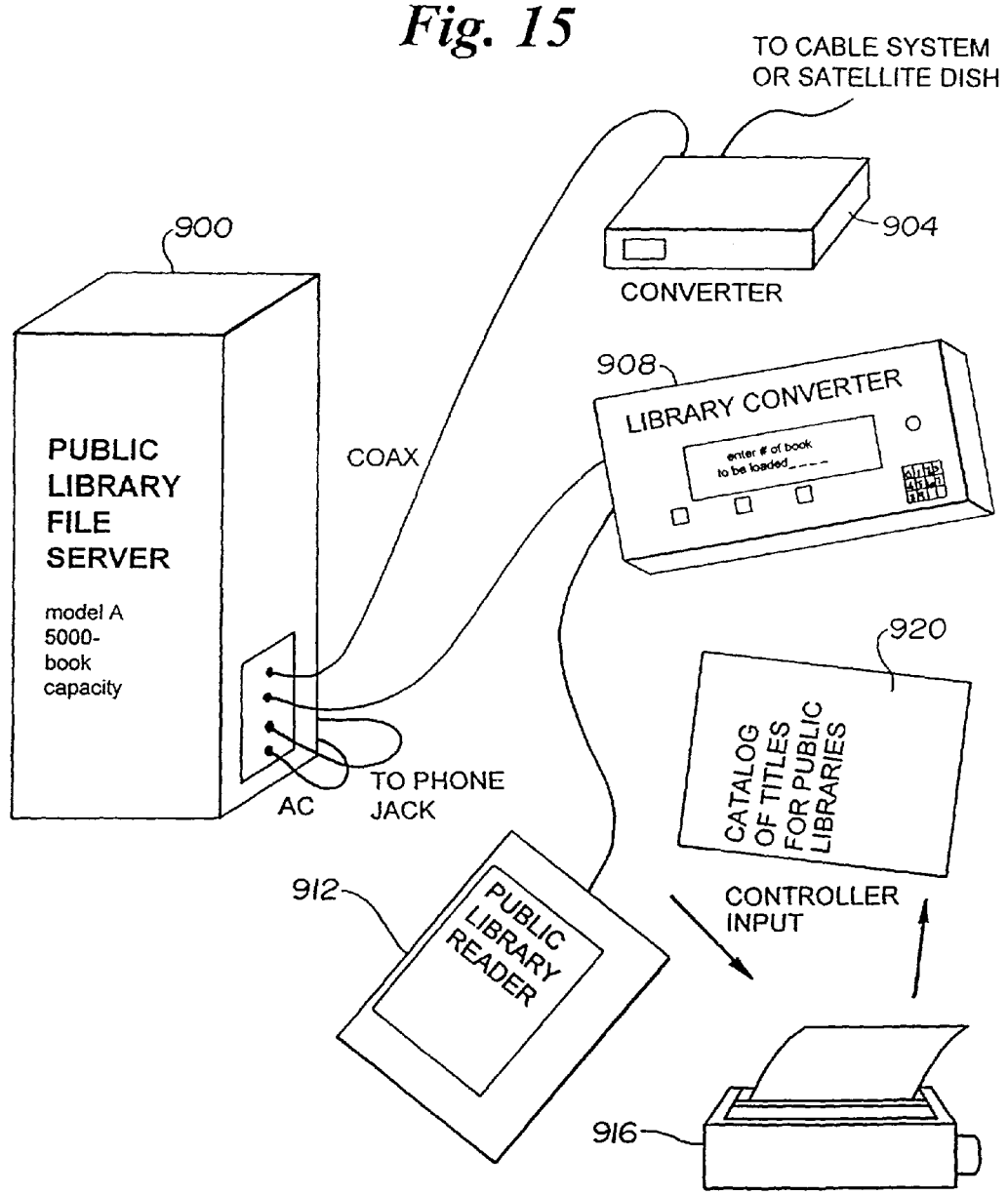

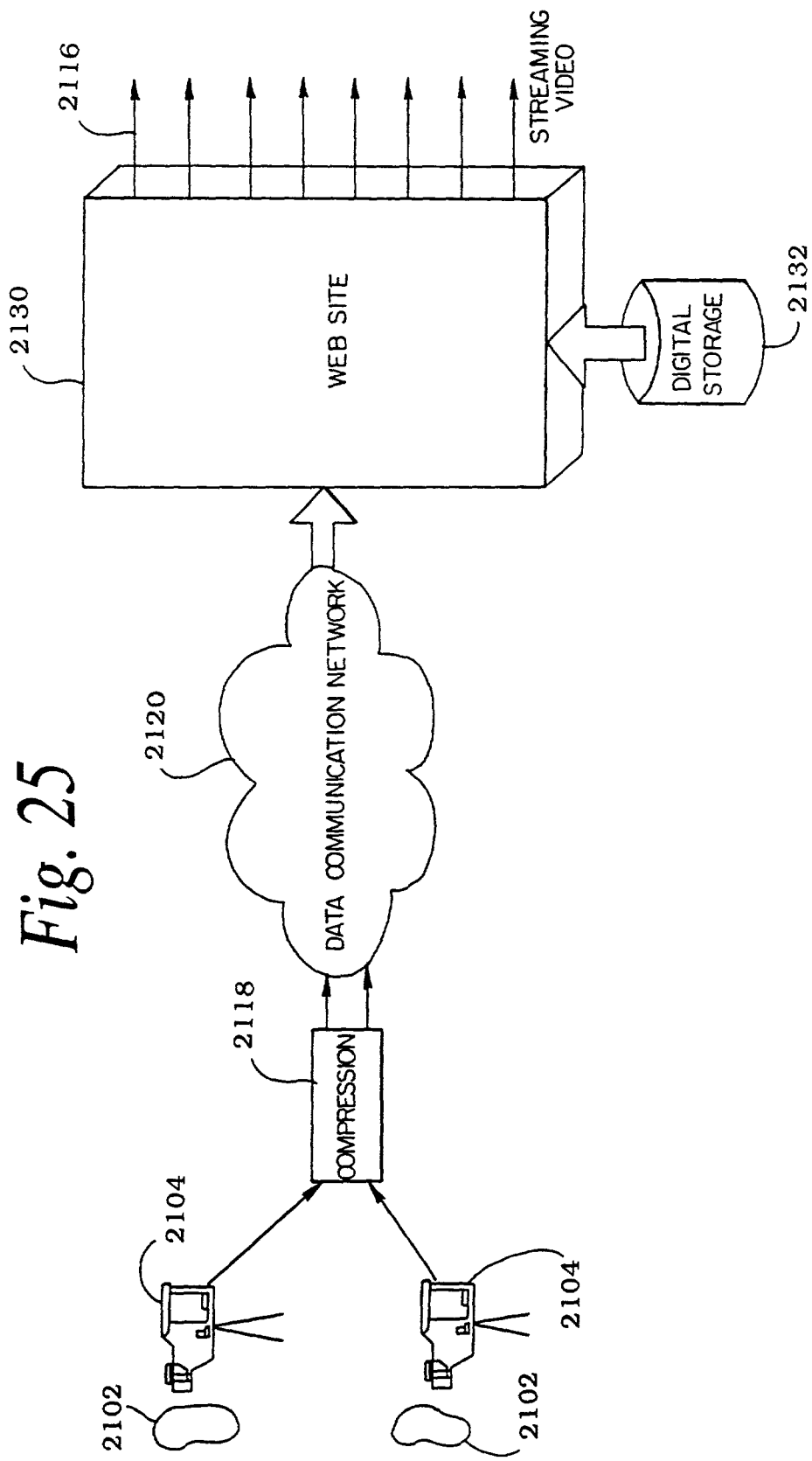

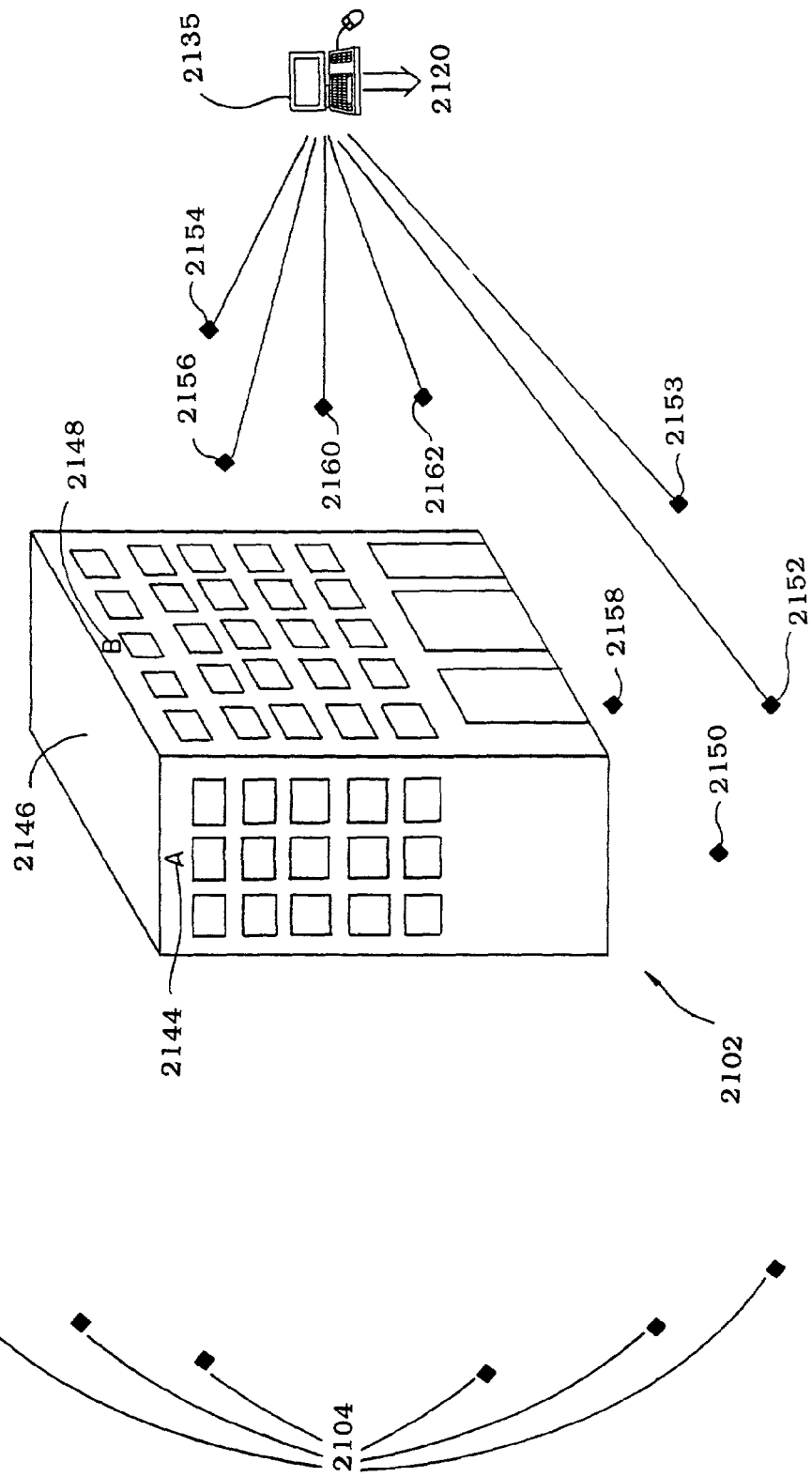

ELECTRONIC BOOK CONNECTION TO WORLD WATCH LIVE

RELATED APPLICATIONS

This application is a continuation-in-part of U.S. application Ser. No. 07/991,074 entitled TELEVISION PROGRAM PACKAGING AND DELIVERY SYSTEM WITH MENU DRIVEN SUBSCRIBER ACCESS, filed Dec. 9, 1992 now abandoned, U.S. application Ser. No. 08/336,247 entitled ELECTRONIC BOOK SELECTION AND DELIVERY SYSTEM, filed Nov. 7, 1994 now U.S. Pat. No. 5,986,690, U.S. application Ser. No. 08/160,194 now U.S. Pat. No. 5,990,927 and PCT/US93/11606 entitled ADVANCED SET-TOP TERMINAL FOR CABLE TELEVISION DELIVERY SYSTEMS, filed Dec. 2, 1993, U.S. application Ser. No. 08/906,469 entitled REPROGRAMMABLE TERMINAL FOR SUGGESTING PROGRAMS OFFERED ON A TELEVISION PROGRAM DELIVERY SYSTEM, filed Aug. 5, 1997 now U.S. Pat. No. 6,408,437, U.S. application Ser. No. 09/191,520 entitled DIGITAL BROADCAST PROGRAM ORDERING, filed Nov. 13, 1998 now abandoned and U.S. application Ser. No. 08/923,091 entitled APPARATUS FOR VIDEO ACCESS AND CONTROL OVER COMPUTER NETWORK, INCLUDING IMAGE CORRECTION, filed Sep. 4, 1997 now U.S. Pat. No. 6,675,386. These applications are incorporated by reference herein. Also incorporated by reference are co-pending U.S. application Ser. No. 09/237,827 entitled ELECTRONIC BOOK HAVING LIBRARY CATALOG MENU AND SEARCHING FEATURES, filed Jan. 27, 1999; U.S. application Ser. No. 09/237,828 entitled ELECTRONIC BOOK ELECTRONIC LINKS, filed Jan. 27, 1999; U.S. application Ser. No. 09/391,461 entitled VIDEO CONFERENCING WITH AN ELECTRONIC BOOK VIEWER, filed Sep. 8, 1999; and U.S. application Ser. No. 09/289,956, entitled ELECTRONIC BOOK ALTERNATIVE DELIVERY METHODS, filed Apr. 13, 1999.

FIELD OF THE INVENTION

This invention relates to the distribution of audiovisual signals through communications networks such as computer networks and servers and their subsequent storage in and display on an electronic book reader. The invention has particular use with respect to global networks such as the Internet and "World Wide Web". The invention also relates to education. Particularly, the invention provides an alternative to in-person classroom instruction.

DESCRIPTION OF RELATED ART

There is a constant desire to improve education and knowledge at all levels. It is thought that true human progress can only be achieved if people's understanding of each other is improved and if people's understanding of nature and the environment is improved. Traditionally, education and knowledge have been obtained in schools from classroom instruction and from the reading of books.

The disadvantage of current classroom instructional systems is that students must be physically present in the classroom to participate in the educational process. Therefore, students who are geographically displaced from the location of the classroom often cannot attend class instruction as often or as timely as students who are nearby to the classroom.

The disadvantage of textbooks is that they are often not kept current with recent events or technological changes. Textbooks are usually only updated on a yearly or less frequent basis, while important changes may occur monthly or more frequently. Also, to save funds, schools may not purchase new textbooks even though the textbooks have been updated. Therefore, the new knowledge, although available, is not communicated to students.

Recently, audiovisual presentations have begun to be used in the field of education. These systems may provide playback of a recording of a lecturer who provides a presentation on an educational topic. For example, students may learn about math from watching a videotape or television broadcast of a math professor's lecture. Education can also occur on a more informal basis. For example, specialty channels in the United States such as the Discovery Channel® and The Learning Channel® (headquartered in Bethesda, Md., U.S.A.) broadcast educational programming that both entertains and educates a diverse viewership.

The disadvantage of these audiovisual systems is that they are not interactive. Students are unable to ask questions, and the lecturer is unable to tailor the presentation of material to the specific needs of the current student audience. Consequently, the needs of the students are not met.

Cable and broadcast television are commonly known media which supply information to large numbers of viewers equipped with receivers known as "television sets." By receiving a broadcast, cablecast or satellite signal, users are able to view scenes from remote locations and observe newsworthy events which occur far from the user's location. However, conventional television is a one-way media in which users cannot communicate with each other or the broadcaster.

Recently, the advent of the Internet, and the World Wide Web, in conjunction with the proliferation of personal computers, has allowed people to exchange information and ideas on a global and inexpensive basis. Generally speaking, the Internet is a large computer network which connects host computers. Users with a computer, modem and telephone line commonly call via telephone to connect with a host. The host, being in communication with other hosts (connected to other users) is able to transfer information between users. The Internet is used, for example, to transfer, data files, still images, sounds and messages between virtually any two points in the world with telephone access.

The use of the Internet has increased dramatically since 1981, when approximately 300 host computers were linked together. In 1989, the number of linked host computers was fewer than 90,000; but by 1993, over a million host computers were connected. Currently over 10 million host computers are linked (not including the personal computers people use to access these hosts via modems) and as many as 40 million people around the world may have access to the Internet medium. This number is expected to grow to 200 million by the end of 1999.

Users on the Internet are able to transfer text, graphics, and still pictures between remote locations. Other types of information which can be transmitted include files containing prerecorded sequences of images. To view these images, users download a large data file, and after running appropriate software, see a sequence of images on the computer screen. These images typically are not provided in real time, and are not viewable while the user is accessing the Internet.

Therefore, even though the Internet is a two-way communication medium, it is not currently being utilized to provide video information and audiovisual presentations. This is a disadvantage, in that a large number of people have been accustomed to television audiovisual presentations, and prefer an audio-video presentation to a textual or graphical presentation.

SUMMARY OF INVENTION

The electronic book selection and delivery system is a new way to distribute books to bookstores, public libraries, schools and consumers. The technological breakthroughs of this invention provide a secure electronic system for both delivering selected books and receiving payments. The system has an unusual combination of features that provides the consumer with a daily use household appliance that has a high tech aura while being very practical, portable, and easy to use.

An advantage of the system is that it eliminates the distribution of any physical object such as a paper book or computer memory device from any book or text distribution system. The purchase of a book becomes a PAY-PER-READ™ event avoiding the overhead, "middle-men," printing costs, and time delay associated with the current book distribution system. Published material and text such as the President's speech, a new law, a court decision on abortion, or O.J. Simpson's testimony can be made immediately available to the consumer at a nominal fee. Alternatively, books may be made available free to the end use consumer, subsidized by advertisers who sponsor books or embed advertising within the books.

The system is a novel combination of new technology involving the television, cable, telephone, and computer industries. It utilities high bandwidth data transmissions, strong security measures, sophisticated digital switching, high resolution visual displays, novel controls, and user friendly interface software.

The primary components of the text delivery system are the subsystem for preparing the text for delivery and the subsystem for receiving and selecting text that was delivered. An embodiment of the system includes additional components and optional features that enhance the system. The system may be configured for use by bookstores, public libraries, schools and consumers. In one embodiment, the system for consumer use is made up of four subsystems, namely: (1) an operations center, (2) a distribution system, (3) a home subsystem including reception, selection, viewing, transacting and transmission capabilities, and (4) a billing and collection system. Alternative configurations of the system are defined to allow for a variety of traditional and non-traditional delivery methods.

The operations center performs several primary functions: manipulating text data (including receiving, formatting and storing of text data), security encoding of text, cataloging of books, providing a messaging center capability, and performing uplink functions. In one embodiment, the system delivers the text from the operations center to consumer homes by inserting text data within analog video signals. The insertion of text is generally performed with an encoder at an uplink site that is within or near the operations center. The system can use several lines of the Vertical Blanking Interval (VBI), all the lines of the analog video signal, a digital video signal or unused portions of bandwidth to transmit text data. Using the VBI delivery method, the top ten or twenty book titles may be transmitted with video during normal programming utilizing existing cable or broadcast transmission capability without disruption to the subscriber's video reception. Using the entire video signal, thousands of books may be transmitted within just one hour of air time. Nearly any analog or digital video or data distribution system may be used to deliver the text data. The text data may also be transmitted over other low and high speed signal paths including a telephone network (e.g., a public switched telephone network) having a high speed connection such as a digital subscriber line (DSL) connection and the Internet, for example.

The home subsystem performs at least four functions: connecting to the distribution system, selecting text, storing text, and transacting through a communicating mechanism. The components of the home subsystem may be configured in a variety of hardware configurations. Each function may be performed by a separate component, the components may be integrated, or the capability of existing cable set top converter boxes, computers, and televisions may be utilized. A connector, library unit and viewer unit may be used. In one embodiment, the connector portion of the home subsystem receives an analog video signal and strips or extracts the text from the video. The home library stores the text signal, provides a user friendly software interface to the system and processes the transactions at the consumer home. The viewer provides a screen for viewing text or menus and novel user friendly controls. Alternative embodiments are presented that support delivery of text using a variety of communication mechanisms.

The viewing device may be a portable book shaped viewer which stores one or more books for viewing and provides a screen for interacting with the home library unit. A high resolution display is used to both read the books and to interact with the home library software. In one embodiment, an optional phone connector or return-path cable connection initiates the telephone calls and, with the aid of the library, transmits the necessary data to complete the ordering and billing portion of the consumer transaction. Alternative embodiments are presented that support ordering and billing using a variety of communication mechanisms. The user friendly controls include a bookmark, current book and page turn button. The billing and collection system performs transaction management, authorizations, collections and publisher payments automatically.

A system similar to the system for consumer use may be used in bookstores, schools and public libraries.

In one aspect of the invention, video is collected at a remote site. The term "video," as used herein, includes stereophonic or monophonic audio signals which may accompany a video signal. Additionally, "video" is used broadly herein to include still images, groups of related still images, animation, graphics, pictures, or other visual data, including textual data. The remote video information may be obtained from a video cassette, CD ROMs, television channels, one or more video cameras, or other well known sources. If video cameras are used, they may be connected to a computer so that they are remotely controllable, or they may be oriented such that a perception of control can be created for users. The video may relate to remote sites of interest, such as a pyramid in Egypt, or the images may relate to an educational lecture being conducted at a remote site.

The collected video may be transferred to a web site, either in compressed or uncompressed form. The video may be physically transported or may be transmitted through a communications medium to the web site.

The web site may contain a storage media that stores some or all of the video. Additionally, the web site may pass camera control commands, if applicable, to the remotely controlled cameras or may simulate the remote control of a camera. One function of the web site is to pass video to a plurality of users, through a communication media such as the Internet, in response to user selections. The video passed to the plurality of users may be live video being fed to the web site, or may be stored video. A number of video servers may be used to output the video to the users through the communications media, such as the Internet. The video may be tailored by the web site for the particular user's hardware, including data communication equipment, or memory size, i.e. the data rate matches the highest speed which the user's equipment can handle.

Users receive and display the video sent from the web site. Many simultaneous video pictures may be received. The quality and frame rate of the video is dependent on the user's communications hardware. Users having electronic book viewers with high-speed modems or cable modems may receive higher quality video. The users are able to send commands and/or queries to the web site. The commands and queries are forwarded to remote locations to control remote cameras or query remotely located instructors. Alternatively, the commands may cause the web site to change from among many video signals with different camera angles or locations (or to transmit a different portion of a wide angle image), causing the user to have a perception of remote camera control. The user's commands may also cause a different portion of a received wide angle image to be displayed, giving the user a perception of camera control.

In addition to video, the web site provides information, such as graphics and text, which may be related to the video or may be a separate program. This information may be automatically supplied, or provided upon user request. Therefore, the user may be provided with a comprehensive set of information concerning remote sites, remotely located documents, or other information or data, enabling the user to be quickly educated about the remote site of interest.

BRIEF DESCRIPTION OF DRAWINGS

FIG. 1b is a block diagram of an electronic book selection and delivery system that uses a composite video signal.

FIG. 4 is a block diagram of the operations center.

FIG. 6a is a block diagram of a hardware configuration for a four component home subsystem.

FIG. 15 is a schematic diagram of an electronic book system for a bookstore or public library.

FIG. 25 is a block diagram of an embodiment of the invention where remote video is provided by remotely located cameras and a communication network carries the video to the web server.

FIG. 27 shows remote cameras positioned around a building for perceived camera control.

DETAILED DESCRIPTION OF INVENTION

Figure 1A:
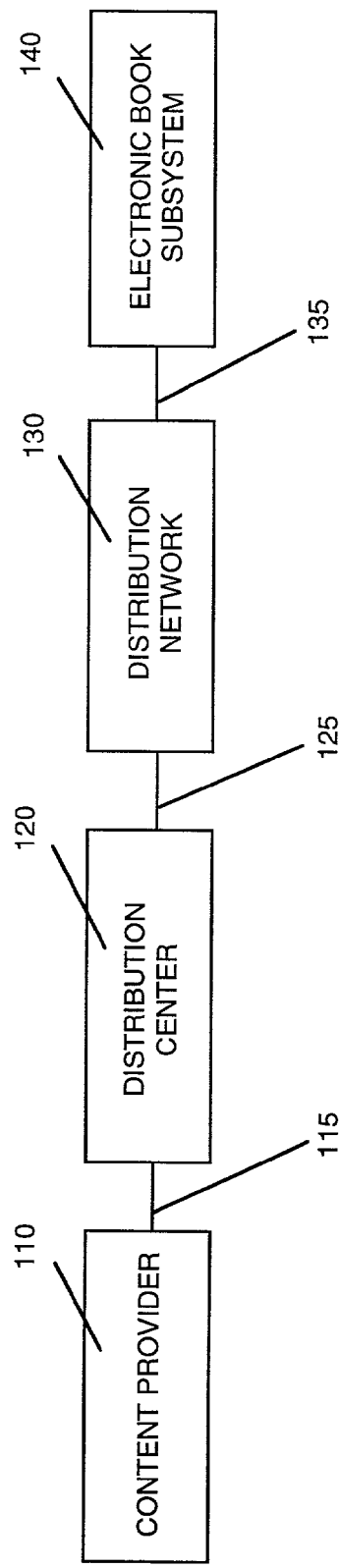
FIG. 1a is a block diagram of the primary components of an electronic book selection and delivery system.

FIG. 1a shows an electronic book distribution system 100 that may be used for distributing an electronic book. A content provider 110 may publish hard copy versions of books or other printed media including newspapers, magazines, and product catalogs, for example. The content provider 110 may convert printed materials to an electronic format and provide the electronic formatted materials to a distribution point, or center 120, over uplink path 115. The uplink path 115 may be a wired or a wireless path. The uplink path 115 may be a telecommunications network, for example. The uplink path 115 may be a satellite relay path or a wireless telephone path. The uplink path 115 may involve providing electronic books to the distribution center on a fixed media, such as a CD-ROM, for example.

In FIG. 1a, the content provider 110 and the distribution center 120 are shown as separate components of the electronic book distribution system 100. However, the content provider 110 and the distribution center 120 may be co-located.

The distribution center 120 may convert printed matter into an electronic format. Alternately, the distribution center 120 may receive electronic files from an outside source, such as the content provider 110. The distribution center 120 may process and store electronic books.

The distribution center 120 distributes electronic books. The distribution may be, for example, over distribution path 125, distribution network 130, and distribution path 135 to an electronic book subsystem or terminal 140, which may include an electronic book viewer (not shown). The terminal may also be a television, a set top terminal, a personal computer, or similar device. An apparatus and method for distributing electronic books is disclosed in greater detail later. The distribution network 130 may be an electronic book store, an Internet web site, a wired or wireless telecommunications network, an intranet, a radio program delivery system, a television program delivery system, including cable television, satellite television broadcast, and over-the-air broadcast, for example. The electronic book distribution network 130 could include direct delivery through a mail delivery system of electronic books on a fixed media, such as a CD-ROM, for example.

FIG. 1b shows components of an electronic book distribution system 170 using a television program delivery system to distribute electronic books.

In the embodiment shown in FIG. 1b, the components of the electronic book selection and delivery system 170 are an encoder 174, a video distribution system 178, a connector 182, and a text selector 186. The encoder 174 places textual data on a video signal to form a composite video signal. Although the composite signal may contain only textual data, it usually carries both video and textual data. A variety of equipment and methods may be used to encode text data onto a video signal. The video distribution system 178 distributes the composite video signal from the single point of the encoder 174 to multiple locations, which have connectors 182. The connector 182 receives the digital or analog video signal from the video distribution system 178 and separates, strips or extracts the text data from the composite video signal. If necessary, the extracted text data is converted into a digital bit stream. The text selector 186 works in connection with the connector 182 to select text.

Using the connector 182 and text selector 186 combination, various methods of selecting and retrieving desired text from a composite or video signal are possible. Text may be preselected, selected as received or selected after being received and stored. One method is for the connector 182 to strip or extract all the text from the video signal and have the text selector 186 screen all the text as received from the connector 182. The text selector 186 only stores text in long term or permanent memory if the text passes a screening process described below.

Figure 2:
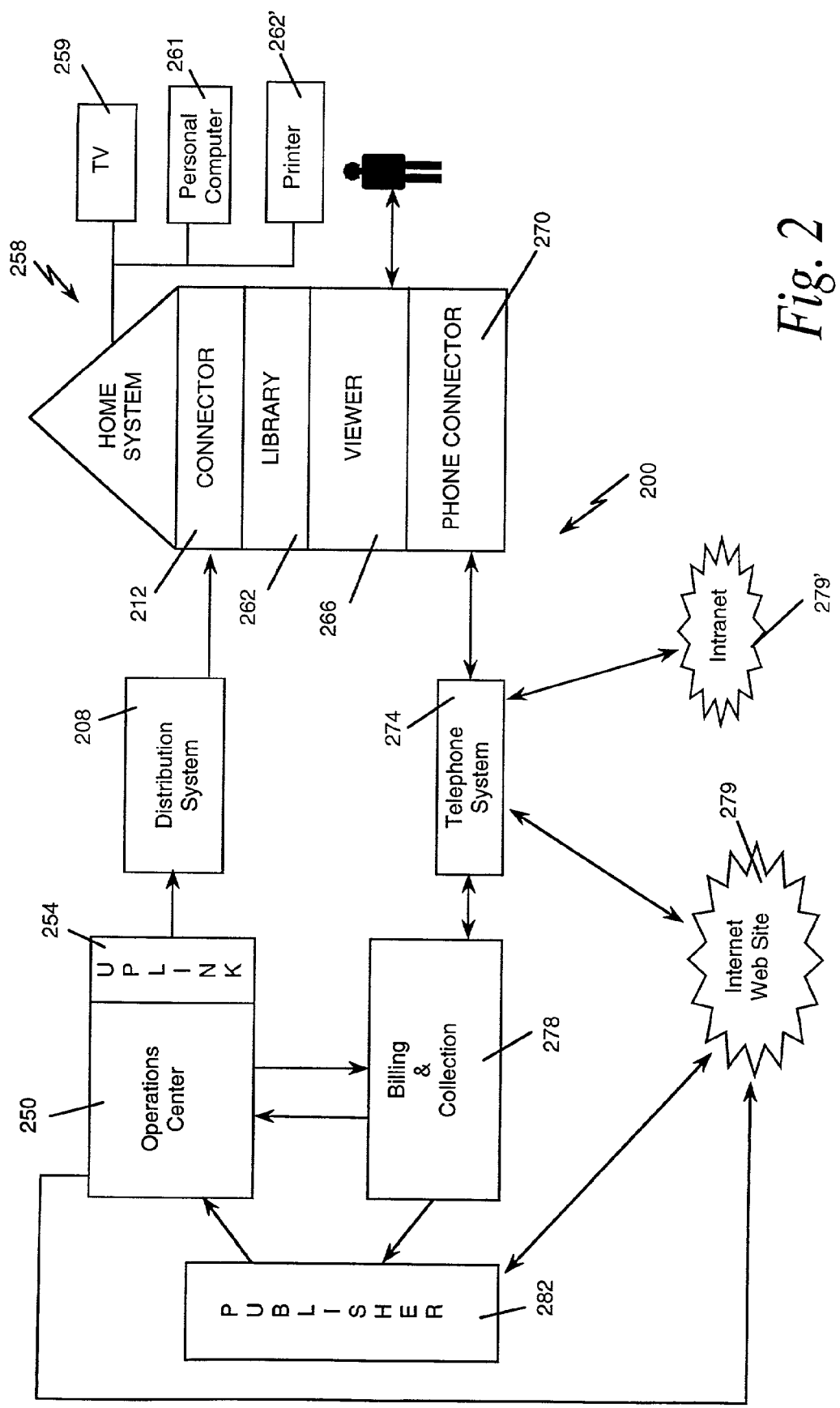
FIG. 2 is a schematic showing an overview of the electronic book selection and delivery system.

FIG. 2 shows another embodiment of an electronic book selection and delivery system 200. The delivery system 200 includes: an operations center 250 including an uplink site 254, a video distribution system 208, an electronic book device, or home system 258 including a video connector 212, a library 262, a viewer 266, and a phone connector 270, telephone system 274, an Internet web site 279 and a billing and collection system 278. Also as shown in FIG. 2, the home system 258 may include connections to a television 259 and a personal computer 261 may be used to display menu screens, electronic books, electronic files, or any other information associated with the electronic book delivery system 200. In addition, the television 259 and the personal computer 261 may provide control functions that replicate and supplement those of the viewer 266.

The operations center 250 receives textual material from outside sources 282 such as publishers, newspapers, and on-line services. Alternately, the outside sources may maintain electronic books at the Internet web site 279. The outside sources 282 may convert textual and graphical material to digital format, or may contract with another vendor to provide this service. The operations center 250 may receive the textual and graphical material in various digital formats and may convert the textual material to a standard compressed format for storage. In so doing, the operations center 250 may create a pool of textual material that is available to be delivered to the home system 258. The textual material may be grouped by books or titles for easy access.

As used herein, "book" means textual, graphical or video information. Such information may be contained in any novels, encyclopedias, articles, magazines, newspapers, catalogues, periodicals, or manuals or any portion or section of the above. The information may also be provided as a video clip, for example. The term "title" may represent the actual title assigned to a book, a video program, or any other designation indicating a particular group, portion, or category of textual information. The title may refer to a series of related textual, video or graphical information, a grouping of textual, video or graphical information, or a portion of textual, video or graphical information. For example, "Latest Harlequin Romance", "Four Child Reading Books (Ages 10-12)," "Encyclopedia 'BRITANNICA'™," "President's Speech," "Instruction Manual," "Schedule of 4th of July Events," "Pet Handbooks," "Roe v. Wade," and "The Joy of Cooking," are suitable titles. Also, the title may be a graphical symbol or icon. Thus, a picture of a wrench may be a title for a repair book, a picture of a computer a title for a computer book, a graphical symbol of a telephone a title for a telephone book, a drawing of a dagger a title for a mystery book, a picture of a bat and ball a title for a sports book, and a picture of tickertape a title for a business book.

The operations center 250 includes the uplink site 254 for placing the text or other information onto a telecommunications signal and sending the telecommunications signal into a distribution system. The uplink site 254 may include an encoder 204 (not shown in FIG. 2) to encode the text onto the telecommunications signal.

Many analog and digital video distribution systems may be used with the electronic book delivery system 200, such as cable television distribution systems, broadcast television distribution systems, video distributed over telephone systems, direct satellite broadcast distribution systems, and other wire and wireless video distribution systems. Nearly any distribution system which can deliver a telecommunications signal, including a video signal, will work with the electronic book delivery system 200. It is also possible to distribute the electronic book without using a telecommunications signal as described in the embodiments presented in Section VII below.

The home system 258 performs five functions: (1) connecting with a video distribution system; (2) selecting data; (3) storing data; (4) displaying data; and (5) handling transactions. An important optional function of the home system 258 is communicating using, in one embodiment, a telephone communication system 274. The home system 258 may be made up of four parts: a video connector 212 or similar type of connector for connecting with the distribution system 208, a library 262 for storing and processing, a viewer 266 for viewing menus and text and a telephone connector 270 for connecting with a telephone communications system 274. Additional embodiments are presented in Section VII that address alternative communication mechanisms.

The billing and collection system 278 may be co-located with the operations center 250 or located remote from the operations center 250. The billing and collection system 278 may be in communication with the home system 258 using telephone-type communication systems (for example 274). Any of a number of communication systems as presented in Section VII, such as a cellular system or the Internet, will operate with the billing and collection system 278. The billing and collection system 278 records the electronic books or video, or portions of text or video that are selected or ordered by the subscriber. The collection system will charge a subscriber's credit account or bill the subscriber. In addition, the billing and collection system 278 may monitor that amount due to publishers or other outside sources 282 who have provided textual data or other services such as air time to enable the text delivery system 200 to operate.

Also shown in FIG. 2 is an intranet 279'. The intranet 279' may be used as a part of a private distribution network for distributing and circulating electronic books. For example, a university library may use the intranet 279' to circulate electronic books to university students and professors.

Figure 3:
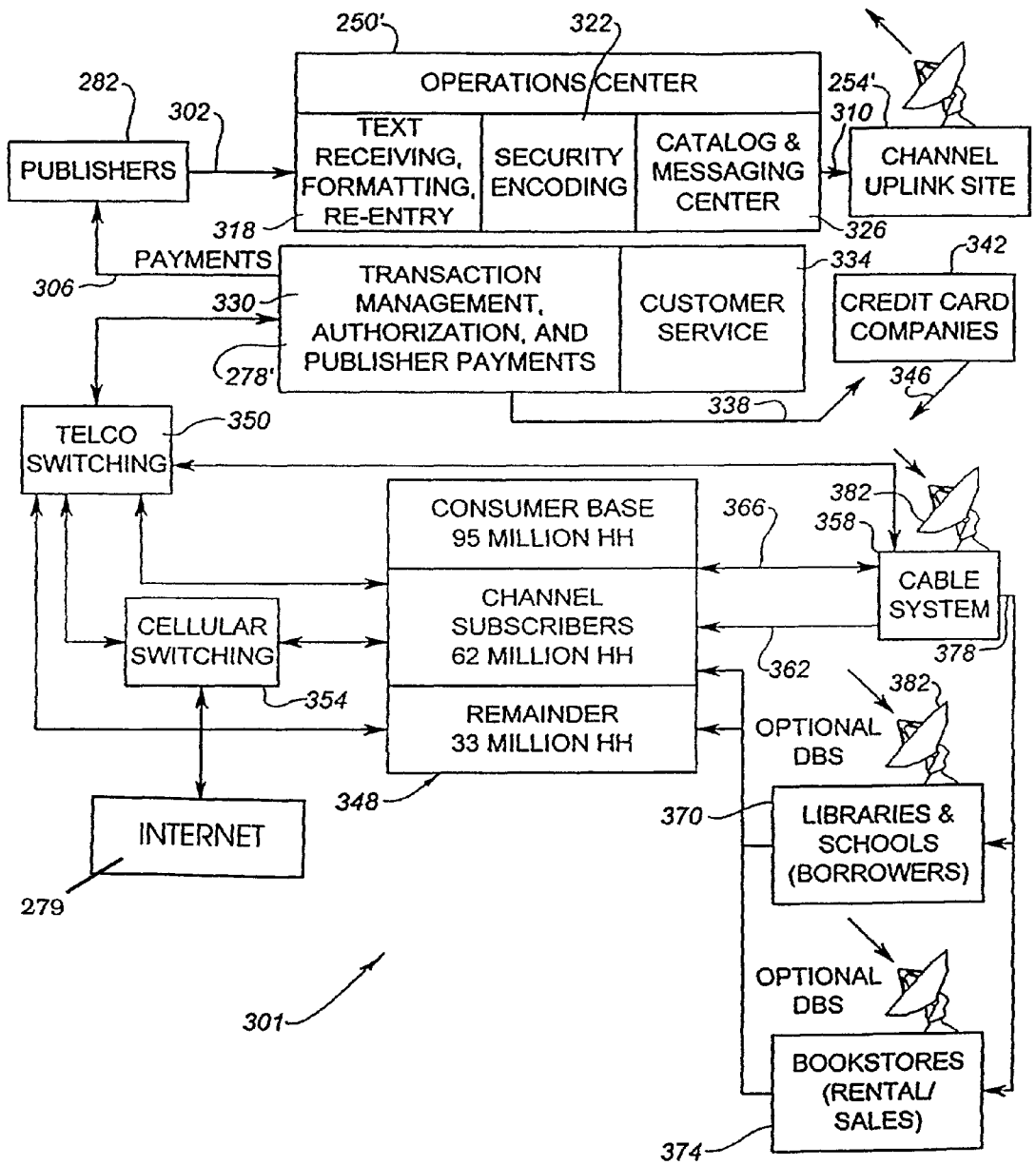
FIG. 3 is a schematic of a delivery plan for the electronic book selection and delivery system.

FIG. 3 is an expanded overview of a delivery plan 301 for the electronic book delivery system 200. It is a comprehensive delivery plan 301 to support various types of users and various billing systems. FIG. 3 shows that publishers 282 may provide text transfer 302 to the operations center 250' and receive payments 306 from the billing and collection system 278'. A separate channel uplink site 254' is shown in this configuration receiving data 310 from the operations center 250'. The operations center 250' has three separate sections (318, 322, 326) one for text receiving, formatting and re-entry 318, a second for security encoding 322 and a third section for catalog and messaging center functions 326.

The collection and billing system 278' shown has two sections (330, 334) one for transaction management, authorizations and publisher payments 330, and the other for customer service 334. The customer service section 334 provides for data entry and access to customer account information. Transaction accounting information 338 is supplied to credit card companies 342 by the transaction management section 330 of the billing and collection system 278'. The credit card companies 342 provide billing 346 to customers either electronically or by mail.

Methods for communicating between the subscriber base 348 and the billing and collection system 278' include: by telephone switching 350 alone, cellular switching 354 and telephone switching 350 combined, and by use of the cable system 358 and the telephone switching 350. The system shown supports both one-way 362 and two-way cable communication 366 with subscribers. Additional communication methods are presented in Section VII. Public libraries and schools 370 as well as bookstores 374 may use the delivery system 301.

Public libraries and schools 370 could have a modified system to allow the viewer to be checked-out or borrowed while bookstores 374 would rent or sell the viewer and sell electronic book data. The bookstores 374 as well as the public libraries and schools 370 may be serviced by cable 378. Optional direct broadcast systems (DBS) 382 can also be used with the system 200.

I. The Operations Center

FIG. 4 is a schematic of the operations center 250, which includes the uplink 254. The operations center 250 may gather text or books by receiving, formatting, storing, and encoding. A data stream 302 containing text may be received at the operations center 250 by a data receiver 402. The data receiver 402 is under the control of a processor 404. After reception, the data stream is formatted using digital logic for formatting 406 which is also under the control of the processor 404. If any additional text is generated at the operations center 250 locally for insertion into the distributed signal, the text generation is handled through text generator hardware 410, which may include a data receiver and a keyboard (not shown). Following processing by the text generator 410, the additional text can be added to the text received by the combining hardware 414 that includes digital logic circuitry (not shown).

The processing at the operations center 250 is controlled by a processor 404, which uses an instruction memory 416. The processor 404 and instruction memory 416 may be supplied by a personal computer or mini-computer, for example. To perform the catalog and messaging functions, the operations center 250 uses a catalog and message memory 420 and the text generator 410 if necessary.

The data stream of text, catalog and messages may be encoded by security module encoding 424 prior to being sent to the uplink module 254. Various encoding techniques may be used by the security encoding module 424 such as the commercial derivative of NSA's encryption algorithm (Data Encryption System (DES)) and General Instrument's DigiCipher II. Following encoding, the encoded text may be stored in text memory 428 prior to being sent to the uplink 254. A first-in-first-out text memory arrangement may be used under the control of the processor 404. Various types of memory may be used for the text memory 428 including RAM. The operations center 250 may use file server technology for the text memory 428 to catalog and spool books for transmission as is described below. The operations center 250 may also store the electronic book as compressed data files.

In an embodiment, to transmit textual data, the distribution system 208 (see FIG. 2) may use high bandwidth transmission techniques such as those defined by the North American Broadcast Teletext Standard (NABTS) and the World System Teletext (WST) standard. Using the WST format (where each line of the Vertical Blanking Interval contains 266 data bits), a four hundred page book, for example, may be transmitted during regular television programming using four lines of the Vertical Blanking Interval at a rate of approximately one book every 1.6 minutes (63,840 bits per second). Alternatively, books may be transmitted over a dedicated channel, which interrupts programming so that 246 lines of video can be used to transmit approximately 2,250 books every hour (3.9 Mbits per second). A teletext type format is the simplest but possibly the slowest text format to use with the electronic book delivery system 200. In either event, an encoder 204 may be used at an uplink site 254 to insert textual data into the analog video signal. In many other respects, the delivery of the textual information may be completed using an existing cable television plant and equipment. Alternative transmit formats and delivery systems are presented in Section VII.

Figures 5A, 5B:
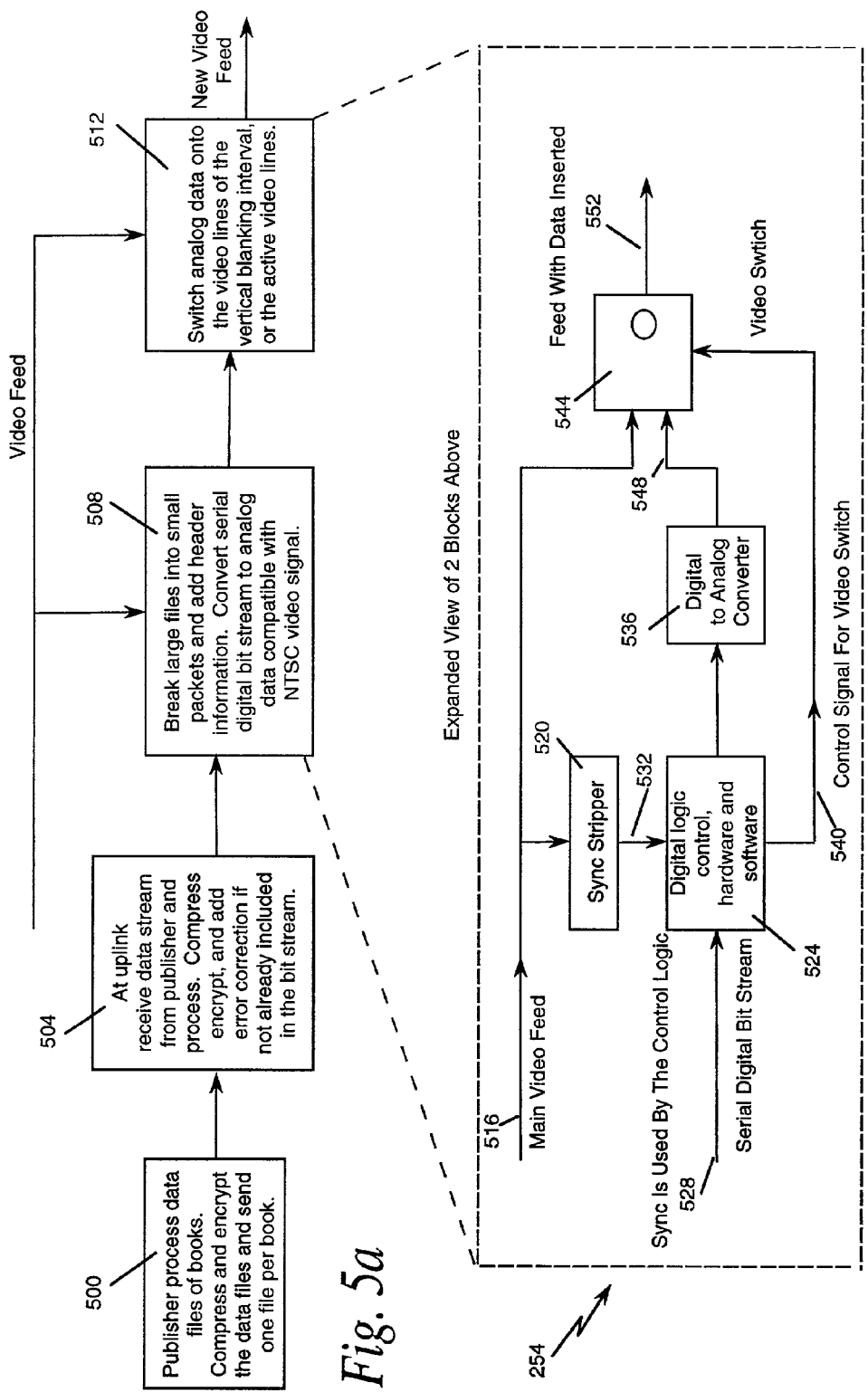
FIG. 5a is a flow diagram of processing at the operations center and uplink.
FIG. 5b is a block diagram of a hardware configuration for an uplink site.

FIG. 5a is a flowchart of steps involved in processing text from the publisher or provider 282 that may occur at the operations center 250. As shown in block 500, the publisher 282 processes data files of text for books, compresses, encrypts and sends the data files to the operations center 250 or uplink 254. Text files for books may be sent one book at a time. As shown in block 504, the uplink 254 or operations center 250 receives and processes the data stream from the publisher 282. Generally, part of this processing includes encryption and error correction. Text files may be delivered for receipt by multiple home subsystems simultaneously, or to a specific individual home subsystem.

In FIG. 5a, the electronic books are distributed to consumers using a video distribution system such as a cable television system. However, the electronic books may also be packaged as data packets and distributed over other telecommunications networks such as a digital wireless telephone network, for example.

In one embodiment, as shown in block 508, files are broken into smaller packets of information. Header information is added to the packets. The bit stream is converted from a serial digital bit stream to an analog bit stream that is compatible with an NTSC video signal. Block 512 shows the switching of analog data into the video lines of a video signal. The analog data may be placed either in the VBI or the active video lines. In some instances, unused portions of bandwidth (such as 5-40 MHZ, 70-75 MHZ, 100-109 MHZ or other guard bands) may be used instead of the video lines. Alternate transmission methods are presented in Section VII.

FIG. 5b is an example of a hardware configuration to perform some of the functions for blocks 508 and 512. A video feed 516 is received and processed through a sync stripper 520. The stripped sync signal 532 is used by the digital logic control 524. The digital logic control 524 receives the sync signal 532 and a serial digital bit stream 528 for processing. The digital logic control 524 passes the serial digital bit stream to the Digital to Analog converter 536 and outputs a control signal 540 for the video switch 544. The video switch 544 integrates the video feed 516 and analog data stream 548 into a video feed with analog data signal inserted 552.

As an alternative to cable, broadcast or other television delivery methods, the public telephone system may be used to transmit books to the subscribers. An average book would take about 7 minutes to transmit over the public telephone system. Using the telephone system, it is not necessary to combine video and text into a composite signal. In most other respects, the operations center would remain similar whether text delivery was by telephone or cable. File server technology (such as that described in U.S. Pat. No. 5,262,875, entitled AUDIO/VIDEO FILE SERVER INCLUDING DECOMPRESSION/PLAYBACK MEANS, issued to Mincer, et al., and, U.S. Pat. No. 5,218, 695, entitled FILE SERVER SYSTEM HAVING HIGH-SPEED WRITE EXECUTION, issued to Noveck, et al., incorporated herein by reference) may be used at the operation center with a telephone system text delivery method.

As another alternative to cable, television, and telephone system delivery, the public telephone system may be used to provide access to the Internet, where the Internet web site 279 may be accessed. Electronic books may be ordered, paid for, and delivered directly from the Internet web site 279 over the telephone system.

When a wireless telephone network is used to distribute electronic books, or otherwise communicate with the home system 258, the home system may receive data using any one or more standard protocols including time division multiple access (TDMA), code division multiple access (CDMA), Global Systems for Mobile Communications (GSM) and Advanced Mobile Telephone System (AMPS) protocols.

In any delivery system using the telephone system, individual subscribers may increase the electronic book deliver rate by incorporating high speed modems or other communications devices such as an Integrated Services Digital Network (ISDN) connector, or by use of a Digital Subscriber Line (DSL).

II. The Home Subsystem

Figure 6B:
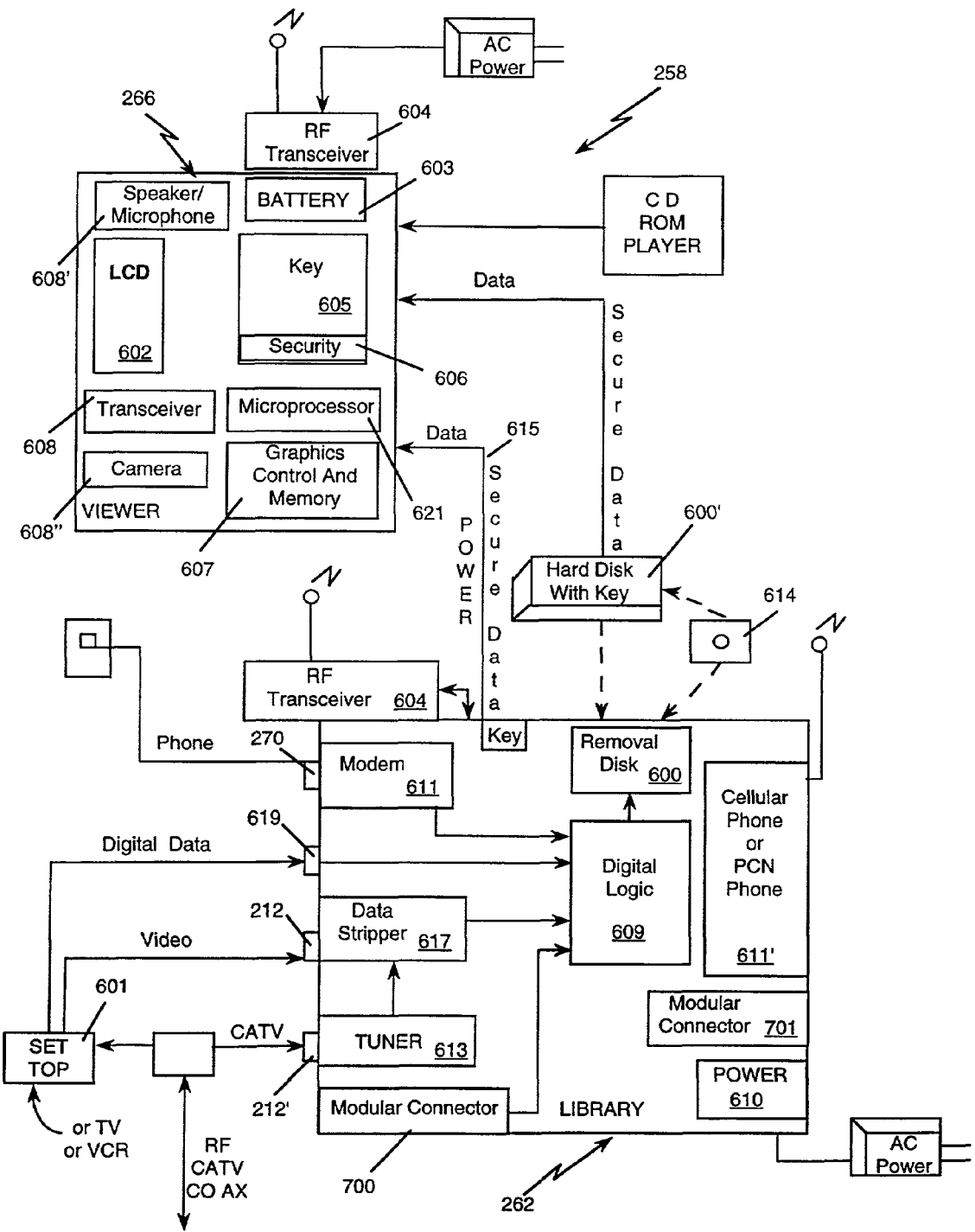
FIG. 6b is a schematic of a two unit home subsystem.

The hardware configuration for a four component home system 258 is shown in FIG. 6a. FIG. 6b shows a hardware configuration for a two component home subsystem. The home system 258 performs several functions, such as receiving data and video transmissions, stripping (or extracting) the data from the video signal, screening and storing the data, providing user friendly interface controls and software, displaying menus and text, processing transactions, initiating telephone calls and transmitting billing data. Various hardware configurations may be utilized to achieve the desired functions of the home system 258. For example, as shown in FIG. 6b, the home system 258 can be configured to utilize the reception and channel tuning capability of the current installed subscriber base of cable converter boxes and televisions 601 and networked computers. The home system 258 can also be designed as an advanced set top terminal converter box with menu generation capability, electronic memory and a telephone modem as described in section V below. Alternatively, the home system 258 can be configured to support alternate delivery and ordering methods as described in Section VII.

The electronic components, which make up the home system 258 can be arranged in a variety of ways. In the four unit subsystem of FIG. 6a the viewer 266 and library 262 are wired together while the remaining components communicate through RF transceivers 604. In a simple version of the home system 258 there are only two units, a library 262 and a viewer 266. FIG. 6b shows a two unit home system 258 with certain optional features.

The viewer 266 is generally equipped with a high resolution viewing area 602, digital logic (including a key 605, security 606, and a microprocessor 621), video graphics control and memory 607, power supply circuitry 602 (not shown), an optional battery 603 and an optional RF transceiver 604. In a two unit arrangement, the library 262 contains the connector function to the electronic book distribution system 208, connector function to a public telephone communications system, and memory 600 (which may be removable and portable 600'). More specifically, the library 262 would include data stripping functions 617, digital logic 609, memory storage 600, power circuitry 610, optional connections 611 (including cellular or PCN 611'), optional battery (not shown), optional tuner module 613 and an optional RF transceiver 604. The connector 212 and the public telephone system connection 270, as well as the removable portable memory unit 600 of the library 262 may be broken out into separate components. (FIG. 6b shows a removable portable hard disk memory 600' with removable cartridges 614.) Finally, the home system 258 may include an attached keyboard 267 or a wireless keyboard 268. Both the attached keyboard 267 and the wireless keyboard 268 may be used to communicate with the viewer 266 (not shown) or the library unit 262. The wireless keyboard 268 may communicate using radio frequency (RF) signaling, for example.

In an alternate arrangement, all functions of the home system 258 may be incorporated into a single unit. The functions of the library 262, for example, may be carried out by a card or chipset in the viewer 266. All the communications devices needed to couple the home system 258 to various telecommunications networks may also be incorporated into the viewer. All interfaces between the home system 258 and the subscriber may be included with the viewer 266. In this embodiment, the viewer 266 may include a communication device for receiving inputs from a separate keyboard. The viewer 266 may also include a built-in video camera 608" that may be used to transmit images of the subscriber. Using the transceiver 608, the camera 608" and the speaker/microphone 608', the subscriber may use the viewer 266 for video conferencing, for example.

Therefore, the home system 258 may have as many as five separate components, which communicate with each other. The two, three, four or five separate components which make up the home subsystem can communicate with each other in a variety of ways, including hardwired connection 615, RF transceiver 604 and other wireless methods.

RF communications may be used in the home, allowing separate components to be located throughout the home without restriction. The data communicated between the units may be secure data. In addition, the library 262 may provide power to the viewer 266 through the hard wire communication link 615.

To receive and strip data from a video signal at the consumer's home, a device such as a cable interface device or cable connector 212 is used. The cable connector device includes a tuner 613, while the cable interface device makes use of existing tuning equipment in the home. In either configuration, data is stripped from the video signal and stored at the subscribers location in the library 262. The phone connector 270, optional connector 611, and modular connector 701 initiate communications and transmit ordering and billing information to the operations center 250 or billing and collection system 278. A digital connector 619 is provided to communicate digital information with the set top 601. The library 262 is the intelligent component of the home subsystem, incorporating the hardware and software necessary to store the text data, generate menus and effect the purchase transactions. In addition to an RF transceiver 604, the home library 262 also includes the necessary jacks and connections to allow the system to be connected to the viewer 266. As shown in FIG. 6b, the library 262 communicates the text data to the viewer 266 in a secure format, which requires a key 605 for decryption. The text may be decrypted page by page just before viewing.

a. The Video Connector

Figure 7:
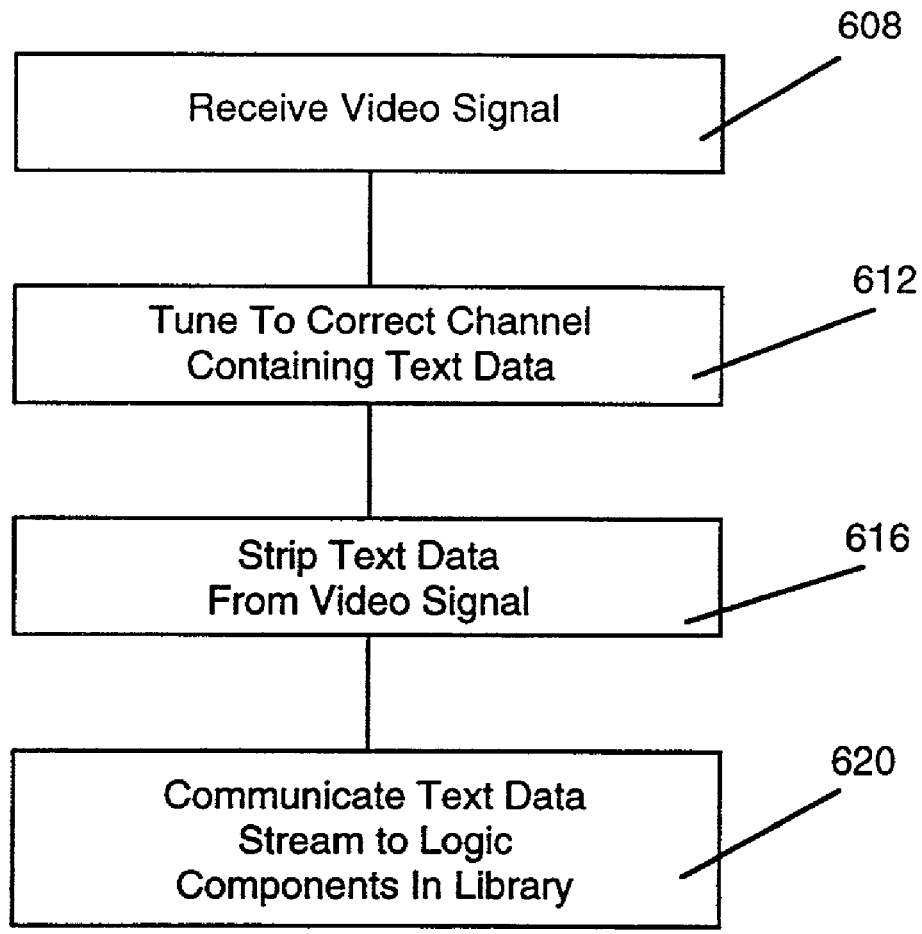
FIG. 7 is a flow diagram of processes performed by a video connector.

FIG. 7 shows the flow of the processes performed by the video connector 212. The video connector 212 receives the video signal 608, tunes to the channel containing the text data 612, strips the text data from the video signal 616, and communicates the text data stream to logic components in the library 620.

The connection to the video distribution system may be a cable connector to a cable television delivery system, as shown in FIG. 6b. The cable connector includes a data stripper circuit 617, which accepts video input from either a set top converter, TV or VCR 601, or an optional tuner block 613 that receives the CATV signal through the cable connector 212'. The data stripper circuit 617 strips data out of the video, and outputs a digital bit stream to the digital logic portion 609 of the library unit 262. The data is embedded in the video signal either in the vertical blanking interval or the active video portion in an encrypted and compressed format. The data stripper circuit 617 can be placed inside the set top converter box 601, TV, or in the library unit. The data stripper circuit 617 outputs the digital bit stream to be used by the library digital logic 609.

The video connector 212 may also contain a channel tuner module 613 that can tune to the video channel and provide access to the video that contains the data to be stripped. Using the optional tuner module 613, a set top converter, VCR, or TV tuner is not needed in the home subsystem. The optional tuner module 613 would instead receive the CATV signal directly through the cable connector 212. Additional connector options, which allow for the receipt of text files using alternative delivery methods, are presented in Section VII. This ubiquitous access is provided using the modular connector 700 as depicted in FIG. 6b.

b. Library

Figure 8:
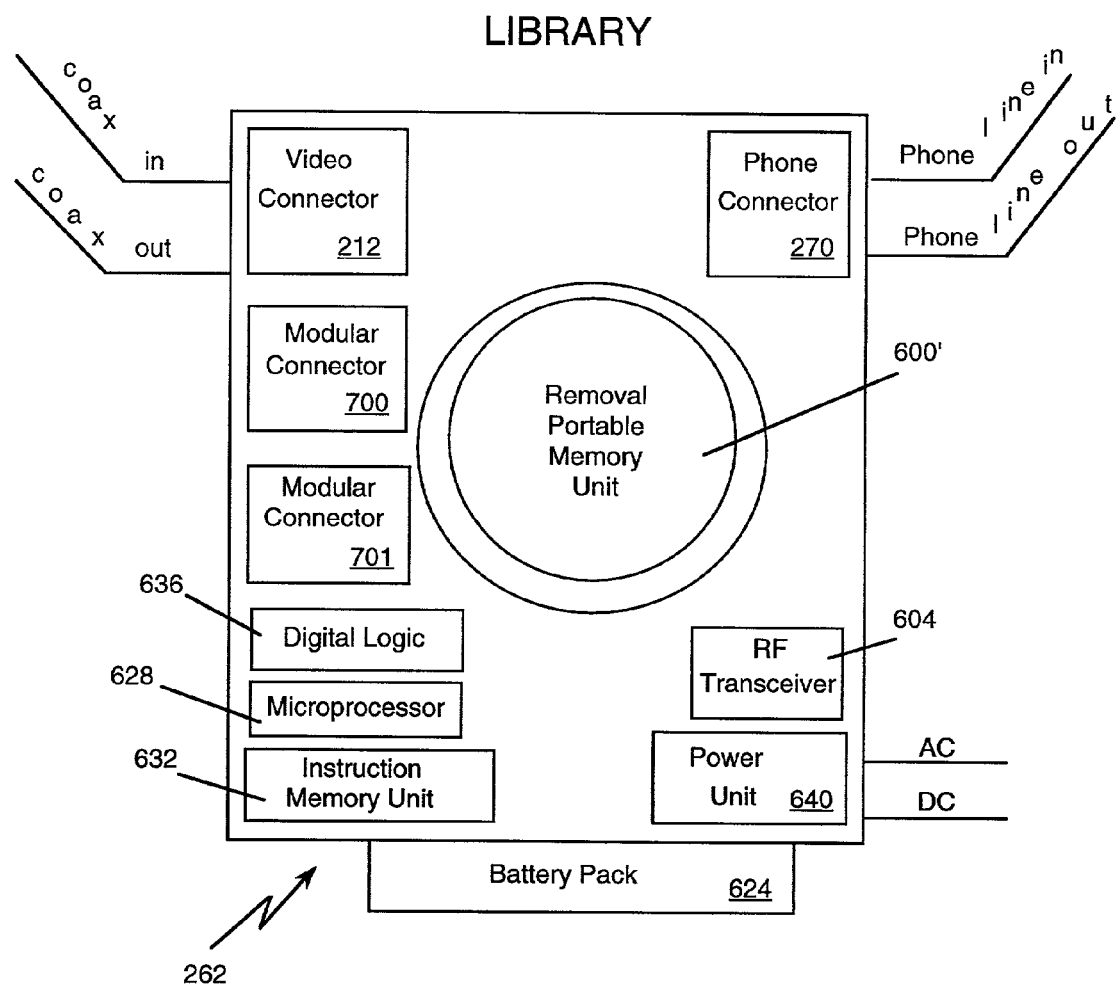
FIG. 8 is a block diagram for an example of a library unit.

An embodiment of the library 262 for a two unit home subsystem is shown in both FIG. 6b and FIG. 8. The embodiment shown includes the following optional parts: the video connector 212, phone connector 270, RF transceiver 604, and battery pack 624 in addition to a removal portable memory 600', microprocessor 628, instruction memory unit 632, digital logic 636, and power unit 640.

The library 262 contains a digital logic section 609 (not shown in FIG. 8) which includes the microprocessor 628, the digital logic 636 and the instruction memory unit 632. The microprocessor 628 may be a secure microprocessor such as the Mot SC21 device sold by Motorola. The digital logic section 609 will receive the serial digital bit stream from the data stripper circuit 617 and process the data. Error correction will also be performed by the digital logic section 609 and the data will be checked for proper address. If the address of the data is correct and the library 262 is authorized to receive the data, the data will be transferred to the memory storage unit 600, 600'. Authorization to receive the data is provided by the cable headend or another distribution point. An authorization code may be sent in the serial digital bit stream. The digital logic section 609 will send appropriate text and graphical data to the memory storage unit 600, 600'. It transfers this data in a compressed and encrypted format and the data remains stored in a compressed and encrypted format.

i. Memory Storage Unit

The memory storage unit of the library may be a removable portable memory unit 600' (as shown in FIGS. 6a, 6b and 8). A variety of options are available for memory storage: a hard disk drive, such as an 80 megabyte, a 200 megabyte, a hard disk with removable platters, and CD ROM. Referring to FIG. 6b, a hard disk drive unit 600', which contains removable platters, may also be used. This would provide virtually unlimited library storage capacity. Data will be stored in the memory storage unit in a compressed and encrypted format. As is also shown in FIG. 6b, the data may also contain a key or unique ID number that matches the ID or key of the viewer 266. This matching of a unique key or ID number prevents unauthorized transfer of text data from the memory storage unit to an unauthorized viewer. Small memory devices such as smart cards, electronic memory cards or PCM CIA cards (personal computer memory card industry association) may also be used to store the data.

ii. Power Circuitry

As shown in FIGS. 6b and 8, the library 262 will accept power from AC wall power 610, DC power 640, or optional battery power 624. The power circuitry 610, 640 may provide all the voltage necessary from either the battery 624 or AC unit for the various circuitry in the library. The power circuitry 610, 640 may also provide power to the viewer through a single data cable when connected to the viewer. The power circuitry 610, 640 will recharge the battery using AC power when in operation. With the optional battery unit 624 installed, the library 262 becomes a portable unit and can still provide power to the viewer 266. In order to extend battery life, power conservation measures may be utilised, such as shutting down the memory system when not in use. When the viewer unit 266 is being utilized and the library circuitry is not being utilized, virtually all power may be shut down to the library 262.

iii. Connection to the Public Telephone System

In an embodiment, the connection to the telephone system may be provided by a connector device 611, which consists of a modem. Various available modems may be used to perform this function. As shown in FIG. 6b, cellular phone or PCN phone connections 611' may also be provided. When the home system 258 is first initialized, the modem may be used to transfer the name and credit card information of the consumer to the billing and collection system 278. The telephone connection 270 may be utilized each time an electronic book is purchased by a consumer to complete and record the transaction. The telephone connection 270 may also be used to receive the text data from the operations center 250, bypassing the video distribution system 208. The phone connection 270 may be a separate unit as shown in FIG. 6b. However, alternate means exist to connect the home system 258 to the billing and collection system 278 or the operation center 250. The modular connector 701 (shown in FIGS. 6b and 8) provides access to each communication network to provide a path from the home system 258 to the billing and collection system 278 or the operations center 250. These alternatives are presented in detail in Section VII.

iv. Library Processing

Figure 9:
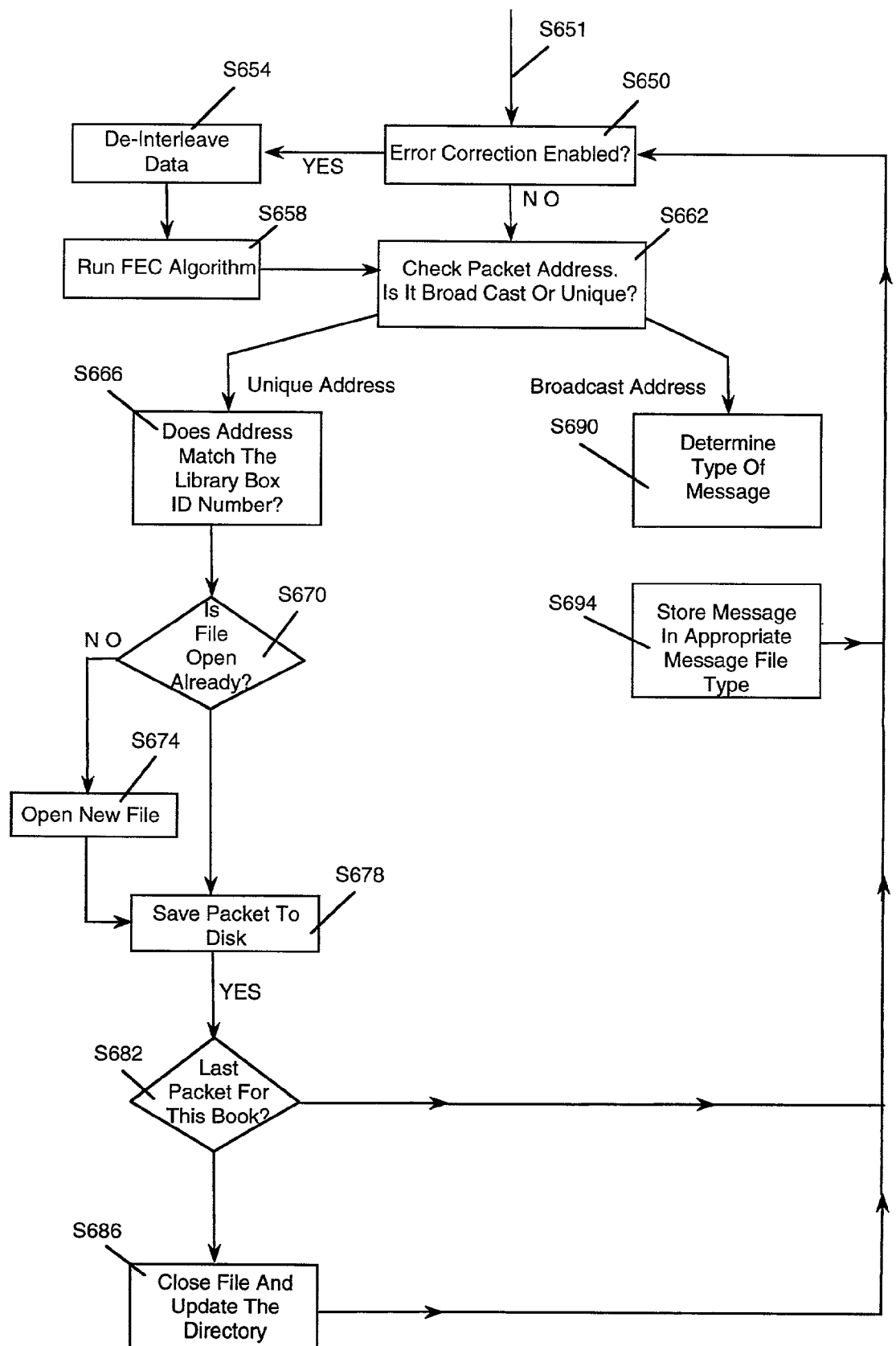
FIG. 9 is a flow diagram of processes performed by a library unit on the received data stream.

FIG. 9 shows for one embodiment, an example of processing performed by the digital logic section 609 of the library 262 on the data stream 651 received from the video connector 212 or stripper circuit 617. In step S650, digital logic section 609 checks the data stream 651 for error correction. If an error is detected, in step S654 digital logic section 609 de-interleaves the data and in step S658 runs a FEC (Forward Error Correcting) algorithm. In steps S650, S654 and S658, the digital logic section 609 performs the error correction needed on the data stream. If no error correction is necessary the digital logic section 609 proceeds to step S662 and checks data packets individually for packet address.

If the address is a unique address, the process moves to step S666 and the digital logic section 609 checks whether the address of the packet matches the library box ID number. The library box ID number is a unique number associated with the library 262. The library box ID is used to ensure security of the data. The process then moves to step S670 and the digital logic section 609 determines whether an electronic file has already been opened into which the data packet can be saved. If no data file has been opened, the digital logic section 609 opens a new data file for that packet. If an electronic file has been opened, the process moves to step S678 and the digital logic section 609 saves the packet in the electronic file on disk. The process moves to step 682 and the digital logic section 609 checks to see if this is the last packet for a particular book for a particular textual data block being received. If it is the last packet of information, the process moves to step 686 and the digital logic section 609 closes the electronic file and updates the directory of available electronic files. Following either step S682 or S686, the process returns to receive another data packet from the data stream received from the data stripper block.

If the packet address is checked and the address is determined to be a broadcast address, the process moves to step S690 and the digital logic section 609 determines the type of message that is being sent. The message may be an index of book titles, menu (and menu graphics) information, announcements, special offerings, discounts, promotions, and previews, for example. The process then moves to step S694 and the digital logic section 609 stores the message in an appropriate electronic message file. The process then returns to step S650 to receive another data packet and perform another error check.

Using the process of FIG. 9, the library 262 is able to receive, store and update directories related to the textual data and graphical data (that can be used to depict pictures in a given book or to generate menus). Variations of the processes are possible depending on the format of the data and operating system of the library 262.

Figure 10:
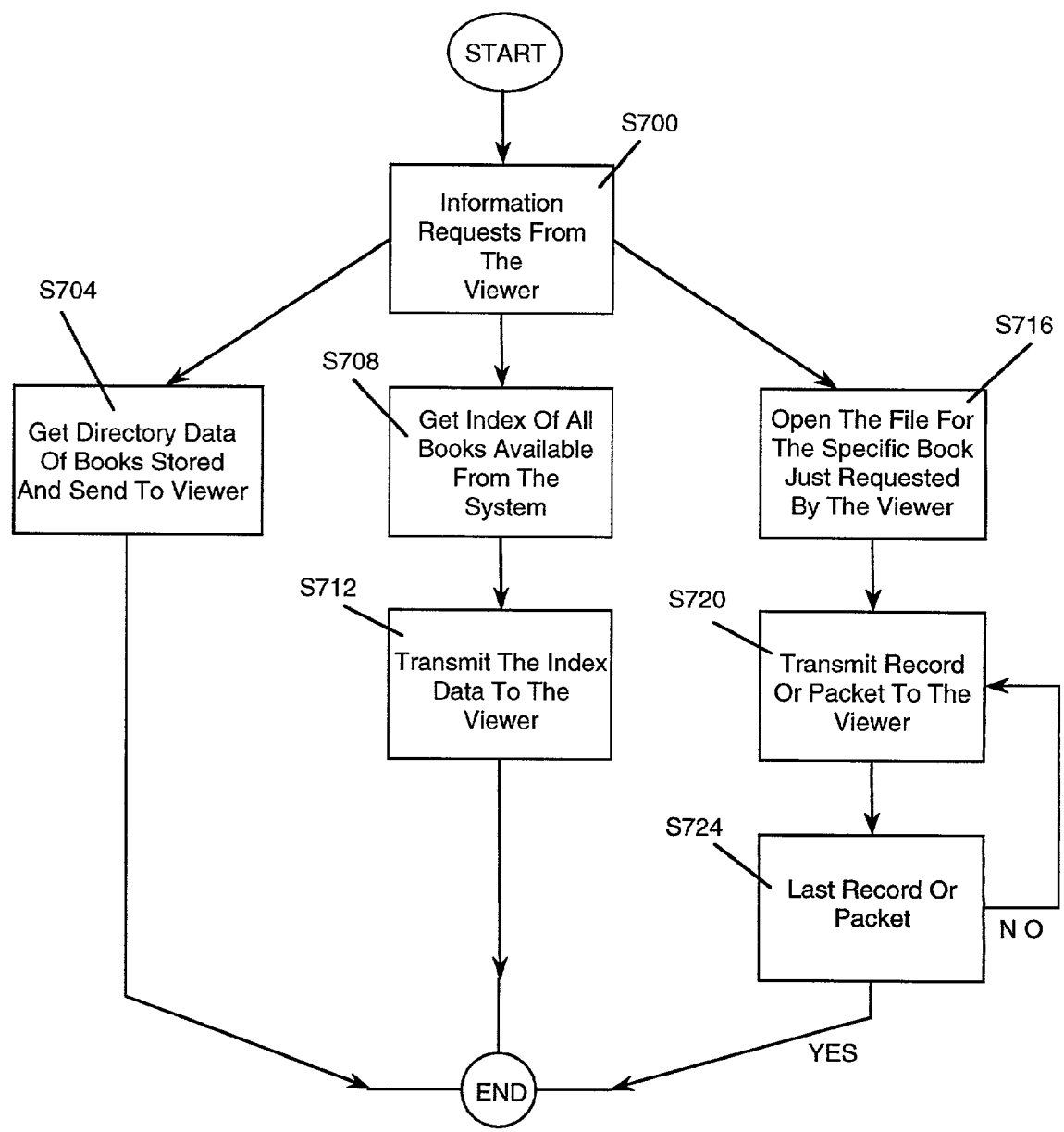
FIG. 10 is a flow diagram of processes performed by a library unit on information requests from a viewer.

FIG. 10 shows an example of the processing of information requests from the viewer 266 at the library 262. Information requests from the viewer 266 are received either through the cable connecting the viewer 266 to the library 262 or through wireless transmissions such as RF. It is possible in some embodiments for subscribers' requests to come from a set top converter box 602 (see Section V).

Information requests received from the viewer 266 generally fall into three categories: (1) directory data of books stored in the library 262, (2) index of all available books on the system, and (3) requests for a specific book (step S700). In step S704, the digital logic section 609 answers a request from the viewer 266 for a directory of data showing the books stored at the viewer 266. The directory of data is sent to the viewer 266 so that it may be displayed to the subscriber. In step S708, the digital logic section 609 handles requests from the viewer 266 for an index of all available books on the system. The library 262 will obtain an index of all the available books on the system and transmit that index, in step S712, with menu information to the viewer 266. In step S716, the digital logic section 609 replies to a request from the viewer 266 for a specific book. In step S720, the digital logic section 609 opens an electronic file for the specific book requested by the viewer 266 and transmits the record or transmits the information on a packet-by-packet basis to the viewer 266. This process of transmitting the specific book, record, or packets to the viewer 266 continues until the last record or packet has been sent in step S724.

In addition to the processes shown on FIG. 10 in handling a request for a specific book, the library 262 also orders and receives specific books from the operations center 250 using the process as described in step S716. Following a request for a specific book which is not stored at the library 262, the library 262 will proceed to determine the next available time the book will be on the video distribution system 208 or an alternative delivery system and ensure reception and storage of that book (process not shown). In performing this process the library 262 will transmit to the viewer information on when it will obtain the text data for the book so that the subscriber may view the book. In addition to timing information, price and other ordering information may also be passed by the library 262 to the subscriber.

c. The Viewer

Figure 11:
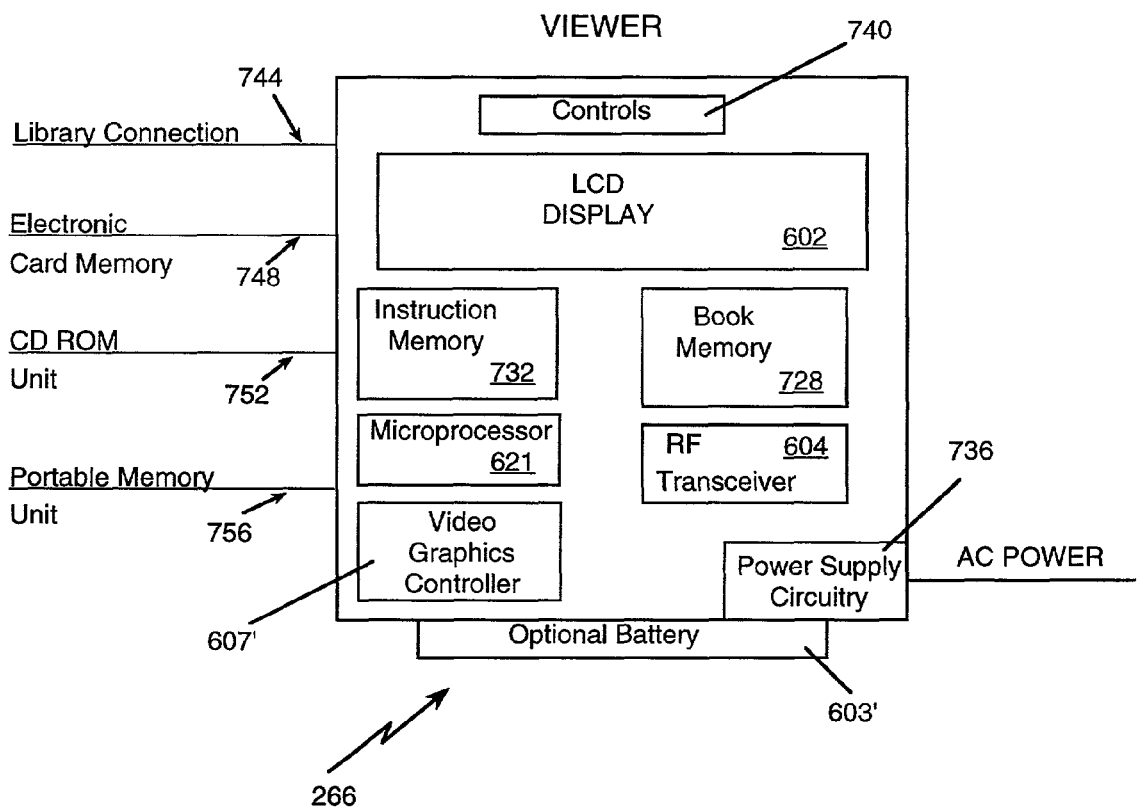
FIG. 11 is a block diagram showing the components for an example of a viewer.

FIG. 11 is a block diagram of a viewer 266 showing its internal components. The viewer 266 of FIG. 11 is similar to the viewer 266 depicted in FIG. 6b. The viewer 266 is designed to physically resemble a bound book. The viewer 266 is made up of five primary components and seven optional components: (1) LCD display 602, (2) digital circuitry (not shown), (3) video graphics controller 607', (4) controls 740, (5) book memory 728, (6) optional power supply circuitry 736, (7) optional battery 603', (8) optional RF transceiver 604, and (9) optional cellular or mobile connector (such as 611') (10) optional keyboards 267 and 268, and (11) an optional speaker/microphone 608', (12) optional alternative communication interface devices.

(1) A high-resolution LCD screen 602, of VGA quality, may be used by the viewer 266 to display text and graphic images. The screen may be the size of one page of an electronic book. A two page screen or two screens may also be used with the viewer 266.

(2) Digital circuitry that includes a secure microprocessor 621, instruction memory 732, and digital logic. Data is transferred to the viewer 266 in compressed and encrypted format. The secure microprocessor 621 compares the ID number of the viewer 266 with the incoming data stream and only stores the text data if the ID number of the viewer 266 matches that within the incoming data stream. The viewer 266 may be configured to not output text data or other data and that the data is decompressed and decrypted only at the moment of viewing and only for the current page being viewed. These measures provide additional security against unauthorized access to data.

(3) A video graphics controller 607' that is capable of assisting and displaying VGA quality text and graphic images is included in the viewer 266. The graphics controller 607' is controlled by the digital circuitry described above. Text may be displayed in multiple font sizes.

(4) The viewer 266 of FIG. 11 has touch panel controls 740. These unique and novel controls 740 allow the consumer to select stored electronic books and electronic books from catalogues, move a cursor, and turn pages in an electronic book. Typically, the controls 740 include forward and reverse page buttons 742, 741, a ball 743 for cursor movement, one or more selection buttons 745, a current book button 747 and a bookmark button 749 (see FIG. 14a).

Figure 14A:
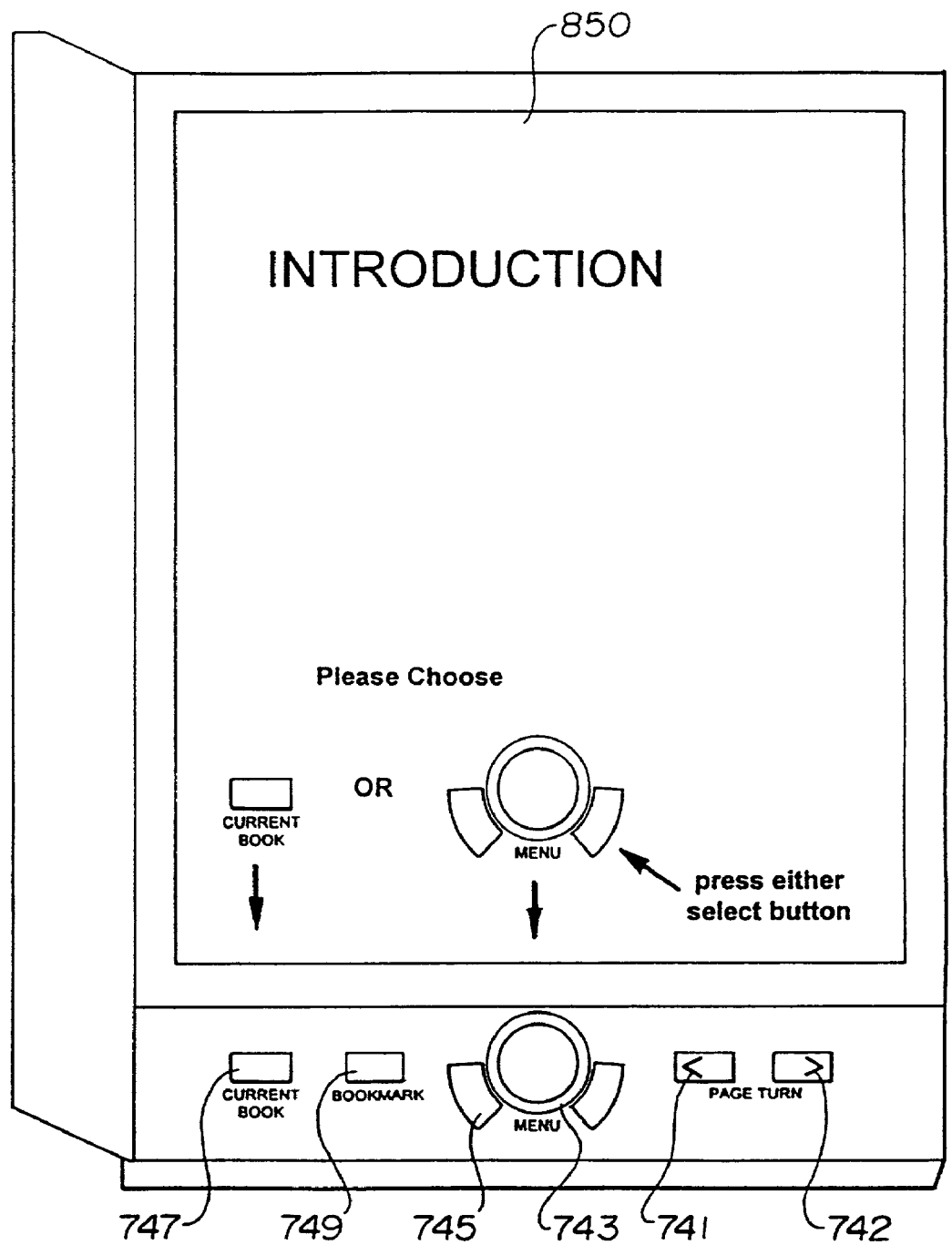
FIG. 14a is a schematic of an introductory menu.

The controls 740 should be easy to use and conveniently located. Referring to FIG. 14a, the controls for the viewer 266 may be located below the screen 602 at the bottom portion of the viewer 266. The next page turn button 742 is the most used button 740 and is located towards the right edge of the page. The subscriber is likely to use right hand thumb movements to work the controls particularly the page turn buttons 741, 742. Therefore, the buttons may be arranged in such a manner that the buttons are easily controlled by a subscriber's right thumb. Generally, this can be accommodated either on the lower portion of the viewer 266 (as shown) or along the right hand margin of the viewer 266 (not shown). The current book button 747 and bookmark button 749 are usually the least used of the controls 740. Therefore, in the example shown, those buttons 747, 749 are located on the inside portion towards the binder of the viewer 266. Locating the ball 743 or other cursor movement device (such as four pointer arrows not shown) in the bottom center of the viewer 266 is both easier for the subscriber to use and easier in manufacturing the viewer 266. The selection buttons for the cursor 745 may be located below the middle diameter of the cursor ball 743 on the right and left sides of the ball as shown. If pointer arrows are used for cursor movement, a selection button 745 may be located in the center of the four arrow buttons (not shown). Again, the most used controls 740 should be located where a subscriber's right hand thumb would normally rest.

(5) Book memory 728 for at least one electronic book or more of text is included in the viewer 266. The memory 728 stores text and any graphics, which represent pictures in a book. The memory 728 can also store menu graphics data. Two different memory 728 devices may be used in the viewer 266, one for the instructions for the microprocessor 621 in the digital circuitry and a second type of memory may be used for the book memory 728 (and graphics). Various memory devices available on the market may be used such as, ROM, RAM or a small hard disk. Since an electronic book requires approximately 0.6 megabytes of storage, a small hard disk providing approximately 60 MBytes of storage provides memory to store approximately 100 electronic books.

Text for electronic books may be displayed in various font sizes. To accommodate various fonts for display, a variety of fonts are stored in instruction 732 or book memory 728. Thus larger or smaller fonts may be recalled from memory 621, 728 to create displays desired by the subscriber.

(6) Power supply circuitry 736 in the viewer 266 will accept power from either an AC power source or from an optional battery 603', or the library 262. The power supply circuitry 736 provides the necessary voltages to accommodate the various systems within the viewer 266.

(7) An optional battery 603' is provided in one embodiment. The battery 603' is automatically recharged when AC power is available.

(8) An optional RF transceiver 604 which provided two-way data link between the viewer 266 and other components of the home subsystem can also be included in the viewer 266.

(9) Also, the viewer 266 may include a cellular transceiver (not shown) for mobile communications.

(10) The optional wired (attached) keyboard 267 and wireless (e.g., RF) keyboard 268 (see FIG. 6a) may be used with the viewer 266 to provide communications between the subscriber and the viewer 266.

(11) The optional speaker and microphone 608' allow the viewer 266 to provide audio signals to the subscriber, and allow the subscriber to provide an audio input. The speaker and microphone 608' may be used in conjunction with the cellular transceiver 608 or other telecommunications equipment to provide for reception and transmission of telephony and data.

(12) The optional alternative communication interface devices allow the viewer 266 to make use of a variety of communication paths.

The viewer 266 of FIG. 11 has parts available for providing connections to: a library 744, electronic card memory 748, CD ROM units 752, and a portable memory unit 756 (such as that shown in FIG. 6b as 600'). Various electronic memory cards such as PCMCIA can be used with the viewer 266 to supply and store electronic books.

Security, low power consumption and excellent display technology are desired features of the viewer 266 design. The viewer 266 should be lightweight and portable. The viewer 266 contains a software operating system that allows electronic books to be stored, read and erased and includes the capability to order electronic books and retain them in memory 728 for a predefined period of time determined by the system operator. The software can be configured to allow the electronic book to be read during a period of time (i.e., two weeks) and then automatically erased, read once and erased, or held in memory permanently. Each viewer 266 may have a unique key 605. All of the data storage may be encrypted with the key 605 for an individual viewer 266 to prevent more than one viewer 266 accessing the text file or electronic book file.

Figure 12:
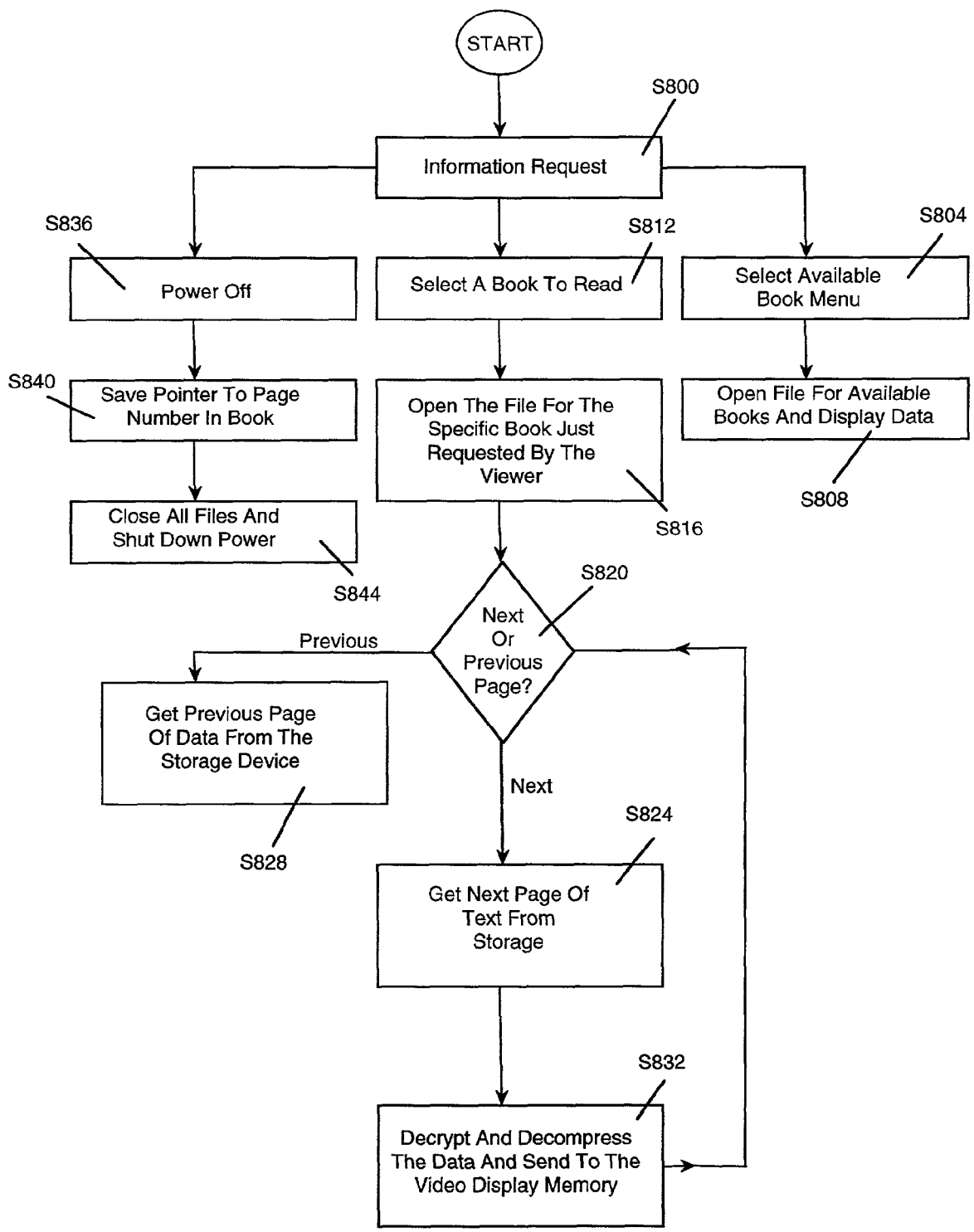
FIG. 12 is a flow diagram of processes performed by a viewer on an information request from a subscriber.

FIG. 12 is a flow diagram of some of the processes executed by the microprocessor 621 in the viewer 266. The viewer 266 may receive inputs from the subscriber through touch panel controls 740. In step S800, the subscriber's information requests are then processed by the microprocessor 621.

In step S804, if the subscriber requests a menu of available electronic books, the microprocessor 621 will select an electronic book menu. In step S808, the microprocessor 621 will open the electronic files that list the electronic books which are available (related to the category of topic of the menu) and display the menu with the names of the available electronic books.

If the subscriber selects a particular book to read, then in step S812, the microprocessor 621 will process the selection and determine the electronic file that contains the specific electronic book. In step S816, the microprocessor 621 will open the file for that specific electronic book and normally access the first page. (If a pointer has already been set in that books electronic file, the process may default to that page.) In step S820, the microprocessor 621 will then determine which page needs to be displayed. That is, the microprocessor 621 will determine whether a next page, previous page or a bookmarked page needs to be displayed. If the pointer for the electronic file is not in the correct location then in step S828, the microprocessor 621 will move the pointer and obtain the previous page of data from the stored file. Otherwise, in step S824, the microprocessor 621 will normally obtain the next page of text from the stored electronic file. In step S832, the microprocessor 621 will decrypt and decompress the text data and send the data to the video display. The video display will generally have a video display memory associated with it. In step S832, the microprocessor 621 will send the data directly to that video display memory. The circuitry for the display then completes the process of displaying the page of text.

If the subscriber, through the controls 740, requests (from step S800) that the power be turned off, then in step S836, the microprocessor 621 initiates power off. In step S840, the microprocessor 621 saves the pointer in memory to the page number in the book that the viewer 266 is currently reading. In step S844, the microprocessor 621 closes all the electronic files and signals the power circuitry to shut down the power to the various circuits in the viewer 266. With these examples of basic processes the viewer 266 is able to display book selections and display text from those electronic books.

d. Menu System

Figure 13:
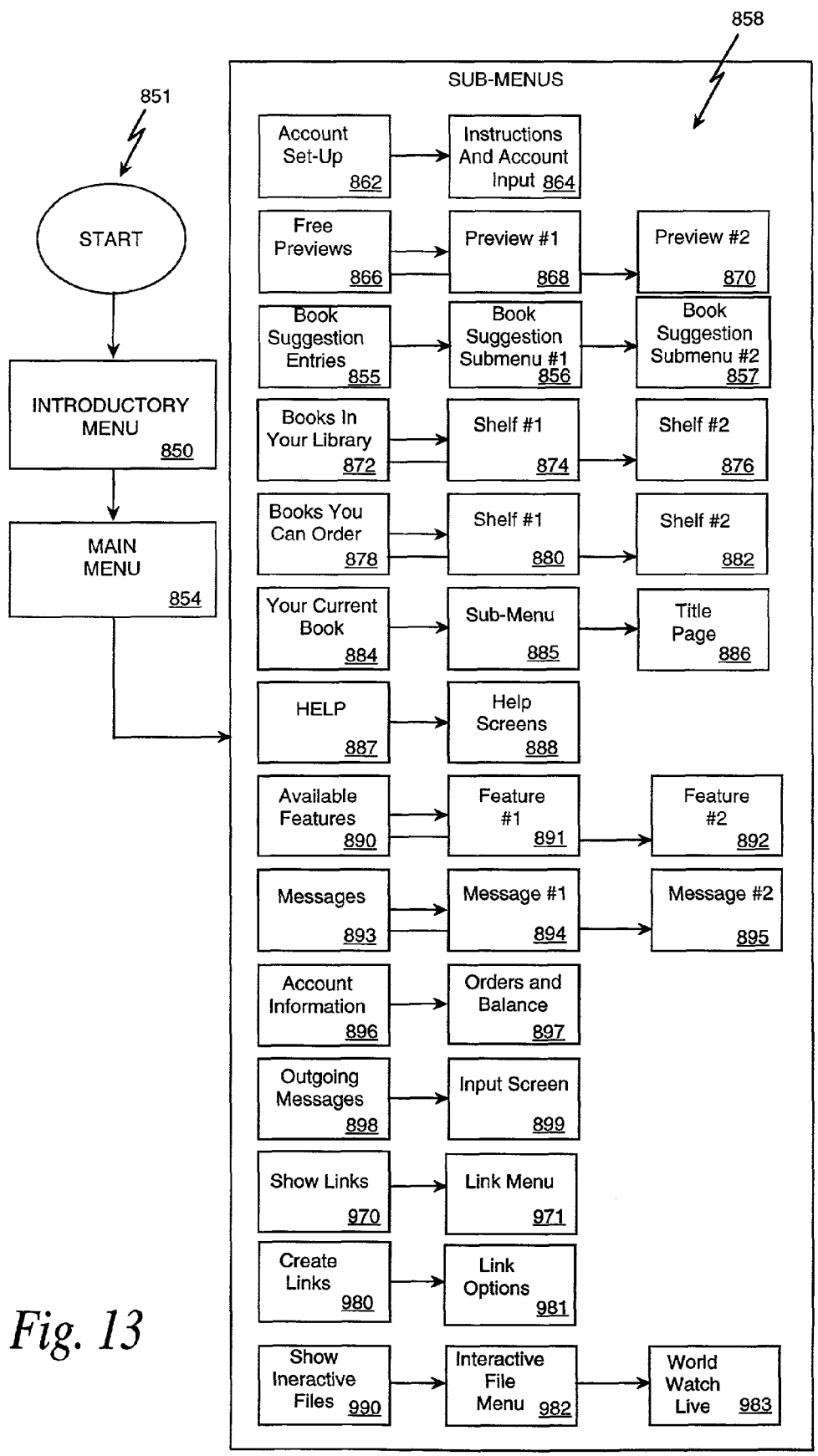
FIG. 13 is a chart depicting a menu structure and sequencing of menus in a menu system.

Referring generally to FIG. 13, the electronic book system 200 may have a menu system 851 for selecting features and books from the electronic book system 200. The operating software and memory required for the menu system 851 may be located at the viewer 266 (e.g., the instruction memory 732 and/or book memory 728). However, it can also be located at the library 262 (e.g., the instruction memory 632) or the library 262 and the viewer 266 can share the software and memory needed to operate the menu system 851. Since the menus are usually displayed on the viewer, and since the viewer 266 may be capable of operating in the absence of the library 262, the basic software and memory to create the menus is more conveniently located at the viewer 266.

The menu system 851 allows sequencing between menus and provides menu graphics for graphical displays such as on the LCD display 602 of the viewer 266. In an electronic book system that uses a set top converter these menus may also be displayed on a television screen. In an electronic book system that uses a computer, these menus may also be displayed on the computer monitor. In an embodiment, the menus provide just basic text information from which the subscriber makes choices. In other embodiments, the menus provide visual displays with graphics and icons to assist the subscriber and allow for subscriber interaction and real-time ordering of electronic books or other content available to the subscriber.

FIG. 13 depicts the menu system 851 with sequencing. The primary menus in the menu system 851 are an introductory menu 850, a main menu 854 and various submenus 858. In the embodiment shown, there are three levels of submenus 858. In certain instances one or two submenus 858 is sufficient to easily direct the subscriber to the selection or information requested. However, there are features in which three or more submenus 858 make the user interface more friendly for the subscriber. Each level of submenus 858 may consist of multiple possible menus for display. The particular menu displayed depends on the selection by the subscriber on the previous shown menu. An example of this tree sequence of one to many menus are the help submenus 887, 888. Depending upon the specific help requested, a different level two help menu is displayed to the subscriber.

Figure 14B:
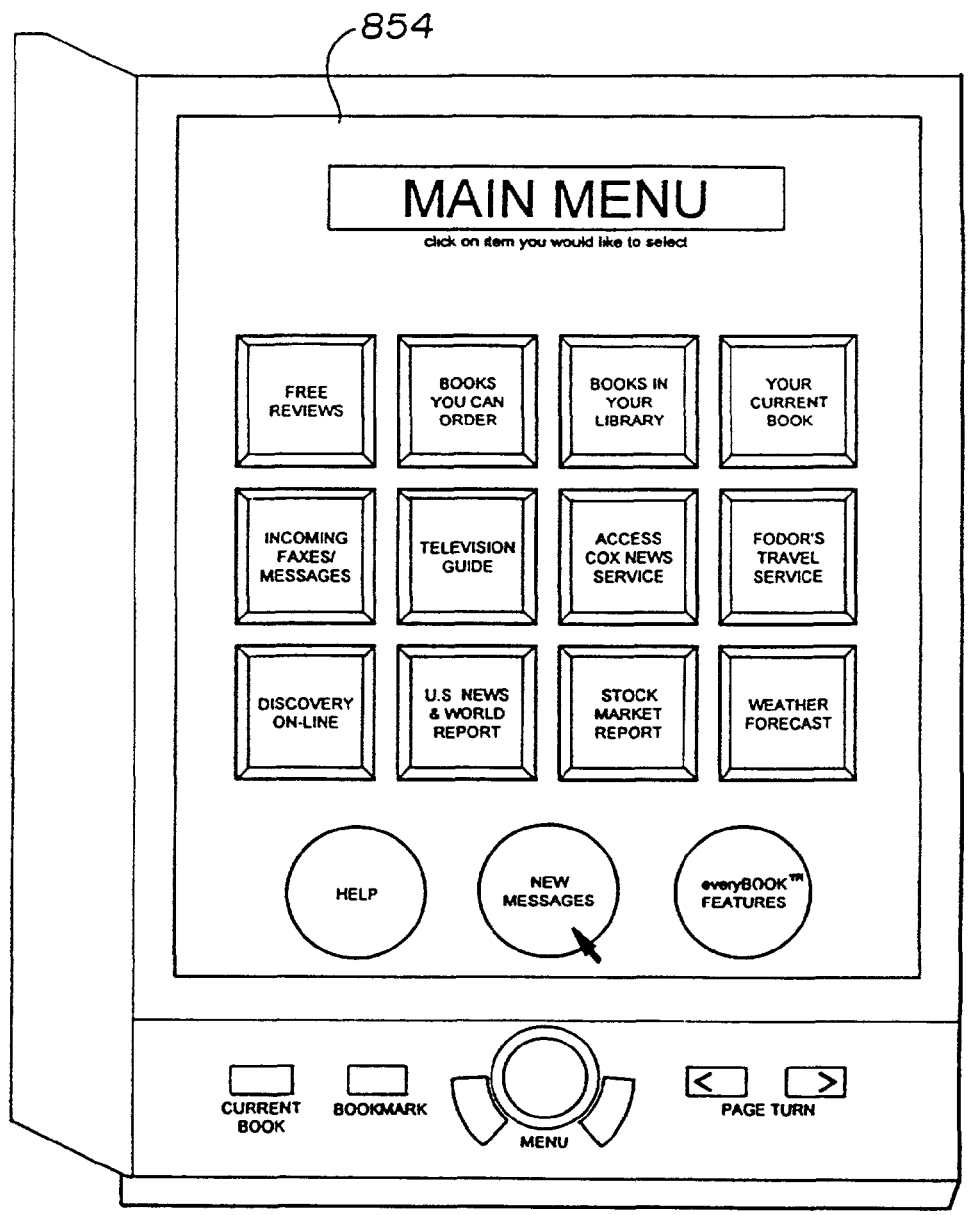
FIG. 14b is a schematic showing an example of a main menu.

An example of an introductory menu 850 is shown on FIG. 14a. Generally the introductory menu 850 introduces the viewer 266 to the system and provides initial guidance, announcements and instruction. The introductory menu 850 is followed by a main menu 854, an example of which is shown in FIG. 14b. The main menu provides the viewer 266 with the basic selection or features available in the system. FIG. 14b is an example of a main menu 854 offering many additional features and submenus 858 to the subscriber. For example, FIG. 14b shows that the viewer 266 is able to choose by a point and click method, many options including: (1) free previews, (2) books you can order, (3) books in your library, (4) your current book, (5) help, (6) on-line services and (6) other system features. Following a selection on the main menu 854, a corresponding submenu 858 is shown.

Figure 14C:
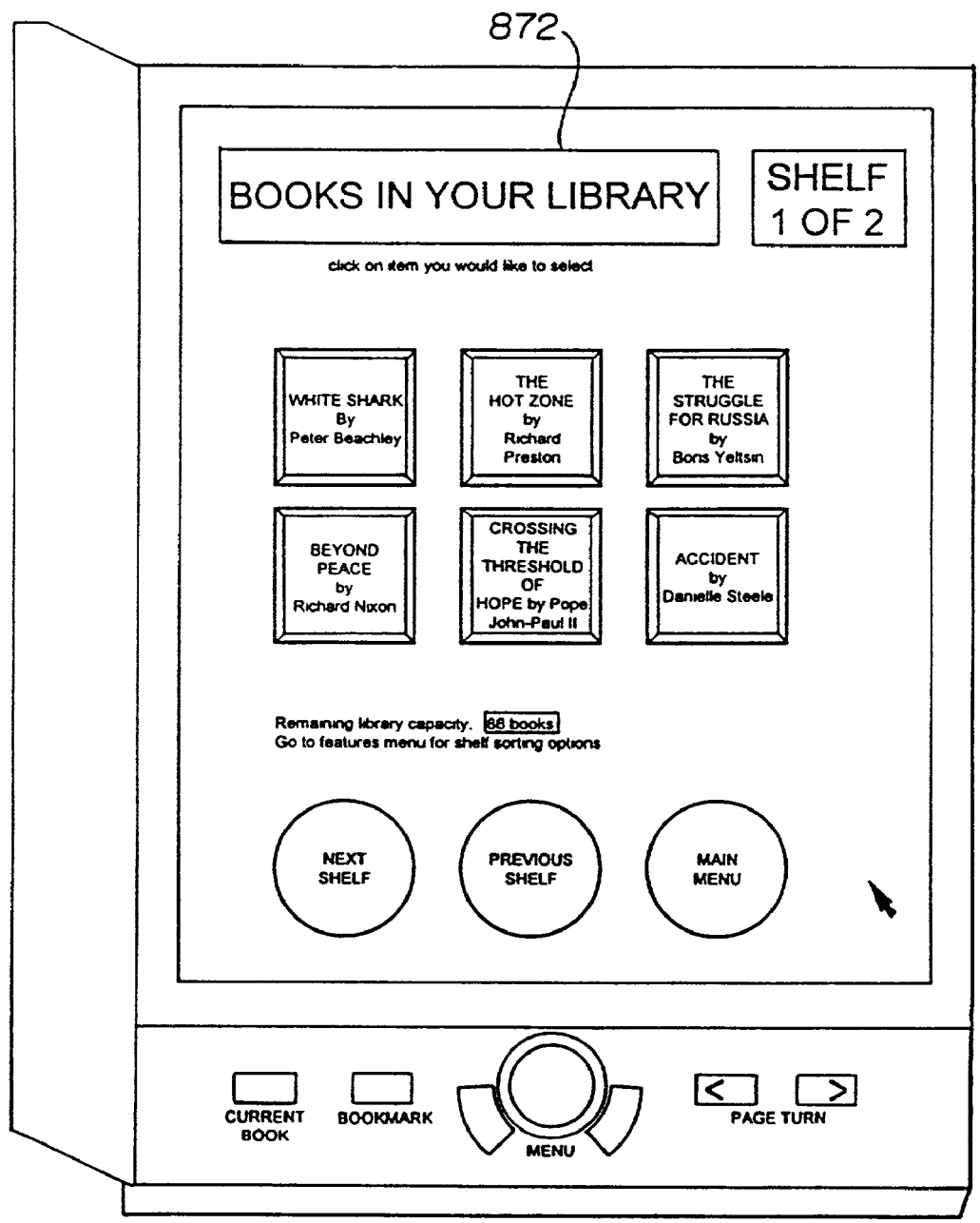
FIGS. 14c, 14d, 14e, 14f, 14g, 14h, 14i and 14j are schematics showing examples of submenus.
Figure 14D:
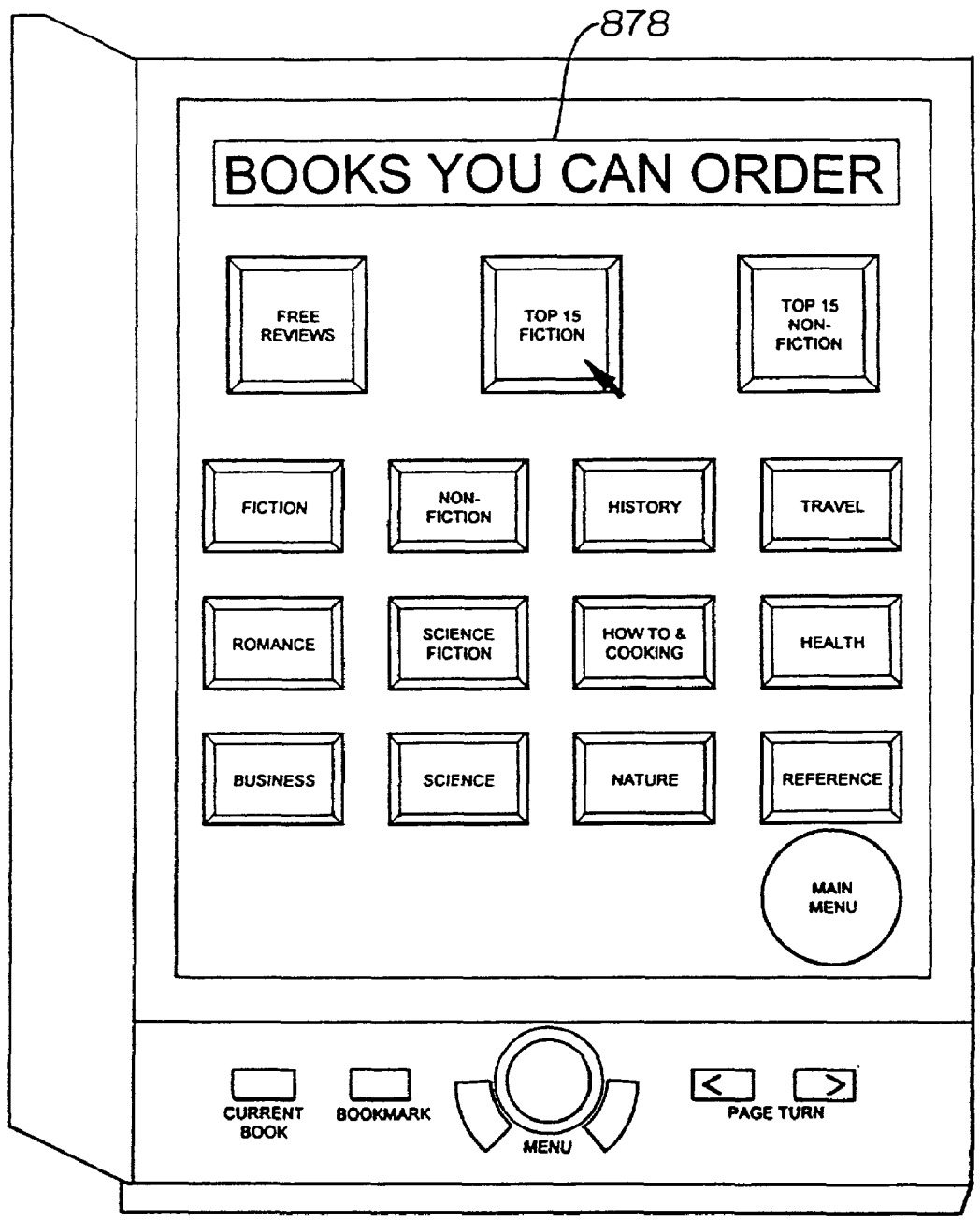
Figure 14E:
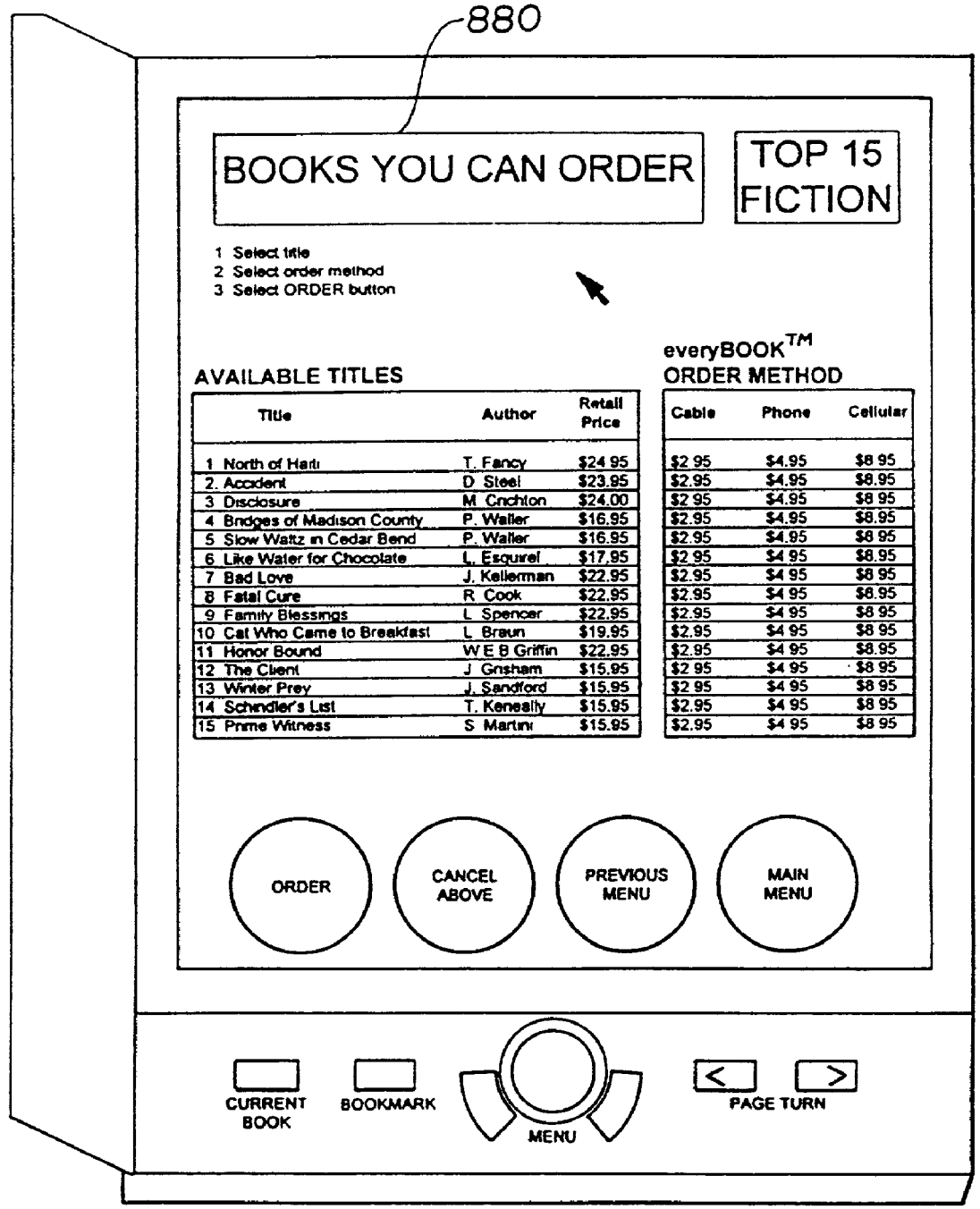

FIG. 13 shows fourteen available primary or first level submenus. They are (1) account set up 862, (2) free previews 866, (3) book suggestion entries 855, (4) books in your library 872, (5) books you can order 878, (6) your current book 884, (7) help 887, (8) available features 890, (9) messages 893, (10) account information 896, (11) outgoing message submenu 898, (12) show links submenu 970, (13) create links submenu 980, and (14) show interactive files submenu 990. FIG. 14c is an example of a first level submenu for books in your library 872. This "Book In Your Library" example submenu 872 shows six available books by title and author and provides the subscriber with the ability to check a different shelf of books 874 or return to the main menu 854. FIGS. 14d and 14e show example submenus 858 for books that may be ordered using the "Books You Can Order" submenu 878.

Figure 14F:
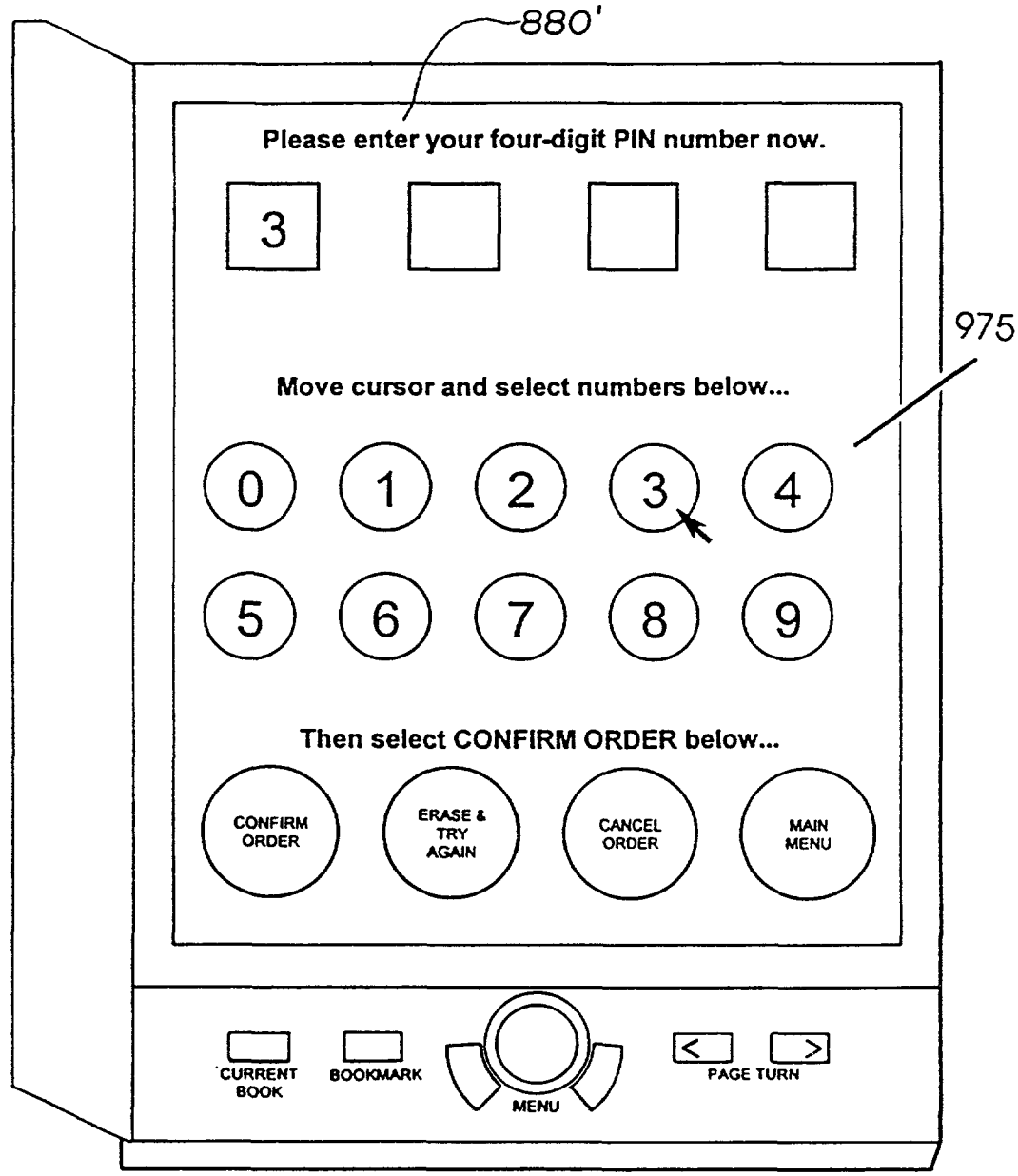

FIG. 14f is an example of a confirmation menu which confirms a subscribers order. In this particular example, the subscriber is required to enter a PIN number to complete the subscriber's order. Any alpha-numeric or similar password may be used to ensure the subscriber is an authorized subscriber. In one embodiment, the subscriber confirms an order with a PIN or password and then receives a final confirmation screen. The final confirmation screen is primarily text and may state:

Your book order is now being processed using CABLE.

Your book will be delivered overnight and your VISA account will be charged $2.95.

Your book will be available for reading at 6:00 AM EST tomorrow. Make sure that:

1. your Library Unit and Cable Connection Unit are plugged in with aerials up tonight; and 2. you tune your cable converter to THE BOOK Channel. The TV set does not have to remain on.

or similar language.

Figure 14G:
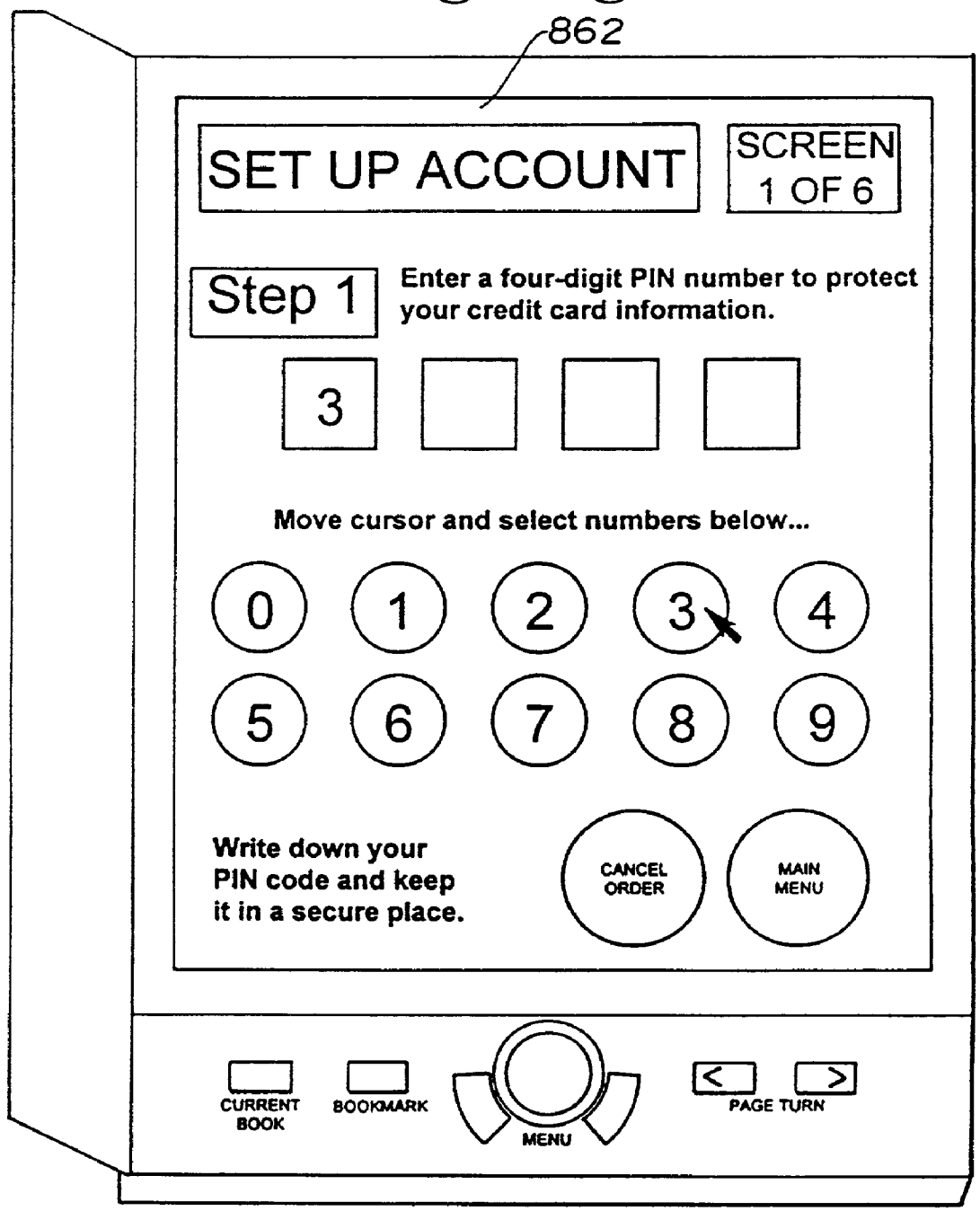
Figure 14H:
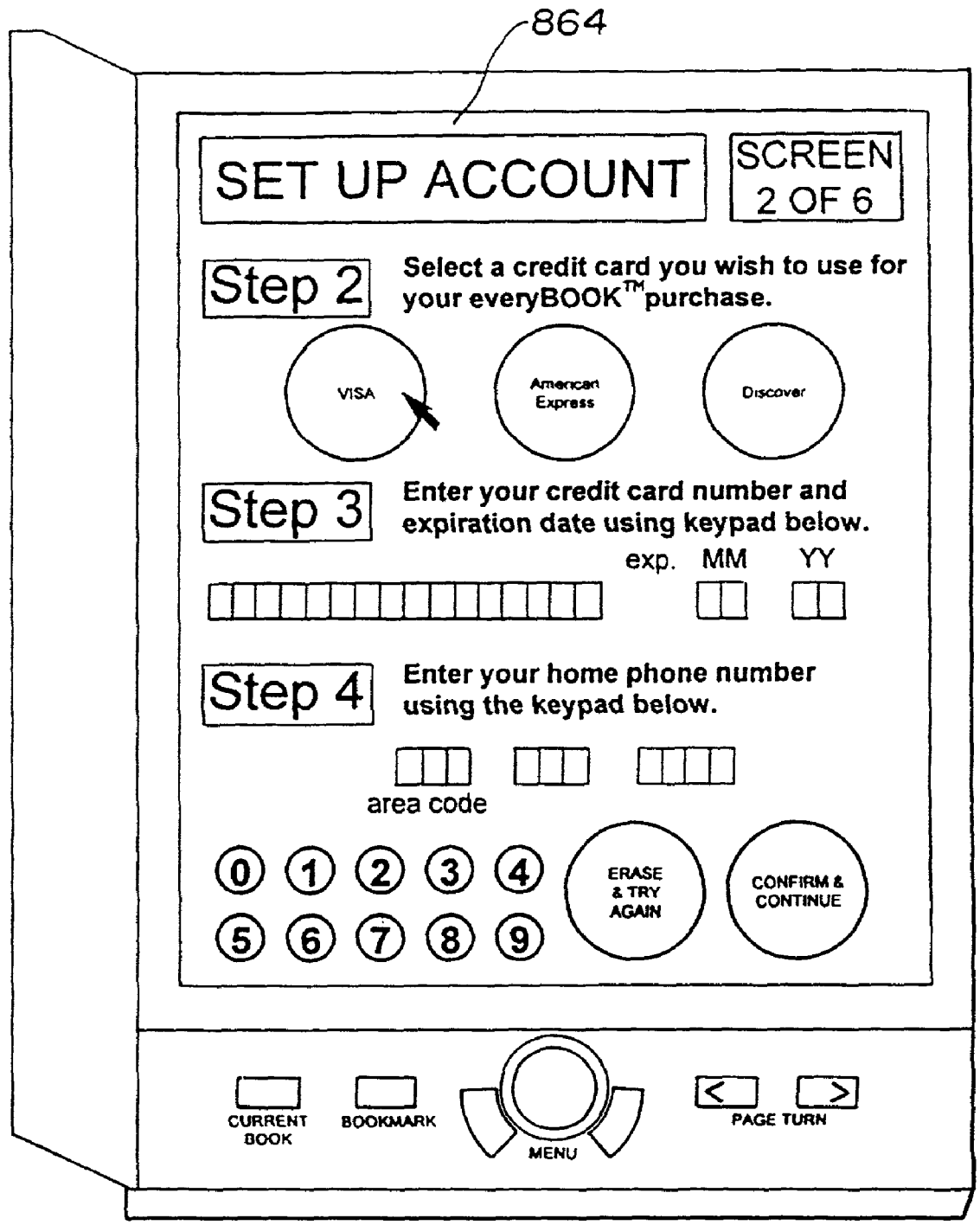

Examples of the "Account Set Up Menu" 862 and further submenus 858 related to account set up (which provide instructions and account input 864) are shown in FIG. 14g and FIG. 14h. These submenus 858 allow initialization of an account at the operations center 250 and orders to be charged to credit cards. The submenus 858 include the ability to enter data related to your desired PIN number or password, credit cards, phone numbers, etc. In one embodiment, the account set up be performed using the telephone system. A confirmation menu verifies that the account has been properly set up with the desired PIN or password and credit card. However, additional set-up methods are presented in Section VII.

Figure 14I:
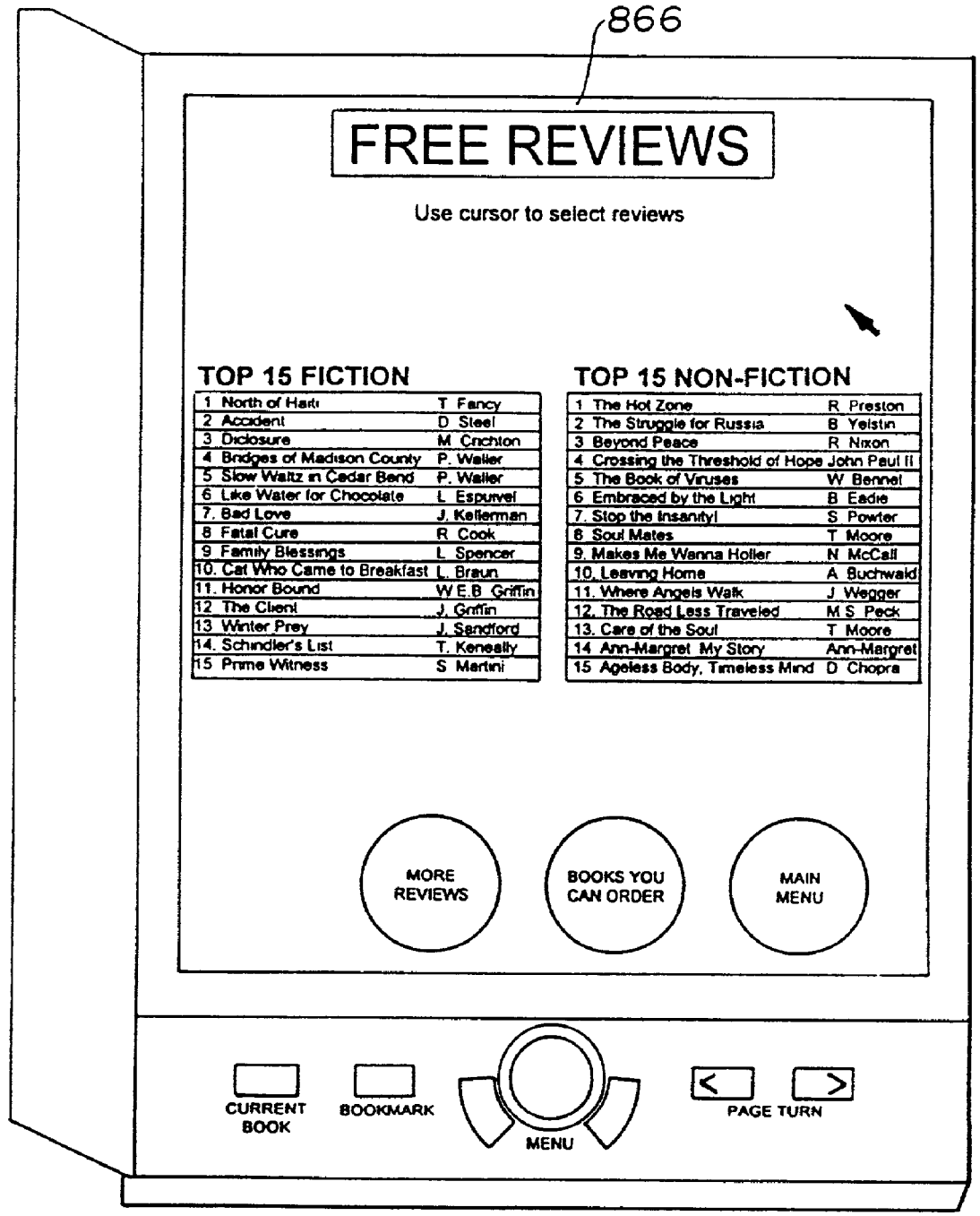
Figure 14J:
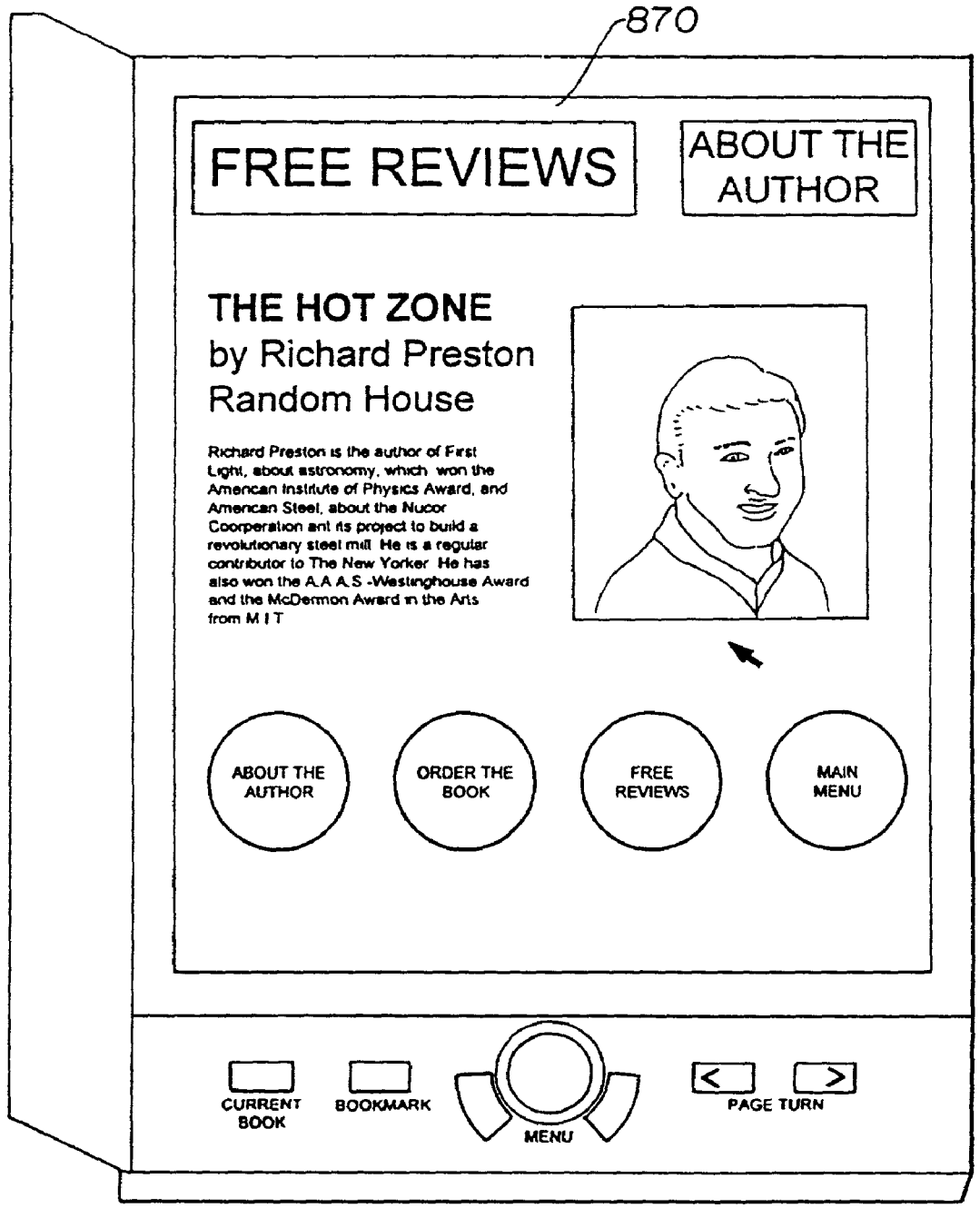

Free previews for books 866 are also provided by submenus (868, 870). Examples of the free preview menus are shown in FIG. 14*i* and FIG. 14*j*. FIG. 14*i* shows a menu depicting various books for which previews are available for viewing. Following a book selection, a screen submenu showing an excerpt of the selected book cover's description is provided along with an excerpt from a critic's review of the selected book. In one embodiment, this preview screen for a particular book also allows the subscriber to select a submenu which provides information about the author. The book preview submenu may also include a still video picture or graphics portraying a book cover or a scene from the book. An example of such a still video picture or graphics is shown in FIG. 14*j* which depicts a preview screen 870 about the author. The author's preview screen 870 shows a picture of the author, provides a short biography, and may allow the subscriber to order the author's books. The price for ordering the authors various books may also be shown on the menu.

In addition to free previews, in other embodiments, the electronic book system 200 provides the subscriber with a book suggestion feature (see 855). This is accomplished using the menu system 851 and the processor with associated memory located at the viewer 266, library 262 or at the distribution point (1020 or 250). When necessary, information for the book suggestion feature is sent in the text data of the signal to the home system 258. With this feature, books or authors are suggested to a subscriber based upon historical data of the subscriber's previous orders, demographics or mood of the subscriber, other indicators, and/or by text word searches.

In one book suggestion embodiment, text word searches of preview information (such as book cover descriptions, critics reviews and biographies about the author) and/or text of books or other titles are performed by the library 262 using databases stored in the library memory 600. Personalized book or author suggestions are made to the subscriber by obtaining information from the subscriber indicative of general subscriber interests. Subscriber entries may be solicited from the subscriber using the book suggestion entry submenu 855. The system uses these subscriber entries either directly or indirectly to search for books or authors to suggest to the subscriber.

Generally, the electronic book suggestion methods may be categorized into two categories, either responsive methods (which respond to a series of subscriber menu entries), or intelligent methods (which analyze data to suggest a book). Using a responsive or intelligent method, the system 200 determines a list of suggested titles or authors and creates a second or third level submenu 856, 857 to suggest the titles for subscriber selection.

Responsive methods of suggesting titles include, for example, the use of mood questions, searching for authors, and keyword searching. Using the instruction memory 732 and menu generation hardware (e.g., 607) of the viewer 266, a series of mood questions can be presented on menus to determine a subscribers interest at a particular time. For this methodology, the operations center's 250 processor 404 and instruction memory 416 assign each title mood indicators (and sub-indicators) from a group such as light, serious, violent, short, long, dull, exciting, complex, easy-read, young theme, old theme, adventure, romance, drama, fiction, science-fiction, etc. These indicators are sent to the home system 258 with the text data and are stored in library memory 600. Based upon the subscriber entries, the processor associates a set of indicators with the subscriber's request and a set of books with matching indicators are located for suggesting to the subscriber.

Responsive searches for authors or keywords (a search word provided by the subscriber) are generally performed by the library processor 628 and instruction memory 632 on data stored in the library memory 600. For example, a keyword given by the subscriber may be searched for a match in library memory 600 storing the book reviews, critics and previews databases. Thus, if a subscriber provided an entry of the word "submarine" on an appropriate submenu, the title "Hunt For Red October" may be located by the microprocessor 628 using instruction from a routine in instruction memory 632.

Intelligent methods of suggesting programs include analyzing personal profile data on the subscriber and/or historical data about the subscriber such as past books ordered by the subscriber (or buy data). This method may be performed at the distribution point or operations center 250 by the on-site processor 404 using subscriber databases stored in memory 428. The home system 258 receives the text data including program suggestion information from the distribution point or operations center 250 and generates the program suggestion submenus 855, 856, 857 using the same text data receiving 212 and viewer menu generation hardware (e.g., 607, 621) described above. Software routines and algorithms stored in instruction memories (e.g. 632, 732) are used to analyze historical data and book ordered data to determine a line of books to suggest to the subscriber.

The algorithms for this powerful feature of suggesting books or authors to subscribers is disclosed in great detail in U.S. Pat. No. 5,798,785, entitled TERMINAL FOR SUGGESTING PROGRAMS OFFERED ON A TELEVISION PROGRAM DELIVERY SYSTEM, filed Dec. 2, 1993, which is incorporated herein by reference.

Referring to FIG. 13, submenus 858 are shown on the "Books In Your Library" submenu 872 and may be broken into shelf numbers with submenus for each shelf 874, 876. The submenus 858 for the "Books You Can Order" submenu 878 is similarly broken out into submenus by shelves 880, 882. These shelves may each be a category or genre of books. Books may be grouped into categories such as best sellers, novels, fiction, romance, etc. See FIG. 14*d*.

Referring to FIG. 13, the submenu 858 for "Your Current Book" 884 allows a subscriber to select a current book 884 and then determine what page to view. This selection is confirmed with a level two submenu 885. The help submenu 887 provides the subscriber with additional help screens 888. The submenus 858 for available features 890 may be broken out into a sequence of separate submenus for each feature 891, 892.

Referring to FIG. 13, messages can also be sent with the electronic book selection and delivery system 200. A level one message screen provides the subscriber with the ability to select from various messages the subscriber has pending 893. Each message is then shown on a separate submenu screen 894, 895. The message may contain text and graphics.

Referring to FIG. 13, account information is shown on a level one submenu 896 and then follow-on submenus 858 show the recent orders and your account balance 897. There is also a level one submenu for outgoing messages 898 which has a follow-on submenu used as an input screen 899.

In addition to the specific features and submenus described in FIG. 13 and FIG. 14*a* through FIG. 14*j*, many other variations and features are possible. When a book is finally selected for viewing the title page 886 will appear on the screen followed by a page of text.

III. Billing and Collection System

In one embodiment, the billing and collection system 278 (shown in FIGS. 2 and 3) utilizes the latest technology in electronic transaction and telephone switching to track orders, authorize deliveries, bill consumers, and credit publishers automatically. The telephone calls initiated by the phone connector 270 are received by the billing and collection system 278 which responds immediately without human intervention by placing the order and charging the consumers credit card account. Data is compiled periodically and publishers 282 are credited for sales of their books or other text. The billing and collection system 278 may also connect with subscribers through two-way cable connections, cellular, or other communication means. These additional methods are detailed in Section VII.

The billing and collection system 278 communicates with the operations center to track changes in available books and to provide statistical data to the operations center 250.

IV. Public Library, School, and Bookstore System

The electronic book system can be modified to be used at public libraries, schools, bookstores, newsstands, or stand-alone kiosks. FIG. 15 shows one possible arrangement of components for the distribution location. The main unit is the file server 900. The file server 900 is a large electronic memory unit that can store thousands of books, newspapers, or periodicals. Various electronic storage means may be used in the file servers, such as hard disks, read-write CD ROMs and read-only CD ROMs.

The system comprises five components; the file server 900, a converter or video connector 904 or connector capable of interfacing to one of the alternative delivery systems presented in Section VII, a controller 908, a viewer 912, and a catalog printer 916. The software for controlling the system is primarily located in the controller 908. The converter or video connector 904 is similar to those described above. In this configuration the controller unit 908 monitors the data being transferred to the file server 900 by the converter 904. The controller 908 may be provided with a viewing screen and several control buttons. When it is necessary to have a larger screen to perform more sophisticated controlling of the system a viewer 266 may be connected to the controller 908 and the viewer screen and controls 740 may be used.

For security reasons, the controller 908 is only able to download books to public viewers 912 which are authorized to receive books from the particular file server 900. Also for security reasons it is not desirable that the public viewer 912 have access to more than one file server 900. In this way, security can be maintained over the text data for books. The public viewer 912 may be limited to receiving one or two books at a time from the controller 908. When the user of the public viewer 912 needs a new or additional book, the user returns the viewer 912 to the school or public library where the user receives a new book from the controller 908.

In order to track the books that are available on the file server 900, the titles of the available books may be printed on a catalog printer 916. The catalog printer 916 is connected to the library controller 908 and the titles of the books are downloaded to the catalog printer 916. For security reasons, the coded text for any of the electronic books may not be authorized for printing using the controller 908 and catalog printer 916. In order to maintain security over the data, none of the electronic book data may be allowed to be downloaded to the printer 916. Once a complete printout of available book titles, magazines, or other textual material is complete, a hard copy of the catalog 920 can be maintained at the file server 900.

The system shown may also be used at bookstores. The bookstores can rent the public viewer 912 to customers with the text for one or two books loaded onto the public viewer 912. The public viewer 912 may be provided with an automatic timeout sequence. The timeout sequence would erase the textual data for the books after a certain period of time, for example, two weeks. It is expected that after a period of time (perhaps within two weeks) the renter would return the public viewer 912 to the bookstore and receive additional books for viewing. Using this arrangement, it is also possible for the bookstore to (permanently) sell a viewer 912 to a regular customer. The customer then returns to the bookstore from time to time to receive textual data for a book which the customer can then store permanently on the customer's own viewer 912. Various other configurations are possible for bookstores, schools and public libraries using the file server 900 and public viewer 912 described.

V. Use of a Set Top Converter

Existing set top converter boxes such as those made by Scientific Atlanta or General Instruments are presently unequipped to handle the book selection system of the present invention. Although set top converters may be built which include the library functions, hardware modifications are necessary in order to use the book selection system with existing set top converter technology.

Figure 16A:
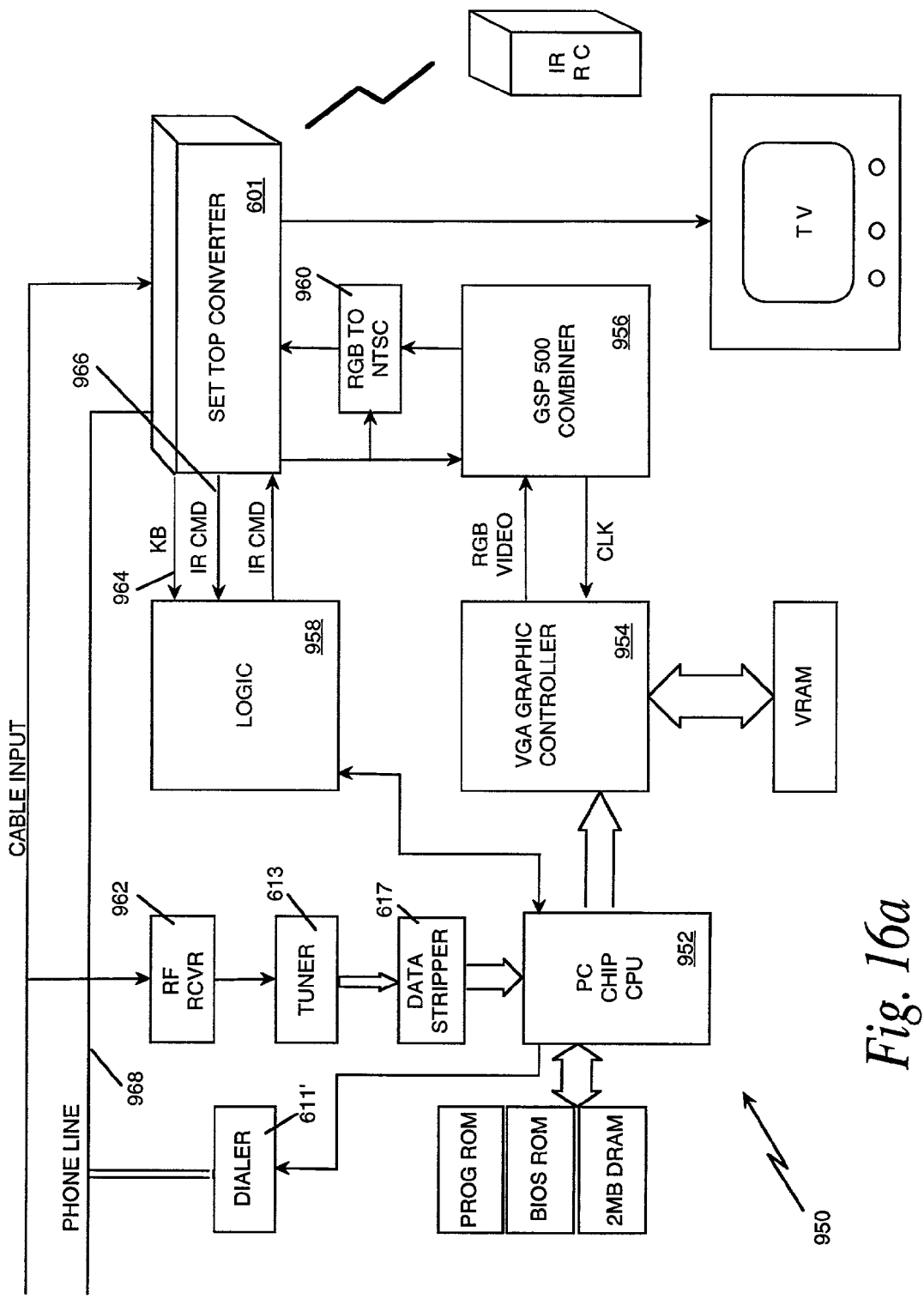
FIG. 16a and FIG. 16b are schematics of hardware modifications or upgrades to a set top converter.
Figure 16B:
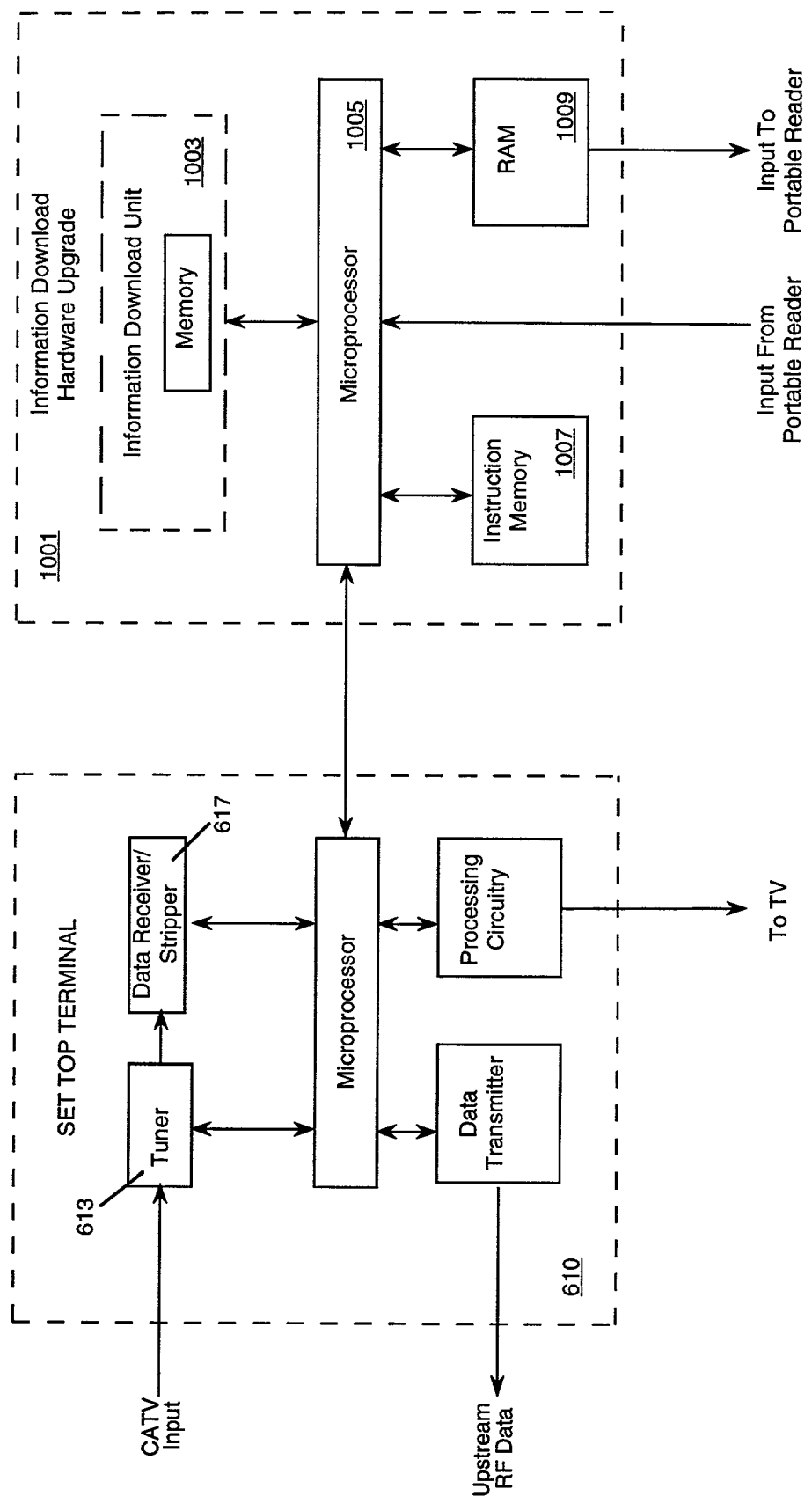

FIGS. 16*a* and 16*b* are examples of hardware modifications or upgrades. A port is used to attach hardware upgrades described below to a set top terminal. Two upgrades are possible to set top converters 601 to assist in receiving and selecting electronic books, a menu generation card upgrade (FIG. 16*a*) and an information download unit (FIG. 16*b*). Each of these upgrades may be connected to the set top terminal unit through an upgrade port. A four wire cable, ribbon cable, FireWire (IEEE 1394B) interface connector, USB connector, or the like may be used to connect the upgrade to the set top converter 601.

A card addition 950 to a set top converter 601 is depicted in FIG. 16*a*. The card 950 shown provides the additional functionality needed to utilize the book selection system with existing set top converter 601 technology. The card 950 may be configured to slip inside the frame of a set top terminal and become part of the set top terminal, an advanced set top terminal. The primary functions the card 950 adds to the set top converter 601 are the interpreting of data signals, generating of menus, sequencing of menus, and, ultimately, the ability of the subscriber to select a book using either the television or a viewer 266. The card 950 also provides a method for a remote location, such as the cable headend, to receive information on books ordered. The books ordered information and control commands may be passed from the cable headend to the card 950 using telephone lines or alternative ordering methods as presented in Section VII.

The primary components of the card 950 are a PC chip CPU 952, a VGA graphic controller 954, a video combiner 956, logic circuitry 958, NTSC encoder 960, a receiver 962, demodulator (not shown), and a connector 611', which consists of a dialer. The card 950 operates by receiving the data text signal from the cable headend through the coaxial cable. The logic circuitry 958 of the card 950 receives data 964, infrared commands 966, and synchronization signals (not shown) from the set top converter 601. Menu selections made by the viewer 266 on the remote control are received by the set top converter's 601 IR equipment and passed through to the card 950. The card 950 interprets the IR signal and determines the book (or menu) the subscriber has selected. The card 950 modifies the IR command to send the information to the set top converter 601. The modified IR command contains the channel information needed by the set top converter 601. Using the phone line 968 and dialer 611', the card 950 is able to transmit electronic books ordered information to the cable headend. It is also possible to receive the electronic books over the telephone lines and other telecommunications networks, including wireless networks, and by-pass the video distribution system.

These commands are passed through the interface linking the set top terminal's microprocessor with the microprocessor of the hardware upgrades. In this way, subscriber inputs, entered through the set top terminal keypad or remote control, can be transferred to any of the hardware upgrades for processing and responses generated therein can then be sent back to the set top terminal for display. In one embodiment the IR commands 966 are transferred from set top terminal 601 to hardware upgrade.

Hardware upgrades may include a microprocessor, interactive software, processing circuitry, bubble memory, and a long-term memory device. In addition to these basic components, the hardware upgrade may make use of an additional telephone modem or CD-ROM device.

An information download hardware upgrade 1001 shown in FIG. 16b allows the subscriber to download large volumes of information from the operations center 250 or cable headend using a set top terminal 610. The hardware upgrade 1001 will enable subscribers to download data, such as electronic books and electronic magazines, to local storage. Primarily, the hardware upgrade 1001 is an additional local storage unit 1003 (e.g., hard disk, floppy, optical disk or magnetic cartridge and may include a microprocessor 1005, instruction memory 1007, and a random access memory 1009, as shown in FIG. 16b). A small portable viewer may also provided with the upgrade 1001 to enable downloaded text to be read without the use of a television.

The downloadable information may be text or graphics supplied by the operations center 250 or cable headend. With the upgrade 1001, electronic books may be downloaded and read anywhere with the viewer 266. Using the upgrade 1001, electronic books may be downloaded and stored in compressed form for later decompression. The electronic books may be decompressed only at the time of viewing. Important text that the public desires immediate access may made available through this system. Text such as the President's speech, a new law, or a recent abortion decision rendered by the Supreme Court may be made immediately available.

In one embodiment, electronic book ordering information is stored at each set top terminal 610 until it is polled by the cable headend using a polling request message format. An example of a polling request message format consists of six fields, namely: (1) a leading flag at the beginning of the message, (2) an address field, (3) a subscriber region designation, (4) a set top terminal identifier that includes a polling command/response (or P/F) bit, (5) an information field, and (6) a trailing flag at the end of the message. A similar response frame format for information communicated by the set top terminal to the cable headend in response to the polling request may be used.

Figure 17:
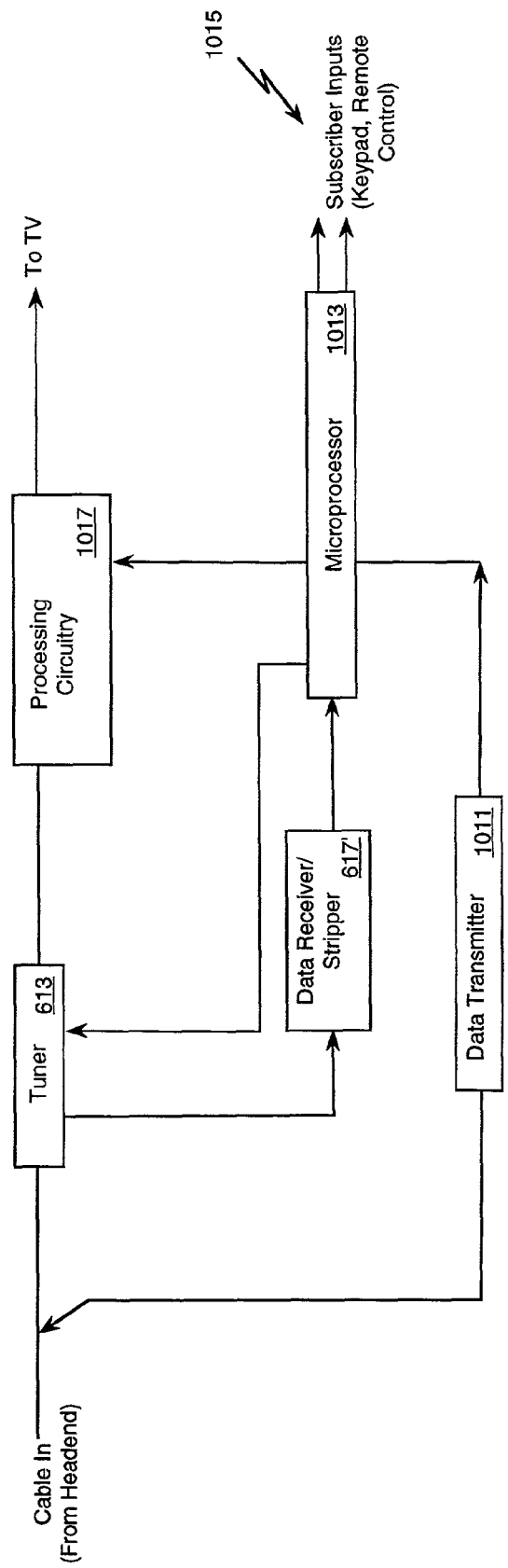
FIG. 17 is a schematic showing a set top terminal that includes a data receiver and data transmitter.

FIG. 17 shows components of a set top terminal 610'. The components include a data receiver 617' and a data transmitter 1011. The data transmitter provides upstream data communications capability between the set top terminal 610' and the cable headend. Upstream data transmissions are accomplished using the polling system described and, using a data transmitter 1011. Both receiver 617' and transmitter 1011 may be built into the set top terminal 610' itself or added through an upgrade module. Regardless of the specific hardware configuration, the set top terminal's data transmission capabilities may be accomplished using the hardware shown in FIG. 17.

FIG. 17 shows RF signals, depicted as being received by a data receiver 617' and tuner 613 working in unison. Both of these devices are interfaced with the microprocessor 1013, which receives inputs 1015, from the subscriber, either through a set top terminal's keypad, a remote control unit or viewer 266. Generally, all cable signals intended for reception on the subscriber's TV are accessed by the tuner 613 and subsequently processed by the processing circuitry 1017. This processing circuitry 1017 typically includes additional components (not shown) for descrambling, demodulation, volume control and remodulation on a Channel 3 or 4 TV carrier.

Data targeted to individual set top terminals is received by the data receiver 617' according to each set top terminal's specific address or ID. In this way, each addressable set top terminal 610' only receives its own data. The data receiver 617' may receive set top terminal 610' specific data in the information field of the signal frame described or on a separate data carrier located at a convenient frequency in the incoming spectrum.

The received data includes information regarding electronic books and menus available for selection. The subscriber may enter a series of commands 1015 using a keypad or remote control in order to choose an electronic book or menu. Upon receipt of such commands, the set top terminal's microprocessor 1013 instructs the tuner to tune to the proper frequency of the channel carrying data and subsequently instructs the processing circuitry 1017 to begin descrambling of this data.

Upon selection of an electronic book, the microprocessor 1013 stores any selection information in local memory (not shown) for later data transmission back to the cable headend. The set top terminal's microprocessor 1013 coordinates all CATV signal reception and also interacts with various upstream data transmission components. Typically, the data transmitter 1011 operates in the return frequency band between 5 and 30 MHZ. In an alternative embodiment, the frequency band of 10 to 15 MHZ may be used. Regardless, however, of the frequency band used, the data transmitter 1011 sends information to the cable headend in the information field of the response frame described. Those skilled in the art will recognize that a number of variations and combinations of the above-described set top terminal hardware components may be used to accomplish upstream data transmissions.

VI. Books-On-Demand System

Figure 18A:
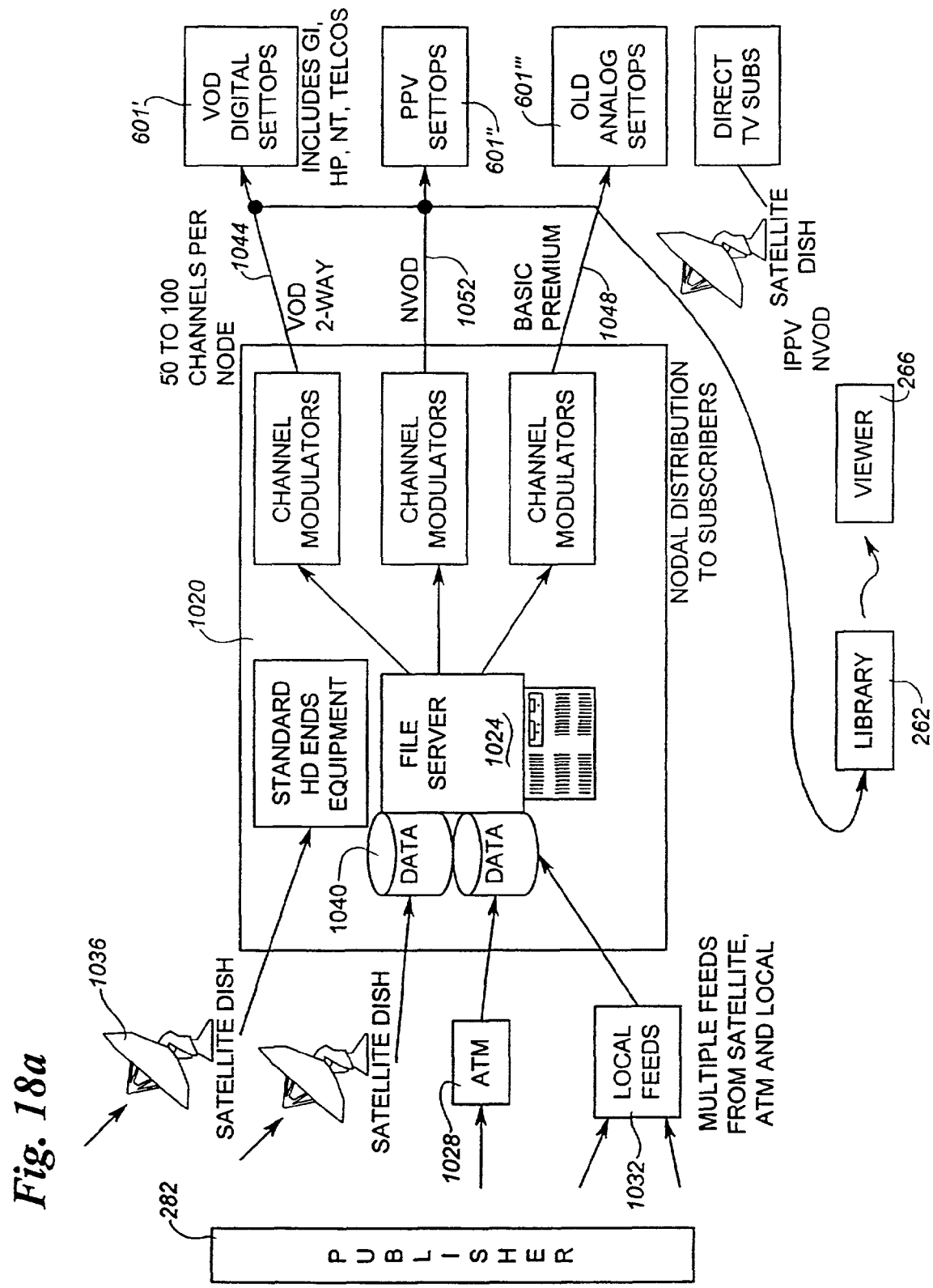
FIG. 18a is a schematic of a book-on-demand system.

The electronic book system 200 described may also be configured in a book-on-demand style. FIG. 18a shows one example of a configuration for a book-on-demand system. A book on demand system requires more powerful two-way communications between the consumer's home, bookstore, school or public library and either the operations center 250 or a distribution site 1020 such as the cable headend. In one embodiment, this type of two-way communication can be provided by the hardware shown in FIG. 17 and described above. Additional methods related to alternative communication paths are presented in Section VII.

Referring to FIG. 18a, in a book-on-demand system, the subscriber selects the book to be download from an available menu of books (see for example FIGS. 14d and 14e). The data for menus of available books is usually sent to the subscriber location by the distribution site 1020. After the subscriber's menu selection, information about the subscriber selection (or request) is then communicated to either a distribution point 1020 (such as a cable headend) or the operations center 250. Upon receipt of this request, the needed textual and graphical information for the book is spooled and sent to the subscriber. In this manner, electronic books are only sent when requested by the subscriber and are sent immediately upon demand for the electronic book (or text).

In order to support such a demand system, the text delivery and distribution must be conducted on a strong nodal architecture distribution system, such as, a video-on-demand cable or telephone television system, through use of individual telephone calls on the public telephone system or cellular phone system, through the use of the Internet, or a number of other data network options.

The book-on-demand system allows for a greater selection of electronic books to the subscriber and limits the amount of communicated book data that is unnecessary or unneeded. It also provides the electronic book to the subscriber in a much timelier fashion.

In addition to a stronger distribution system, a book-on-demand system requires a distribution point 1020 to have more sophisticated equipment to access and "spool out" the textual information. This can be accomplished using file server technology 1024 for storing the books and distribution technology such as ATM 1028 or telephone-type switching (not shown) to distribute the textual information. The file server 1024 and distribution technology that can be used in configuring such a book-on-demand system is described in U.S. Pat. No. 5,262,875 and U.S. Pat. No. 5,218,695, cited above.

FIG. 18*a* shows an embodiment for a book-on-demand system that utilizes file server technology. In addition to books, the embodiment of FIG. 18*a* will support distribution of nearly any digital data. Books or textual files are received from publishers 282 and other sources through local feeds 1032, ATM 1028, or by satellite dish 1036, for example. The data is then stored in memory 1040 at the file server 1024. In one embodiment, the distribution point 1020 is a cable headend that receives requests from subscribers and delivers text to subscribers over a two-way communication system (such as a video-on-demand system (VOD) 1044).

The library 262 can be connected to either a basic premium-type service cable system 1048, a near video-on-demand type cable system (or pay-per-view (PPV) 1052) or a video-on-demand cable system 1044. In connecting with either of these three systems the library 262 may access the cable directly or may access the system through a set top terminal 601', 601", or 601'".

Using the two-way video-on-demand system 1044, a subscriber is able to request a specific book title and receive that text immediately following its request. To accomplish this, the distribution point 1020 transmits a list of available books through the cable delivery system to the library 262. The library 262 displays the list of available books on a menu or similar format. As described earlier, the library 262 may use menus which list categories of available books to form its request from the distribution point 1020. After selecting a book the library 262 then sends a request signal on the two-way communication system 1044 back to the distribution point 1020. This request signal can be handled in two ways. The library 262 either initiates the request or the distribution point 1020 polls the various libraries on to the two-way system 1044. Upon receiving the request for the book title, the text associated with that book title is transmitted to the library 262 using the two-way cable system 1044.

Figure 18B:
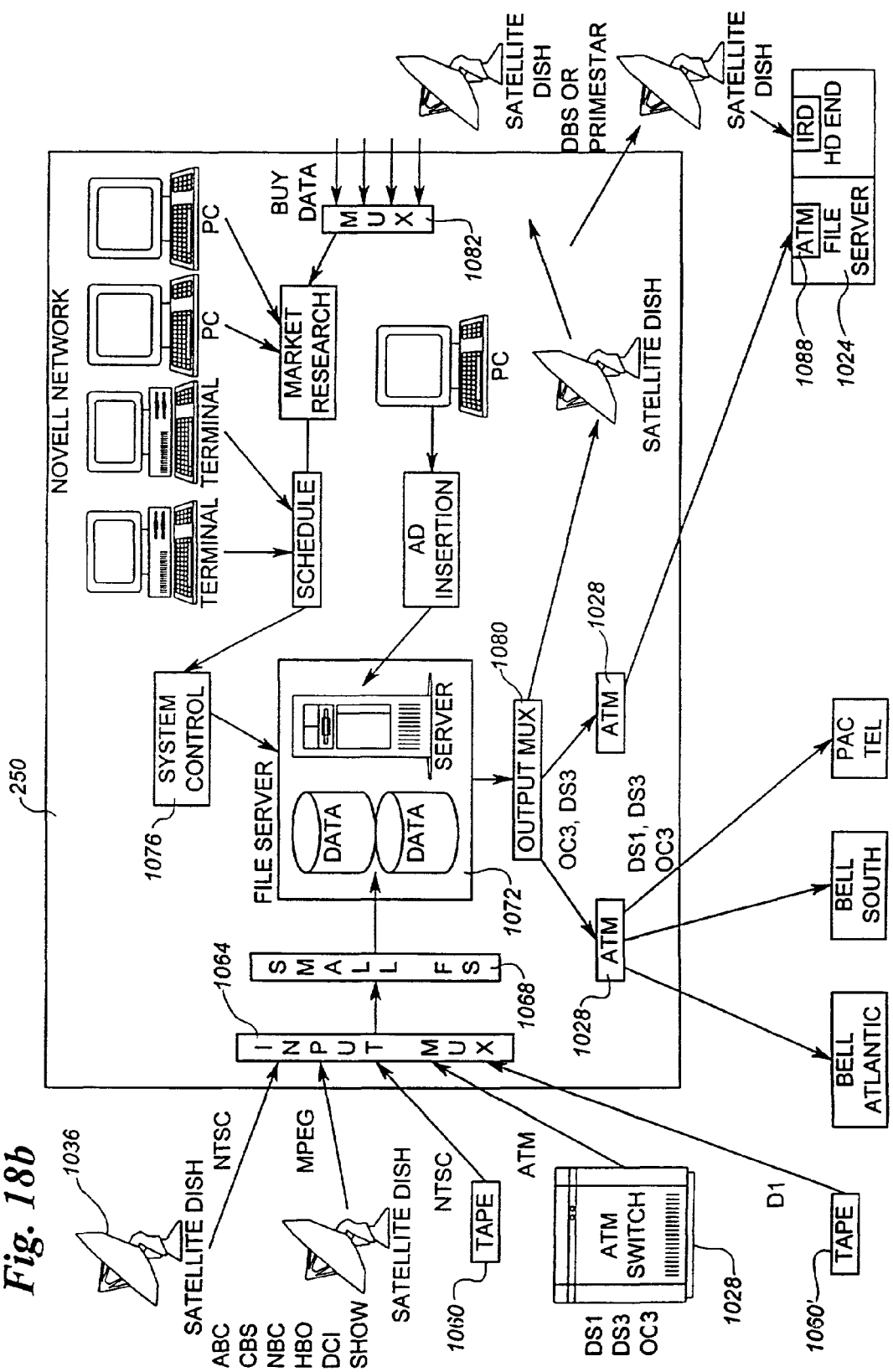
FIG. 18b is a schematic of an operations center supporting a book-on-demand system.

FIG. 18*b* is an expanded view of an operations center 250 that supports a regional or national book-on-demand system. In fact, the operations center 250 shown supports distribution of nearly any digital data. The operations center 250 supports multiple feeds to receive digital information by tape 1060, 1060', ATM 1028, or satellite 1036. The information is processed through an input MUX 1064 and a small file server 1068 before reaching the master file server 1072. Digital data such as books received from publishers 282 is then stored on the master file server 1072. The digital data may be stored compressed in a standard format such as MPEG2.

A system controller 1076 provides control over the regional or national book-on-demand system. Books may be packaged into groups to provide feeds to various cable headends. In addition, scheduling and marketing research are conducted at the operations center 250. In order to handle the scheduling and market research, book buy data is received at the operations center 250 through a multiplexer 1082. Book buy information can be provided by the operation center 250 to the billing and collection system 278.

The operations center 250 is also equipped to insert messages or advertisements into the file server. These messages or advertisements will eventually be received by the subscribers.

The master file server 1072 uses an output multiplexer 1080 and ATM 1028 as well as satellite connections to distribute digital data. In one embodiment, cable headends receive text data on books from the master file server 1080 through the output multiplexer 1028 and an ATM system 1028. After receiving the digital book data, the cable headends store the books in a local file server 1024. FIG. 18*a*'s distribution point 1020 is an example of a cable headend which may receive data from the operations center 250 of FIG. 18*b* through an ATM hookup 1088 or satellite hookup.

VII. Alternative Delivery and Ordering Methods

Electronic books and related data, including electronic book menu data, may be provided to subscribers by use of an on-demand delivery system in which electronic books are delivered after an order is received by the delivery system. The delivery system may supply the electronic books in real time or near-real time (i.e., near on-demand), or after a delay period that allows the delivery system to process, package and transmit the electronic book. Alternatively, the delivery system may broadcast one or more electronic books in a continuous fashion. In this alternative, the subscriber indicates a desired electronic book from a list of the broadcast electronic books. The delivery system may include a billing system that debits a subscriber's account, or debits a credit card, for example, upon delivery of the electronic book. The delivery system, or a related authorization system, may provide a local authorization code that allows the subscriber to decrypt, store and view the desired electronic book. Alternative delivery systems and methods are disclosed in pending U.S. application Ser. No. 09/289,956 entitled, ELECTRONIC BOOK ALTERNATIVE DELIVERY METHODS, filed Apr. 13, 1999, and U.S. application Ser. No. 09/427,938 entitled, VIRTUAL ON-DEMAND ELECTRONIC BOOK, filed Oct. 27, 1999, the disclosure of which are incorporated by reference.

a. Internet Delivery Methods

Figure 19:
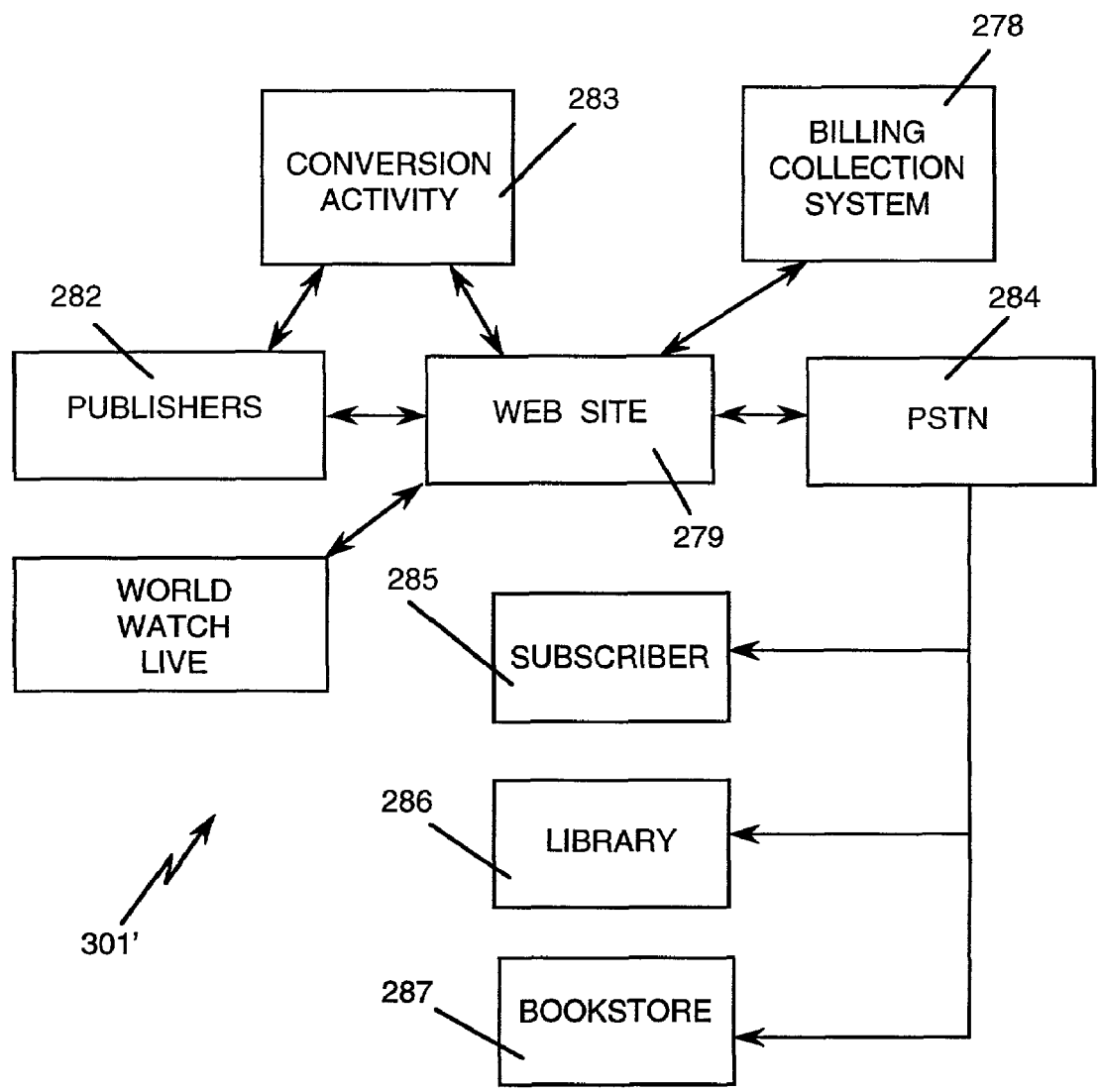
FIG. 19 is a diagram depicting components used for delivery of electronic books over the Internet.

FIG. 19 is an alternate delivery plan 301' that provides for electronic book delivery using the Internet. In FIG. 26, the publishers 282 provide the electronic books to be posted at the Internet web site 279. The publishers may convert the text and graphical data to digital format, compress the digital data, and upload the compressed digital data to the Internet web site 279. Alternately, the publishers 282 may arrange for an outside conversion activity 283 to convert the text and graphical data to digital format. The conversion activity 283 may then provide the digital data to the Internet web site 279. For example, a large on-line bookstore could gather publications in electronic form from a variety of publishers, or could convert hard-copy books to electronic form, and post the electronic books on the Internet such as at the Internet web site 279.

The electronic books may then be transferred using a public switched telephone network (PSTN), for example, or other communications systems, direct to a subscriber 285, a library 286 and a bookstore 287. The library 286 and the bookstore 287 may also provide electronic books to the subscriber 285.

When electronic books are provided by the Internet web site 279, the billing and collecting functions may be incorporated into the Internet web site 279. For example, a subscriber may pay for an electronic book selection by entering a credit card number into a data field of a page of the Internet web site 279. In this configuration, a separate billing and collection system may not be required. Alternatively, the Internet web site 279 may communicate information with the billing and collection system 278.

Electronic book delivery over the Internet may be handled using a number of methods. In a method, the electronic book may be downloaded to the requesting home system 258 immediately after the order has been processed. Alternatively, the electronic book may be e-mailed to an e-mail address that is entered as part of the ordering process. In another embodiment, as part of the ordering transaction process, the subscriber is provided with location and authorization information that allows the subscriber to retrieve the ordered electronic book at the subscriber's convenience. For delivery of subscription electronic book products, like newspapers, magazines or other periodicals, the Internet web site 279 can deliver the latest version of the product to the subscriber automatically immediately upon logon by the subscriber to the Internet web site 279. Electronic book data may also be embedded into continuous multicast streaming video, audio, or data feeds.

Delivery methods that allow for dedicated, full time delivery can be used to provide continuous distribution of electronic book data including requested electronic books from subscribers, electronic books to be broadcast to all subscribers, updated menu contents, and updated advertising. For delivery methods that allow for non-dedicated or user established connectivity, the operations center 250 may manage the timing and delivery of content by delivering the electronic book only when requested, or periodically, to ensure delivery for those home systems that may not be able to receive the delivery. Finally, delivery methods that are capable of two-way communication may be used to provide a return path to the operations center 250 or billing and collection system 278 for the purpose of ordering or requesting updated electronic book information. Two-way communications paths may be used to allow linking from an electronic book home system 258 or viewer 266 to external nodes that provide world watch live content. These delivery methods are described in detail in co-pending U.S. patent application Ser. No. 09/289,956 entitled ELECTRONIC BOOK ALTERNATIVE DELIVERY METHODS, filed Apr. 13, 1999, the disclosure of which is hereby incorporated by reference.

Additionally, although the home system 258 is presented as an independent device that directly interfaces with the delivery system 200, the home system 258 may connect to the delivery system 200 through a set top terminal, TV, PC, radio, or any other device capable of receiving the signal provided by the delivery system 200. Additionally, the home system 258 may not be an independent apparatus, having some or all of its functionality supported within the set top terminal, TV, PC, radio, or any other device capable of receiving the signal provided by the delivery system.

b. Alternative Ordering Methods

Any of the delivery methods described in the section above are viable embodiments for providing access from the home system 258 to the billing and collection system 278 or operations center 250. In an embodiment, the modular connector 701, as shown in FIGS. 6b and 8, may be used to provide the specific protocol formatting and transmission processing to allow the home system 258 to use the communication path. In the embodiment where the PSTN is used to provide access, the modular connector 701 includes the phone connector 270 and the modem 611 as depicted in FIG. 6b. In the embodiment where the cellular phone system is used to provide access, the modular connector 701 includes the cellular phone or PCN phone 611' as depicted in FIG. 6b.

c. Mobile Environments

A feature provided by delivery methods using a wireless broadcast system, satellite broadcast system, wireless personal communication system, or terrestrial television broadcast system is mobility of the electronic book home system 258 or viewer 266. This mobility allows for ordering and receiving electronic book data anytime or anywhere, from sitting on a beach in Florida to sitting on a bus in New York City. This mobility allows for the delivery of electronic book data subscription products such as daily newspapers, monthly magazines, or books from book-of-the-month clubs. These subscription products may be delivered automatically to the appropriate home system 258 or electronic book viewer 266. Enhanced end-to-end error correction techniques can be added to the transmission system to ensure higher probability of receipt for these mobile environments. Additionally, transmission methods may be implemented that resend packets of electronic book data, changing their delivered order on each resend, to improve likelihood of receipt. For lower bandwidth mobile environments, an electronic book file may be broken up into packets and the packets sent a limited number of times. If the electronic book file is not received completely, the electronic book viewer 266 may initiate a request to the operations center 250 to resend only that portion of the electronic book file yet to be received.

VIII. Electronic Book Link System

Electronic book links allow the subscriber to use the electronic book viewer 266 to traverse pre-defined paths between content in their currently viewed electronic book to related information contained either elsewhere in the electronic book, elsewhere on the viewer 266, or external to the viewer 266, including in the library unit 262 or in a connected Internet web site. These links provide an organized and methodical method for the subscriber to quickly access related topic areas or seek clarification of the currently viewed material.

An electronic book includes first locations, or components, such as words, phrases, sentences, sections of text, paragraphs, pages, chapters, figures, drawings, maps, video clips, and audio clips. Links to second and subsequent locations, or components, contained in the same electronic document or in another related electronic document, file, or database can be associated with each of these first components. First components with underlying links can be highlighted and displayed on the viewer display 602 or on the connected television 259 or a personal computer 261 (see FIG. 2). First components that have underlying links associated with them may be identified by assigning them a unique identifier. The unique identifier can be a word or phrase, an alpha-numeric value, a coordinate point, or other unique identifier. In an embodiment, each such first location may be assigned an identifying index value.

The use of the index value allows the first components to maintain links with other components, even if the electronic book is altered. For example, a subscriber may use a cut and paste edit feature to move a block of text containing a first component. Cutting and pasting will not affect the status of the first component and its links to other components. Similarly, changing font style or font size will not affect the status of the links.

In the creation of an electronic book, or subsequently, the electronic book may undergo a process that maps identifying index values to each of the first components. These index values can then be accessed by software directives that drive the presentation of alternative or linked material (e.g., material at one of the second locations) once a selection is made. For each electronic book, these index values may be contained in a hidden table that maps the identifying index values of all first components with underlying links to the location of the linked material (the second location). Moreover, each such first component may be linked to one or many linked material locations. That is, the first component may be linked to a second component, a third component and soon. An example of a hidden table is presented below.

tion, book name, chapter, page, line, and word as identified by their index value. The source location will provide the delivery system 200 the necessary information to contact the operations center 250, the Internet web site 279 (see FIG. 2) or another electronic database and request the appropriate material for retrieval and download if it currently does not reside on the viewer 266 or the home system 258. In the case that the linked material resides on the Internet web site 279 or on another electronic database, the location information in the hidden table allows the operations center 250 or home system 258 to retrieve the desired material from the Internet web site 279 or from the electronic database.

If the second component, or linked material, is located at the viewer 266, the processor in the viewer 266 can cause the linked material to be displayed without any communications with an outside source. For example, if the first component is the name "Cezzanne" and the linked material, or second location, is in an electronic dictionary stored in the viewer 266, the viewer 266 can display the electronic dictionary entry for "Cezzanne." This linked material may be displayed

| Identifying Index Value(s) | Component Identifier | Link Number | Linked Material Identifier | Linked Material Description | Linked Material Location (file location/ file name/ corresponding index value) |
|---|---|---|---|---|---|
| 135 | "Cezzanne" | 1 | More on Cezzanne | Reference material on Cezzanne | Art-Encyclopedia.com/ FrenchArtists/Index Value = 1 |
| 135 | "Cezzanne" | 2 | Pronunciation | Pronunciation of the word | Websters.com/ Websters E-Dictionary/Index Value = 56221 |
| 135 | "Cezzanne" | 3 | Audio Clip | Audio file providing condensed Cezzanne's biography | Viewer/ Current file/Index Value = 199384 |
| 133-135 | "PorchScene by Cezzanne" | 1 | Graphic File | JPEG file presenting Cezzanne's PorchScene painting | Viewer/ Current file/Index Value = 9382 |
| 5673 | "reactivism" | 1 | Definition | Definition of the word | Websters.com/ Websters E-Dictionary/Index Value = 564 |
| 4948-4950 | "Order Little Women" menu item | 1 | Book Order | Order the book Little Women | Discovery.com/ Little Women Order/Index Value = 672 |
| 4949-4950 | "Little Women" | 1 | Book review | Review of the book "Little Women" | LiteraryWorks.com/ Little Women/Index Value = 1 |
| 90462 | "Dental diseases" | 1 | TOC link to Document Body | Link from Table of Contents to desired chapter | Viewer/ Current file/Index Value = 69980 |
| 1342 | "Dental diseases" | 2 | Related discussion group | Access to Web discussion group on gum diseases | NoMoreCavities.com/ Index Value = 1 |
| 572 | "VegieMaster" | 1 | Product Order | Order the product "VegieMaster" | HomePurchases.com/ KitchenProducts/ Index Value = 1 |
| 14 | "Chesapeake" | 1 | Video | Video clip of interview with J. Michener on writing of Chesapeake | Viewer/ Current file/Index Value = 38677 |
| 14 | "Chesapeake" | 2 | Narration | Audio file - narration of Chesapeake by J. Michener | Viewer/ Current file/Index Value = 38678 |

As shown in the table, a first location "Cezzanne" has an identifying index value 135. "Cezzanne" has three links. A link to a second location is to an art encyclopedia. A link to a third location is to an electronic dictionary that provides a pronunciation guide. A link to a fourth location is to an audio file that plays a short biography of the artist. Each of the second, third and fourth locations have their own index values. Linked material location information (i.e., the location of second and subsequent components) can include source locafull screen, in a picture-in-picture window, or as an overlay, for example. The entry can also remain hidden, until a user of the viewer 266 commands the entry to be displayed.

Upon selection of a component with underlying links, the software directive determines the identifying index values associated with the selected component, searches the table for the index values of the selection made, looks up the corresponding linked location, accesses the location, and displays the linked material on the viewer 266. The linked material can be displayed on the viewer 266 in place of the original source material, or simultaneously with the original source material by displaying the linked material in a picture-in-picture window, via a split screen, or via a screen overlay.

Figure 20:
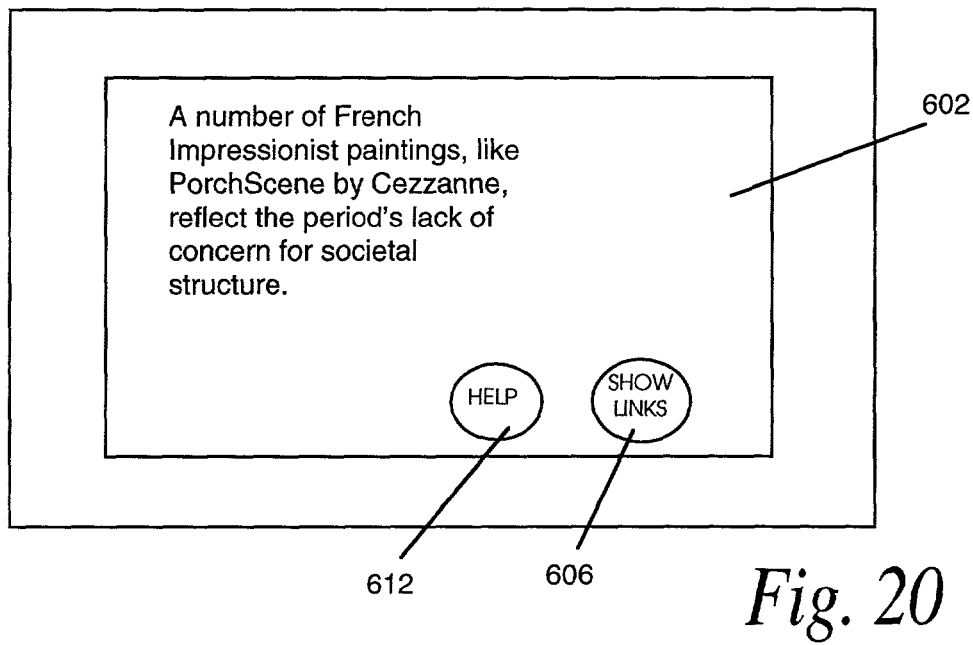
FIG. 20 is a schematic of a page of an electronic book having electronic links.

FIG. 20 shows a portion of a page of electronic text having one or more electronic links. The display 602 may include a show links button 606 and a help button 612. The show links button 606 may be used to display a link menu 971 (see FIG. 13 and FIG. 21). That is, the viewer 266 can be commanded, via the show links button 606, to display all components that have underlying links. The components may be displayed in a highlighted mode, in a different color, in a unique font, bold or italic typeface, underlined, outlined, or in reverse background mode, for example. To make a selection of a component to view the underlying linked material, the cursor 745 is used to identify the desired selected item. The ball 743 is used to guide the cursor 745 across the page to the desired selected item, and the selection button is used to make the selection. Alternatively, cursor movement for screen navigation can be provided via devices such as a fingerpad, mouse, or joystick. Selection can also be made by incorporating a touch-sensitive screen into the viewer 266.

Figure 21:
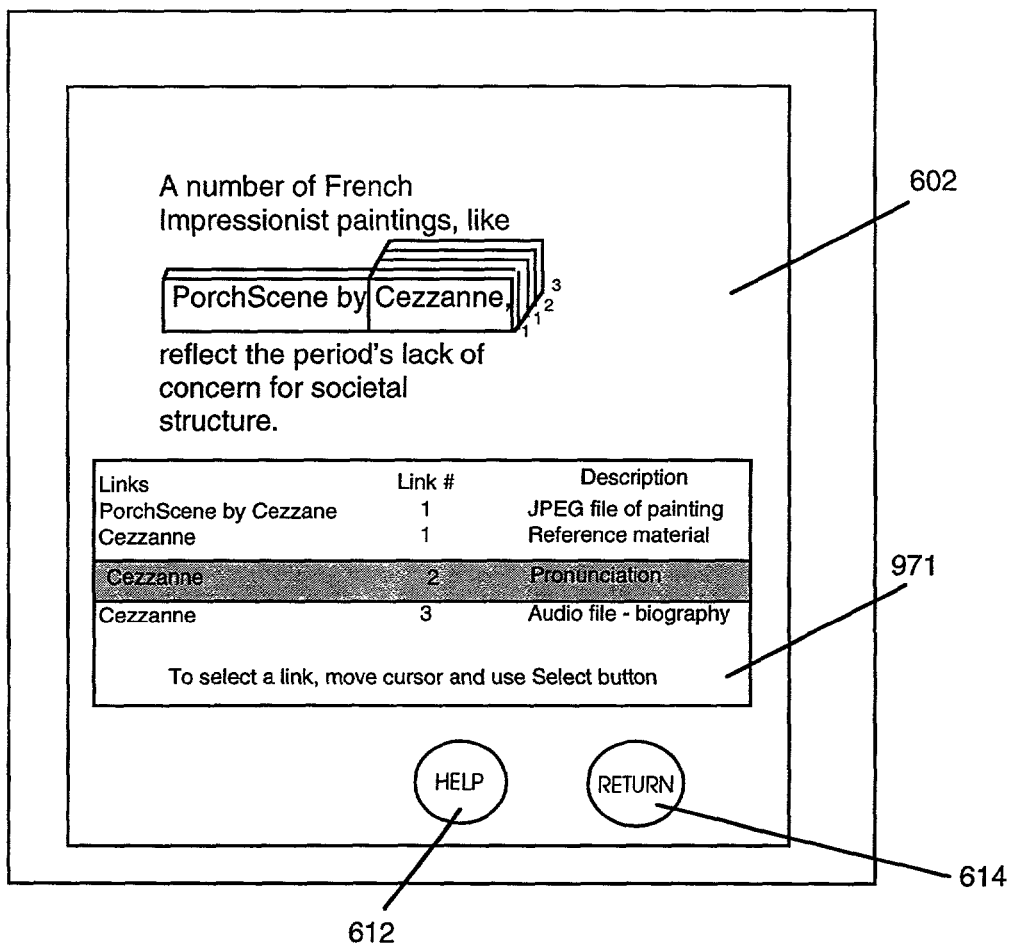
FIG. 21 is a schematic of a page of an electronic book with the electronic links shown.

FIG. 20 depicts the display before commanding the viewer 266 to show links. FIG. 21 shows the display once the request has been made to display all underlying links. FIG. 21 shows the link menu 971, a help button 612, and a multi-function button, or pull-down menu, 614. The multi-function button 614 can be used as a return button, a hide active links button, and a restore active links button, for example. Alternately, several additional buttons may be provided to select these features. The multi-function button 614 may be active when the show links button 606 has been operated. In FIG. 21, the components having underlying links are "PorchScene by Cezzanne" and "Cezzanne." The component "PorchScene by Cezzanne" is shown with one link and the component "Cezzanne" is shown with three links. Also shown in FIG. 21 is the link menu 971 that lists the links, or components, the link number and a description of the linked material. For example, the material linked to the component "PorchScene by Cezzanne" is a JPEG video file showing the painting.

Once a link is selected, an on-screen return button 614 allows the subscriber to return from the linked material back to the originally viewed text. The show links button 606 (see FIG. 20) can be displayed on the viewer 266 either at all times that an electronic book is open, any time an underlying link exists, or only when commanded to do so from the viewer's menu system 851.

When linked material is displayed (for example, in an overlay fashion) the subscriber can command the linked material to be placed in a hidden state by operating the hide active link button 614 or by use of the menu system 851. When an active link is hidden, the restore active link button 614 is displayed. Operation of the restore active link button 614 will display the material linked by the active link.

Figure 22:
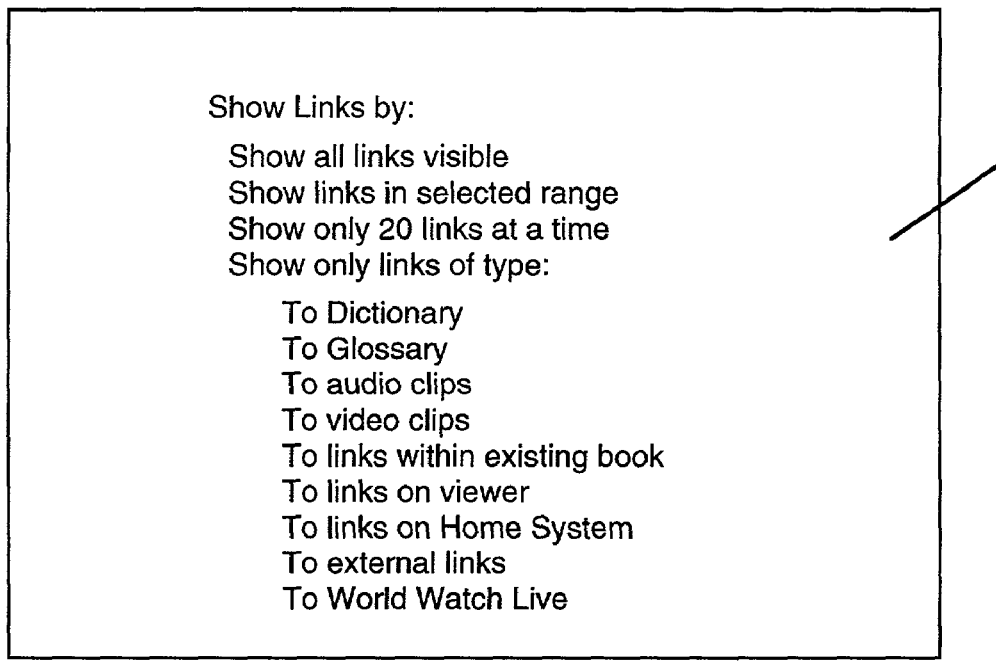
FIG. 22 is a schematic of a show links submenu.

Alternatively, the on screen "Help" menu 887 (see FIG. 13) provides access to further assistance when selecting links. The Help menu 887 is accessed by operation of the on-screen help button 612. Related link options will be available for display on the viewer 266 by selecting the Help menu 887, using the cursor 745 to do so. The "Help" function allows the subscriber to select which specific links to be displayed on-screen. The links when displayed may be simply highlighted portions of text, or text in different colors. All links for the displayed page can be selected to be displayed. Alternatively, by selecting a range of content in an electronic book that may have multiple underlying links, only links associated with the components within the selected range will be presented on the viewer 266 for the subscriber to select the specific link desired. Alternatively, a fixed number of links may be selected to be displayed on the screen at a time. Alternatively, only a certain type of link may be selected to be displayed. The types of links that are available for display may be listed in a pop-up menu. The subscriber can choose from this pop-up menu which of the links to display. For example, the pop-up menu could list links for a dictionary and links to an Internet web site. The subscriber could choose to display only the dictionary links. FIG. 22 depicts the menu screen 981 used to manage the subscriber's filtering of links to view.

Figure 23:
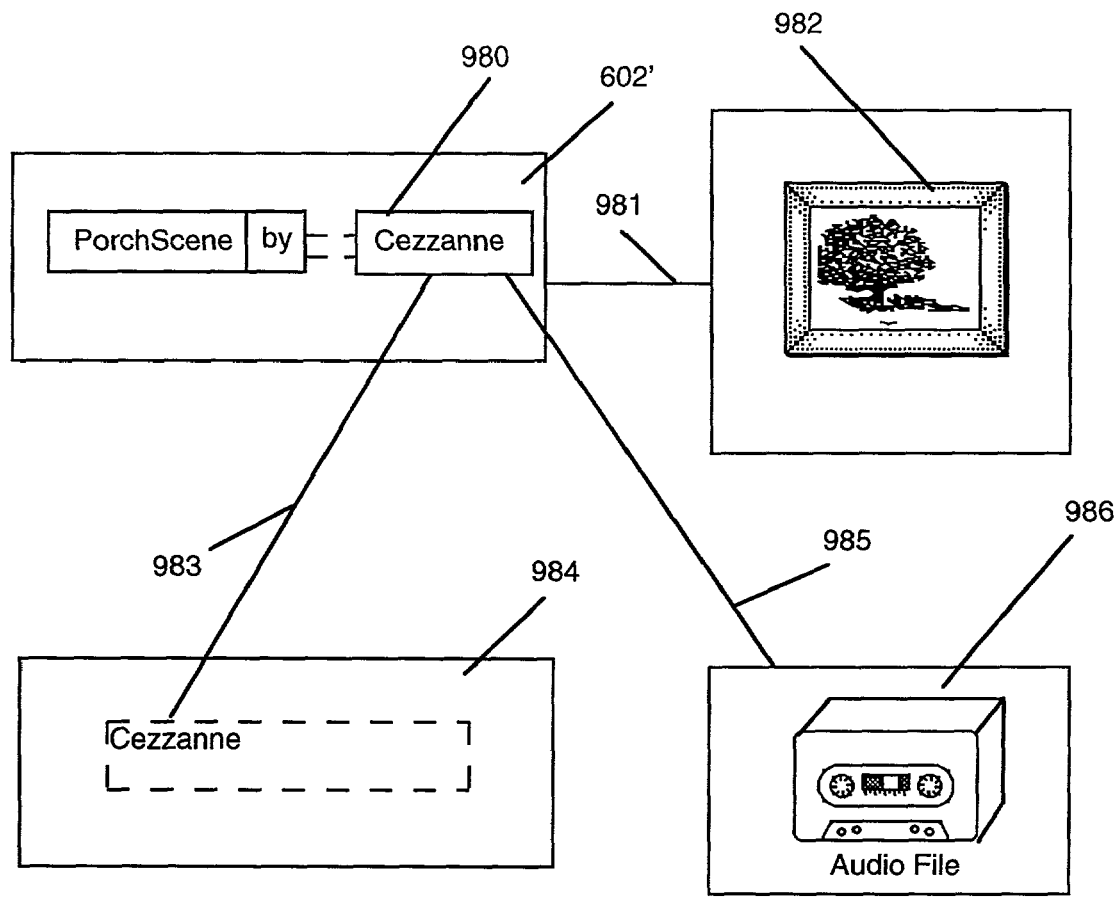
FIG. 23 is an example of links in an electronic book.

FIG. 23 is a logical representation of the components and links for the example first component "Cezzanne" shown in FIG. 20. In FIG. 23, the text block (page) 602' containing the first component Cezzanne 980 is shown linked to components in other electronic files or documents. A first link 981 links Cezzanne 980 to a reference material component 982, which is an encyclopedic entry related to the artist. A second link 983 links Cezzanne 980 to a dictionary entry 984 that includes a pronunciation key for the artist's name. A third link 985 links Cezzanne 980 to an audio clip 986, which provides an audio file describing the artist's life. If the subscriber chooses the audio clip 986, the audio file will immediately begin playing and will be broadcast on a speaker in the viewer 266, or the attached television or the attached personal computer, as applicable. The subscriber can stop the playback by operating the hide active link button 614.

The links described above may also function in two directions. A biography of Cezzanne could include a link to the JPEG file showing PorchScene. The JPEG file PorchScene could be one of several still videos of the artist's work. This JPEG file could be linked to an appropriate section of the Cezzanne biography. Then, if the subscriber were viewing the JPEG file for PorchScene, the subscriber could display the link to the biography and, upon activating the link, have displayed that portion of the biography that discusses PorchScene. In this example, the same link is used to display either the JPEG file or text from the biography. The same hidden table can be used with the two electronic files (i.e., the biography and the JPEG file). Alternately, each electronic file may have its own hidden table. In this alternative, the same link may be referenced in each of the hidden tables.

In the discussion above, each first component is linked to one or more other components. However, the other components (i.e., the second and third components, for example) may also be linked together. In addition, other components linked to one first component may be crossed-linked to other components that are linked to a second first component (identifying secondary or tertiary cross-links). For example, the JPEG file of PorchScene referred to in FIG. 21 may be cross-linked to the audio file-biography shown in FIG. 21. Displaying the JPEG file will result in a cross-link being identified that links the JPEG file to the audio file.

The cross-link may be indicated by highlighting, underlining, outlining, using a bold or an italics typeface, using a different font, and using different color text. If the cross-linked material is selected, that material will then be displayed. In the example described above, the JPEG video file that shows the painting PorchScene can be cross-linked with Cezzanne and its identity would be displayed on the viewer 266. The video file could be displayed full screen or in a picture-in-picture format. The video file could also be displayed on the attached television 259 or the personal computer 261 (see FIG. 2). Finally, the video file could be printed by sending the video data and a print command to a printer 262 attached to the home system 258 or to the personal computer 261.

In the table previously shown, all the links for a number of electronic books were provided in one hidden table. In an alternate arrangement, many hidden tables may be provided. For example, each electronic book may be provided with a hidden table. In this alternative, the many hidden tables could form a relational database of linked material. As an example, several different electronic medical text books could each be provided with its own hidden table. An electronic general medical encyclopedia could also be provided with a hidden table. Terms that are listed in one of the several medical electronic text books could then be linked, in a relational fashion to the electronic medical encyclopedia. The several electronic medical text books could also be relationally linked to each other, to on-line databases and to other electronic files. For example, an electronic medical text book could be electronically linked to electronic books, databases and other electronic files maintained at a medical school's library.

The hidden table (either for many electronic books, or individually for each electronic book) may be provided by the central provider or distributor as an additional feature that is paid for separately from purchasing an electronic book. The distributor may offer many different levels of service, such as only linking material (components) stored on a viewer, only linking material within a particular electronic book, or linking one or more electronic books to electronic files outside the home system 258 (e.g., linking an electronic book to a database maintained by the distributor at an Internet web site).

Downloading the most current links table for an electronic book from the operations center 250 or the Internet web site 279 refreshes the hidden links table, that is, any new links that have been generated by the operations center 250, for example, are added to the hidden links table. The current links table may be downloaded in conjunction with downloading a new electronic book. Alternately, the current links table may be provided periodically by the operations center 250.

As noted above, links within electronic books may be self-contained in nature, where all the material to be linked to is resident within the same electronic book file. Additionally, links may also be provided between material residing on the viewer 266. Also, links may be provided to material that currently resides on the home system 258, if separate from the viewer 266. Finally, links may be provided to material that must be accessed through a communications network. For example, material that is ordered or downloaded from the operations center 250 or the Internet web site 279 may be linked to the electronic book. On screen menus can also be supported on the viewer 266 in the form of electronic book files, serving as a book or product catalog or service catalog that allows the subscriber to link to the operations center 250 or the Internet web site 279 to order additional electronic books or products and services at any time by selecting the desired component from the text.

If the content that is to be linked to is currently not available on the electronic book viewer 266, the viewer 266 may prompt the subscriber to decide whether to: 1) retrieve the corresponding material immediately from the home system 258, the operations center 250, or the Internet web site 279; 2) wait until the next communication opportunity with the home system 258 or operations center 250 to retrieve the material; 3) commence direct outside communications with another communications system (e.g., a telephone in a PSTN); or 4) stop.

In one embodiment, the first components on the viewer 266 are a Table of Contents and List of Figures for a book. Making a selection from the Table of Contents and List of Figures automatically links to and displays the selected page within the electronic book file. In another embodiment, the first components on the viewer 266 may be an Index of an electronic book. Selecting the desired topic and associated page will cause that page to be displayed on the viewer 266. In yet another embodiment, the first component is a footnote or endnote. When the footnote is selected, the viewer 266 provides a display of material that further addresses the reference. In another embodiment, the first component is a word or phrase that has a further definition or clarification associated with it. By selecting the first component, the corresponding dictionary definition, foreign translation, or glossary entry will be displayed on the viewer 266. The dictionary definition or foreign translation may also be provided via an audio file. In this embodiment, electronic books can be bundled with other standard reference material or alternatively, stand-alone reference material like dictionaries or encyclopedias may be accessed from within multiple electronic book files.

In another embodiment, the first component is a reference to another electronic book altogether. By selecting the first component, the selected book is displayed on the viewer 266. In another embodiment, on-screen menu buttons will be displayed on the viewer screen 602 that allow for a quick link to the Table of Contents, Index, glossary, and other key electronic book sections by simply selecting the item on the viewer screen 602 with the cursor 745. In yet another embodiment, the selected first component links the subscriber to a book review or series of book reviews, providing additional information to assist in the decision of selecting a new electronic book. In another embodiment, the selected first component is a book title, chapter title, or text in the body of a book that is linked to an audio file that serves as an audio narration of the selection that is played on the viewer 266. In yet another embodiment, the selected first component links to a video file (JPEG or MPEG) that can be displayed on the viewer screen 602. Another embodiment is a first component that links to textual annotations and notes that have been created by the subscriber.

One embodiment includes first or subsequent components that are electronic book titles that, when selected, links the subscriber to the operations center 250 or the Internet web site 279 to allow for the ordering of the selected book. In a similar embodiment, the selected component consists of a product that, when selected, link the subscriber to the operations center 250 site or an Internet web site to allow for the ordering of the selected product. Lastly, in another embodiment, the selected component is a topic on which there is a link to an Internet-based discussion group that addresses the topic in more detail.

Another embodiment is a link to a world watch live server/site. When a link is provided to link a word or phrase to a foreign language dictionary, the viewer 266 may display a foreign language selection feature. The subscriber may then indicate which language to use when activating the link. For example, an English word or phrase in the electronic book may be linked to a French, Spanish or German dictionary. The subscriber may specify which of these foreign language dictionaries to link to.

IX. Connection to World Watch Live

The viewer 266 may also be used to display live or recorded video. The video may be distributed using a telecommunications system, including delivery using the Internet. Access to video may be provided using links within an electronic book or on an electronic book menu display.

A. Obtaining Video From Remote Sites, Communicating the Video to a Web Site, and Streaming the Video to Users.

Figure 24:
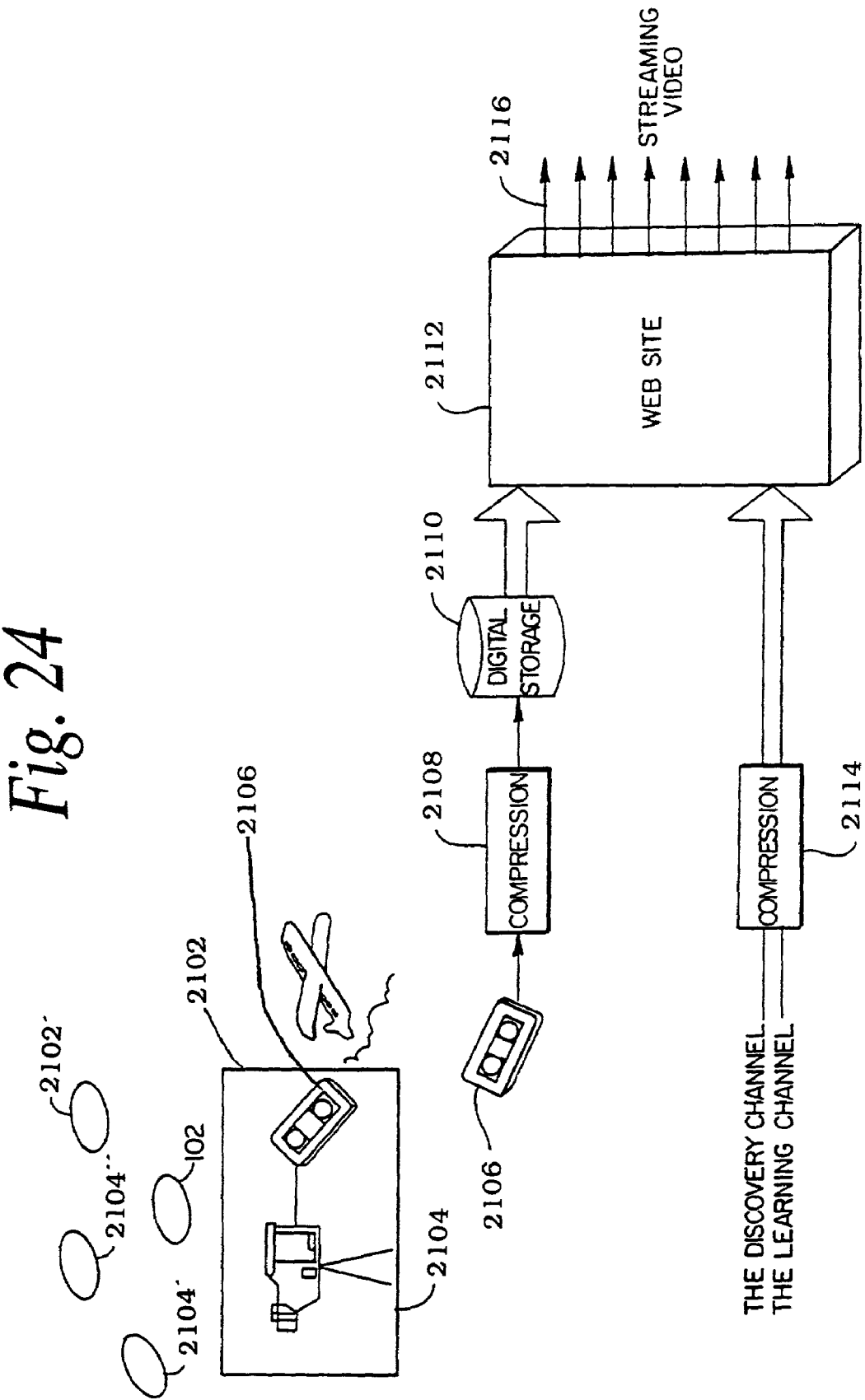
FIG. 24 is a block diagram of an embodiment of the invention where remote video is provided to a web server by videocassette and by ordinary television.

FIG. 24 shows a system that provides video, audio and text data from remote video sources such as videocassettes and television programs. FIG. 24 shows remote sites 2102, remote cameras 2104, videocassette 2106, compression devices 2108, 2114, digital storage device 2110 and web site 2112. As shown in FIG. 24, a video camera 2104 is used to film activity at remote site 2102. As discussed below, numerous video cameras at a single remote site may be used to obtain different views, text, and audio (for example, stereophonic) of the remote site from different angles and orientations. Also, numerous remote sites, each with its own video camera, may used as shown at 2102', 2102" and 2104' and 2104". The video cameras film events at the remote sites, and record the events on videocassette 2106 or other suitable media.

The recorded information is then transported to a web site 2112, or to a site in communication with the web site 2112. As shown in FIG. 24, the recorded information from video tape 2106 is then compressed in compression unit 2108 and stored in digital storage media 2110. Many compression algorithms may be used, such as MPEG-1, MPEG-2 and Wavelet. Compression systems currently available from The Duck Corp, Xing Technology Corp., Indeo, Digital Video Arts, Ltd., VDOnet Corp. and Intel Corp., may be used with the system. The digital storage media may be any known storage device, such as a hard disk, CD ROM, digital video disc (DVD), digital tape, video file server or other media.

The stored and compressed data may then be provided on a number of streamed audio-video outputs 2116 from the web site 2112. This enables many users to access the stored video, text, and audio, and allows for one user to receive numerous audio-video signals, i.e. split the display into numerous "camera" feeds.

In addition to providing streamed audio and video from videocassette, the web site 2112 may provide audio, text, and video from television channels. The television signals are received by a conventional television receiver (not shown in FIG. 24), and digitally compressed by the compression unit 2114 and fed through the web site 2112 to the streamed output. It is not normally necessary to store the television programs in a digital storage unit (such as the storage unit 2110), since the audio, text, and video is constantly incoming and changing. However, certain segments of broadcast television may be stored in a storage device, such as the digital storage unit 2110, for recall by a user.

FIG. 25 shows another system for supplying video, audio and text data, where similar reference numerals indicate items that correspond to the items shown in FIG. 24. The system of FIG. 25 uses remote cameras and a communication network to provide remote video to the web site. FIG. 25 shows remote sites 2102, video cameras 2104, compression unit 2118, data communication network 2120, web site 2130, digital storage unit 2132, and streamed video 2116.

As shown in FIG. 25, the remote sites 2102 are filmed by cameras 2104 (as in FIG. 24). However, in this system, the outputs of the cameras 2104 pass through a compression unit 2118. The compressed audio, text, and video is communicated over the data communication network 2120 to the web site 2130. The data communication network 2120 may be any network currently known to one of ordinary skill in the art, such as land-leased lines, satellite, fiber optic cable, microwave link or any other suitable network. These and other delivery systems are described in more detail in Section VII.

Other suitable networks may be cellular networks or paging networks. In a paging network, the cameras 2104 may be connected to a paging device and/or digital storage media or paging transmitter for communication of the video (including text and still images—as used hereinafter, video refers to moving and still images, and to text data) to the web site 2130.

The following publications, hereby incorporated by reference, disclose relevant systems: PCT Publication No. WO 96/07269, published Mar. 7, 1996 by Jambhekar et al.; PCT Publication No. WO 96/21173, published Jul. 11, 1996 by Harris et al.; PCT Publication No. WO 96/21205, published Jul. 11, 1996 by Harris et al.

The web site 2130 in this example is adapted to receive information from the data communication network 2120. The web site may pass the video from cameras 2104 to users at streamed video outputs 2116. Alternatively, the web site may contain a decompressor to decompress the video prior to streaming it to users, or change the compression scheme of the video to one which is compatible with the connected user. Alternatively, the video may be compressed at the streamed video output and users who connect to the web site 2130 may run decompression software. The web site 2130 may store the audio and video received over data communication network 2120 in digital storage unit 2132 before providing it to the streamed outputs 2116. Alternatively, the audio and video may be directly passed to the streamed outputs 2116.

Figure 26A:
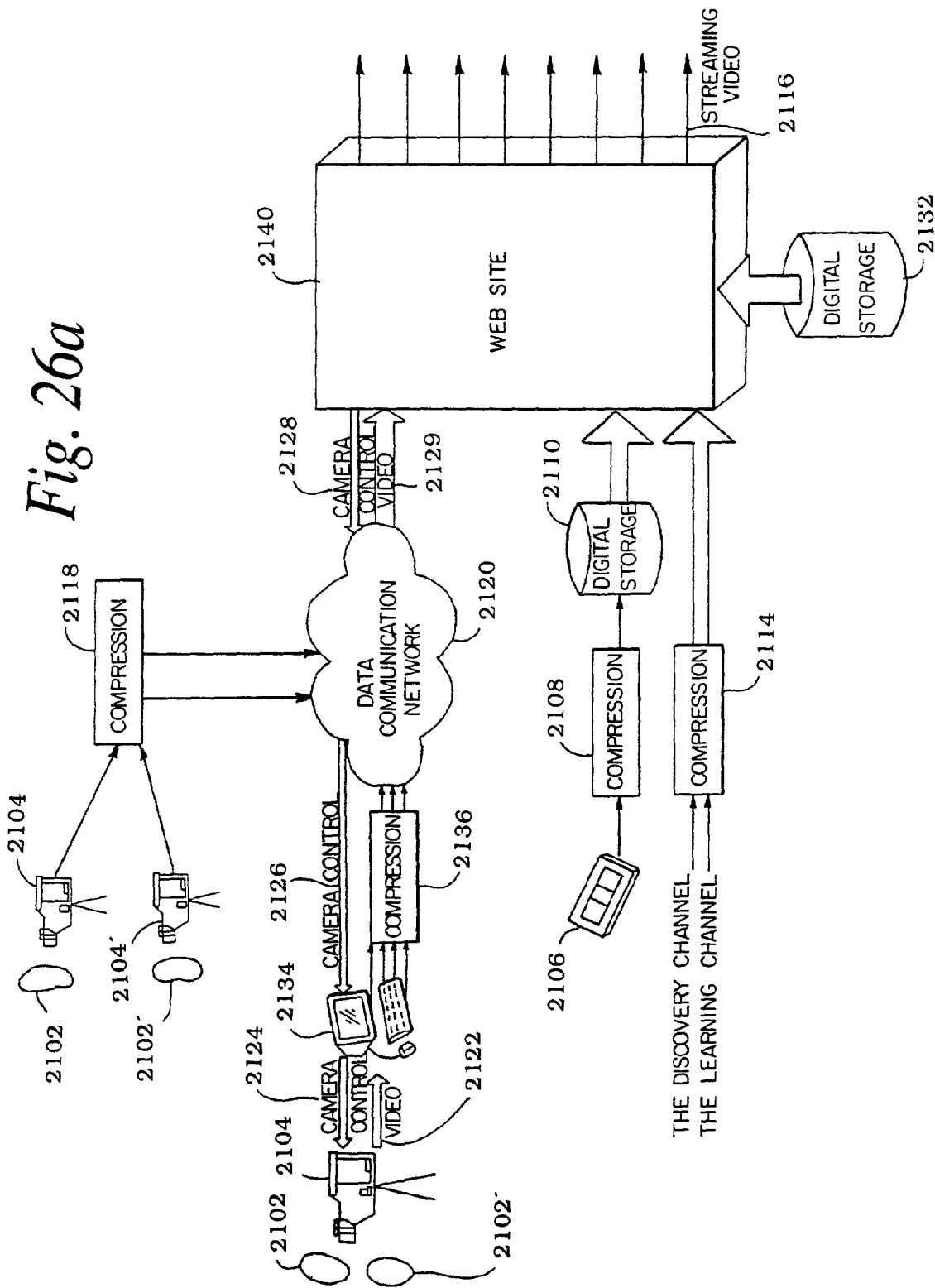
FIGS. 26a and 26b are a block diagrams of an embodiment of the invention using the embodiments of FIGS. 24 and 25 with remotely controllable cameras.

FIG. 26a shows another embodiment of the invention that combines the embodiments of FIGS. 24 and 25 and adds remote camera control. FIG. 26a shows remote sites 2102, cameras 2104, computer 2134, video path 2122, 2129, control path 2124, 2126, 2128, compressors 2108, 2114, 2118, 2136 data communication network 2120, web site 2140, digital storage means 2132, and streamed video 2116. As with FIGS. 24 and 25, remote sites 2102 are filmed by the cameras 2104. As with FIG. 24, the web site 2140 is able to receive data from the video tape 2106, compress the audio and video in the compression unit 2108, and store the compressed audio and video in the digital storage unit 2110. Audio and video from television stations may also be compressed by the compression unit 2114 and stored or passed as streamed video 2116, as in FIG. 24.

Likewise, the cameras 2104 may be connected to the compression unit 2118 (as in FIG. 25) and communicate compressed audio and video to the web site 2140 via the data communication network 2120. Thus the functions performed by the systems shown in FIGS. 24 and 25 may be combined in a variety of manners at the single web site 2140.

Figure 26B:
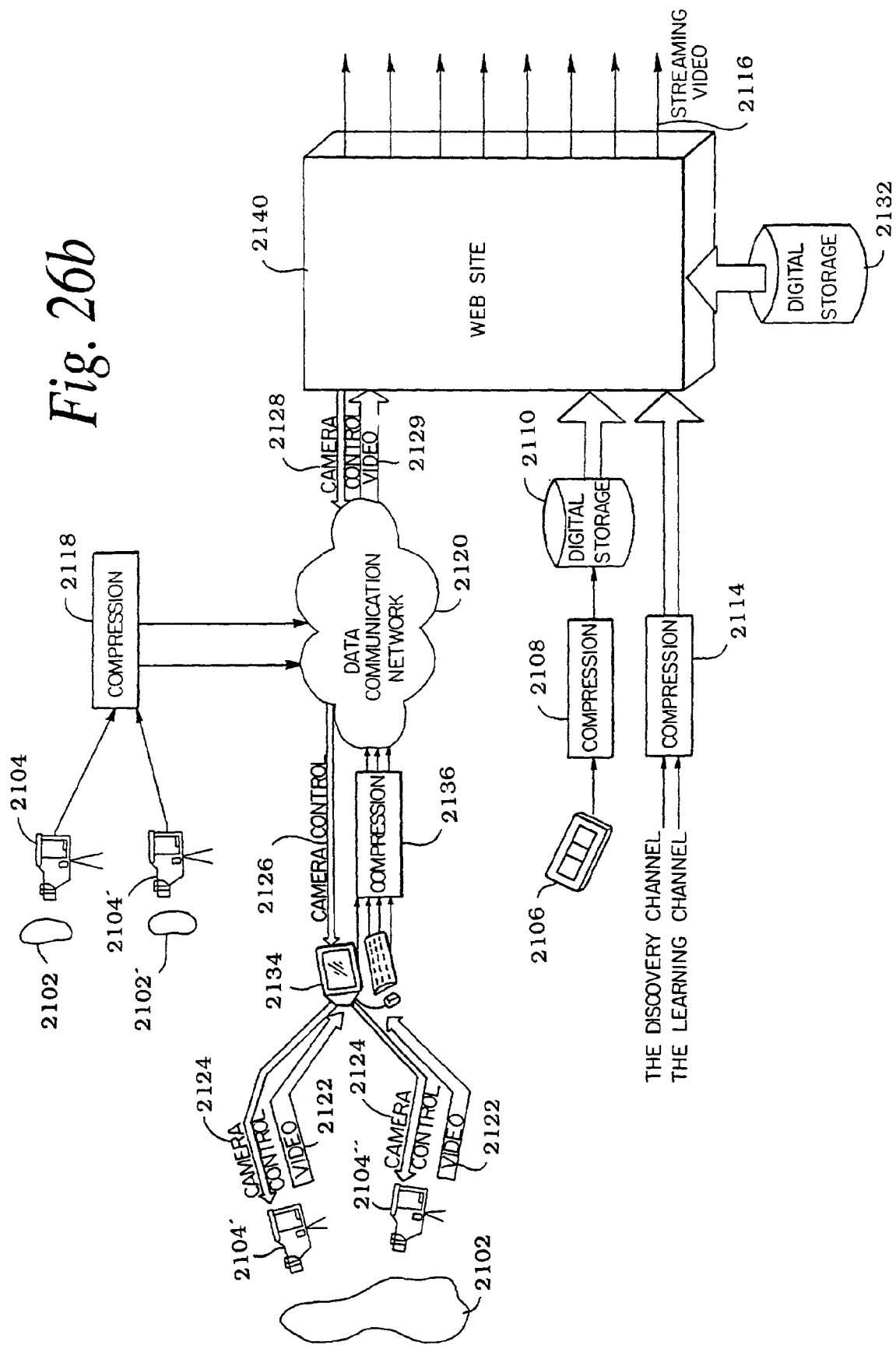

FIGS. 26a and 26b add the additional feature of camera control to the previously described systems. As shown in FIG. 26a, the computer 2134 is connected to the remote cameras 2104. The computer is able to control a mechanical or electrical device on the cameras 2104, to alter the cameras' orientation (including position and/or angle). Audio and video from the camera 2104 passes to the computer 2134. The video may be processed and stored in the computer. As shown in FIG. 26b, the computer may be connected to multiple remote cameras 2104' and 2104" so that multiple users may each control a camera. The computer 2134 may either contain a compressor or be connected to an external compression unit 2136. The video from cameras 2104' and 2104" is compressed and provided to data communications network 2120. This compressed video is subsequently received by the web site 2140. The remote cameras 2104', 2104" (FIG. 26b) may be controlled by control signals passed from the computer 2134 on the path 2124. The control signals are received by the computer 2134 from the data communications network 2120 over the camera control path 2126. The web site 2140 provides the control information to the data communications network 2120 over path 2128. The web site 2140 in this system is adapted to pass control signals to the cameras 2104 and to store video images in the digital storage unit 2132. The web site 2140 provides a number of streamed video outputs 2116.

The system shown in FIG. 26a allows remote users to control the angle or orientation of cameras 2104', 2104". Users are connected to the web site 2140 and receive the streamed video 2116 from the cameras 2104', 2104". If the users wish to move the cameras 2104', 2104" to the right, they may enter a user command (such as "pan right") at their terminal. The terminal may be an electronic book home system 258, a personal data apparatus (PDA) or a personal computer, for example. The command is received by the web site 2140, and formatted, if necessary. The command is outputted to the data communication network 2120 as a control signal through the camera control path 2128. The computer 2134 receives the camera control signals from the communication network 2120 over the camera control path 2126. The remote computer 2134 may be adapted to control multiple cameras at multiple locations 2102, or multiple cameras at the same location 2102.

When using the home system 258 to connect to a world watch live web site, the user may enter commands using the viewer 266. In this embodiment, the viewer 266 may display command options in a "soft key" format. The user initiates a command through use of a touch screen device or a pointing device such as a track ball, for example. The user interface aspects of the viewer 266 will be described later in more detail. The home system 258 and the viewer 266 may be adapted to display data from the world watch live web site 2140 by the addition of software routines. The software routines may be contained on a computer-readable medium, such as a floppy disk, for example. Alternatively, the software routines may be downloaded to the home system 258 and the viewer 266 over the Internet from the web site 2140.

The computer 2134 is connected to the remote camera 2104 by a camera control path 2124. This path allows control commands from the computer to travel to the cameras 2104', 2104" and control the cameras 2104', 2104". The cameras 2104', 2104" may have computer-controlled swivel motors (not shown) for panning left and right, may have a computer-controlled pivot motor (not shown) for panning up and down, and may have a computer-controlled motor (not shown) for moving a zoom lens. These motors are known to the artisan and are currently available. A number of cameras may be provided at a single site to allow multiple users to have camera control at the same time.

This system of obtaining and/or storing video at a web site is extremely flexible. The system allows for perceived camera control by multiple cameras, actual camera control of one or more cameras, perceived camera control via a wide-angle lens on a single camera, and for the generation of comprehensive interactive programs.

B. Perceived Camera Control with Multiple Cameras

Figure 28A:
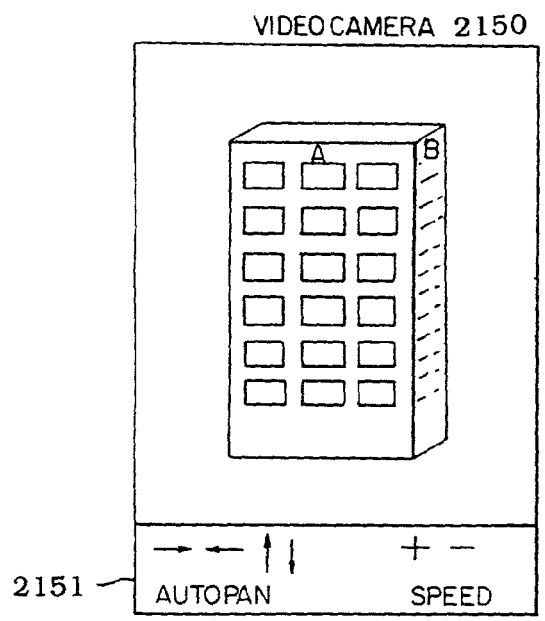
FIGS. 28a-28d show video images from specific cameras shown in FIG. 27.
Figure 28B:
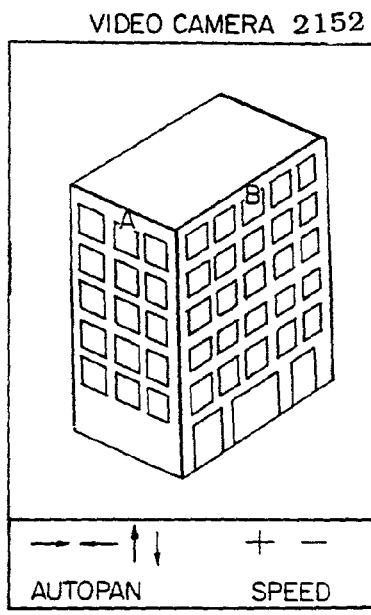
Figure 28C:
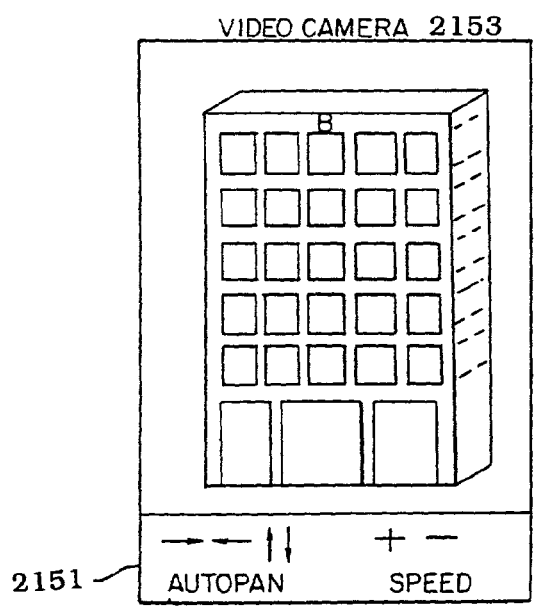
Figure 28D:
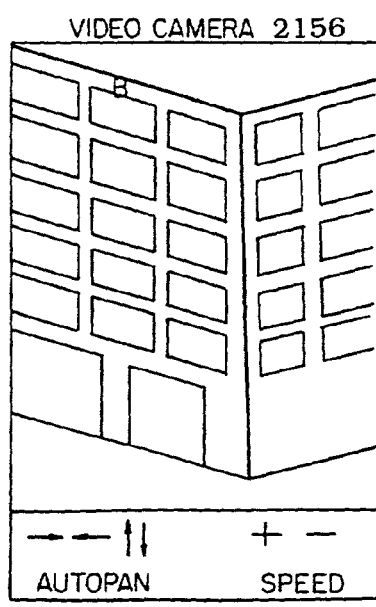
Figure 29:
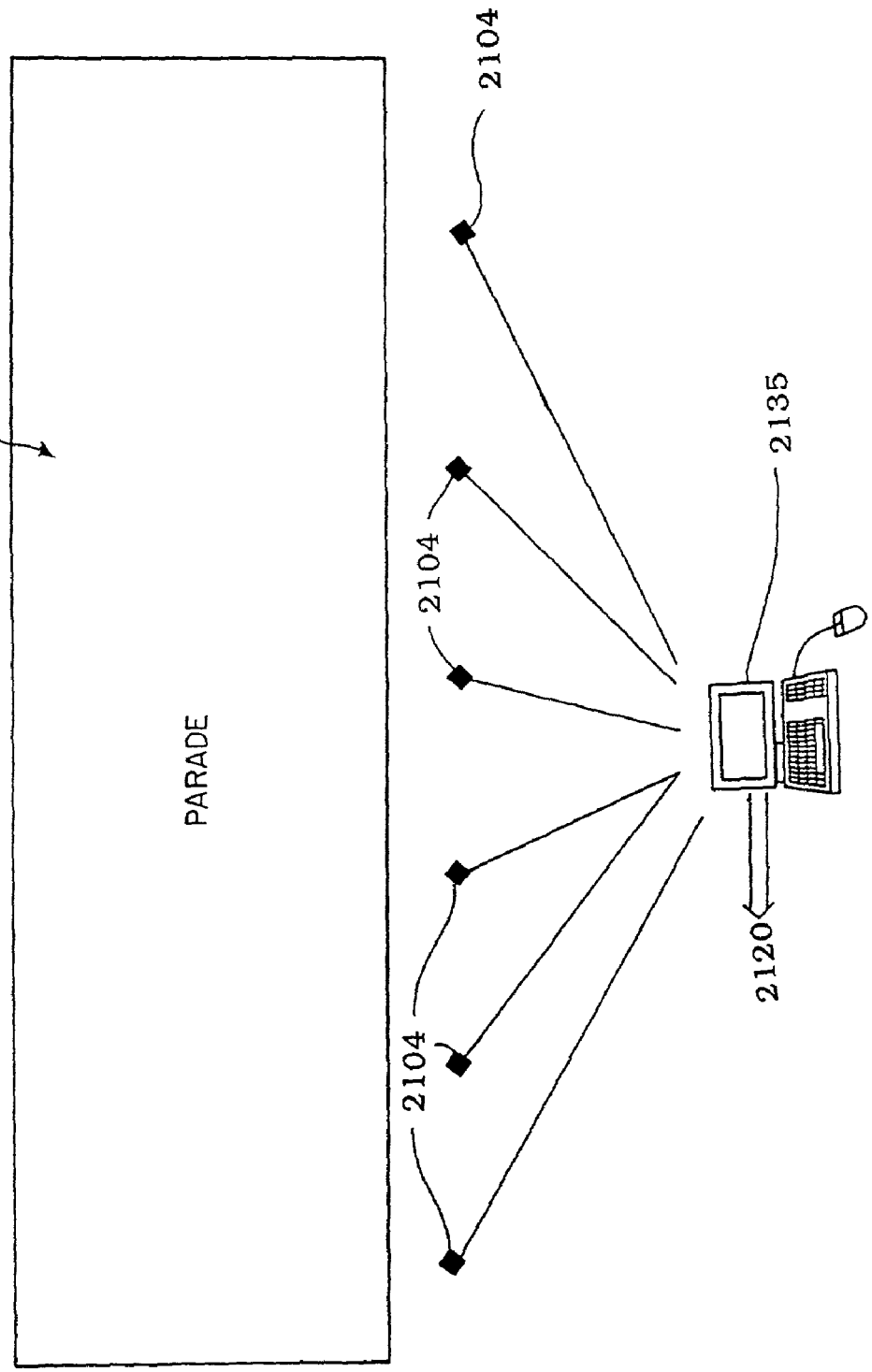
FIG. 29 shows remote cameras deployed to follow a parade route.

In an alternative system, shown more clearly in FIGS. 27-29, users are given the perception of camera control. To achieve this, a plurality of fixed cameras 2104, 2150, 2152, 2153, 2154, 2156, 2158, 2160, 2162 (FIG. 27) are disposed around a remote site 2102. In accordance with this embodiment, it appears to users that they are controlling the angle or position of a camera when in actuality they are merely being transferred to the video output of a different camera. FIGS. 27-29 show this concept in greater detail.

As shown in FIG. 27, a building 2146 is being prepared for demolition. Disposed around the building 2146 are cameras 2104, 2150, 2152, 2153, 2154, 2156, 2158, 2160, 2162, connected to a computer 2135. The computer 2135 is connected to a communication network 2120 (not shown). The video from cameras 2104, 2150, 2152, 2153, 2154, 2156, 2158, 2160, 2162 is digitized and preferably compressed prior to communication over network 2120, either by compressors connected to the cameras (not shown) or by a compressor connected to the computer 2135 (not shown). The cameras may be digital cameras or analog cameras connected to an analog-to-digital converter.

The cameras specifically identified around the periphery are cameras 2150, 2152, 2153, 2154, 2156, 2158, 2160, and 2162. For reference, the building contains the letter "A" and the letter "B" on two sides as shown at 2144 and 2148 in FIGS. 27 and 28a-28d. A number of additional cameras 2104 are disposed about the periphery of the building in a circular pattern. The pattern and number of cameras are not critical, but will control how the user perceives movement of the "camera".

Referring to FIG. 27, a video camera 2150 faces side A, a video camera 2152 is between sides A and B, a video camera 2153 faces side B and a video camera 2154 is between side B and the side opposite side A. The video cameras 2156, 2158, 2160 and 2162 are disposed closer to the building, as shown. All the video cameras contain audio pickups (preferably stereo). Additionally, all the video cameras are connected to a computer 2135 which outputs compressed audiovisual signals to the communication network 2120 and consequently to the web site. The system shown in FIG. 27 may be implemented by the systems shown in either FIG. 25 or FIGS. 26a and 26b. Any number of users in communication with the web site 2130, 2140 may receive the audio and video from these cameras.

FIG. 28a shows a typical screen view 2150 of the video presented on the viewer 266 to remote users who are connected to the web site of the present invention. As shown, the user is observing live video from camera 2150, which provides a view of the building on side A. A "toolbar" of commands 2151 is presented to the user, including a pan left command "←", a pan right command "→", a pan up command "↑" and a pan down command "↓". An "autopan" command is used in conjunction with another command (such as pan right). The "autopan" command is used to automatically move the picture position in the direction previously entered. For example, if "autopan" is entered after "pan right," then the picture will keep panning right until another key is pressed or a default key (such as the ESCape key) is pressed. The speed of the "autopan" function is controlled by the "speed" command, which is used in conjunction with the "+" and "−" commands. Additionally, the "+" and "−" commands, when used alone, control a "zoom-in" and "zoom-out" function, respectively. The "toolbar" commands are selected via a user input device, which may be a touch sensitive screen, a keyboard, mouse, trackball, and a remote control.

When any user wishes to switch from the view of the camera 2150 (FIG. 28a) and pan to the right, the user initiates a pan right command "→", which is transmitted to the web site 2130, 2140 (FIGS. 25 and 26a and 26b). The web site receives the command, and in response, causes the video from the camera positioned to the right of the camera 2150, in this case the video camera 2152 (FIG. 27) to be transmitted to the user. The user then observes the picture appearing in FIG. 28b, which appears to be a view to the right from the previous position (camera 2150). If the user continues to pan right, the user is presented with the FIG. 28c view, received from the camera 2153. The user may continue to pan right all away around the building in this manner.

Additionally the user has special functions available, such as "autopan" and "zoom." For example, "autopan" in conjunction with "pan right" would cause the view of the building to rotate, at a speed dictated by the "speed" function and the "+" and "−" keys. Using the "+" and "−" keys alone causes the view to change to a closer camera ("+") or a camera further away ("−"). As shown in FIG. 27, the cameras 2156, 2158, 2160 and 2162 are disposed closer to the building than cameras 2150, 2152, 2153 and 2154. A "magnified" image, obtained from the camera 2156, is shown in FIG. 28d. If no cameras are disposed closer or further away, digital image processing may be used to digitally increase or reduce the size of the image. The software which controls these functions may be disposed either at the web server or on the user's computer.

Thus, users may obtain different views of the building 2146 as if they were remotely controlling the positioning of a single remote camera. The users may observe the demolition of the building from many exciting perspectives. This "perceived" camera control is advantageous because it allows any number of users to "control" a camera. A single camera which is remotely controllable is only controllable by a single user. Thus, the present invention is suitable for large audiences. The realism of this perceived control is directly dependent upon the number of cameras and their distances from the viewed object.

Therefore, when the building 2146 is demolished, any number of users may pan around the building in real time as if they were actually present at the site. When the building is demolished, the video cameras pickup, preferably in stereo, the sounds of the demolition. Users who have loudspeakers connected to their computer may experience the demolition almost as if they were present.

FIG. 29 shows a deployment of a number of cameras 2104 which are arranged in a linear fashion around a point of interest, each camera connected to computer 2135 as in FIG. 27. As with FIGS. 27 and 28a and 28b, this embodiment uses "perceived" camera control which may be achieved by the systems shown in FIGS. 25, 26a and 26b. In this example, the remote location and point of interest is a parade, such as a New Year's Day Parade. With the camera deployment shown, a user may traverse the length of the parade without actually being present. Users may view whichever part of the parade they are interested in, for as long as they desire, without worry that they have missed an interesting band or float. In this example, the camera deployment merely follows the parade route. Parents who have children in a band or float may search for the child and follow the child throughout the parade route, rather than having to monitor every moment of the parade on television in the hopes that the child will pass the reviewing camera when the parents are watching. The parents merely "move" from different cameras along the parade route as their children progress in the parade.

C. Actual Camera Control of Single/Multiple Cameras

Figure 30A:
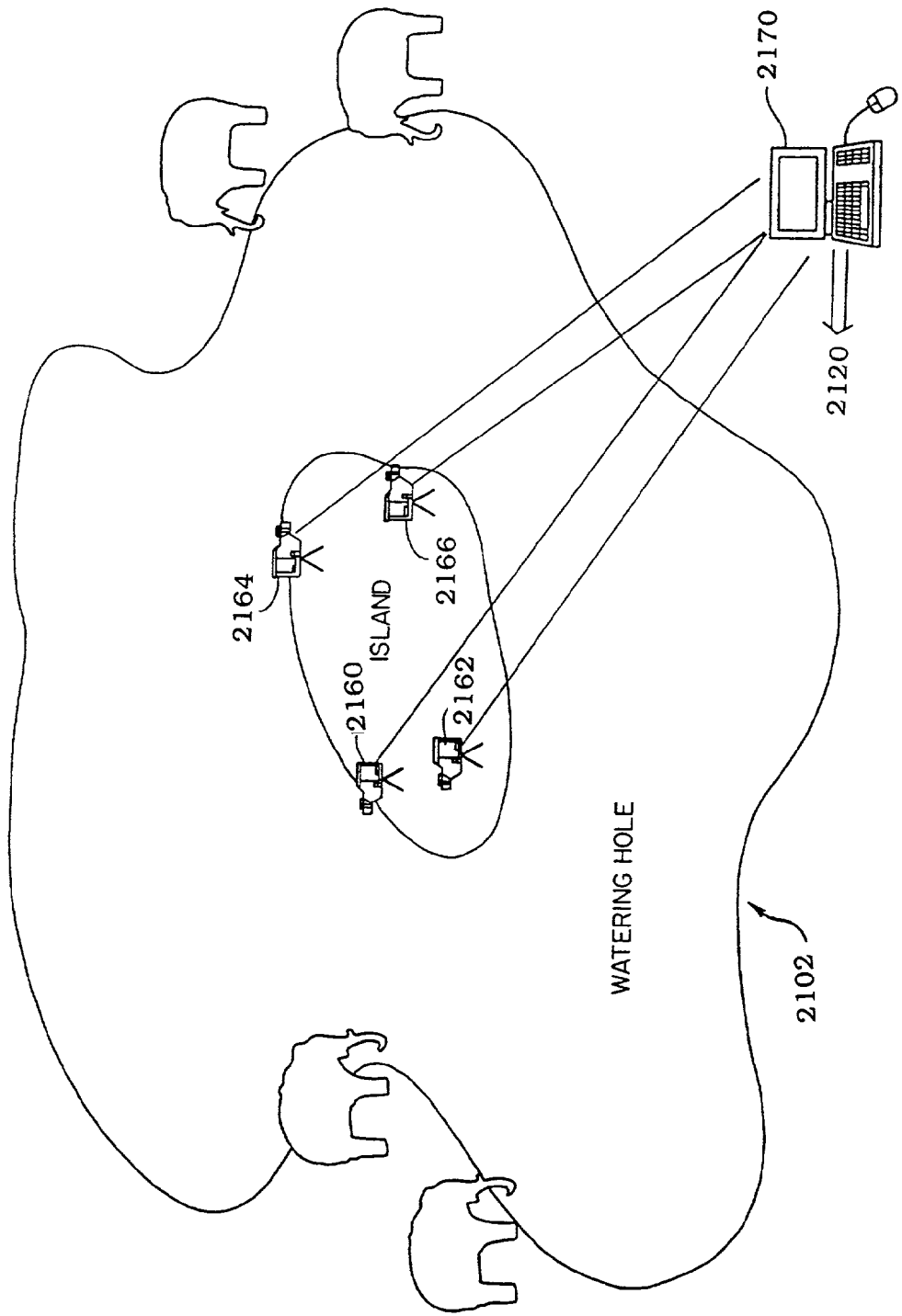
FIGS. 30a and 30b show remotely controlled cameras at a remote location.
Figure 30B:
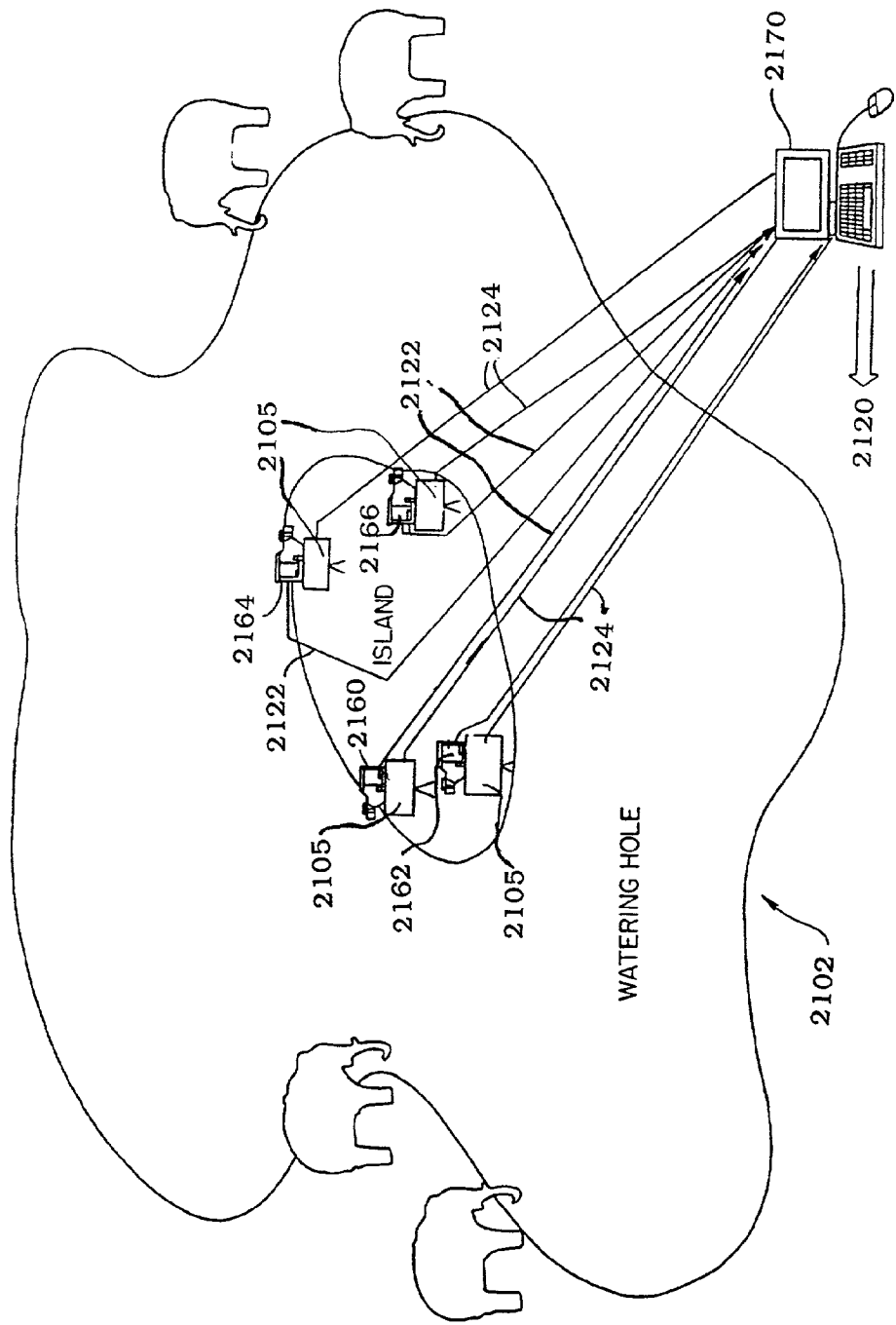

FIGS. 30a and 30b show another system, where a number of cameras 2160, 2162, 2164, 2166, are provided. These cameras are in direct communication with and are controlled by computer 2170. Although it is possible to form a ring of cameras to perform "perceived" camera control (as in FIGS. 27-29), the embodiment shown uses four cameras 2160, 2162, 2164, 2166 which contain motors 2105 (FIG. 30b) for controlling the camera's positioning. The motors are controlled by computer 2170. Either a single computer 2170 or a number of computers 2170 may be used. The remote location and point of interest shown in FIGS. 30a and 30b are, for example, a watering hole or desert oasis. Users who access the web site 2140 are able to observe live video of wildlife behavior at the watering hole. The cameras 2160, 2162, 2164, 2166 are disposed at an island in the middle of the watering hole. The toolbar 2151 of FIG. 28a is also used in this embodiment and enables users to choose camera control commands to spin the cameras around or perform other camera functions, such as zoom. Users are therefore able to receive different views and angles, and observe the entire watering hole.

FIG. 30b shows the control and video paths of the FIG. 30a system combined with system shown in FIGS. 26a and 26b. The video from cameras 2160, 2162, 2164, 2166 is communicated to computer 2170, in compressed or uncompressed form on path 2122. The computer 2170 communicates the video to communications network 2120 for reception by the web site 2140 (FIGS. 26a, 26b). Preferably the video is digitized and compressed by either the cameras 2160, 2162, 2164, 2166, the computer 2170, or an external analog-to-digital converter (not shown) and compressor 2136 (FIGS. 26a, 26b) prior to transfer to the communications network 2120.

Camera control commands are received by the computer 2170 on control line 2126, as shown in FIGS. 26a, 26b and 30b. The commands are formatted, if necessary, by computer 2170 and transferred to control units 2105 attached to cameras 2160, 2162, 2164, 2166. The control units 2105 are connected to spin, zoom, or otherwise control the cameras as directed by the user.

Communications links 2124 and 2122 may be wired, wireless, digital or analog, and computer 2170 may be located nearby or remote from the site 2102.

The system of FIGS. 30a and 30b are unlike the systems shown in FIGS. 27-29, because each user is assigned a remote camera in the FIG. 50a, 50b embodiment. Since each user must be assigned their own controllable camera, users will have to contend for available cameras. The number of controllable cameras may range from a single camera to any number, and is preferably statistically determined to correlate to the average number of users who access the web server 2140 at any given time or at peak times. The number of cameras may be reduced by using known systems which utilize queuing, reservations, and time limits.

D. Perceived Camera Control Using a Single Camera and a Wide-Angle Lens

Figure 31A:
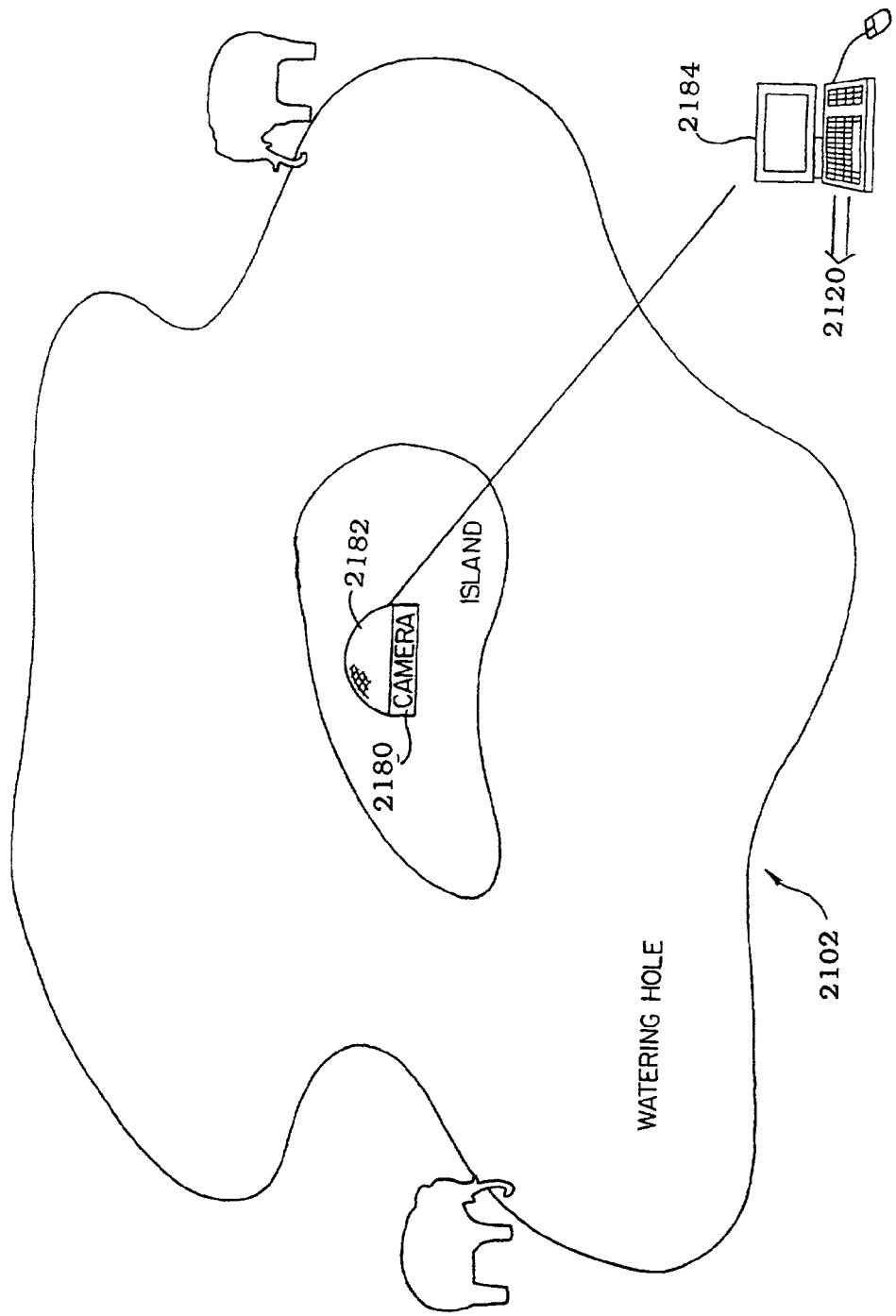
FIGS. 31a and 31b show a single remote camera at a remote location, where the camera has a 180 degree spherical (or other wide angle) lens.
Figure 31B:
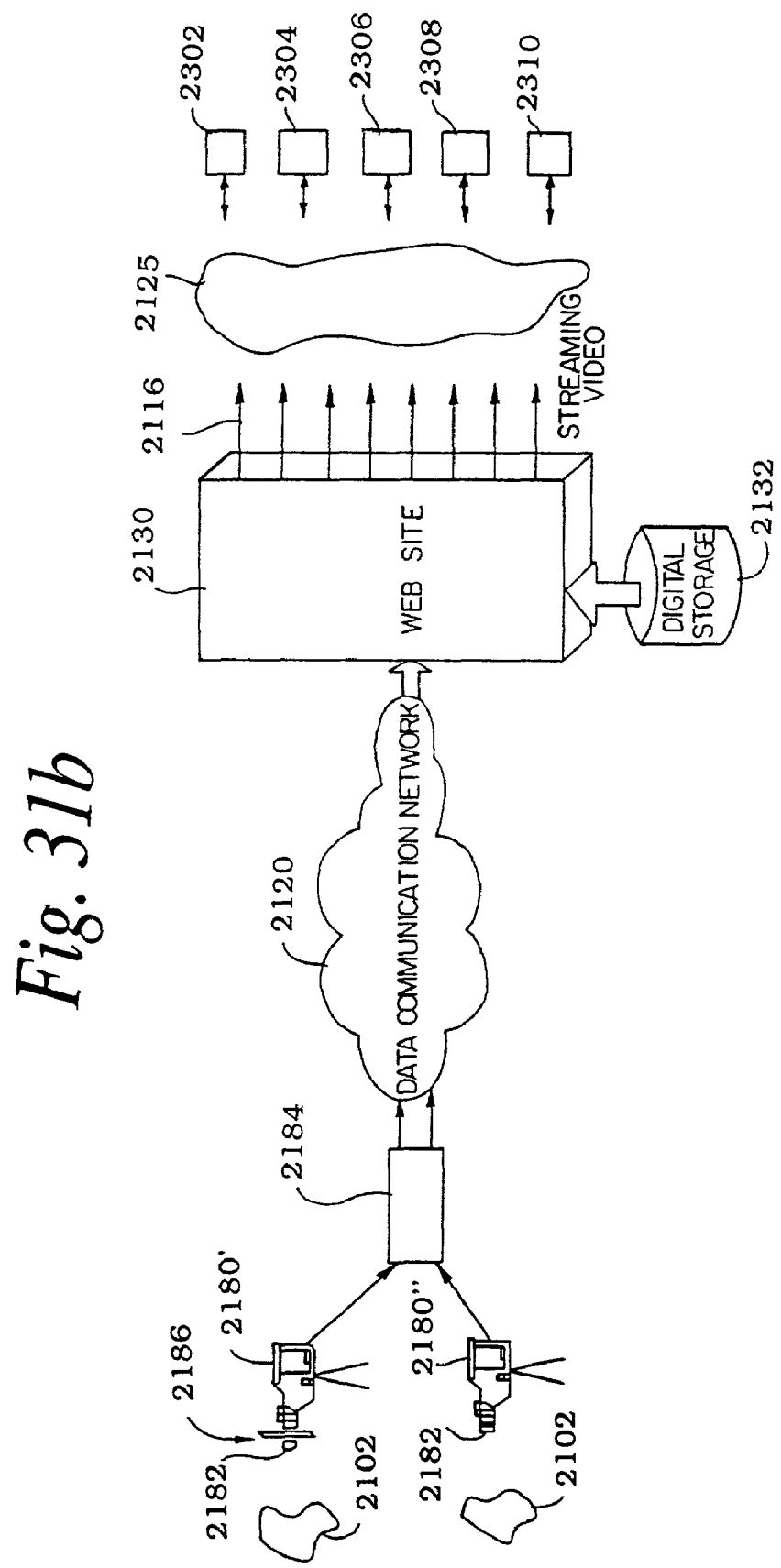

FIGS. 31a and 31b show another embodiment, using only a single camera, where an unlimited number of users may view any portion of the remote site 2102. This embodiment uses a spherical lens 2182 in optical communication with the camera 2180. The remote site 2102 shown in FIG. 31a is a remote watering hole or oasis as in FIGS. 30a and 30b.

As shown in FIG. 31a, a camera 2180 has a spherical (or other wide angle) lens 2182, which provides a 180°, spherical or other wide-angle view. This view, which is communicated to a computer 2184, contains distortion. The computer 2184 communicates and compresses the distorted video back to the web site 2130 or 2140 which stores and may process the image. Rather than using the computer 2184, a simple transmitter may be used to convey the entire spherical video to the web site 2130, 2140 (FIGS. 25 and 26a and 26b). By using appropriate image processing software, the web site removes the barrel distortion and stores data relating to the entire spherical view. Users may then access different portions of the 180° sphere. In this embodiment, the toolbar 2151 of FIG. 28a is also used. By using the toolbar 2151, users may move across the spherical view and obtain the "perception" of camera control. This embodiment is advantageous in that it can provide the perception of camera control to any number of users simultaneously using only one remote camera.

FIG. 31b shows alternative embodiments of the system shown in FIG. 31a. As shown in FIG. 31b, the spherical (or other wide angle) lens 2182 is used with video camera 180", which conveys video information to computer 2184. Computer 2184 communicates the video over communications network 2120 to the web site 2130. The web site 2130 may store or process the received video, and make the video available to users at user terminals 2302, 2304, 2306, 2308, 2310 by communicating the video over communication network 2125. Communication network 2125 is explained in more depth below with respect to FIG. 33.

Because wide angle lenses generate distortion, processing is conducted on the distorted image to remove the distortion from a segment of the image. This processing may be performed at the computer 2184, or the web site 2130. Alternatively, the processing may be performed at the user terminals 2302, 2304, 2306, 2308, 2310.

Thus, the web site 2130 has available wide angle video for sending to users. Users display and view only a segment of the wide angle video at a time. Then, by using toolbar 2151 (FIG. 28a), the user may select adjacent segments of the video for view. When a user selects an adjacent segment of the video for display, the adjacent segment is processed to remove distortion and then displayed. Displaying the adjacent segment gives the appearance that the camera was physically "moved" to the adjacent side of the original segment.

One system for electronically removing the distortion from a segment of an image obtained from a fish-eye lens is disclosed in U.S. Pat. No. 5,185,667, issued Feb. 9, 1993 to Zimmerman, incorporated herein by reference Zimmerman's apparatus uses the following hardware for processing a captured and digitized image: a microcomputer connected to a remote control, computer control, X-Map and Y-Map; an input image buffer connected to the X-Map and Y-Map with an output connected to an image filter and an output image buffer. This hardware, for example, or any other suitable hardware, may be placed at the computer 2184, or the web site 2130, but is preferably located at the user terminals 2302, 2304, 2306, 2308, 2310.

Alternatively, the specialized hardware is removed and the hardware functionality is implemented in software at the computer 2184 or web site 2130, but preferably the software is loaded into the user terminal 2302, 2304, 2306, 2308, 2310. Thus, in accordance with the present invention a spherical (or other wide-angle) image is supplied to the user's terminal, which executes appropriate software (which may be a "plug-in" for a browser application program) for displaying a segment of the image (or video) without distortion. Additionally, the distorted spherical image (or video) may be saved to a storage medium, either at the user's terminal or at the web site, for future loading and viewing.

FIG. 31b also shows how to remove the lens distortion without special processing. As shown in FIG. 31b, a spherical (or other wide angle) lens 2182 is in optical communication with a video camera 2180'. However, a nonlinear imaging sensor 2186 is placed between the spherical lens 2182 and the video camera 2180'. The imaging sensor is designed to provide a distorted output which cancels out the distortion of the spherical lens 2182, and thus an undistorted wide-angle image is provided to video camera 2180'. Alternatively, imaging sensor 2186 may itself provide a digital output, making it unnecessary to use a camera 2180'. In this case, the imaging sensor 2186 would be directly connected to computer 2184.

Examples of imaging sensors 2186 are disclosed in U.S. Pat. No. 5,489,940, issued on Feb. 6, 1996 to Richardson et al., and in PCT publication WO 96/12862, published Jun. 13, 1996 to Richardson et al., each incorporated herein by reference. Other suitable imaging sensors may be used with the present invention.

The image obtained by the imaging sensor 2186 may be undistorted and not require further processing. A segment of the image may then be selected for display by simply passing the image data to a display device. If the imaging sensor is imperfect, further processing may occur to correct for defects in the sensor. Additionally, further processing for "zoom" and "unzoom" functions may occur. This further processing may take place at the web site 2130 or at the user's terminal 2302, 2304, 2306, 2308, 2310.

The embodiments of FIGS. 48a through 51b may be used in conjunction with either live audio and video or prerecorded video data (with audio) (shown in FIGS. 24-26b). For example, if nothing interesting is happening at the watering hole, a connected user may access a stored audio and video clip of a lion attack which occurred the day before. If "perceived" camera control is utilized, the stored audio and video preferably includes all camera angles (or a wide-angle view), such that the ability to pan and zoom is preserved.

E. Web Site Configuration

FIGS. 52a and 52b show a more detailed view of the web site, listed as web site 2140 (FIG. 28a), but which may also correspond to web sites 2112 (FIG. 24) and 2130 (FIG. 25). The web site 2140 is connected to a data communication network 2120, the Internet 2242, and direct connections 2244. The web site contains transmission equipment 2210, receive equipment 2220, 2220', two compression units 2108, 2114, a web server 2200, a router 2230, and communication equipment 2240. The web server 2200 itself contains a digital matrix switch 2250, a plurality of digital video servers 2252, 2252', 2252'', 2252''', a firewall access control unit 2254, a database server 2256, an audio and video storage unit 2258, a data storage unit 2260, an administrative unit 2262, a digital matrix switch 2264, a camera control unit 2268 and a digital video matrix switch 2270.

The web site 2140 is connected to the data communication network 2120 by transmission equipment 2210 and receive equipment 2220. As shown, multiple receivers 2220, 2220' may be used. Also, as shown, the receivers may have more than one video output. Audio and video signals may also be input to the web server 2200 by videocassette (or other suitable recorded media) or simply by feeding in television programming. As with FIGS. 24 and 26a, these signals are preferably compressed by compression units 2108, 2114. On the opposite side, the web server 2200 is connected to remote users by a router 2230 and communication equipment 2240, which in turn are connected to the Internet 2242 or directly connected 2244 to users. The communications equipment 2240 outputs the video streams 2116 through a number of input/output ports.

As previously stated, the web server 2200 contains a digital matrix switch 2250, a plurality of digital video servers 2252, 2252', 2252'', 2252''', a firewall access control unit 2254, a database server 2256, an audio and video storage unit 2258, a data storage unit 2260, an administrative unit 2262, a digital matrix switch 2264, a camera control unit 2268 and a video matrix switch 2270.

The digital matrix switch 2250 receives all incoming compressed video signals from the receivers 2220, 2220' and the compressor units 2108, 2114. The matrix switch 2250 also receives compressed video data from database server 2256. Under control of the administrative unit 2262, the digital matrix switch 2250 outputs the input compressed video signals to digital video servers 2252, 2252', 2252'', 2252'''. In this manner, any input signal can be transferred to any video server as directed by the admin unit. Also, stored programming from the database server 2256 is routed to the digital matrix switch 2250 to be switched as if it were incoming live video. The outputs of the digital matrix switch 2250 also connect to the database server 2256, so that anything at the inputs, such as incoming live audio and video, can be stored in the database server 2256.

The compressed input video is passed into various digital video servers 2252, 2252', 2252", 2252''' for formatting. Users who connect to web server 2200 preferably run their own decompression software so that the no decompression need occur at the web server 2200. As an alternative, the digital video servers may decompress the input video.

The audio and video from the video servers 2252 are passed through a second digital (video) matrix switch 2270. Since switching has already occurred at the digital matrix switch 2250, the second video matrix switch 2270 is not required, but is desired for maximum flexibility. It is also optimal where the number of users exceeds the number of video inputs, as one input may be channeled to numerous connected users.

The matrix switch 2270 may contain a processor that joins different frames of video and audio such that each output contains frames for multiple video pictures (including audio). This enables users to receive split screen images of video and select an audio track for playback (see FIG. 37, discussed below). The split-screen images may be formed by using known methods, which may differ depending on the type of compression used. For example, digital images may be decompressed, combined with other decompressed images, and then re-compressed; or the images may be decompressed and converted to analog, combined, and then converted to digital and compressed for transmission.

The signals switched by the video matrix switch 2270 are preferably digital. This is because the communicated video streams 2116 are preferably digital. It is preferred to process all the signals in the web server in the digital domain to improve simplicity and maintain maximum flexibility.

The various streams of video output from the video matrix switch 2270 are passed to the firewall access control unit 2254 for output to the router 2230 and the communication equipment 2240.

Using this system, any user may receive any signal present at any input, including stored signals within audio and video database 2258 or data storage unit 2260. Additionally, any compressed digital signal present at the input to digital matrix switch 2250 may be stored in the audio and video storage unit 2258 or data storage unit 2260. This is advantageous in the perceived camera control embodiment (FIGS. 27-31b) where the web server 2200 must output a different video picture to the user upon user request. When the user request is received by the web server 2200, the administrative unit 2262 directs the matrix switches 2250 and 2270 to output the correct video stream to the user. If the user is requesting stored video, the administrative unit directs the database server 2256 to provide the video to digital matrix switch 2250. If graphics or textual data are required, the administrative unit 2262 directs the database server 2256 to output the text or graphics to digital matrix switch 2264.

Although shown as one functional box, the database server 2256 may be implemented by using several servers and/or multiport servers. The audio and video storage unit 2258 and data storage unit 2260 may be implemented by using many storage media of different types, such as optical storage devices (i.e. CD-ROM), magnetic disks, magnetic tape, or memory circuits (i.e. RAM/ROM). The number of units depends on the amount of stored data, the number of users, and the desired output speed. The database server 2256 may be one or multiple units. The audio and video storage unit 2258 stores (preferably compressed) audio and video presentations, including all relevant camera angles. The video servers 2252 may also be implemented as one or more servers and/or multiport servers.

The data storage unit 2260 is used to store information relating to audiovisual displays. This information relates to the menu structure and screen displays communicated to connected users. The stored information may also relate to specifically to the audio and video which is currently being displayed and heard. For example, in the demolition embodiment of FIG. 28a, a user may click on a "more info" icon, to obtain information on demolition. Such information, which could include statistics on dynamite, for example, would be stored as text or graphics in data storage unit 2260. The "more info" command would be transmitted to the communications equipment 2240, pass through the router 2230, and the firewall access control 2254 to administrative unit 2262. The administrative unit 2262 then directs the database server 2256 to recall the relevant information, such as statistics on dynamite, from data storage device 2260 and pass the information to digital matrix switch 2264. The recalled information is then passed to the firewall access control unit 2254, the router 2230, and the communication equipment 2240 for transmission to the proper subscriber. The data may be combined with audio and video in the firewall access control unit 2254, or be a separate transmission.

In the perceived camera control embodiment, the communication equipment 2240 forwards the user's command (such as "pan right") to the router 2230, which detects the command and forwards it to the firewall access control unit 2254, which passes it to the administrative unit 2262. The administrative unit 2262 controls the video being fed to each connected user. The administrative unit 2262 also responds to user commands by instructing either the matrix switch 2250 or the matrix switch 2270 to pass a different audiovisual signal from another source (i.e. camera, for example, the camera to the right of the present camera) to the connected user. If the user is receiving a stored image from database 2258, the administrative unit instructs the database server 2256 to recall the appropriate video signal.

In the actual camera control embodiment (shown in FIGS. 26a and 30a), commands from the user (such as "pan right") are received by the communication equipment 2240 and forwarded to the router 2230. The commands enter the web server 2200 via the firewall access control unit 2254, and are passed to the administrative unit 2262. The commands may be stored in the administrative unit 2262 or passed to the database server 2256. Either way, the commands pass through the camera control unit 2268 which formats the commands as necessary for remote camera control. The formatted commands are passed to the transmission unit 2210. The transmission unit 2210 provides the commands to data communication network 2120 for reception at remote cameras and CPU 134 (FIG. 26a).

In the system with the spherical (or other wide angle) lens (shown in FIGS. 31a and 31b), where the remote camera uses a spherical lens 2182, the administrative unit 2262 determines which segment or quadrant of the audiovisual image is to be supplied to the user in response to the user's command. The spherical image may be stored in database 2258 prior to being output to digital matrix switch 2250. The image is split into a number of sections, which when combined form the entire 180° sphere. By using suitable image processing software, the distortion is removed or minimized in each segment. The administrative unit 2262, in response to a user command, determines which segment of the sphere should be sent to the user. The administrative unit then directs the database server 2256 to retrieve and output the correct segment to the digital matrix switch 2250. By controlling the digital matrix switch 2250 and video matrix switch 2270, the administrative unit 2262 is able to ensure that the user receives the correct segment of the spherical image.

In one system the entire spherical (or other wide angle) video is communicated to the user, and the distortion removed by software at the user's terminal. This minimizes the complexity of the processing necessary at the web site 2140, and allows the user to store the entire spherical (or other wide angle) video.

Figure 38:
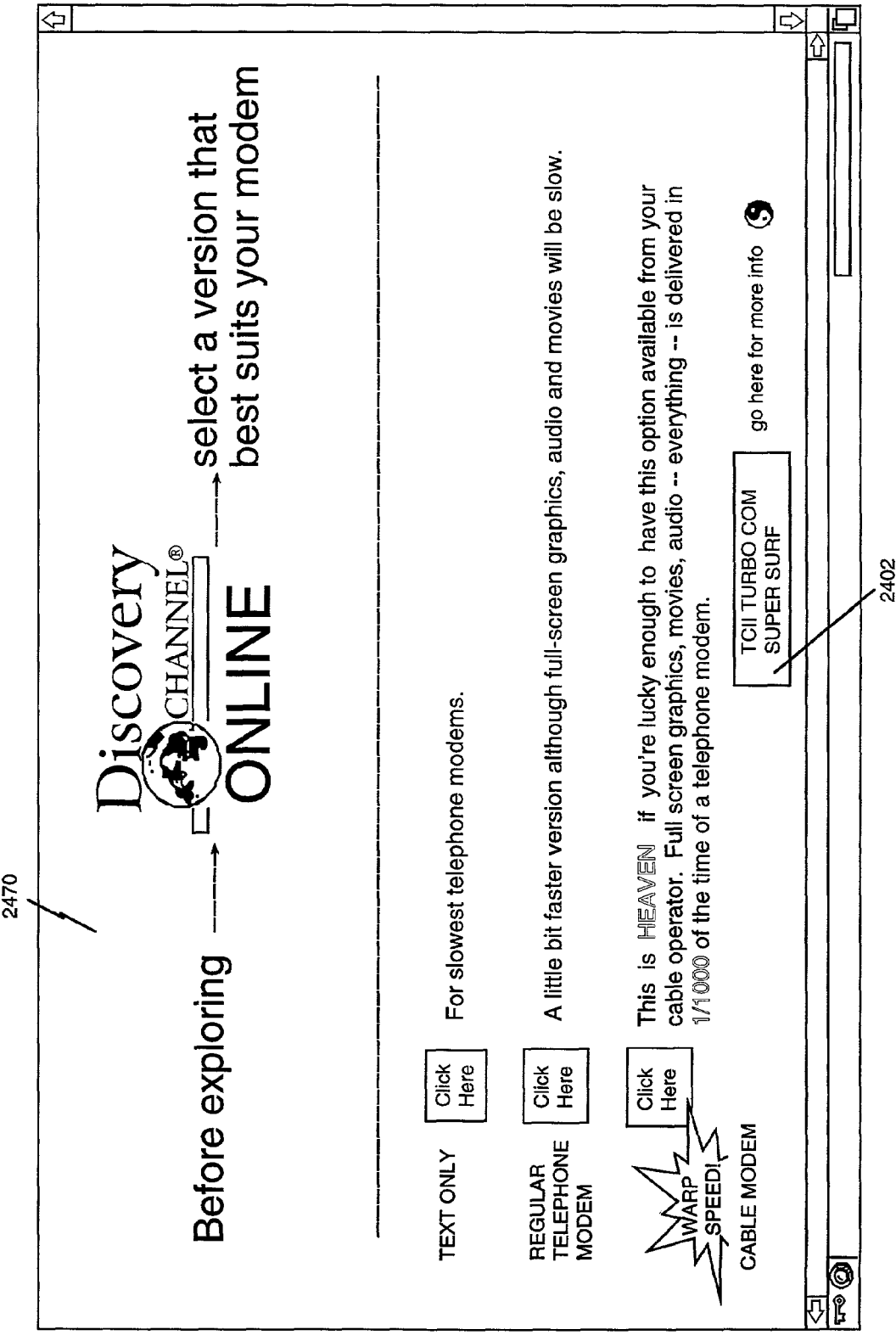
FIG. 38 shows a page directed to determining the user's data rate.

The communication equipment 2240 may be designed to automatically determine the maximum data rate at which information can be transmitted to the connected users. The data rate depends on the type of connection the web sites has with the user, and the type of equipment the user is operating. The communications equipment may use the maximum data rate possible as sensed from the user's communications. Alternatively, users may enter their data rates when prompted by a menu screen, as shown in FIG. 38 and described below. The data rates are then stored in communications equipment 2240. The communications equipment 2240 may also compress the video streams prior to transmission using any known compression algorithm. Additionally, the communications equipment may remove video frames, preferably prior to compression, such that the resulting data rate is reduced to be compatible with the user.

Figure 32A:
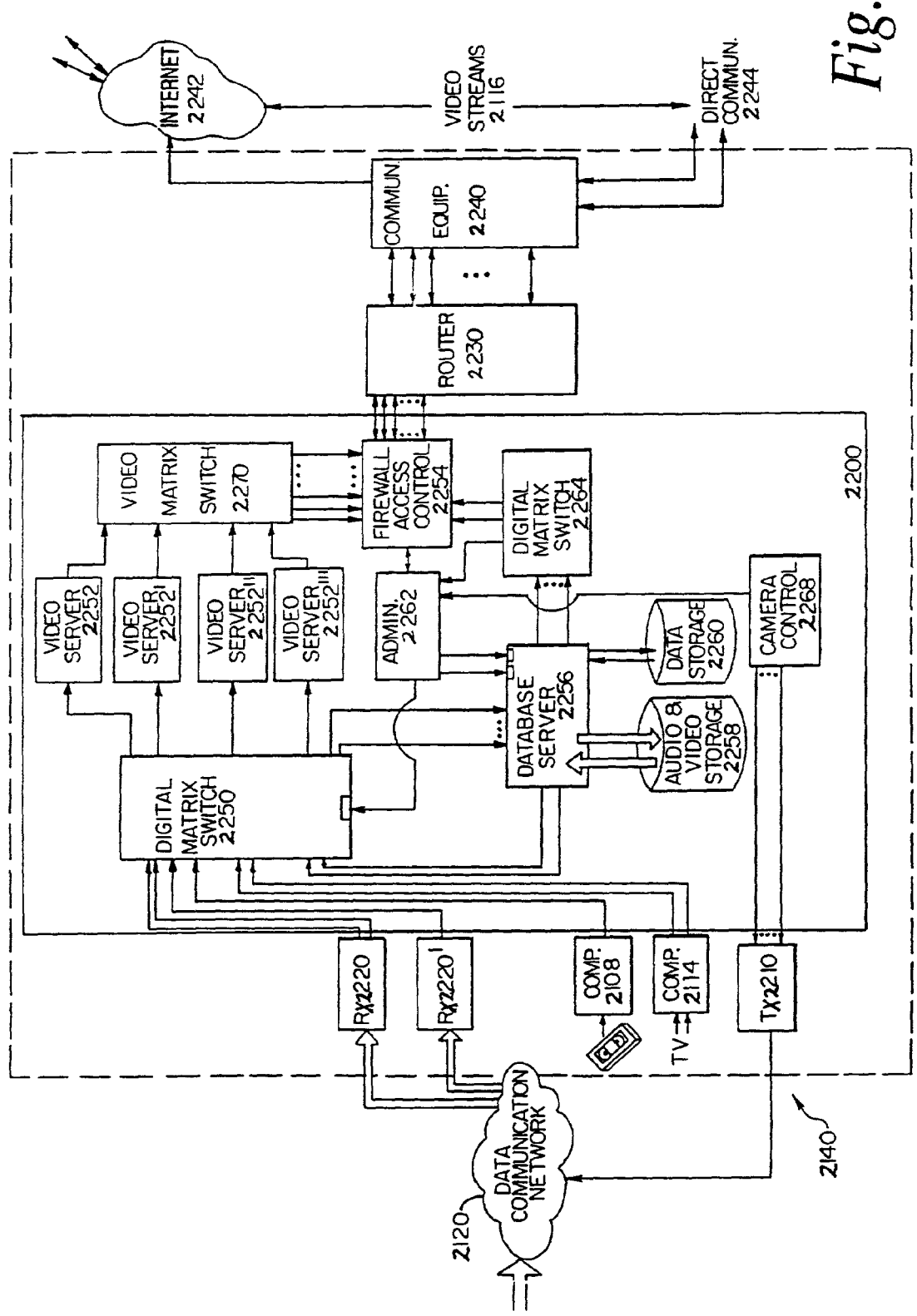
FIGS. 32a and 32b are block diagrams of a server platform.
Figure 32B:
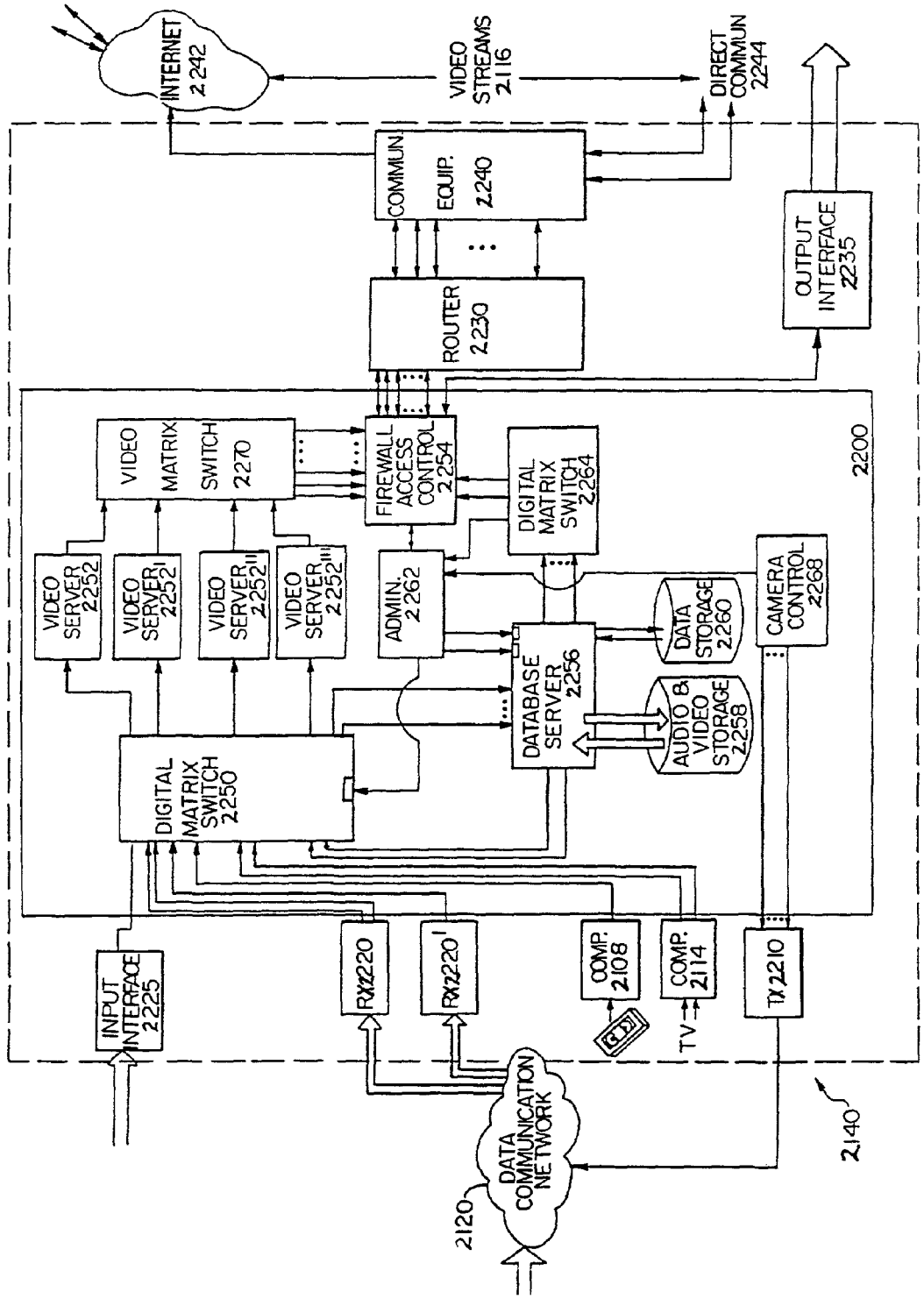

FIG. 32b is identical to FIG. 32a, but contains an input interface 2225 and an output interface 2235. The input interface 2225 is used to obtain digital video from other sources, such as a paging system, cellular system, cable television system, etc. The output interface connects the web site to other communications systems such as paging systems, cellular systems, or cable television systems. In the case where the input interface connects to an analog system, it contains suitable analog to digital converters (not shown). Also, where the output interface connects to an analog system, it contains suitable digital to analog converters (not shown).

For example, the input interface 2225 may obtain images or video from a paging system, and the output interface 2225 may be connected to a paging system to broadcast video or images to a selective call receiver. In this regard, the following publications are incorporated by reference, each of which relates video/images to selective call receivers: PCT Publication No. WO 96/07269, published Mar. 7, 1996 by Jambhekar et al., PCT Publication No. WO 96/21173, published Jul. 11, 1996 by Harris et al., and PCT Publication No. WO 96/21205, published Jul. 11, 1996 by Harris et al.

F. Communication to Electronic Book Home Systems

Figure 33:
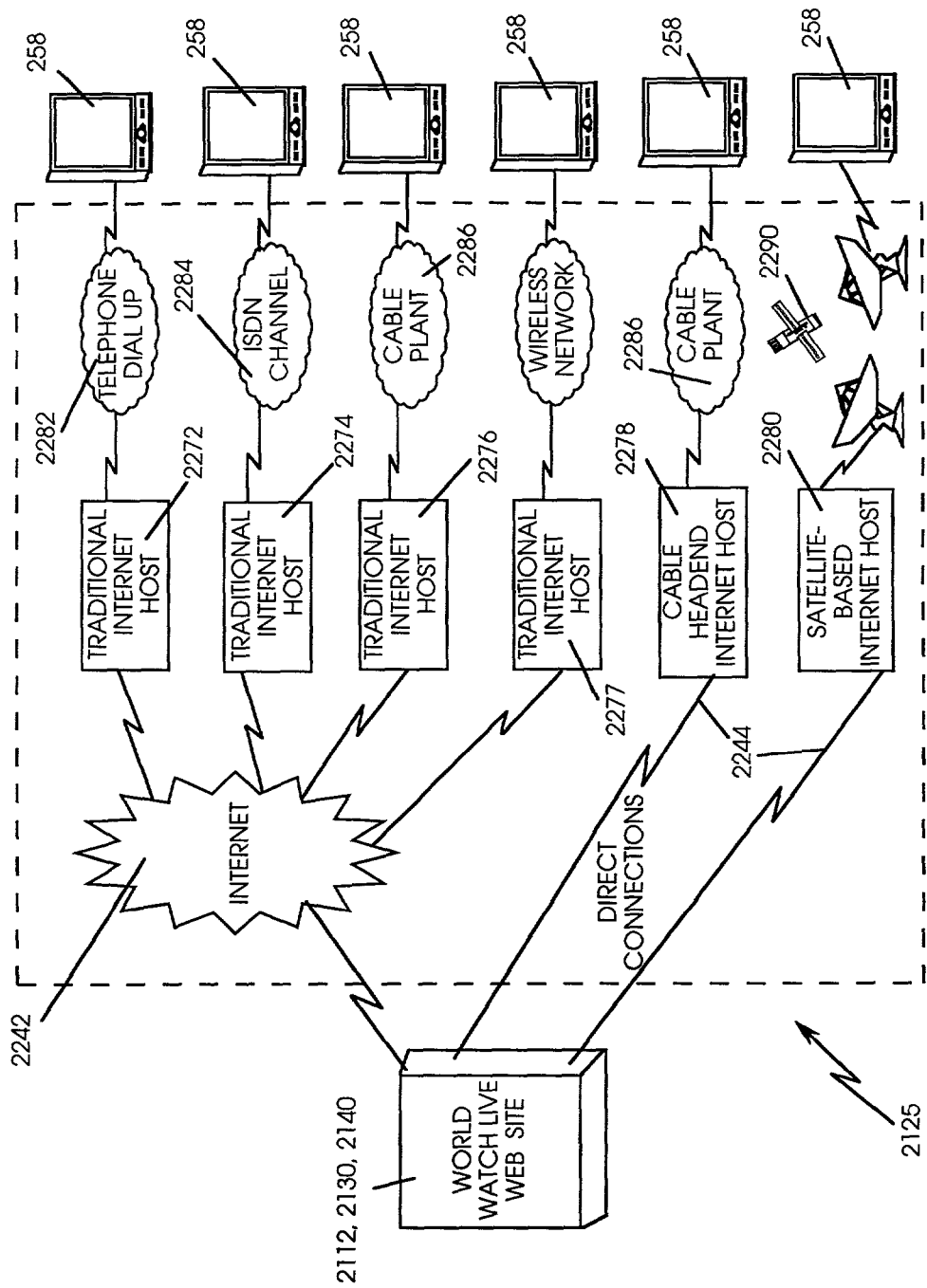
FIG. 33 is a block diagram of communications paths from the server site to remote users.

FIG. 33 shows how the users are connected to the web site using home system 258, and shows an example of a communications network 2125 (FIG. 31b) in detail. The connections shown in FIG. 33 apply to the web sites of the previous figures, including the web site 2112 (FIG. 24), 2130 (FIG. 25) and 2140 (FIGS. 26a and 32a). FIG. 33 shows a server platform 2200, the Internet 2242, two direct connection 2244, two traditional Internet hosts 2272, 2274, two cable Internet hosts 2276, 2278, a satellite-based Internet host 2280, a telephone dialup 2282, an ISDN channel 2284, a cable plant 2286, 2288, a satellite system 2290 and a plurality of connected user terminals. The user terminals shown in FIG. 33 are home systems 258 including electronic book viewers 266. However, the user terminals can be any electronic device capable of receiving and displaying digital data including personal computers, for example.

In operation, the web sites 2112, 2130, 2140 may communicate over the Internet 2242 to a number of different systems. These systems include the traditional Internet hosts 2272, 2274, the cable headend Internet host 2276 and the wireless Internet host 2277. The traditional Internet host 2272, 2274 may be connected using a telephone line 2282 or an ISDN channel 2284 to a plurality of home system 258. The cable Internet host 2276 may be connected using a cable plant 2286 to a home system 258.

Alternatively, the web site is connected using a direct connection 2244 to a cable headend Internet host 2278 or satellite-based Internet host 2280. The cable headend Internet host 2278 communicates to a cable plant 2288 and a home system 258. The satellite-based Internet host 2280 communicates using a satellite 2290 to a home system 258. These direct connections 2244 enable a higher data rate and use a high speed cable modem.

The communications equipment 2240 (FIG. 32a) may enable communications with any type of user terminal, including the home system 258, no matter what the data rate or system. User terminals with higher data rates will receive higher quality audio and video images.

G. Screen Displays and Features

FIGS. 34-39 show examples of display pages that are shown at the home system 258. The pages and menus are stored in data storage unit 2260 (FIG. 32a) as graphical and/or textual information. The world watch live menu may be accessed using the menu system 858 shown in FIG. 13.

Figure 34:
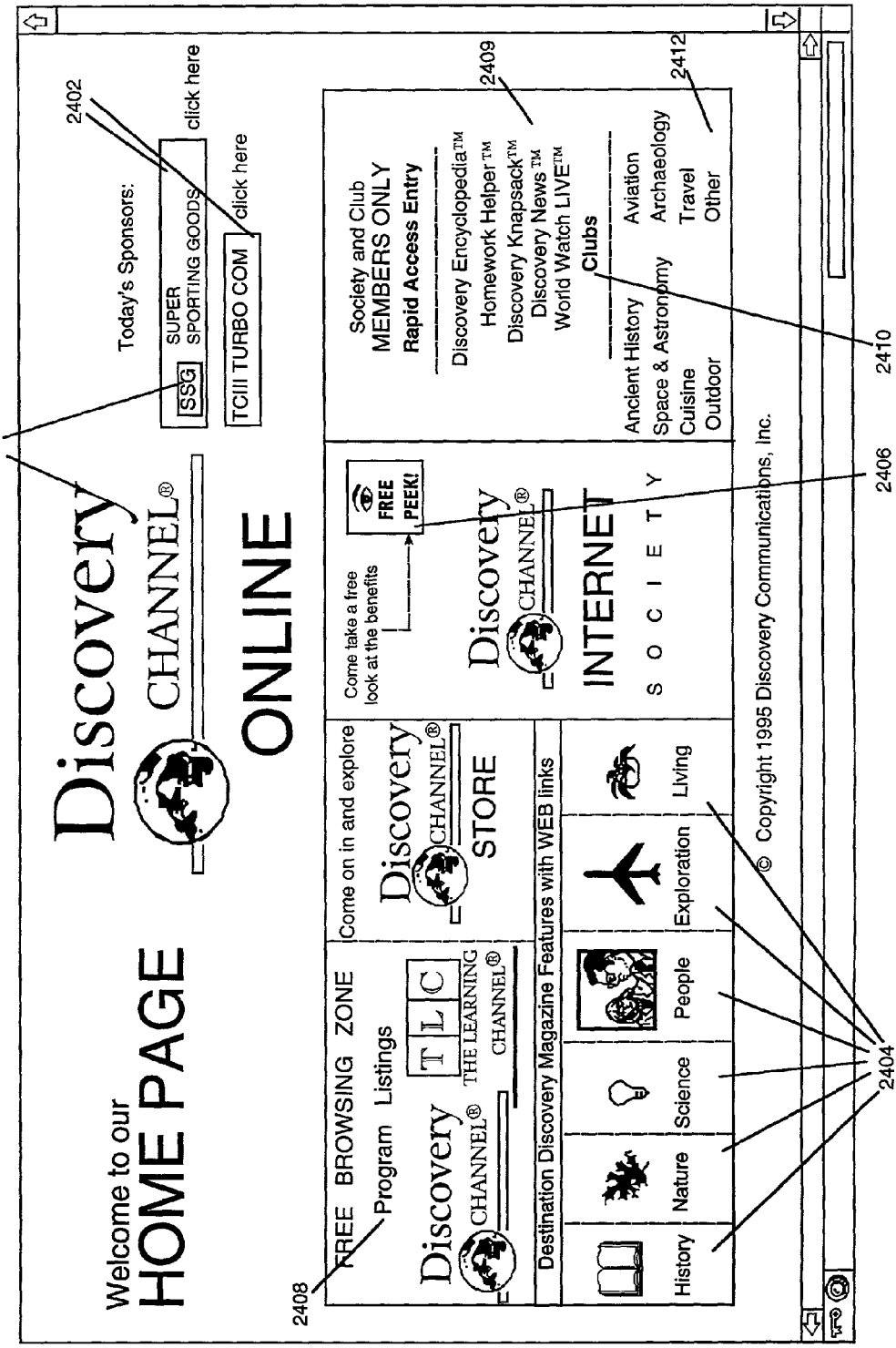
FIG. 34 shows a home page in accordance with an embodiment of the invention.

FIG. 34 shows an example of a home page 2400 that contains a number of advertisements 2402, numerous web links 2404, a society link 2406, options for viewing television programming 2408, a plurality of rapid access entry options 2409 including a world watch live option 2410, and options for clubs 2412.

The advertisements 2402 are useful for the page provider to generate revenue. As described previously, the system is designed such that television programming can be supplied over the Internet. Users may view television programming by selecting the home page television option 2408. The Magazines 2404 are used to provide information concerning specific topics to the user. Users may join a society, having additional membership benefits, through the "society" selection 2406. The world watch live feature 2410, part of the rapid access entry options 2409, is selected when users wish to watch live video from remote sites. The clubs shown in the club option 2412 are selected by users who wish to obtain information related to common areas of interest.

Figure 35:
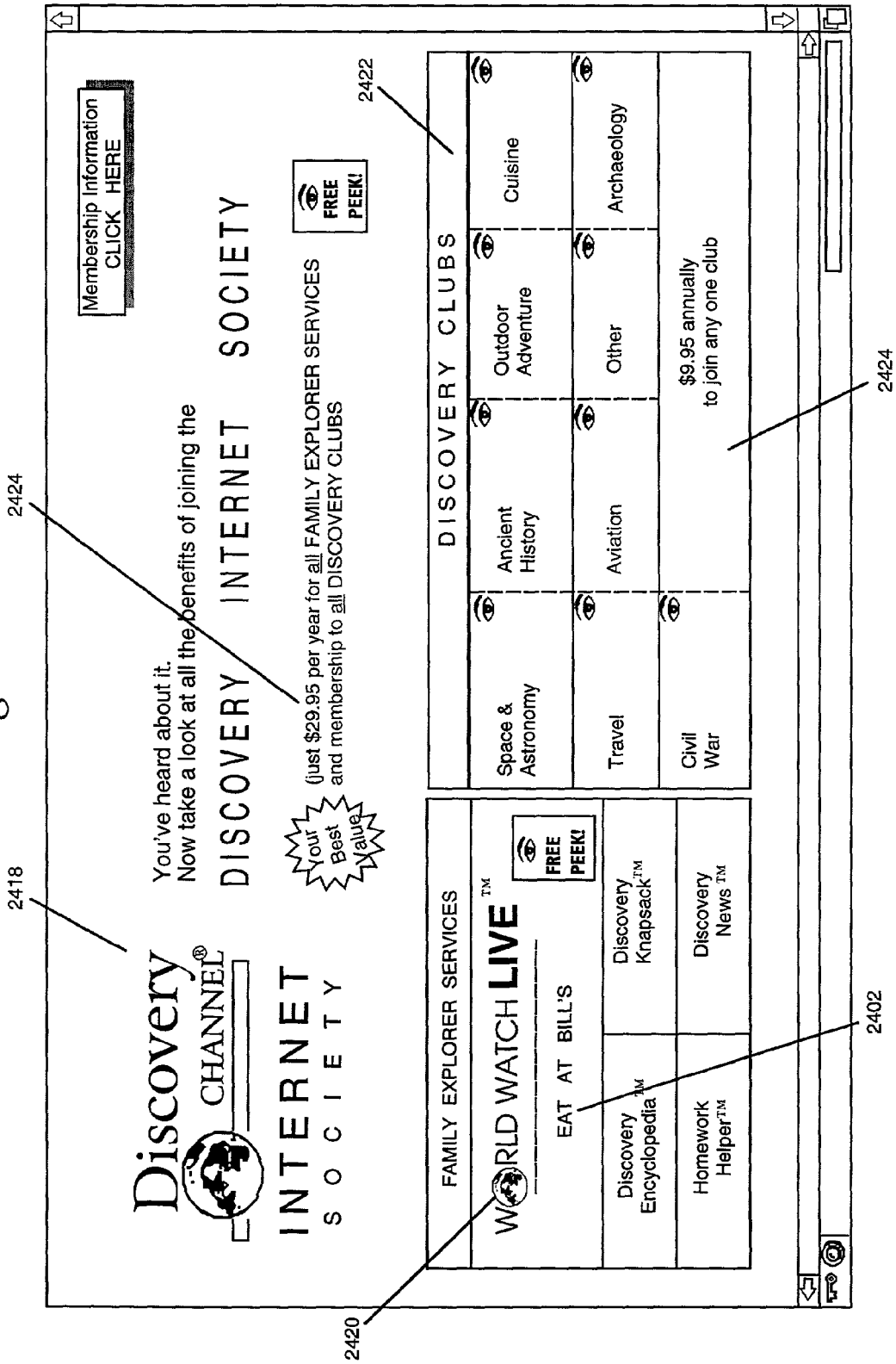
FIG. 35 shows a "society" page in accordance with another embodiment of the invention.

FIG. 35 shows a society menu 2406, selected from the FIG. 34 home menu page. As shown in FIG. 35, there are options for world watch live 2420, is an advertisement 2402, subscription information 2424, and numerous club options 2422. This screen and all the functions selected in response to the displayed options may be provided on a subscription or temporarily free basis.

Figure 36:
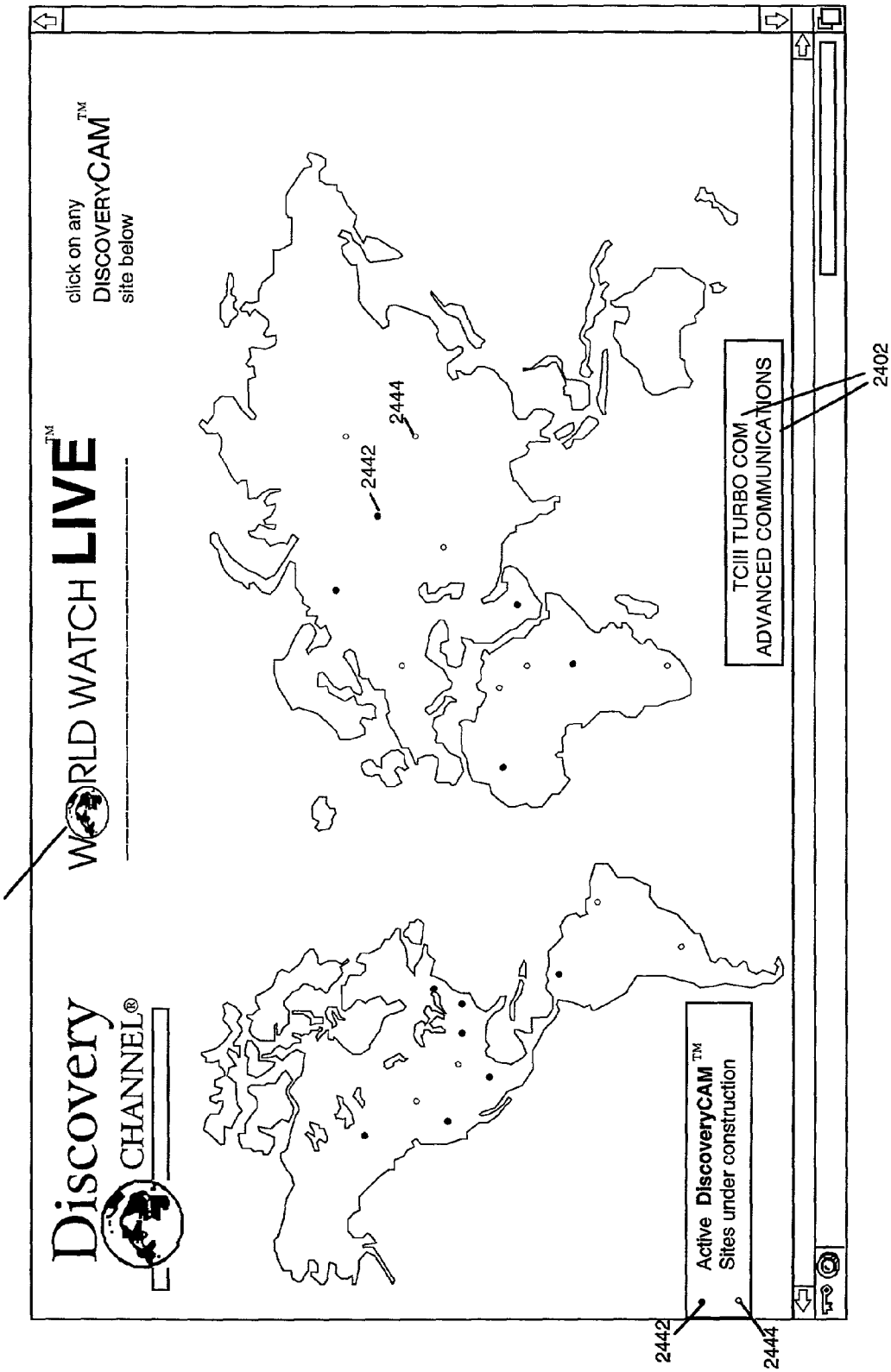
FIG. 36 shows a "map" page of remote camera locations throughout the world.

FIG. 36 shows one example of a world watch live menu 2440. This menu may be used to select remote locations from which to observe live or prerecorded video. In this example, a map of the world is presented with sites that are available to select for observing live video. The screen indicates sites that are active 2442 or under construction 2444. This menu also contains two advertisements 2402.

The world watch live embodiment allows connected users to visit virtually anyplace in the world to learn more about its culture, geography, or environment. Coupled with perceived or actual camera control and associated prestored video, textual and graphical information, a powerful and inexpensive learning tool is realized. This is more closely shown in FIG. 37.

Figure 37:
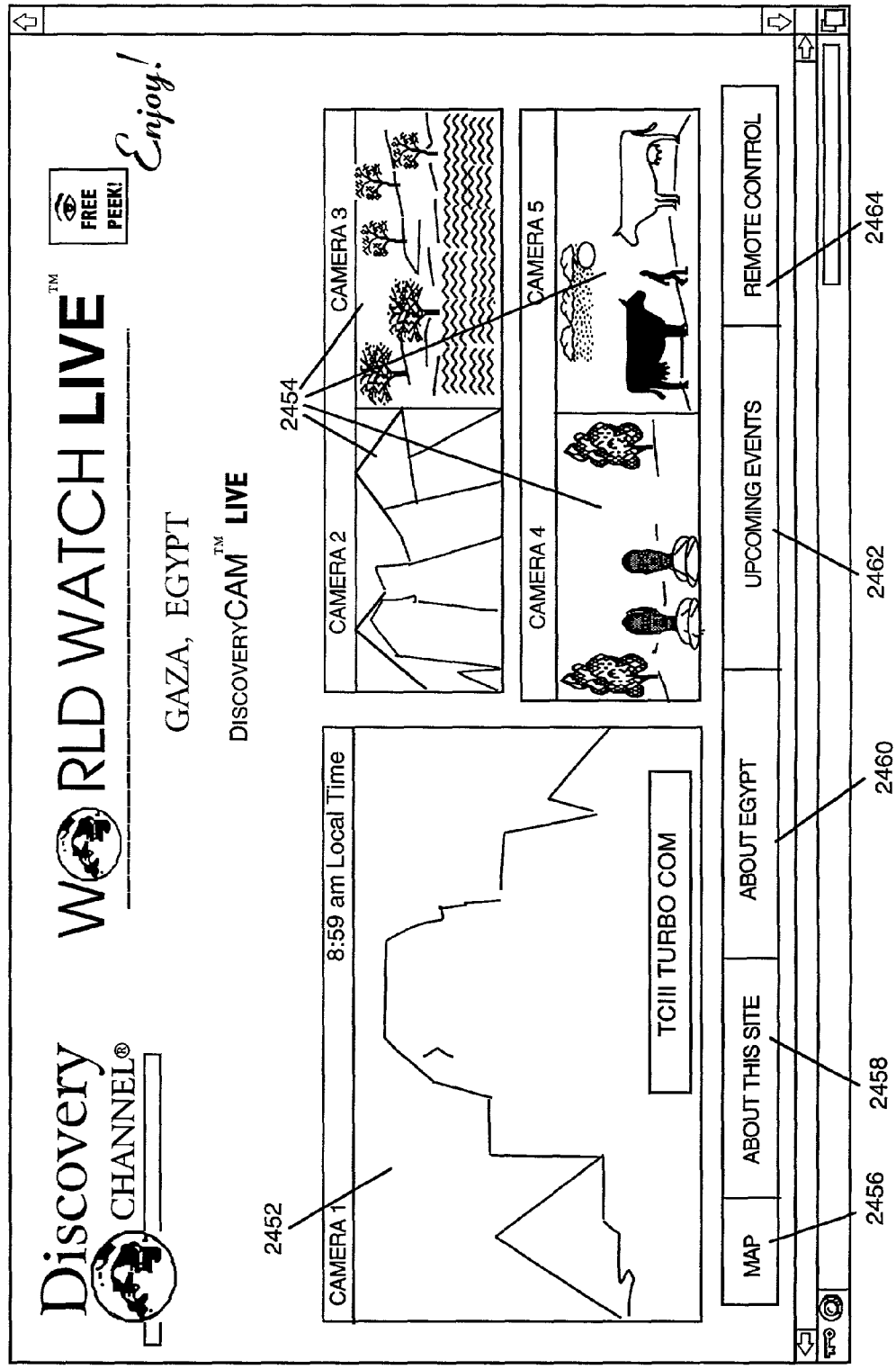
FIG. 37 shows a "watch" page containing live video feeds from five remote cameras.

FIG. 37 shows a menu 2450 that corresponds to the Egyptian site in FIG. 36. This screen concerns "Giza, Egypt", and contains live video from five cameras. As shown in the screen, there is camera one 2452, cameras two through five 2454, a "Map" option 2456, an "About This Site" option 2458, an "About Egypt" option 2460, an "Upcoming Events" option 2462 and a "Remote Control" option 2464. Camera one 2452 is the default for the main viewing camera. The user may select video image sizes and the number of images to be displayed, limited by the equipment the user is operating. Video from cameras two through five are supplied along with that from camera one to provide alternative sites and viewpoints about the topic of the screen (i.e., Egypt).

In an embodiment, the information presented in FIG. 37 may be accessed by activating a link in an electronic book. The link may exist in an electronic book devoted to the history and geography of Egypt. The link may exist in an electronic encyclopedia. The link may exist as a text address (e.g., a HTML address). The link may also exist as a location or an icon in the electronic history book or the electronic encyclopedia. When the link is activated, video feed, either live or delayed, may be provided to the user's terminal (e.g., the viewer 266, the personal computer 261, or the television 259, shown in FIG. 2). The video may be accompanied by audio data, text data and geographical data.

The "Map" option 2456 brings the user back to the world map (FIG. 36) to select additional sites. The "About This Site" option 2458 brings up text, graphics or additional video concerning the site of Giza, Egypt. For example, a professor appears and talks about the origin of the Sphinx (shown by camera 1). The embodiment shown in FIG. 39 and described below (interactive lecture) may be combined with the "About This Site" option. Additionally, other video may be displayed in response to selection of "About This Site". Such video may be a documentary of the Sphinx or discussion about the technology that historians estimate was used to construct the Sphinx.

The "About Egypt" option 2460 brings up graphics, text or additional video concerning Egypt. For example, a map of Egypt with population densities may be shown. The option for "Upcoming Events" 2462 brings graphics, text or video concerning new events in Egypt. For example, text and newspaper articles concerning the construction of new irrigation canals is displayed.

"Remote Control" option 2464 brings up a command menu (such as the "tool bar" 2151 of FIGS. 28*a*-28*d*) that allows the user to change camera angles or positioning in any of the cameras capable of that effect. The menu would apply to actual or perceived camera control. For example, the user could pan around the Sphinx (camera 1, shown at 2452) to observe it from the front, each side, and back.

Thus, this single screen relating to Egypt provides a wealth of information at a single Internet address (or web site). The user may, but need not, "link" to other locations on the Internet. Audiovisual presentations are displayed, which give the user insight into the people and culture of Egypt. Text, graphics, and additional stored video is available to further educate the user. Camera control (actual or perceived) gives the user the feeling of walking around different locations in Egypt.

FIG. 38 shows a screen 2470 that asks users about their equipment in order to determine the appropriate data rate for communications. Preferably the screen is not needed and the data rate is determined by communication equipment 2240 automatically. Note that an advertisement 2402 is also shown on this screen.

Figure 39:
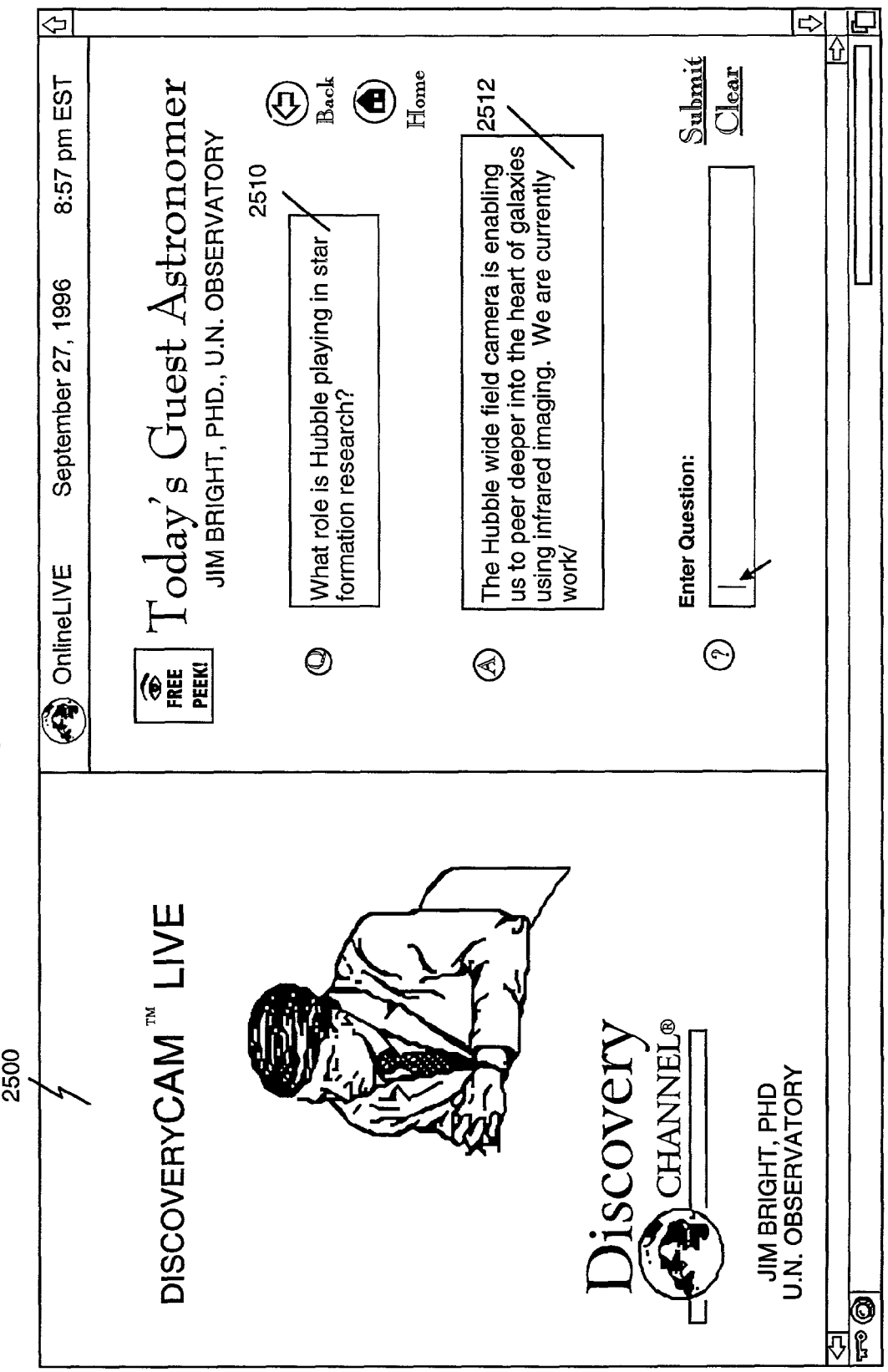
FIG. 39 shows a page of an interactive lecture.

FIG. 39 shows an interactive lecture system. As shown in FIG. 39, live video 2500 of an astronomy professor's lecture is transmitted to connected users. The users are able to ask the professor questions 2510 and receive answers 2512. The live video 2500, questions 2510, and answers 2512 are shown to all connected users. The users may enter questions via keyboard or microphone. However, if suitable data rates are available, the user may ask a question via video. Thus a split screen video showing both the person asking the question and the lecturer may be presented to all users simultaneously. The answers are preferably given by the lecturer, who may observe the question on a remote display. Alternatively, the answers may be supplied by the web site as text, graphics, or prestored video. The answer may pass through a closed captioning device, be encoded, and displayed on the screen in an answer box 2512. Other techniques for two-way video communication are described in co-pending U.S. patent application Ser. No. 09/391,461 entitled VIDEO CONFERENCING USING AN ELECTRONIC BOOK VIEWER, filed Sep. 8, 1999, the disclosure of which is hereby incorporated by reference.

Referring to FIG. 32*a*, questions are sent to the web site 2140 as part of the normal user terminal communication. The web site 2140 receives the question at the communications equipment 2240 and forwards the question through router 2230 and the firewall/access control unit 2254 to the administrative unit 2262. The administrative unit 2262 determines whether the question can be answered by playing stored video or showing stored text or graphics. If so, the administrative unit 2262 directs the database server 2256 to recall the appropriate information. The information is then output through the matrix switches 2250, 2270 or 2264, under control of the administrative unit, as appropriate. The ability of the administrative unit to answer questions depends upon the complexity of its software. Simple, prestored answers to frequently asked or standard questions may be provided in a basic system. More advanced systems may utilize an interpreter to analyze the question before providing an answer. For example, frequently asked questions in the astronomy field may be "what is a star"? or "how was the galaxy formed"? In response to these questions, which may be provided on a menu or list, the administrative unit recalls prestored answers in either video, text, or graphics.

If a question cannot be answered by the administrative unit, or is sent directly to the remote lecturer, the question proceeds to the remote lecturer in a similar fashion as the camera control signal (FIG. 26*a*) discussed previously. However, in the interactive lecture embodiment, the camera control unit 2268 (FIG. 32*a*) is replaced with a question format unit (not shown) which reformats the question under control of the administrative unit 2262. Transmitter 2210 then transmits a question signal to the location of the remote lecture via the data communication network 2120 and the communication paths 2126, 2128. The lecturer has a display which shows questions received over the data communication network.

In an alternative system, the lecturer or a number of assistants may select from among many prestored answers in response to a question. In this system, the remote lecturer has a computer and monitor (not shown) which displays the questions and the available prestored answers. The lecturer or assistants then match answers with the questions. The prestored answers are preferably forwarded to the individual who asked the associated question. In order for others to learn from the questions, the questions and answers may be provided to all connected users.

Figure 40:
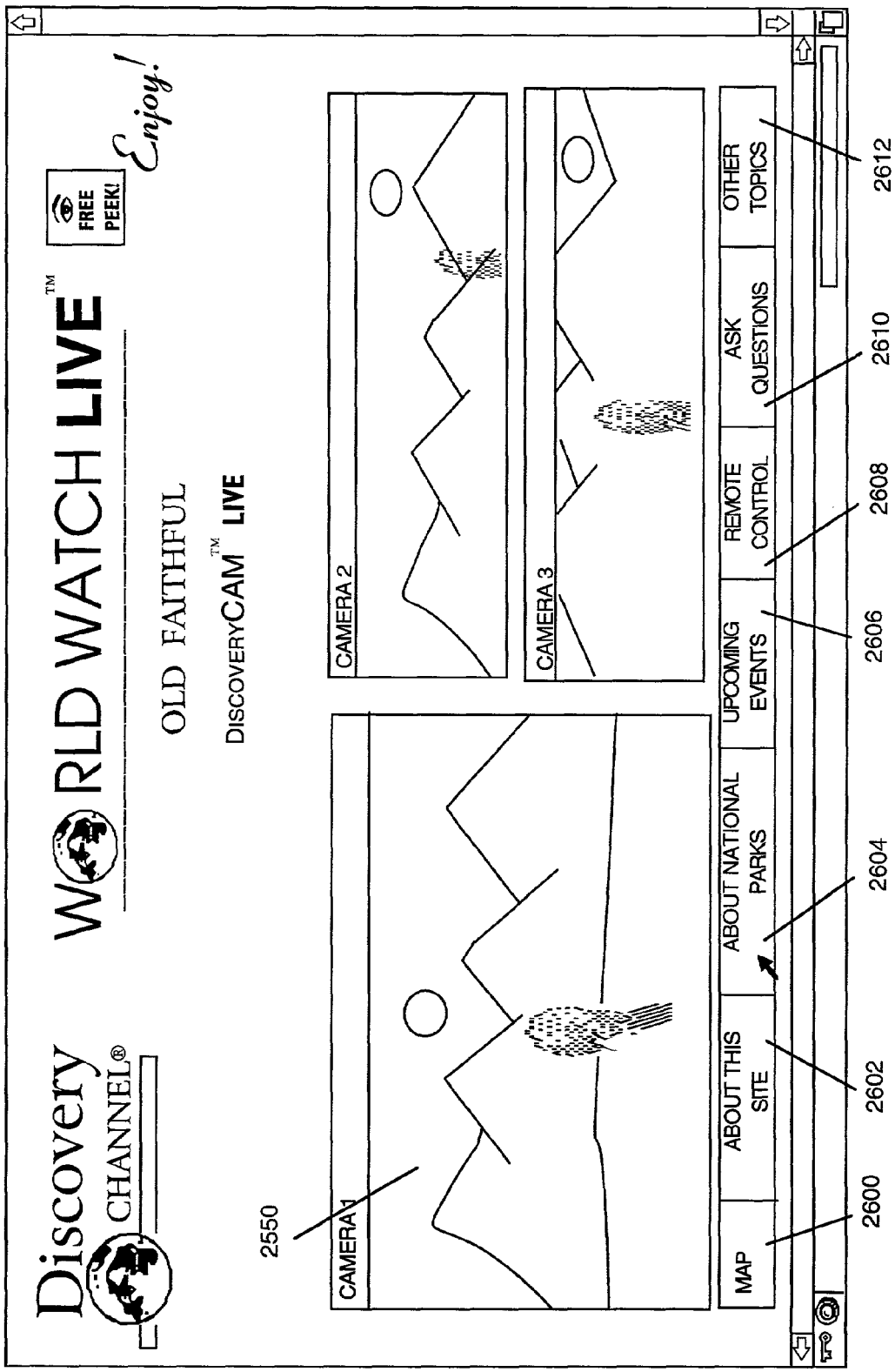
FIGS. 40 and 41 show pages of an embodiment of the invention that combines live video, prestored video, graphics, and interactive questions.
Figure 41:
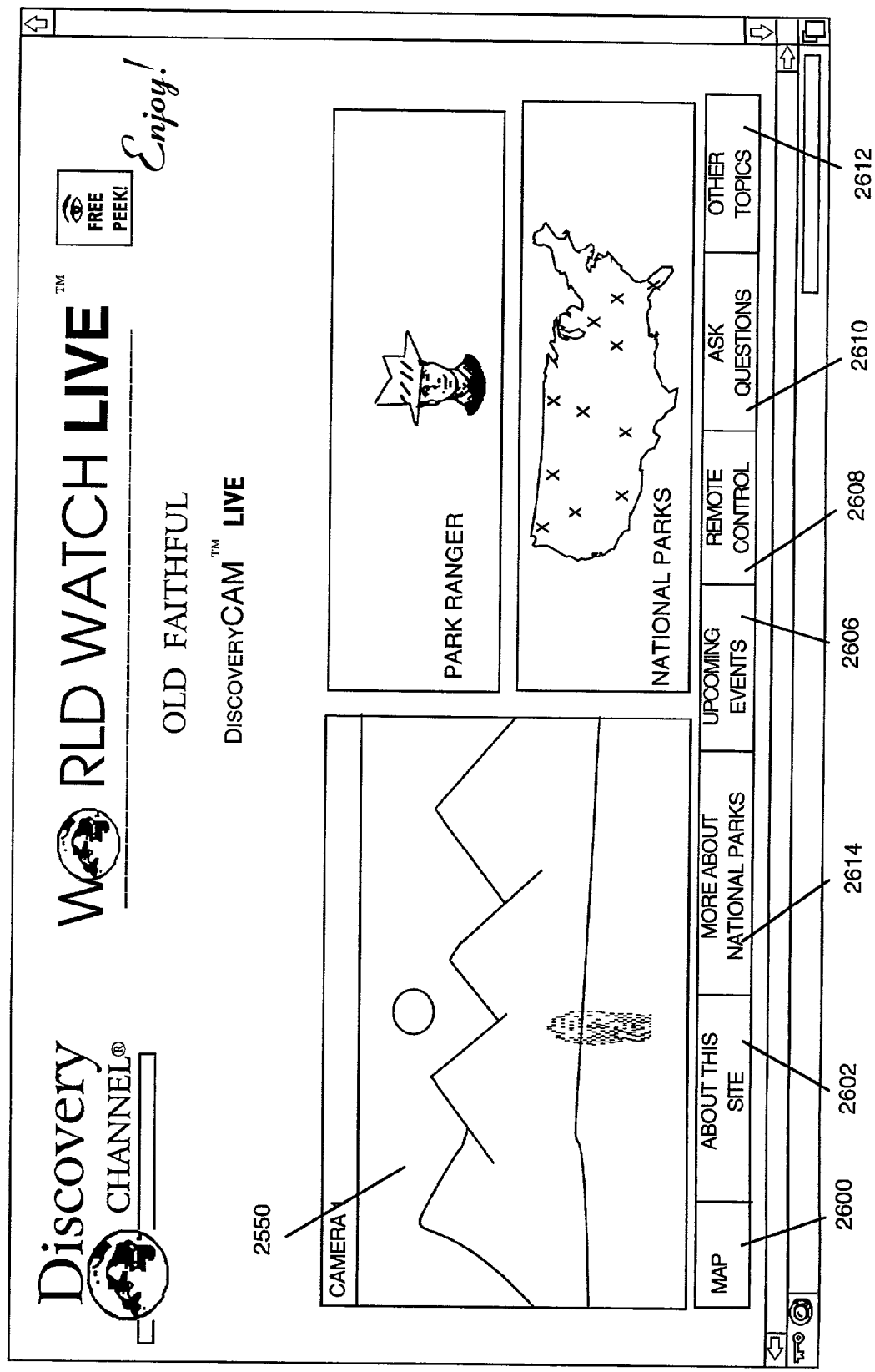

FIGS. 40 and 41 show a system that uses a combination of live video, stored video, stored graphics, camera control and interactive questioning. The live video 2550 of camera 1 shown in FIG. 40 relates to a geological site, i.e., the geyser, "Old Faithful." Since the site is located on a National Park, the display screen has been customized to allow for the selection "About National Parks" 2604. When this is selected, the user's command is communicated to the web server 2112, 2130, 2140 for analysis by the administrative unit 2262. The Administrative unit 2262 determines that prestored video and graphics are required, and instructs the database server 2256 to output the correct information: video to the matrix switch 2250, and graphics to the matrix switch 2264. The matrix switches, 2250, 2270, and 2264, under control of the administrative unit 2262, forward the video and graphics to the user through the communication equipment 2240.

FIG. 41 shows the result at the user terminal. The communicated prestored video 2560 of a Park Ranger appears on the screen. The Park Ranger discusses the topic of National Parks. The discussion occurs in conjunction with a graphical display of the locations of all National Parks, shown at the screen location 2570.

The user may select other options, such as "Map 600" to return to the map of all remote sites, "About This Site" 2602 to learn more about the site currently viewed, "More About National Parks" 2614 for even more information about National Parks, "Upcoming Events" 2606 for a schedule of upcoming events, "Remote Control" 2608 for remote (either actual or perceived) control of the camera (i.e. camera 1), "Ask Questions" 2610 for asking questions (as in FIG. 39) to an on-line Park Ranger, and "Other Topics" 2612, for a list of other topics and/or options.

H. Surveillance Systems

The remote camera systems discussed above may be used in a surveillance or tracking system. For example, a researcher may place a video camera in the center of a watering hole, preferably connected to a video recorder for storing many hours of activity at the watering hole. Multiple cameras or a wide-angle lens may be used such that virtual camera control (as described previously) may be performed on the video. Such a surveillance system has many advantages.

First, the surveillance system allows for automatic scanning of the surveyed area, without the need for moving any cameras. Additionally, viewing multiple segments of the area under surveillance may be viewed at the same time in a split-screen or multi-screen image. All that needs to be done is the removal of distortion in multiple segments of the video (if using a wide-angle lens). The disclosure of U.S. Pat. No. 5,359,363, issued Oct. 25, 1994 to Kuban et al., incorporated herein by reference, discloses one example usable with the surveillance system.

Second, automatic monitoring and/or tracking may be performed. Often, researchers and photographers wait through long periods of inactivity before a desired event occurs. For example, a photographer may wait for hours for a lion or other wildlife to approach the photographer's position. The system may be used to automatically monitor a remote region for activity. In this case, a processor may monitor the multiple cameras or the digital wide-angle video for pixel changes indicating the desired event. For example, an approaching lion in an otherwise inactive desert environment will cause a moving pattern to form on a camera's output or in the wide angle image. A processor may detect the pattern and alert a wildlife researcher that an event is occurring.

Further, the processor may automatically and continually display the relevant camera output, or the segment of the wide angle image containing the lion, thereby tracking the lion. Thus, the present invention may employ tracking techniques, known in the prior art, to the obtained digital image.

In the monitoring and tracking embodiment distortion may be removed from the wide angle image prior to performing the processing to determine whether an event is occurring. The type of event being monitored and nature of the object being tracked controls whether monitoring and/or tracking may be performed on the distorted or undistorted image. One of ordinary skill in the art will choose the system best suited for the particular monitored event or tracked object.

Figure 42:
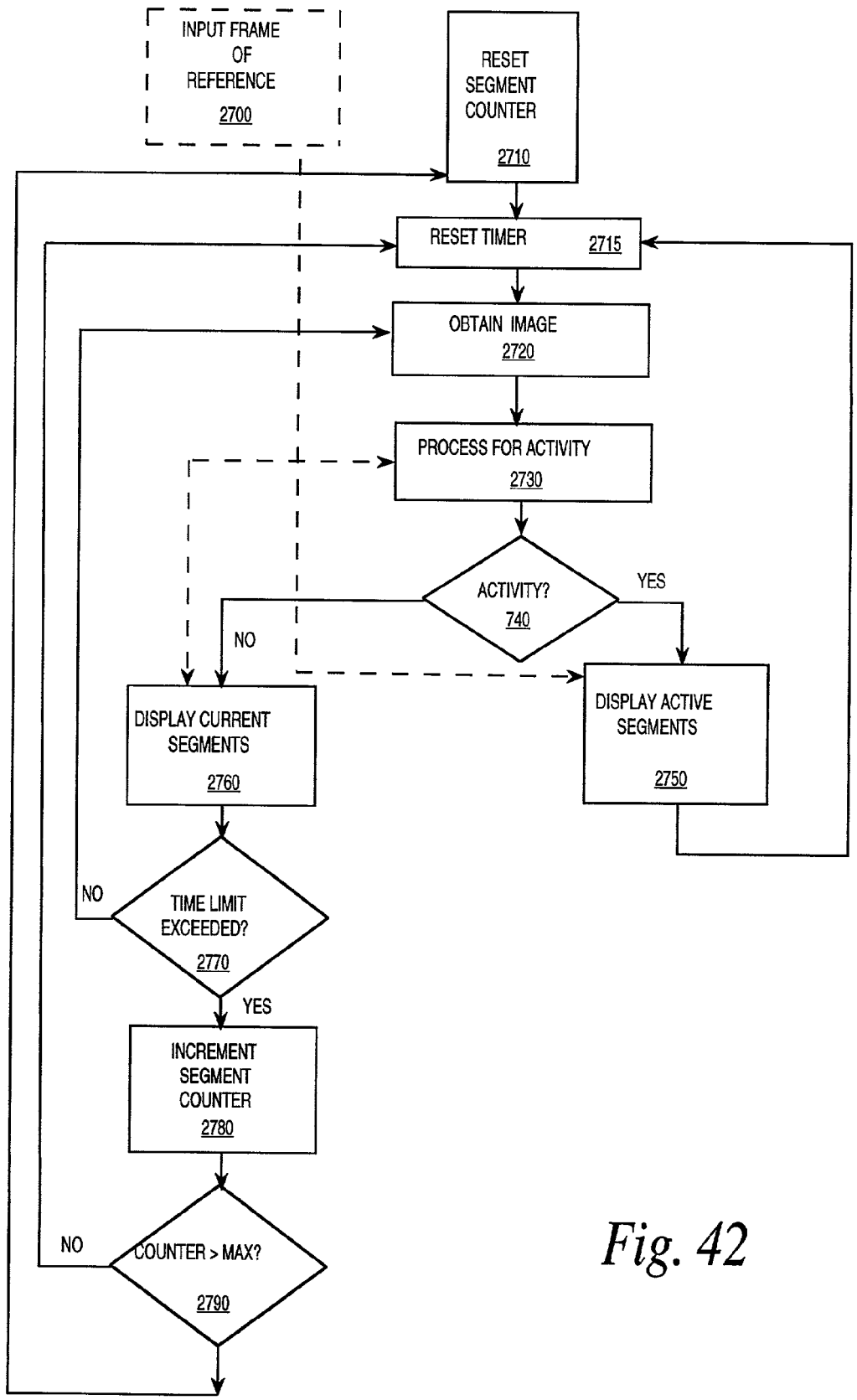
FIG. 42 shows a flow diagram of a method of automatically monitoring and panning an area using perceived camera control.

FIG. 42 shows a flow diagram of a monitoring and tracking system. The software necessary to perform the monitoring/tracking functions may be located at the web site or at the user's terminal, such as the home system 258 and viewer 266. The image/video signal to be processed for monitoring and/or tracking may be a live video feed or be played back from stored video. Thus, a wildlife scientist may leave multiple video cameras running overnight (or a single video camera with a wide-angle lens) and when the video tape is played back, the segments/cameras containing activity are displayed.

Referring to FIG. 42, an "input frame of reference" routine 2700 is executed. This routine is optional, and is used to establish a frame of reference direction, such as north. The frame of reference may deter mine the first segment of a wide-angle image to view, or the first camera to view. Next, a "reset segment counter" routine 2710 is executed. This sets the segment or camera to be first displayed.

Each segment or camera is viewed only for a limited time, prior to viewing the next segment or camera. Thus, a "reset timer" routine 2715 is executed to reset the interval when segments or cameras are switched.

Next, the "obtain image" routine 2720 is executed. This routine obtains the wide angle image (live or prerecorded), or images from all the cameras (in the multiple camera perceived control embodiment of FIGS. 27-28*d*). The obtained image from a wide-angle lens may be processed to remove the distortion or not, depending on what is being monitored.

The obtained image is processed to determine active areas (cameras or segments). Active areas are areas where the processor deter mines that activity is taking place, either by changes in the pixels at those locations, by using other known image/video processing techniques, or by using external sensors. The processing is performed as known in the art and is not described further herein. The processing occurs during the "process for activity" routine 2730. This routine uses the frame of reference to determine which segment(s), relative to the normal (i.e., north) is/are active.

If activity is present, the "display active segments" routine 2750 displays the active segments or cameras on a display. Distortion from the relevant segments is removed in the wide-angle lens embodiment. If more than one segment is active, a split screen display may show each segment simultaneously. The split screen display may make reference to the frame of reference that was previously entered during routine 2700. The "reset timer" routine 2710 is then executed so that the last segment under view is returned when activity is no longer present.

If activity is not present, the "display current segment" routine 2760 is executed. This routine displays the current segment or camera until the timer expires, at which point the next segment or camera is displayed. The display may make reference to the frame of reference which was previously entered during routine 2700.

After displaying the current segment or camera, the "time limit exceeded" routine 2770 is executed. If the time limit has not been exceeded, a branch to the "obtain image" routine 2720 occurs and processing continues until the time limit is exceeded, or until activity occurs. In an "autopan" embodiment (FIG. 28*a*), the time limit value may be increased by pressing the "−" button in conjunction with the "speed" button (FIG. 28*a*), for a slower autopan, and the time limit may be decreased by pressing the "+" button in conjunction with the "speed" button (FIG. 28*a*) for a faster autopan.

If the time limit is exceeded, the segment (or camera) counter is incremented by the "increment segment counter" routine 2780. If the counter is greater than the maximum number of cameras or segments, the "counter>max" routine 2790 branches to the "reset segment counter" routine 2710, to restart the automatic panning. If the counter is not greater than allowed, a branch occurs to the "reset timer" routine 2715 so that the next segment or camera may be displayed, and processing for activity continues.

Thus, the flow chart of FIG. 42 allows for automatic panning and for automatic tracking. If the "process for activity" routine 2730, the "activity?" test 2740, and the "display active segments" routine 2750 were removed, the "autopan" function described previously and shown with respect to FIGS. 28a-28d would be achieved. In this case, "display current segment" routine 2760 would follow "obtain image" routine 2740.

Monitoring and automatic panning may be combined. When combined, all active segments or cameras are automatically panned for a brief timeframe. Thus, if a lion and zebra are both moving towards the camera from opposite direction, each would be displayed for a brief timeframe before switching to a display of the other. This is an alternative to the split screen display previously described.

I. Display of Video Data

In the systems described above, the user may select or be provided data concerning the video currently displayed. For example, superimposed on the video may be the date and time the video was recorded, a name of the image location, remaining time for the video, or data pertaining to the segment (or camera source) of the video which is currently being viewed.

This segment/camera data may be a compass heading (such as north) or angle from a reference (such as 40 degrees), or coordinate information (such as X/Y, X/Y/Z, R/Θ, and X/R/Θ) relating to the location of the center of the segment/video currently displayed in relation to the wide angle image or other cameras. A graphical representation of the lens (or layout of the cameras) may show which segment of the wide angle image (or camera) is being displayed. In order to display the image segment, a frame of reference may be adopted, especially for a spherical lens. The frame of reference would be either generated by a processor at the web site or user's terminal, or entered by a user or operator. For example, the user may select which direction is "north" or position the axis of a coordinate system if a coordinate display is to be used for a particular lens.

Additionally, the image's magnification and its density/colors may also be shown on the display, such as "magnification=10×, picture density=200×200 pixels, 64 colors."

The display of image data may be used in all embodiments of the present invention, and are preferably updated when the displayed image changes.

Figure 43:
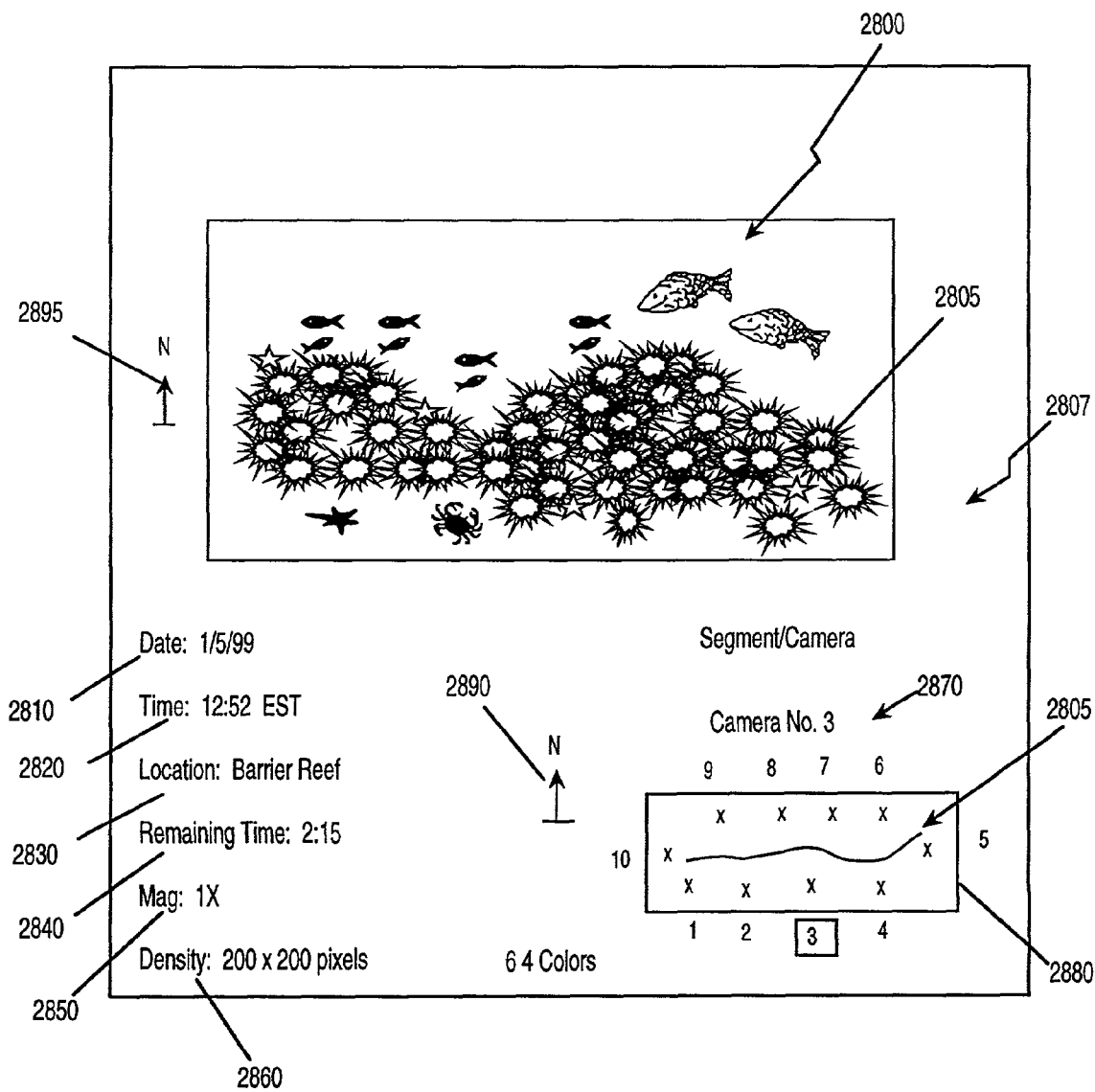
FIG. 43 is an exemplary screen display of the present invention, showing video and also showing video data.

FIG. 43 shows a display 2800 showing a coral reef 2805 where users have virtual camera control using multiple underwater cameras. On the screen 2807, the date 2810 is displayed along with the time 2820. The location is shown at 2830 and the remaining time of the program at 2840. The magnification is shown at 2850 and the density and colors at 2860. The segment camera field 2870 shows that the user is viewing camera no. 3. This segment/camera data may be shown graphically, as depicted at 2880. Field 2880 is a top view of the coral reef 2805 and the layout of the cameras, in this case cameras 1 through 10. The square around camera no. 3 indicates that this camera is the source of the picture on the display 2800. The frame of reference (north) is indicated at 2890 for the graphical segment data and 2895 for the video data.

J. Storing Video and Interactive Presentations.

The images, video, and image data may also be stored at the user's terminal. The wide angle distorted image may be stored, along with the image data, if present. Storage of the image and image data enables the user to retrieve the image and view a segment at a later date. Optionally, the entire interactive presentation may be stored at the user's terminal (including associated graphics, text, video, data, or other information), although all the pertinent files and data would have to be received by the user.

The disclosure of PCT Publication No. WO 96/08105, published Mar. 14, 1996 by Labun, incorporated herein by reference is related to storing images and may be used with the present invention.

The video or image may be stored in either its distorted or undistorted state. Storing the video or image in its undistorted state has the advantage in that tall and/or wide pictures may be stored in their most viewable state, and in that editing may be performed on the images more easily if they are retrieved with the distortion removed.

The artisan of ordinary skill will appreciate that other aspects of the patent applications, patents and publications incorporated herein by reference may be applied to the present invention. As such, the patent applications, patents and publications are incorporated herein in their entirety. The terms and descriptions used herein are set forth by way of illustration only and are not meant as limitations. Those skilled in the art will recognize that numerous variations are possible within the spirit and scope of the invention as defined in the following claims.

The invention claimed is:

1. An electronic book, comprising:
    a screen for displaying an electronic book content;
    at least one first component with at least one underlying link, wherein, upon selection of the at least one first component, the at least one first component links to at least an Internet web site for providing a plurality of streaming video, audio and text data when connected to the electronic book, wherein location information for each of the plurality of streaming video, audio and text data is provided in at least one hidden links table and the at least one hidden links table is provided in conjunction with downloading the content of the electronic book from a remote provider, and each of the at least one hidden links table is associated with the at least one first component with the at least one underlying link, and wherein the location information provides access to the plurality of streaming video, audio and text data, and wherein the at least one first component is a part of a content of the electronic book; and
    a control function wherein the control function allows selection of one or more of the plurality of streaming video, audio and text data while displaying the content of the electronic book, and wherein the selected data is displayed on the screen of the electronic book,
    wherein the hidden links table is updatable from a most current links table using information transmitted via the Internet web site from the remote provider, wherein the most current links table is downloaded to the electronic book either periodically by the remote provider, or when a new electronic book content is downloaded to the electronic book by the remote provider, and
    wherein the control function includes an on-screen show links button, upon selection of which a link menu is displayed on the screen of the electronic book along with the content of the electronic book, wherein the link menu shows all of the first components with the underlying links contained in the content of the electronic book displayed on the screen of the electronic book, and shows linked materials including a number of links, link numbers and descriptions of the linked materials that each of the first components with the underlying links is able to be linked to, such that, by choosing one of the links, a user is able to link to one of the linked materials.

2. The electronic book of claim 1, wherein the electronic book is adapted to be displayed on an electronic book viewer.

3. The electronic book of claim 1, wherein the electronic book is adapted to be displayed on a television.

4. The electronic book of claim 1, wherein the electronic book is adapted to be displayed on a personal computer.

5. The electronic book of claim 1, wherein the electronic book is adapted to be displayed on a palm-sized viewer.

6. The electronic book of claim 1, wherein the control function, comprises:
   a camera selection control that allows a user to select a camera angle from which is provided a video signal; and
   a multiple screen function that provides for display of video signals from more than one camera angle.

7. The electronic book of claim 6, wherein the video signals are tiled for display.

8. The electronic book of claim 6, wherein a first video signal is provided in a picture-in-picture format with a second video signal.

9. The electronic book of claim 1, wherein the electronic book is stored on a device having a memory, and wherein one or more of the streaming video, audio and text data are stored in the memory.

10. The electronic book of claim 1, wherein the one or more of the plurality of streaming video, audio and text data are provided live with display of the link in the electronic book.

11. The electronic book of claim 1, wherein the connection to the Internet web site is completed using a wired communication system.

12. The electronic book of claim 1, wherein the connection to the Internet web site is completed using a wireless communication system.

13. The electronic book of claim 1, wherein the connection to the Internet web site uses an electronic link.

14. The electronic book of claim 1, wherein the first component with an underline link connects to a second component, the second component being located on one selected from a group consisting of the same electronic book, an other electronic book stored locally with the electronic book, an electronic book database, and a material source accessible via the Internet web site.

15. The electronic book of claim 14, wherein each of the at least one first component is assigned an identifying index value.

16. The electronic book of claim 15, wherein the index value is contained in the at least one hidden table.

17. The electronic book of claim 16, wherein the index value of the at least one hidden links table maps the at least one first component with underline links to the second component.

18. The electronic book of claim 1, wherein the hidden links table is purchased separately from the electronic book.

19. The electronic book of claim 1, wherein new links are added to the hidden links table during update of the hidden links table.

20. The electronic book of claim 1, wherein the hidden links table is updated periodically.

21. The electronic book of claim 1, wherein the hidden links table is updated when a new electronic book is purchased.

22. The electronic book of claim 1, wherein the first component includes one of a word, a phrase, a sentence, a section of text, a paragraph, a page, a chapter, a drawing, a map, a video clip, and an audio clip of the displayed book.

23. The electronic book of claim 1, wherein the first component cross-linked to a third component, wherein the third component is part of the content of the electronic book.

* * * * *